United States Patent
Le Dantec et al.

(12)

(10) Patent No.: US 6,236,650 B1
(45) Date of Patent: *May 22, 2001

(54) TRANSMISSION MEDIUM SHARING UTILIZING SERVICE MESSAGES AND RANDOM BALLOT, AND METHOD, DEVICE AND SYSTEMS UTILIZING SAME

(75) Inventors: Claude Le Dantec, St Marc sur Couesnon; Falk Tannhauser, Rennes, both of (FR)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/723,781

(22) Filed: Sep. 30, 1996

(30) Foreign Application Priority Data

Oct. 2, 1995 (FR) .................................... 95 11574

(51) Int. Cl.[7] ....................................... H04J 3/16
(52) U.S. Cl. ........................... 370/346; 370/443; 370/449
(58) Field of Search ..................... 370/337, 340, 370/346, 347, 348, 349, 445, 449, 447, 448, 442, 443, 462

(56) References Cited

U.S. PATENT DOCUMENTS

| 5,274,841 | * | 12/1993 | Natarajan et al. | 370/337 |
| 5,297,144 | * | 3/1994 | Gilbert et al. | 370/346 |
| 5,384,777 | * | 1/1995 | Ahmadi et al. | 370/337 |
| 5,499,243 | * | 3/1996 | Hall | 370/346 |
| 5,555,266 | * | 9/1996 | Buchholz et al. | 370/347 |
| 5,740,167 | * | 4/1998 | Taketsugu et al. | 370/337 |

FOREIGN PATENT DOCUMENTS

| 483546A1 | 10/1991 | (EP) | H04L/12/56 |
| 621708A2 | 4/1994 | (EP) | H04L/12/28 |

* cited by examiner

*Primary Examiner*—Chau Nguyen
*Assistant Examiner*—Soon-Dong Hyun
(74) *Attorney, Agent, or Firm*—Fitzpatrick, Cella, Harper & Scinto

(57) ABSTRACT

In the digital communication systems, devices and methods described, a transmission medium is shared by means of service messages indicating to each digital communication device whether or not that device is authorized to send on the medium once the medium is free after the service message. Certain of these messages are collective authorization-to-send messages indicating to a group of communication devices that each is authorized to send by return. When such a collective message is sent, each receiving device, when attempting to send on the medium, determines whether or not it may send in return, in accordance with a preset rule which preferably involves a random ballot.

53 Claims, 102 Drawing Sheets

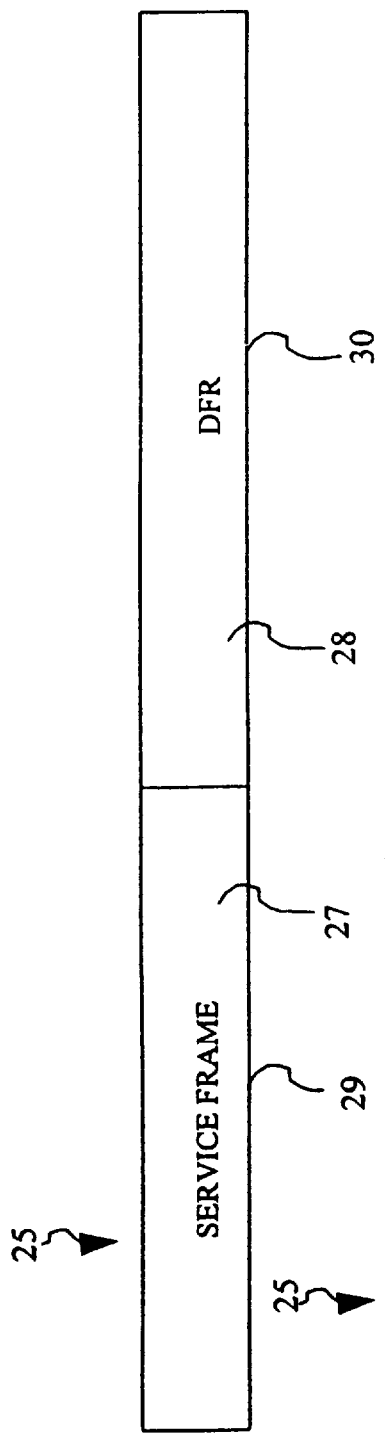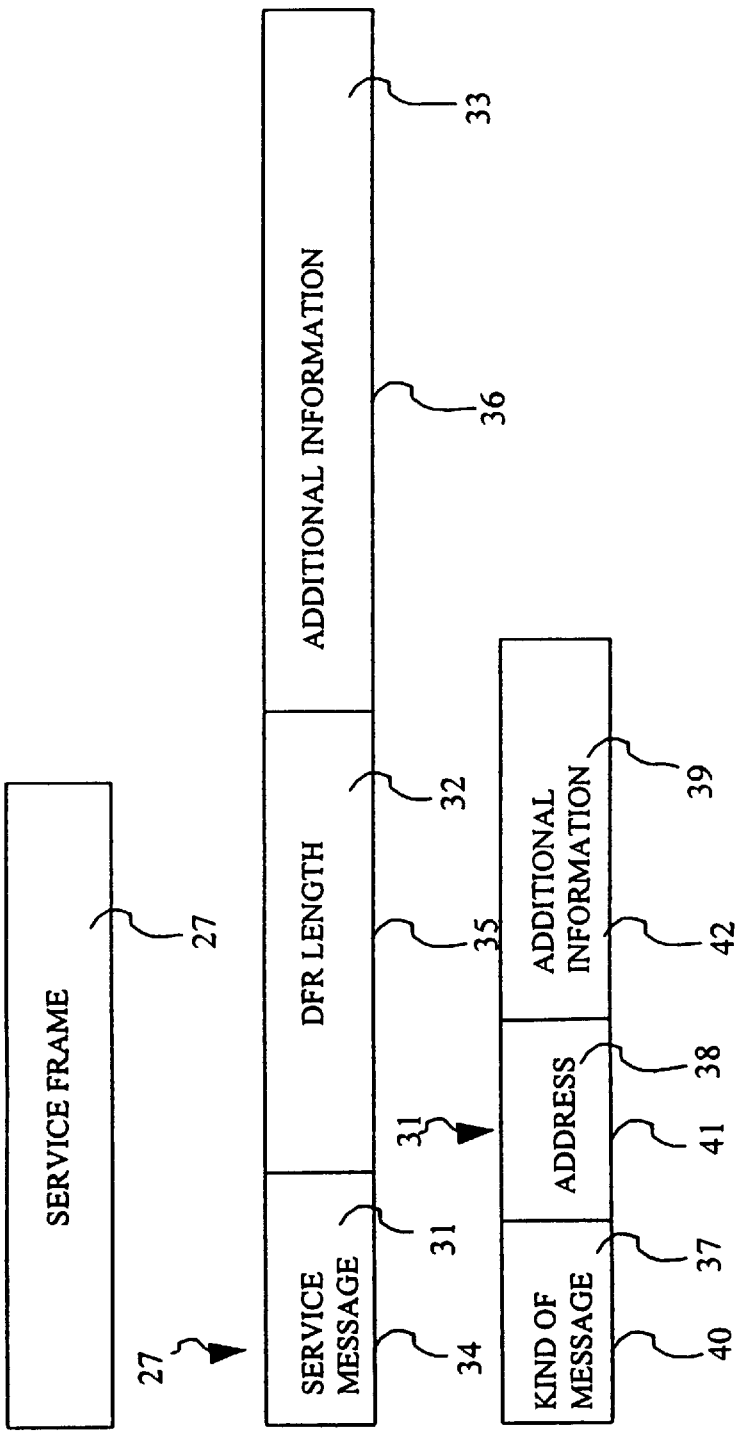

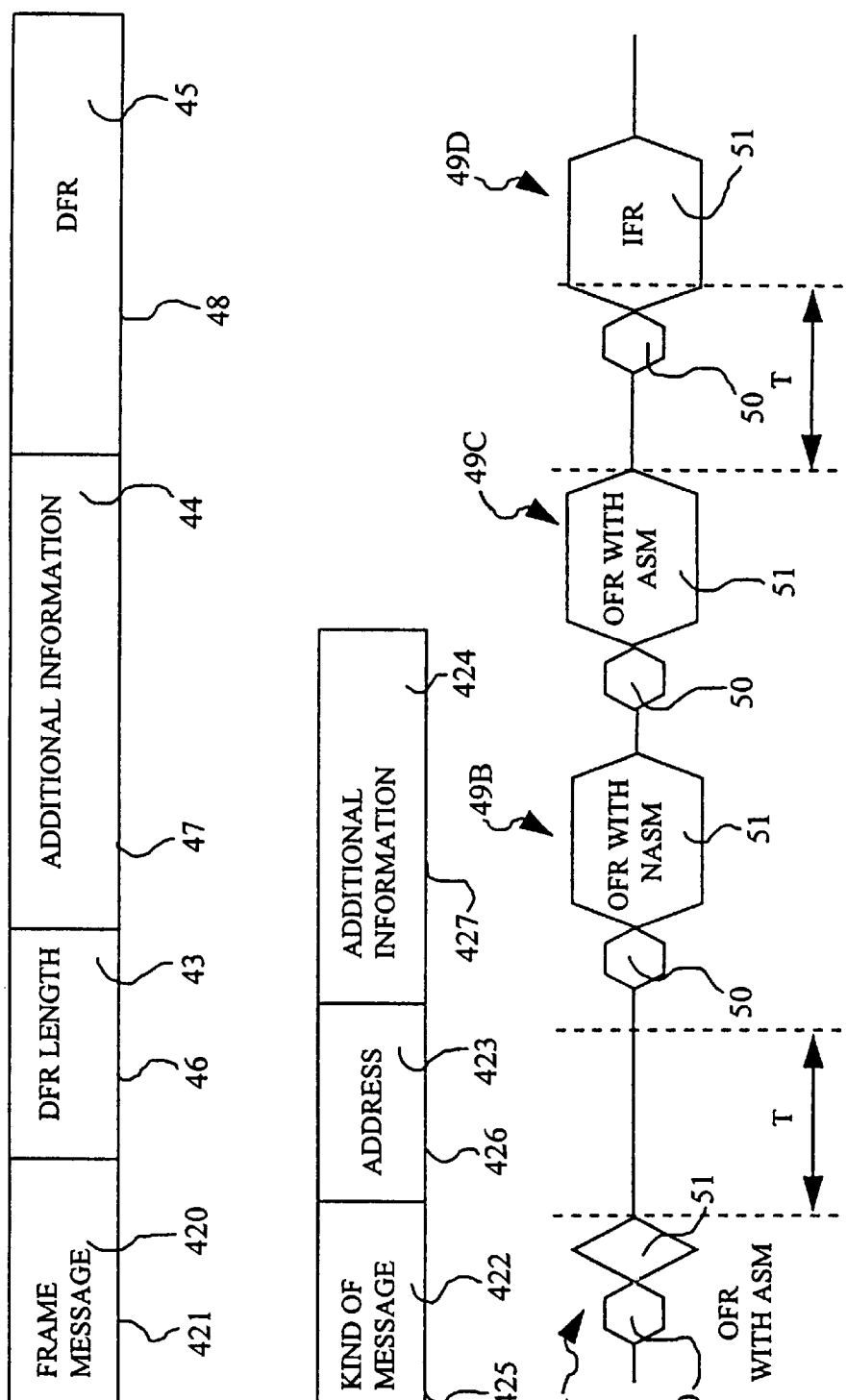

TRANSMISSION MEDIUM SHARING UTILIZING SERVICE MESSAGES AND RANDOM BALLOT, AND METHOD, DEVICE AND SYSTEMS UTILIZING SAME

FIELD OF THE INVENTION

The present invention concerns methods, devices and systems for sharing a transmission medium between communication means, transmission methods, communication devices and communication systems using them.

In the present document, reference will be made to the following definitions:

"Communication converter": any interface or digital communication adapter between a medium able to be shared and a medium dedicated to a single communication means, the two transmission media being controlled by different respective access protocols.

"Address": any information
enabling a destination to recognize itself when a message is sent to it;
enabling a sender to identify himself when he is transmitting a message.

It is known that, in a network between digital communication means which transmit data over the same transmission medium, it is necessary to define a protocol controlling access to the medium, which organises the said access. The performance of the network in the transmission of digital data between the communication means depends on the efficacy of the protocol.

Access control protocols attempt to respond both:
to a sending access constraint: it is necessary for the communication means which have data to transmit over the said medium to have sufficient opportunity to access the network in order to transmit them in their entirety; and
to a transmission constraint: it is necessary for the data sent by a communication means over the said medium to arrive at their destination in their entirety.

Simultaneously meeting these two constraints raises serious difficulties in the prior art. This is because, as will be seen, the known protocols do not meet one or other of these two constraints in certain cases, or meet them at the cost of a serious reduction in their performance.

In this regard, it will be noted that, when the sending access constraint and the transmission constraint are met, the two criteria traditionally used for measuring the said performance are on the one hand the maximum data transmission rate which the communication means can, by themselves, transmit on average during a given period and, on the other hand, the transmission time between the moment when the data are ready to be transmitted by a communication means and the moment when they have been entirely received by their destination and can therefore be used by the latter.

A first protocol is known which may be called "full competition", according to which each communication means is authorised to send when the transmission medium is available. When two communication means effect simultaneous sending of data, a collision occurs which may result in the signals conveyed by the shared medium not being usable.

The existence of these collisions in not insignificant numbers has the consequence that the transmission medium is unnecessarily occupied and that the data transmitted over the medium by certain communication means may never reach their destination, the transmission constraint not being met if there is no retransmission of the said data. When this constraint is met, it has been found that the maximum data transmission rate is approximately one third of the maximum theoretical rate of the medium for a properly sized network.

In addition, the full competition protocol is of interest only in a cabled network since the collisions which occur on a medium consisting of an electrical link are easily detected by each networked communication means or at least by a central means. On the other hand, in a wireless network, for example with a radio transmission medium, a networked communication means can detect collisions between the data transmission signals which it sends and those sent by another communication means only at the cost of techniques which are expensive and/or tricky to implement. It is then necessary for the communication means which has received data from another communication means to transmit in return a so-called "acknowledgement" message indicating the correct reception of the said data. An even more appreciable decrease in the said maximum rate results. It is therefore highly desirable to reduce the risk of collisions as far as possible.

A second access management protocol is known, referred to as a "polling centralised control protocol". According to this protocol, a central networked communication means distributes, to communication means, authorisations to send over the shared transmission medium, following a predetermined order. Each networked communication means which has data to transmit over the shared transmission medium waits until it receives an authorisation to send which is intended for it, before sending.

A third protocol controlling access to a shared transmission medium is also known, of the TDMA type (time division multiple access), in which the communication means are able to transmit only in a time slot allocated to them periodically in a cyclic functioning.

Whatever the protocol it is known that, in a network, communication means may have nothing to send or else be active, but with an activity limited to standby during which they wait until they receive instructions to transmit data. In a network functioning according to a polling protocol or according to a protocol of the TDMA type, the authorisations to send or the time slots which are respectively allocated to the communication means which have nothing to send are wasted since they do not give rise to the transmission of data. This loss is all the greater since, on certain media, notably radio ones, the synchronisation time between a sending communication means and a destination is very long. It turns out therefore that a large number of communication means with a nil transmission rate unnecessarily increases the transmission time for the communication means which have data to transmit. Finally, the more the communication means are liable to have large variations in their traffic, the greater this loss.

It will be noted that, because of this, the reduction in the maximum data transmission rate on the medium is very high. In addition, the higher the number of communication means connected to the shared transmission medium, the more the maximum rate decreases.

Moreover, when one of the networked communication means has, for a relatively long period, a flow of data to be transmitted over the medium which is greater than the available rate resulting from the authorisations to send, or from the time slots, allocated to it, it is as a result impossible for this means to transmit all its data over the medium. The sending access constraint referred to above is not met, in this case, neither by the polling protocol nor by the TDMA protocol. When this constraint is met for temporarily high rates, this occurs at the cost of an increase in the total data transmission time, which gives rise to a drop in performance for the network.

In summary, the full competition protocols have a high performance at low rates but do not allow high rates. On the other hand, polling and time division protocols have a high performance at high rates, but for all rates the transmission time is high since each communication means waits until other communication means have had an opportunity to transmit before doing so, and this is all the more marked as the total number of communication means increases.

In addition, the polling protocol requires the identification of the communication means which are liable to send prior to the personal allocation of an authorisation to send.

SUMMARY OF THE INVENTION

The present invention aims, in general terms, to provide a solution to one or other or both of the following two technical problems:
  on the one hand proposing a protocol which profits from the advantageous performance of polling protocols and full competition protocols, minimising the effect of their drawbacks, whilst meeting the transmission and sending access constraints;
  on the other hand making it possible to identify unidentified communication means liable to send over the shared medium.

In particular, the present invention sets out to achieve these objectives in a network using, at least partly, a radio or carrier current or infrared medium. This is because, on these media, the possibility of having collisions in a not insignificant number necessitates the sending of acknowledgement messages and the repetition of data in the event of collisions since the detection thereof may be difficult to implement. This difficulty, inherent in such a medium, complicates the resolution of the problems set out above.

The present invention achieves these objectives since, in a first of its aspects, it relates to a method of sharing, by digital communication means, a networked transmission medium, including the operation K) of broadcasting on the said medium, with a co-ordination means, service messages indicating to each said digital communication means whether or not it is authorised to send on the said medium in return, that is to say as soon as the shared medium is free for sending after broadcast of a said service message; characterized in that:
  the said operation K) includes the broadcast of authorisation-to-send messages of a collective type, that is to say indicating to a group of at least one said digital communication means that each is authorised to send on the said medium in return; and
  it also includes the process L), with each said digital communication means, when it attempts to send on the said medium, of determining, each time it then receives a said collective authorisation-to-send message authorizing each digital communication means of the said group of which it forms part to send, whether or not it may send in return for this collective authorisation-to-send message, according to a preset rule.

By virtue of these arrangements, the present invention achieves the objectives set out above.

It will be observed first of all that the method according to the invention relates to a protocol which is overall of the polling type with the advantages resulting therefrom, but that it incorporates to a lesser extent the possibility of competition (which will be termed "partial"), this being limited to the members of the said group.

By virtue of the possible groupings between certain communication means, the method according to the invention can benefit from the advantages inherent in the access control protocols of the polling type and those inherent in the protocols of the competition type, whilst limiting their drawbacks.

This is because, between the communication means in the said group and those which do not form part of it, no collision is possible, collisions being possible only within the said group. The maximum data transmission rate is thereby in general increased compared with a full competition protocol.

In addition, the waiting time for an authorisation to send concerning the communication means which do not form part of the group of communication means authorised collectively to send, is generally reduced. The data transmission time is correlatively reduced overall, notably compared with a polling protocol where all the authorisations to send are individual.

It will also be noted that the modification of a polling-type access control protocol with the introduction in accordance with the invention of a possibility of competition within a group is particularly easy.

This is because such a modification may easily consist of the following operations:
  creating within the said consultation type access control protocol the possibility of forming at least one group amongst the communication means,
  making it possible to send an authorisation-to-send message to this group, such a message then being a collective message, and
  including in such a message an indication of the collective character thereof,
  with regard to the communication means, it suffices to modify the protocol by giving them the possibility of distinguishing between the authorisation-to-send messages of the collective type and the authorisation-to-send messages of the individual type.

It will be observed that these modifications do not impair, to a significant extent, the overall structure of the said polling type access control protocol. This structure is therefore for the main part involved.

The present invention also resolves the problem of the identification of the unidentified communication means liable to send over the shared medium, by making it possible, advantageously, to group them together in order to authorise them collectively to send. In this regard, it will be noted that, according to another characteristic of the invention, any transmission from an unidentified communication means in return for a collective message of this type will advantageously include information (such as an address) able to identify it.

According to a particularly advantageous arrangement of a preferred embodiment of the invention, in response to the said transmission in return, an acknowledgement procedure is initiated.

It will be noted that this arrangement is in reality used only following any response to an authorisation-to-send message of a collective type. This is because it is only in such an eventuality that collisions may occur, it also being the case that the aim of the said preset rule is notably to limit the probability of a collision. The acknowledgement procedure therefore makes it possible, advantageously, to detect the occurrence of such a collision.

In this embodiment, the said acknowledgement procedure includes:
  the broadcast of an identification message incorporating the said information identifying the said previously unidentified communication means, on the occasion of the said transmission in return, the use of a timer, waiting for the possible occurrence of an event relating to the favorable end of the said acknowledgement procedure, the suspension of the acknowledgement procedure in the case of the said timer having expired without the said event having occurred.

In this embodiment, the said event is constituted by the reception of the said identification message.

In addition, in this embodiment, where the said timer has expired without the said event having occurred, the said communication means, which is not always identified, reiterates a transmission including identification information.

By virtue of this arrangement, the identification procedure described above will be able to be repeated until the said communication means is identified. This should occur rapidly since the probability of the occurrence of a new collision is particularly low.

Advantageously, in this embodiment, the said identification message is also an authorisation-to-send message.

By virtue of this arrangement, the sending of an individual authorisation-to-send message (in response to which the previously unidentified communication means will be able to transmit data where appropriate), is advantageously used to transmit the identification message. In this way, it is not necessary to transmit a special message which a simple identification message without authorisation to send would constitute. The authorisation-to-send message thus constitutes, in some way, an acknowledgement of receipt implicit in the said transmission by return including the information able to identify the previously unidentified communication means.

According to a preferred embodiment, the said operation L) includes the operation of carrying out random-type ballots, the result of which is taken into account by the said preset rule.

By virtue of these arrangements, the risk of repeated collisions between two members of the said group is compared with rules of a deterministic type.

According to a preferred embodiment, the said operation L) includes the operation, with each said digital communication means, when it attempts to send on the said medium, of carrying out, each time it receives a collective authorisation-to-send message authorizing a said group of which it forms part to send, a random-type ballot (this term is explained below in connection with FIG. 45B), the result of which is one of the two values respectively favorable or unfavorable, the said preset rule being to send in reply to the collective authorisation-to-send message when the ballot is favorable, and not to send when the ballot is unfavorable.

According to an additional characteristic of this preferred embodiment the said operation L) provides that each said random-type ballot has a probability p of being favorable, p being parametrizable for each digital communication means forming part of a said group.

This arrangement has the advantage of flexibility in the implementation of the invention.

According to another preferred embodiment, the said operation L) includes, with each said digital communication means, each time it attempts to send, the operation of carrying out a random-type ballot, the result of which is an integer number n between 1 and a limit value N, then of waiting, before sending, until having received n collective authorisation-to-send message(s) authorizing each means of a said group of which it forms part to send.

By virtue of these arrangements, the time taken for the transmission of data by a communication means in the said group is limited to awaiting a number N of authorisations to send concerning the said communication means. Even in the event of an unfavorable random ballot, this transmission waiting period cannot therefore exceed a predetermined period.

According to an additional characteristic of this embodiment, the said operation L) provides that N is parametrizable for each digital communication means forming part of a said group.

This arrangement has the advantage of flexibility in the implementation of the invention.

According to another of its aspects, the invention relates to a co-ordination device for sharing a transmission medium between digital communication means, having:

broadcasting means adapted to broadcast on the said medium service messages indicating to each said digital communication means whether or not it is authorised to send on the said medium in return, that is to say as soon as the shared medium is free for sending after broadcast of these service messages, characterized in that:

the said broadcasting means are also adapted to broadcast authorisation-to-send messages of a collective type, that is to say indicating to a group of at least one said digital communication means that each is authorised to send on the said medium in return.

This characteristic has the same advantages as those described above with regard to the method.

In a preferred embodiment, the said broadcasting means are also adapted to broadcast collective-type authorisation-to-send messages intended for all the unidentified digital communication means, possibly connected to the said shared medium, and indicating to them that each of them is authorised to send on the said medium in return.

The co-ordination device thus makes it possible, as explained above, to detect the digital communication means which are unidentified but which may have been connected to the network a short time before the sending of the said authorisation-to-send message of the collective type.

In this preferred embodiment, the co-ordination device includes acknowledgement means adapted to control an acknowledgement procedure. This arrangement has the advantage of allowing the use of an acknowledge when a communication means newly connected to the network sends a message enabling it to be identified, in return for the said authorisation-to-send message of a collective type.

In another of its aspects, the present invention relates to a device for controlling a communication means, capable of working in co-operation with a co-ordination device as briefly disclosed above, characterized in that it has:

a means for detecting reception of collective authorisation-to-send messages and, a decision means adapted, in conjunction with the means for detecting reception of collective authorisation-to-send messages:

to determine, according to a preset rule, whether or not the communication means, associated with the control device, may send, following the detection of a collective-type authorisation-to-send message, and in return for the latter; and where appropriate to authorise such sending.

These arrangements allow the implementation of the method with the advantages relating thereto, by a peripheral communication means which, by virtue of the control device associated with it (or which it includes), will be able to detect the reception of collective authorisation-to-send messages and determine whether or not it can send in return.

In a preferred embodiment, the control device is characterized in that the decision means has means for a random-type ballot, the decision means being capable of using the result of the said ballot in order to authorise or not the said sending.

In variant embodiments of this preferred embodiment some of the following additional characteristics are used:

the said operation L) includes the operation, with each said digital communication means, when it attempts to send on the said medium, of carrying out, each time it receives a collective authorisation-to-send message authorizing a said group of which it forms part to send, a random-type ballot, the result of which is one of the two values respectively favorable or unfavorable, the said preset rule being to send in reply to the collective authorisation-to-send message when the ballot is favorable, and not to send when the ballot is unfavorable;

the said operation L) provides that each said random-type ballot has a probability p of being favorable, p being parametrizable for each digital communication means forming part of a said group;

the said operation L) includes, with each said digital communication means, each time it attempts to send, the operation of carrying out a random-type ballot, the result of which is an integer number n between 1 and a limit value N, then of waiting, before sending, until having received n collective authorisation-to-send message(s) authorizing each means of a said group of which it forms part to send;

the said operation L) provides that N is parametrizable for each digital communication means forming part of a said group;

the value of n is equiprobable between 1 and N for each said ballot.

These additional characteristics confer, on the control device according to the invention, the same advantages as those set out above with regard to the variants of the method relating to random ballot.

According to other additional arrangements used in a variant of the preferred embodiment of a control device according to the invention, the latter includes:

an incorporation means adapted, in conjunction with the said co-operation means, to carry out the incorporation of information capable of identifying the latter in any transmission from the said communication means in return for the said collective-type authorisation-to-send message.

a timing means and, a means for detecting an event relating to the favorable end of the said acknowledgement procedure, In addition, according to other additional arrangements, the said decision means also being adapted to:

order, in conjunction with the said timing means, the use of a timer, on the occasion of the said transmission in return for the said collective-type authorisation-to-send message, order, in conjunction with the said means for detecting an event relating to the favorable end of the said acknowledgement procedure, the suspension of the latter, on the assumption that the timer has expired without the said event having occurred.

In addition, according to another additional arrangement, the said event detection means is adapted to detect the reception of an identification message incorporating the said information previously incorporated in the said transmission in return for the collective-type authorisation-to-send message.

These additional arrangements, which, in certain variant embodiments, will not all have to be implemented conjointly, enable the control device according to this preferred embodiment of the invention to implement, in conjunction with the co-ordination device, an acknowledgement procedure enabling the communication means newly connected to the network to be certain that it has indeed been identified. As set out above, with regard to the method, the acknowledgement procedure is repeated if such is not the case.

The present invention is naturally applicable to any type of network. It will be noted that it applies in particular to local area networks (LAN).

In another of its aspects, the present invention relates to transmission methods and communication devices.

In fact, in this preferred embodiment, and according to this other aspect of the invention, the co-ordination device is incorporated in a central means which, in general terms, has the function of retransmitting data frames coming from other communication means and including in each frame intended for these a service message activating the protocol controlling access to the said shared transmission medium.

This aspect of the invention makes it possible to benefit both from the advantage presented, on the topological level, by the existence of a central communication means retransmitting the data frames reaching it, and from the efficacy of a protocol controlling access to service messages using the sharing method according to the invention, without for all that there being any additional time necessary for activating the protocol or for retransmitting the data frames, the conveying of a service message and where applicable a data frame in the same downlink frame taking much less time than if the services messages and data frames were transmitted in separate downlink frames.

It will be noted that this aspect of the invention combines particularly well with the general characteristic of the invention according to which the groups of communication means can be addressed collectively. To do this, it suffices to broadcast, using the central means, the special service message including, as stated above, an authorisation to send of the collective type.

This aspect of the invention also has the advantages mentioned in patent application No. FR-A-95 11573 filed on the same date as the present application, entitled "Methods, devices and a system for the transmission of digital data", and which relates independently to this aspect of the invention.

In this regard, it will be noted that the invention, notably when it is implemented with this aspect, affords a high-performance replacement of all or part of a cabled medium of an ETHERNET network with a radio medium. One example of an ETHERNET network will be described below with the aid of FIGS. 1 to 3.

In another of its aspects, the present invention provides a table representing the said communication means each allocated a priority level for access to the medium representing its estimated transmission requirements and the regular updating of the priority level of each communication means. Advantageously, in a preferred embodiment, the table is managed by the co-ordination means, which is incorporated in the said central means.

These arrangements afford, in general terms, for each communication device or means, access to the medium related to its estimated transmission requirements, which makes it possible to increase the performance of the network. The advantages of these arrangements are added to the advantages of the method according to the invention set out above.

This arrangement also has the advantages mentioned in the French patent application No. FR-A-95 11575, filed on the same date as the present application, entitled "Methods and Devices for Sharing a Transmission Medium, a Transmission Method, an Identification Method, Communication Means and Communication System", and which relates independently to this aspect of the invention.

In yet another of its aspects, the present invention also relates to a communication converter and a method of identifying such a converter when the latter is connected on the one hand to a shared transmission medium, as disclosed above, and on the other hand, through connection means, to a communication means.

In general terms, according to this other aspect of the invention, there is allocated to each converter an address coming from the communication means (for example an ETHERNET adapter) to which the converter is connected by the said connection means, and it is arranged that this address makes it possible to identify the said converter for its functioning in co-operation with the network including the said shared transmission medium.

This arrangement makes it possible notably to prevent the use of an address peculiar to the communication converter and an address peculiar to the networked communication means to which it is connected by the said connection means from then complicating these devices and the central means as well as their use in the network.

In addition, these arrangements make it possible, at the time of connection of a new communication means to a converter, for the latter automatically to be allocated the address of the communication means to which it is connected. The connection of a communication means to a network and then its functioning in the network are therefore further facilitated by the implementation of the invention in that of its aspects which has just been disclosed above.

This arrangement also has the advantages mentioned in the French patent application No. FR-A-95 11576, filed on the same date as the present application entitled "Communication Converter, Communication Device, Identification Method, Frame Transmission Method and Communication Systems Using Them", and which relates independently to this aspect of the invention.

The present invention also has as its objects:

a communication system characterized in that it includes on the one hand a digital communication device incorporating a co-ordination means, as briefly disclosed above, and on the other hand at least one peripheral communication device as briefly disclosed above, a communication system characterized in that it includes communication devices implementing the method as briefly disclosed above, a system for sharing a transmission medium between communication means, characterized in that it includes on the one hand a co-ordination device as briefly disclosed above and on the other hand at least one control device as briefly disclosed above.

BRIEF DESCRIPTION OF THE DRAWINGS

Other advantages, aims and characteristics of the invention will emerge in the light of the following description, given with regard to the accompanying drawings in which:

FIGS. 5 and 6 show the constitution of the downlink frames broadcast by the central networked communication means by means of this shared medium, respectively where this downlink frame includes and does not include a data frame;

FIG. 7 shows the constitution of the service frame included in each downlink frame;

FIG. 8 shows the constitution of the service message included in each service frame;

FIG. 9 shows the constitution of the uplink frames transmitted by the peripheral networked communication means by means of the shared transmission medium;

FIG. 9A shows the constitution of the frame message included in each uplink frame;

FIG. 10 is a timing diagram showing an example of an occupation of the shared transmission medium by bursts transmitting downlink frames and an uplink frame;

FIG. 20I is a flow diagram illustrating the functioning of the individual authorisation-to-send message preparation means included in this central transmission control means shown in FIG. 18a;

DETAILED DESCRIPTION OF PREFERRED EMBODIMENTS

Figure 1:
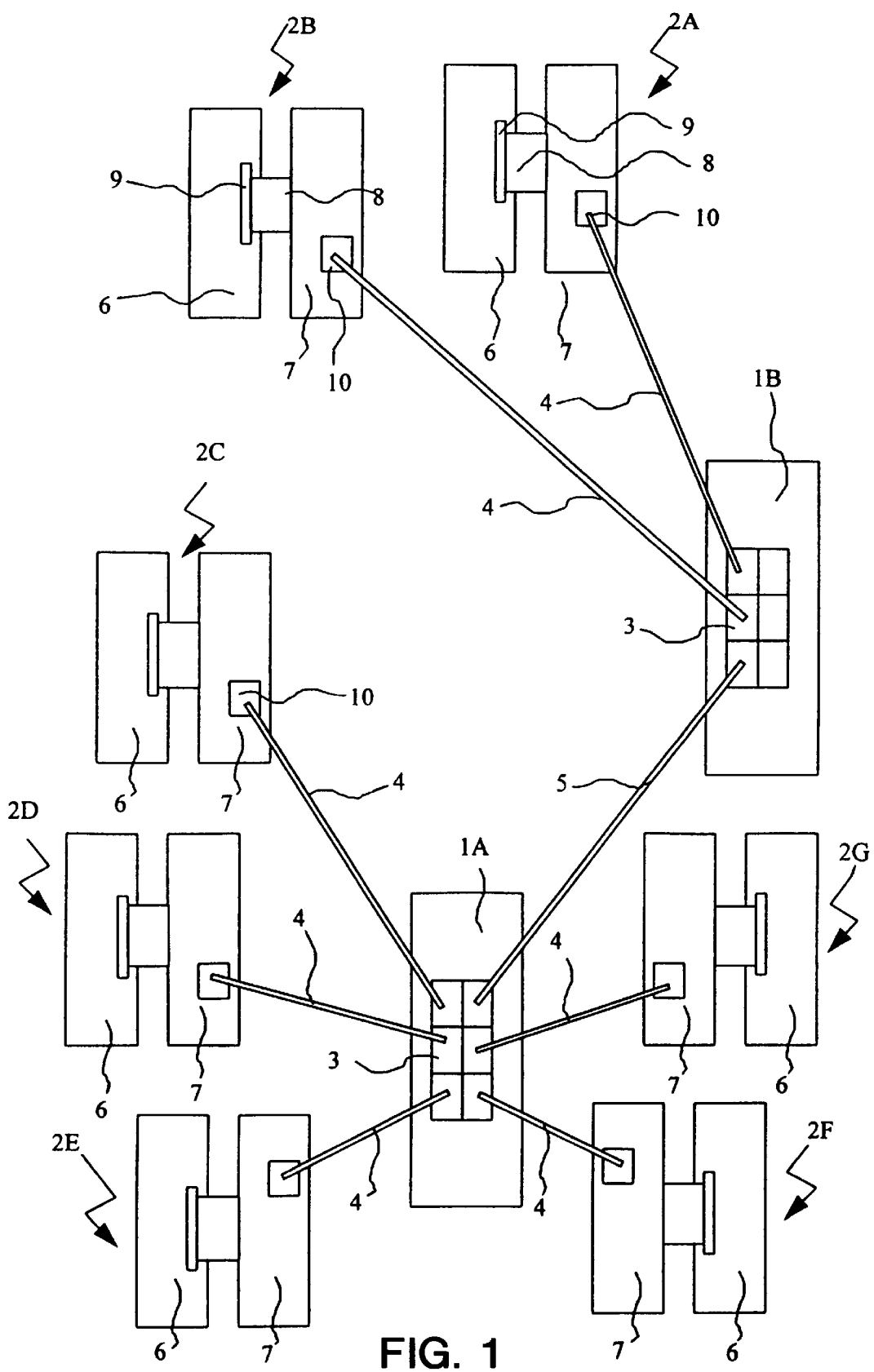
FIG. 1 illustrates the topology of an example of a local area network (LAN) known in the prior art.

The network illustrated in FIG. 1 is in accordance with IEEE recommendation 802.3 type 10Base-T. It includes two concentrators (hub) 1A and 1B and data stations 2A to 2G.

Each of the concentrators 1A and 1B has a set of ports 3 for twisted-pair cables 4 or 5, designed here for six cables.

The assembly 3 of the concentrator 1A is fully occupied, five of its ports each receiving one of the end connectors of a cable 4, the other end connector of which is plugged into a respective one of the stations 2C to 2G, the sixth port receiving one of the end connectors of the cable 5, the other end connector of which is plugged into one of the ports of the assembly 3 of the concentrator 1B.

Only two other ports of this assembly are occupied, each by one of the end connectors of a cable 4, the other end connector of which is respectively plugged into the station 2A or into the station 2B.

The station 2A has a data processing terminal 6 of the personal computer type and an individual networked communication means 7 of the LAN adapter card type conforming to the aforementioned recommendation, normally referred to as an Ethernet® card, this card 7 having a male ISA bus connector 8 engaged in the female ISA bus connector 9 of the personal computer 6, and a port 10 for receiving the end connector of a twisted-pair cable.

The data stations 2B to 2G are identical to the station 2A, with however some stations where the terminal 6 is not a personal computer but a printer, a file server or another type of data processing terminal.

Each of the cables 4 and 5 has at both ends a connector provided with two pairs of pins, each connector being adapted to be plugged into a port 10 or into one of the ports of an assembly 3, each of these ports having, for each aforementioned pin, a corresponding pin with which an electrical contact is established when the connector is plugged therein.

More precisely, the pairs of pins of the ports 10 in respective contact with the pins of first and second pairs of the connector which is plugged therein, serve respectively for sending and receiving, whilst in the ports of an assembly 3 the pair of pins in contact with the first pair of pins of the connector serves for receiving, and that which is in contact with the second pair of pins, for sending.

The cables 4 are of the direct type, that is to say the first pair of pins of one of the end connectors is connected by a pair of conductors to the first pair of pins of the other end connector, and likewise for the second pairs of pins, whilst the cable 5 is of the crossed type, that is to say the first pair of pins of each of its end connectors is connected by a pair of conductors to the second pair of pins of the other end connector.

The concentrators 1A and 1B function as follows: each time a signal conveying information is present at the reception pins of one of the ports of the assembly 3, this signal is repeated at each of the other ports of this assembly on the sending pins. Where a collision occurs, that is to say the simultaneous presence of a signal on a pair of reception pins at two different ports, the concentrator produces an interference sequence at each pair of sending pins, in order to warn the data stations that a collision has occurred.

If for example the station 2A produces a burst transmitting a data frame at the sending pins of its port 10, the concentrator 1B repeats this burst at the pair of sending pins of the port where the connector of the cable 4 which connects it to the station 2B is plugged in and at the pair of sending pins of the port where the connector of the cable 5 is plugged in, so that this burst arrives at the pair of reception pins of the port 10 of the station 2B and at those of the port of the assembly 3 of the concentrator 1A where the cable 5 is plugged in, this burst consequently being repeated once again at the pair of sending pins of the other ports of this assembly 3, this burst thus arriving at the pair of reception pins of the port 10 of each of the stations 2C to 2G.

More generally, each time one of the data stations 2A to 2G produces at the sending terminals of its port 10 a burst transmitting a data frame, this burst reaches the reception terminals of the port 10 of each of the other data stations, in the absence of a collision.

A description will now be given, with the help of FIGS. 2 and 3, of how, in the data stations, the terminals 6 co-operate with the individual networked communication means (INCM in the drawings) 7, so that any one of the terminals 6 can transmit data to another terminal 6 provided, as explained below, with the same network operating system.

To enable each of the data stations to be identified, each individual means 7 is allocated an address (@ in the drawings) 11 for controlling access to the medium (MAC address—Medium Access Control), an address which is peculiar to it.

During its operation, the terminal 6 delivers to the means 7, in the manner explained below, data sequences each accompanied by a destination address, and on each occasion the means 7 prepares a data frame 12 (FIG. 3) including the data sequence delivered and the destination address accompanying it, which corresponds to the address 11 of the individual means 7 of the terminal 6 for which this data sequence is destined.

The format of the frame 12 is fixed by the protocol controlling access to the medium (MAC protocol) used in the network. In general, if fixes at the start of the frame the position of the field 13 containing the destination address, this field being followed by an additional-information field 14 and then a field 15 containing the data sequence.

Thus, in IEEE recommendation 802.3, the destination address field 13 extends over six octets from the start, the additional information field 14 over eight octets, and the data sequence field 15 over forty six to one thousand five hundred octets (where the length of the data sequence is less than forty six octets, a padding is added to it in order to achieve this minimum). The additional information field is subdivided into a source address field which contains the address 11 of the individual means 7 which prepared the data frame and a length field which indicates the number of octets in the field 15, the source address field occupying the first six octets of the field 14 and the length field the last two octets.

The data frame format provided for by the Xerox® Ethernet® protocol is similar, but with the last two octets of the additional information field representing the type of data rather than the length of the field 15.

More generally, when the individual means 7 receives from its terminal 6 a data sequence accompanied by its destination address, it sends over the cable 4, at a time which it determines in accordance with the access control protocol, a burst transmitting the data frame 12 corresponding to this data sequence and to this destination address.

Each burst begins with a synchronisation prefix and conveys, in addition to the bits peculiar to the data frame 12, error detection bits, grouped in a termination.

The nature of the prefix and the overall composition of the bit stream thus conveyed by each burst are also fixed by the protocol controlling access to the medium.

Thus, in IEEE 802.3, the prefix is formed by the encoding of a bit synchronisation acquisition preamble extending over seven octets, and a start-of-frame delimiter extending over one octet, whilst the termination is formed by a redundancy check with a length of four octets.

The prefix and the termination of the bit stream provided for in the Xerox ETHERNET standard are similar, the preamble encoded in the prefix containing six bits more.

Finally, when the individual means 7 receives, over the cable 4, a burst which transmits a data frame, it isolates therein, in accordance with the format fixed by the protocol controlling access to the medium, the destination address appearing therein, it compares this with the address 11 which is peculiar to it and, if there is correspondence, it isolates in the data frame the data sequence which appears therein and delivers it, in the manner explained below, to its terminal 6.

The latter is adapted, with regard to its programs, to co-operate with the individual means 7 because it is provided on the one hand with a network operating system supplying a logic interface and on the other hand a driver for the individual means 7, compatible with this interface.

This is for example of the NDIS type (MICROSOFT® specifications) or of the ODI type (NOVELL® specifications).

It is by virtue of the aforementioned two programs that each terminal 6 is adapted, through the logic interface, to have data sequences delivered to it by its individual means 7, and to deliver such sequences to the latter each accompanied by a destination address.

It can be seen that the concentrators 1A and 1B and the cables 4 and 5 fulfil the role of a transmission medium shared by the stations 2A to 2G, by means of which the latter transmit data to each other. It is clear that such a transmission medium can be produced for a greater or lesser number of data stations, by using more or fewer concentrators and cables 4 and 5.

Many other ways of producing a shared transmission medium are known, for example using a coaxial cable to which the data stations are each connected by a T connection, as provided for in IEEE recommendation 802.3 type 10Base-2, or by using carrier currents or radio or infrared waves, or even by combining the use of these different physical media.

With regard to the protocol controlling access of the different stations to the transmission medium (MAC protocol), the one provided for by IEEE recommendation 802.3 is of the CSMA/CD type—Carrier Sense Multiple Access/Collision Detection—when a station is attempting to transmit data, it listens on the transmission medium, and as soon as it becomes free it transmits its data whilst listening to see whether a collision occurs, in which case it ceases to send, observes a waiting period of random duration, and attempts to send once again.

Other protocols for controlling access to a shared transmission medium are also known, notably of the TDMA type—Time Division Multiple Access—in which the stations are able to transmit only in a time slot which has been allocated to them, and of the polling type, in which the stations can transmit only if a central networked communication means has invited them to do so by means of a special message.

Figure 2:
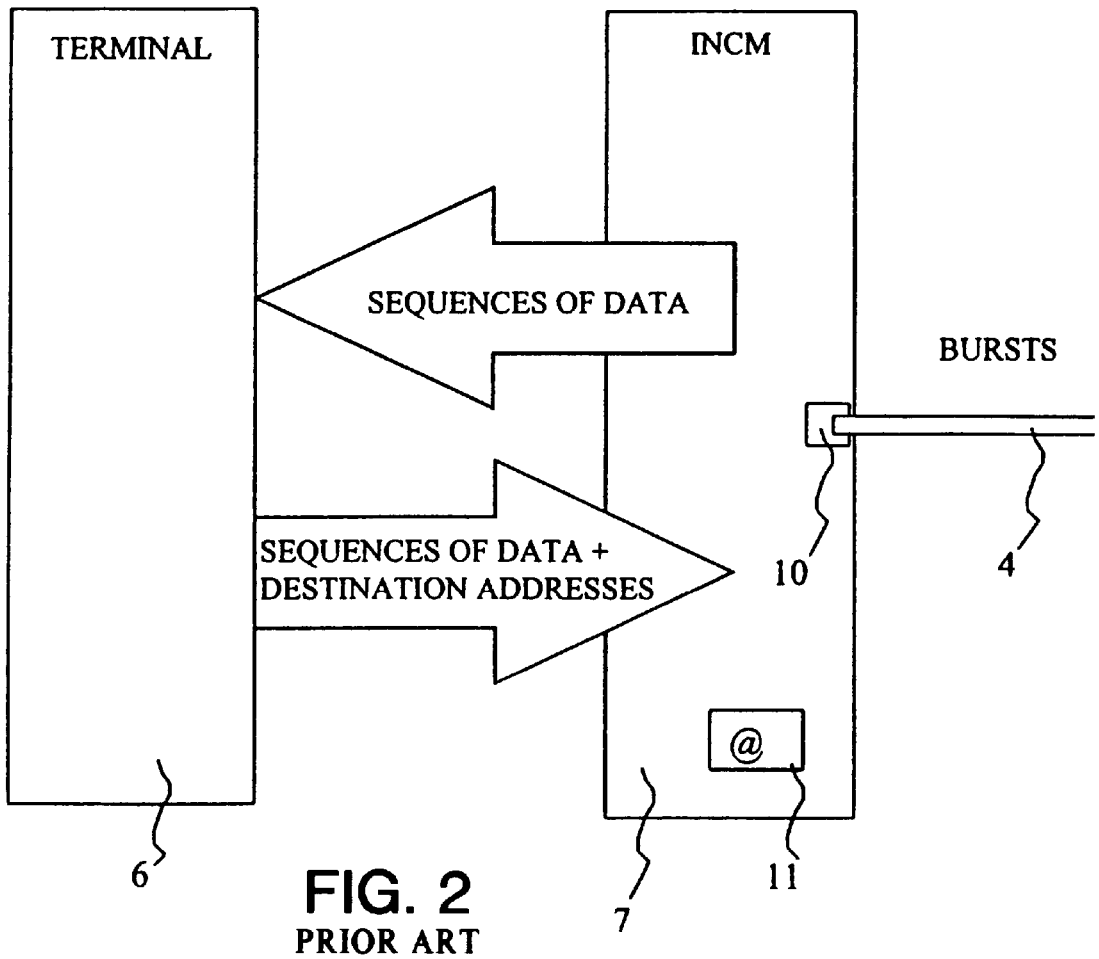
FIG. 2 is a diagram of one of the data stations of this network, illustrating the co-operation between the data processing terminal and the individual networked communication means of such a station.
Figure 3:
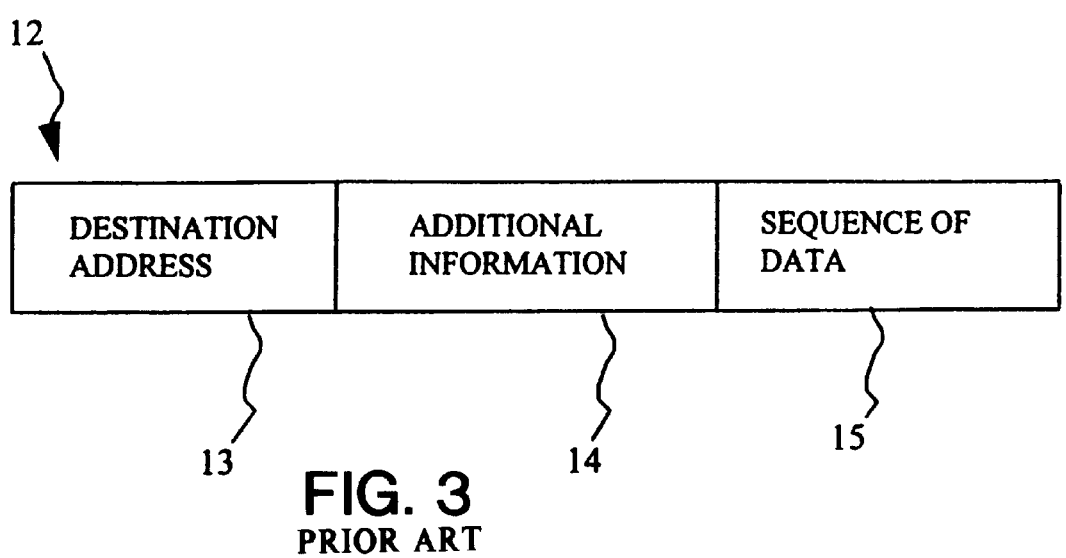
FIG. 3 shows the constitution of the data frames exchanged between the different stations in these networks of the prior art.
Figure 4:
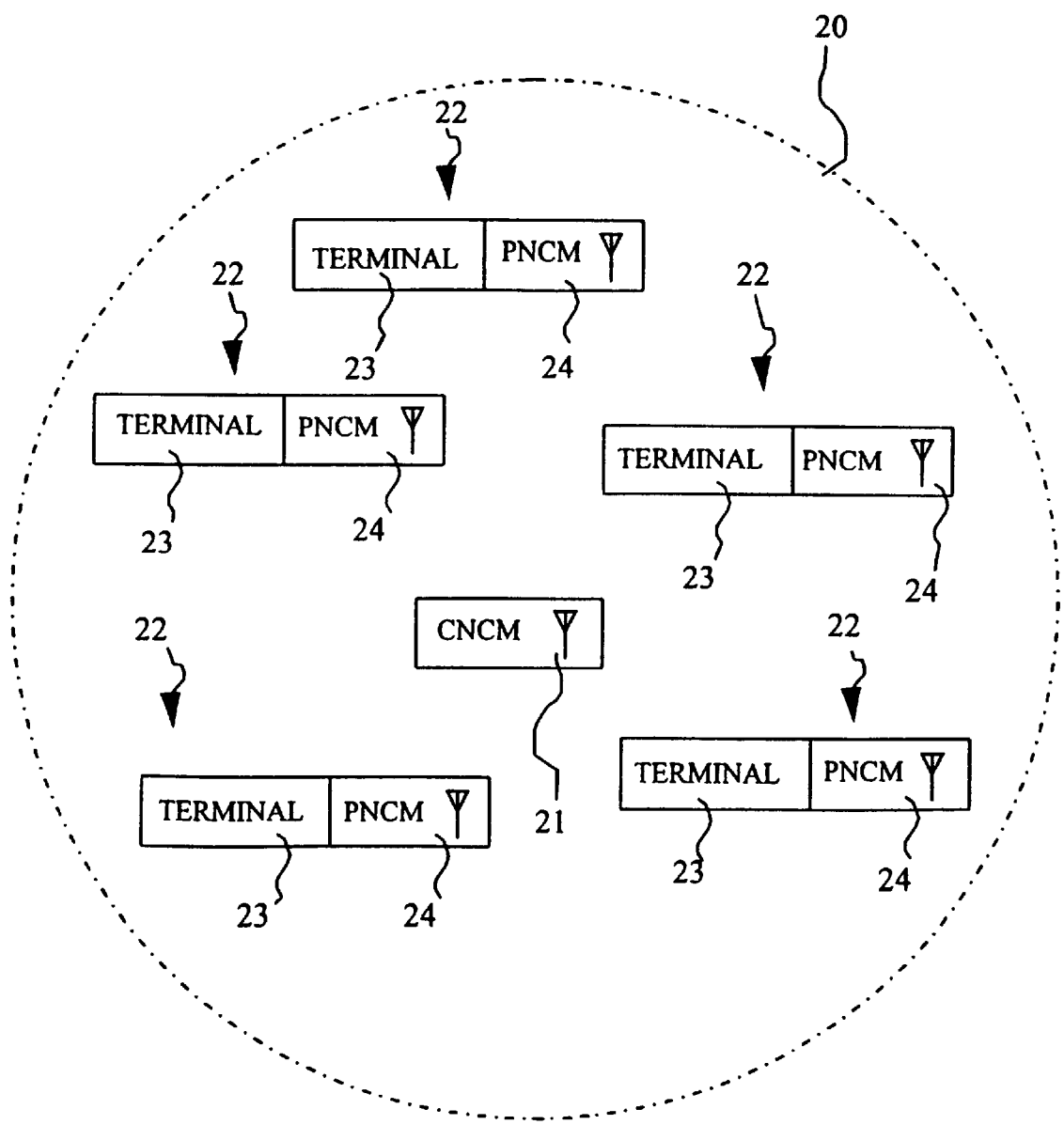
FIG. 4 illustrates the topology of a wireless local network (WLAN—Wireless Local Area Network) implementing the invention, in which radio waves are used as a shared transmission medium.

The network which has just been described with the aid of FIGS. 1 to 3 is well known in the prior art. A description will now be given, in FIG. 4 et seq, of several preferred embodiments of the invention. FIG. 4 shows notably a wireless local area network (WLAN) where the medium is radio, it being stated here once again that the present invention can be applied to networks in which the transmission medium may be of a different nature, for example cabled, infrared, etc.

The wireless local network 20 shown in FIG. 4 has a central networked communication means (CNCM in the drawings) 21 and data stations 22, each of which has a terminal 23 of the same type as the terminals 6 described above, and a peripheral networked communication means (PNCM in the drawings) 24.

Each of the peripheral means 24 is a particular type of individual networked communication means 7 described above, the shared transmission medium by means of which they transmit and/or receive data frames consisting of radio waves.

The central means 21 communicates with each peripheral means 24 by means of this medium, which it also shares, the topological arrangement and the respective radio transmission powers being such that each burst sent over this medium by the central means 21 can be received by each peripheral means 24, and each burst sent over this medium by any one of the means 24 can be received by the central means 21.

Communications between peripheral means 24 are designed to take place solely by means of the central means 21, the transmission of a data frame from a first to a second peripheral means 24 taking place first of all by transmission of the data frame from the first peripheral means 24 to the central means 21, and then by retransmission of this data frame from the central means 21 to the second peripheral means 24.

The bursts which the central means 21 sends over the shared radio medium each enable it to broadcast a downlink frame 25 to the peripheral means 24 (FIGS. 5 and 6) whilst the bursts sent over this medium by the peripheral means 24 each enable the peripheral means 24 which has sent them to transmit an uplink frame 26 (FIG. 9) to the central means 21.

As can be seen in FIGS. 5 and 6, the downlink frames 25 systematically have a service frame 27, whilst, depending on circumstances, it may include (FIG. 5) or not include (FIG. 6) a data frame (DFR in the drawings) 28 of the same type as the frame 12 described above.

The format provided for the frame 25 determines the position of the service frame field 29, at the start of the frame 25, and the position of the data frame field 30, when such exists, directly after the field 29.

In the example illustrated, the service frame field 29 extends over twenty octets, and the data frame field 30 extends over zero (no data frame) to one thousand five hundred and forty octets.

As FIG. 7 shows, each service frame 27 included in a downlink frame 25 has a service message 31, information 32 on the length of the data frame which the frame 25 includes, and additional information 33. The format provided for the frame 27 determines the position of the service message field 34 at the start of this frame, the position of the data frame length field 35 following the field 34, and the position of the additional information field 36 following the field 35. In the example illustrated, the field 34 extends over twelve octets, the field 35 over two octets and the field 36 over eleven octets.

The service message 31, as shown in FIG. 8, includes information 37 on the nature of the service message, a message destination address 38 and additional information 39. Here, the information 39 includes network reference information and protocol version information, the message nature field 40 extends over one octet, the address field 41 over six octets and the additional information field 42 over five octets.

The uplink frames 26, as illustrated in FIG. 9, include in succession a frame message 420 described in FIG. 9A, information 43 on the length of the data frame which it has, additional information 44 and a data frame 45 of the same type as the frame 12 described above. The format provided for the frame 26 determines at the start thereof the position of the frame message field 421, the position of the data frame length field 46 following the field 421, the position of the additional information field 47 following the field 46 and the position of the data frame field 48 following the field 47. In the present example, the field 421 extends over sixteen octets, the field 46 over two octets, the field 47 over ten octets and the field 48 over zero to one thousand five hundred and forty octets.

The frame messages 402 as illustrated in FIG. 9A include successively message nature information 422, address information 423 and additional information 424. The format provided for the frame 26 determines, at the start of the frame message field 421, the position of the message nature field 425 and, in the frame message field 421, the position of the frame message address field 426 following the message nature field 425 and the position of the frame message additional information field 427 following the frame message address field 426. In the present example, the field 425 extends over one octet, the field 426 over six octets and the field 427 over nine octets.

According to a preferred embodiment of the present invention, once the peripheral means 24 knows that it forms part of the network 20, the message nature information 422 of the uplink frame message 420 can adopt two values representing the requirement or absence of requirement for the peripheral networked communication means to effect another uplink frame transmission following the one which is in progress. These two values are, in the remainder of the description, referred to respectively as "frame-not-isolated" (requirement for a further transmission) and "frame-isolated" (no requirement for a further transmission).

On the other hand, when the peripheral means detects that it does not form part of the network 20, that is to say that it is not identified by the central means 21 the information 422 adopts the value of a request for insertion in the network (New PNCM in the drawings).

Each service message 31, by means of the message nature information 37 and the destination address 38, activates a protocol controlling access to the shared radio medium, which is of the polling type.

More precisely, each service message 31 indicates to each peripheral means 24 whether or not it is authorised to transmit an uplink frame 26 in return, that is to say as soon as the shared medium is free to transmit a frame 26 after broadcast of the message 31.

The service messages 31 are generally of the authorisation-to-send message type, that is to say indicating that a peripheral means 24 is authorised to transmit an uplink frame in return, and, in certain circumstances, of the no-authorisation-to-send message type, that is to say indicating, to each peripheral means 24, that it is not authorised to transmit in return.

In the network 20, the radio medium used is of the half-duplex type, that is to say the transmissions in the uplink direction (peripheral means 24 to central means 21) and downlink direction (central means 21 to peripheral means 24) do not take place simultaneously. Thus the shared radio medium becomes free when the transmission of a downlink or uplink frame ends.

FIG. 10 shows an exemplary occupation of this shared radio medium, by four bursts 49A to 49D.

It will be observed first of all that each burst sent over the shared radio medium begins with a synchronisation prefix 50, which is identical for all the bursts, and continues with a signal 51, of a more or less long duration, which carries a bit stream conveying a downlink frame 25 (OFR in the drawings) or an uplink frame 26 (IFR in the drawings), the duration of the signal 51 of each of the bursts obviously depending on the length of the frame 25 or of the frame 26 transmitted by this burst.

In the example in FIG. 10, the downlink frame 25 transmitted by the burst 49A has only one service frame 27, so that its signal 51 is of particularly short duration, close to that of the prefix 50. On the other hand, the frames 25 or 26 transmitted by the bursts 49B to 49D include a data frame 28 or 45, their signal 51 consequently having a longer duration. To simplify the drawing, the respective signals 51 of the bursts 49B to 49D have been given the same duration, but in practice the duration of the signals 51 is very variable, since a data frame 28 or 45 has a length which varies over a range of up to one thousand five hundred and forty octets.

The duration T which can be seen in FIG. 10 is the one that the central means 21 allows to elapse as from the end of the transmission of a downlink frame 25 whose service message 31 is of the authorisation-to-send message type (ASM in the drawings), before transmitting a new downlink frame, unless, during the elapse of the period of duration T it has begun to receive a burst transmitting an uplink frame 26, in which case the central means 21 waits until it has finished receiving this uplink frame.

On the other hand, when the central means 21 transmits a downlink frame whose service message 31 is of the no-authorisation-to-send message type (NASM in the drawings), it can send a new downlink frame as soon as the transmission of the previous one has ended.

Thus, when the burst 49A transmitting a downlink frame including an authorisation-to-send message ended, the central means 21 waited until the period of duration T elapsed and, as during the latter no burst transmitting an uplink frame appeared on the shared radio medium, the central means 21 considered, as soon as this period expired, that it could transmit a new downlink frame, which it did with the burst 49B at the end of a period whose duration corresponds to its reaction time.

Since the downlink frame transmitted by the burst 49B included a no-authorisation-to-send message, the central means 21 considered that it could send a new downlink frame as soon as sending of the burst 49B ended, which it did by sending the burst 49C after a reaction time.

The downlink frame transmitted by the burst 49C included an authorisation-to-send message and, unlike the one contained in the downlink frame transmitted by the burst 49A, this authorisation-to-send message brought about a response from the peripheral means 24 for which it was destined, in the form of the burst 49D transmitting an uplink frame, which began to be sent before the expiry of the period of duration T, so that, when this expiry occurred, the central means 21 noted that reception of this uplink frame was underway, and therefore waited until reception of the burst 49D ended in order to consider that the shared radio medium had become free for it to send a new downlink frame.

The duration T is chosen as the shortest period at the end of which it is certain that any peripheral means 24 for which an authorisation-to-send message is intended has been able to begin to transmit an uplink frame in response, if it sought to do so.

By way of example, the duration T can be around 225 Ts, the duration of the prefix 50 around 125 Ts, the duration of the signal 51 in a range having an upper limit of around 10,000 Ts.

In order to allow the insertion of new peripheral means 24, the central means 21 sends, at regular intervals, for example every second, an authorisation-to-send message of the collective type, indicating to all the peripheral means seeking to be inserted in the network 20, that they are each authorised to transmit an uplink frame in return.

Each peripheral means 24 receiving this collective authorisation-to-send message (NE in the drawings) whilst it is seeking to be inserted in the network, determines, as explained below, whether or not it will send this collective message in return, so that the risk of collision between several peripheral means seeking to be inserted in the network is limited.

Figure 10A:
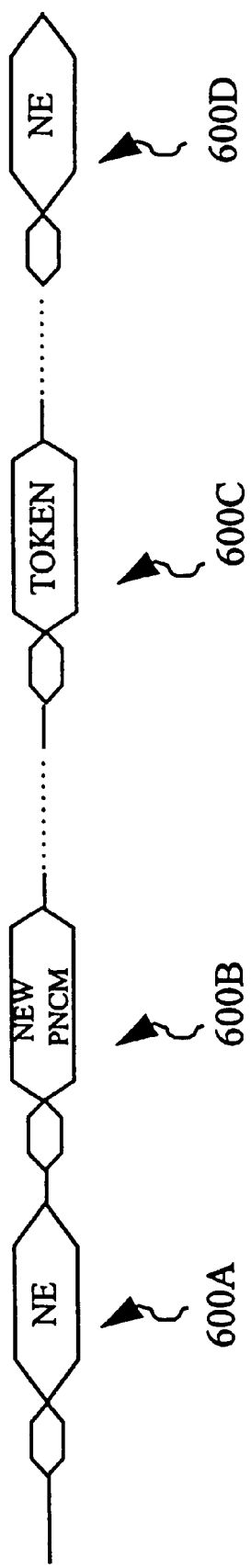
FIG. 10A is a similar timing diagram, showing the service and frame messages included respectively in downlink and uplink frames, which enable a new peripheral means to be inserted into the network of FIG. 4.

FIG. 10A shows an example of an occupation of the shared radio medium by four bursts 600A to 600D, illustrating the process of insertion of a new peripheral means 24.

The downlink frame 25 which was transmitted by the burst 600A included a collective service message, following which a peripheral means 24 which was seeking to be inserted in the network 20 determined that it could transmit an uplink frame in return, which it did with the burst 600B, and, at the end of a certain length of time, it found that the burst 600C sent by the central means 21 transmitted a downlink frame whose service message constituted an acknowledgement (token in the drawings) of the request to form part of the network 20 which it had formulated in the uplink frame transmitted by the burst 600B.

After receiving this acknowledgement, this central means considered that it formed part of the network 20.

In the example illustrated, the service message used as an acknowledgement is a simple individual authorisation-to-send message, that is to say one intended for a single peripheral means 24, in this case the one which sent the burst 600B.

At the end of the interval of time separating the successive sendings of collective authorisation-to-send messages, for example one second, the central means 21 sent a burst 600D, transmitting a downlink frame containing a new collective authorisation-to-send message.

In the example illustrated, when a peripheral means 24 knows that it is not identified by the central means 21, that is to say between its start-up and the moment when it receives the acknowledgement of its request for insertion, the uplink frame which it transmits with a frame message 422 formulating a request for insertion in the network 20 does not include any data frames 45.

Thus all the uplink frames liable to be sent in response to an authorisation-to-send message of the collective type, will have the same length. This makes it possible to simplify the implementation of the invention, by making it possible to avoid having to take account of the fact that, even if two uplink frames are sent simultaneously, it is possible for one of them to arrive directly at the central means (a so-called capture phenomenon), so that it would be possible, should the uplink frame captured be shorter than the other uplink frame, for the central means to transmit an authorisation-to-send message, whilst the transmission medium is always occupied by the long uplink frame.

The device used as the central means 21 in the network 20 will now be described with the help of FIGS. 11 to 24.

Figure 11:
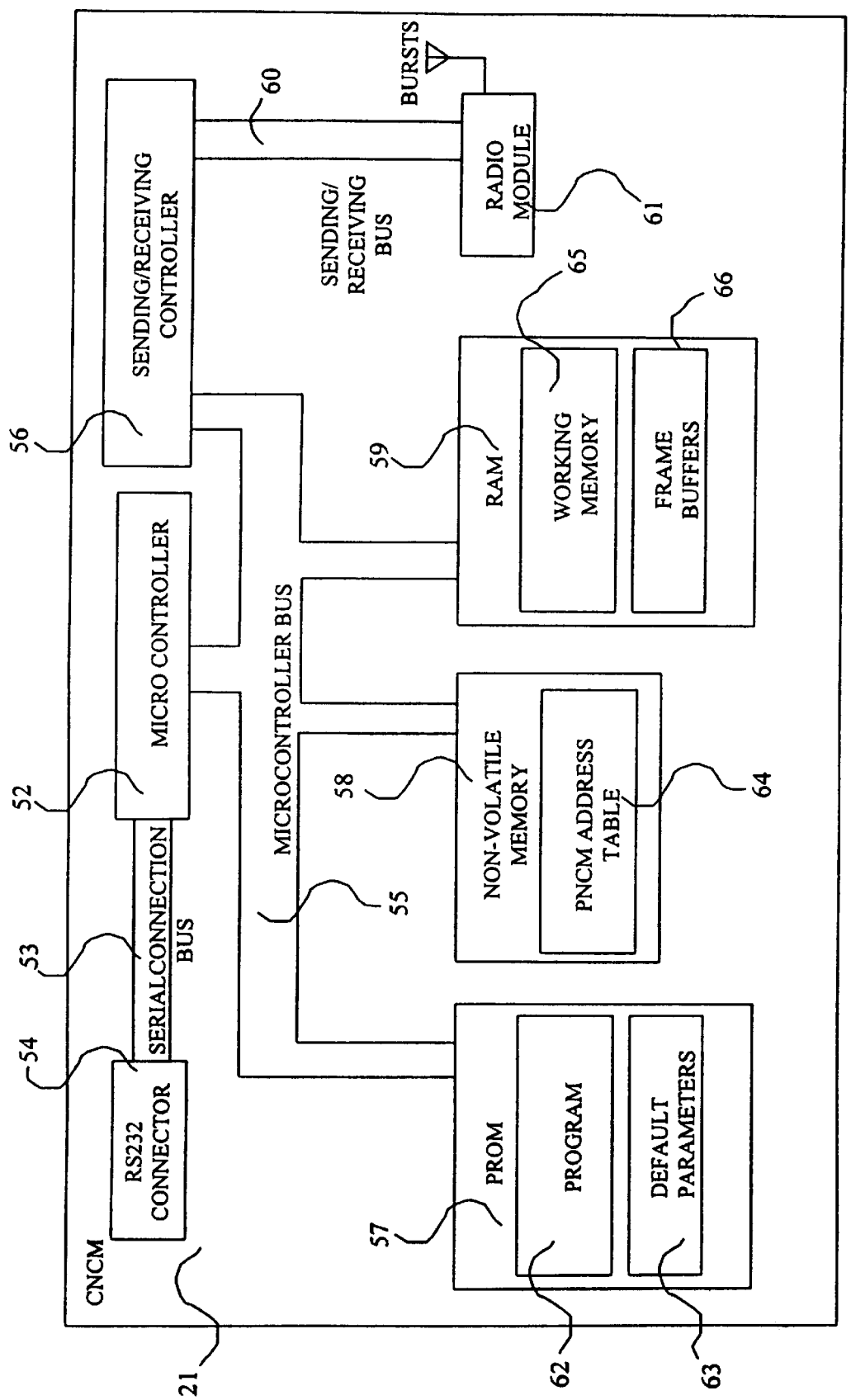
FIG. 11 is an electronic diagram of the central networked communication means.

As can be seen in FIG. 11, the central means 21 has a microcontroller 52 connected, by means of a serial connection bus 53, to a connector 54 of the RS 232 type, and connected by means of a microcontroller bus 55 to a sending/receiving controller 56, a programmable read only memory (PROM) 57, a reprogrammable non-volatile memory and a random access memory (RAM) 59. The sending/receiving controller 56, in addition to being connected to the microcontroller bus 55, is connected to a sending/receiving bus 60, which connects it to a radio module 61.

The microcontroller 52 is for example the one sold by NEC under the reference V53®, operating in accordance with the program 62 stored in the memory 57, which also contains the default parameters 63 for initializing the central means 22 at start-up.

The program 62 is of the multi-task type, by virtue of a real-time nucleus, for example of the Realtime Craft® type sold by GSI TECSI.

The sending/receiving controller 56 is produced with a commercially available programmable logic circuit, for example the one sold by ALTERA® under the reference EPF81500®, or one of those sold by XYLINX.

The radio module 61 is for example produced with a transceiver sold by PULSE ENGINEERING under the reference MTR-2400M, with a space-diversity aerial sold by TELEDYNE ELECTRONIC TECHNOLOGIES suitably connected to the aforementioned transceiver, with error correction/control components, for example of the FEC (forward error correction) type from Reed Soloman, such as the ones sold by AHA® under the reference AHA 4011®, by LSI LOGIC® or by COMATLAS, and with an electrical interface allowing connection to the bus 60, notably affording signal matching. The radio module 61 can also be produced with transceivers other than the above-mentioned one, preferably of the spread spectrum, frequency hopping or direct sequence type.

The reprogrammable non-volatile memory 58 is for example produced with a random access memory (RAM) with battery back-up, such as the one sold by DALLAS SEMICONDUCTOR under the reference DS1497, or with an electrically erasable programmable read only memory (EEPROM) such as the one sold by XICOR or EXEL under the reference 24C02.

The memory 58 includes a table 64 of the addresses of the peripheral means 24 forming part of the network 20, in this case their MAC address, that is to say an address of the same type as the address 11 of the individual means 7 described above. The table 64 is entered in the central means 21 by means of processes of the type shown in FIG. 10.

The random access memory 59 has a space occupied by the working memory 65, and a space 66 occupied by frame buffers.

Figure 12:
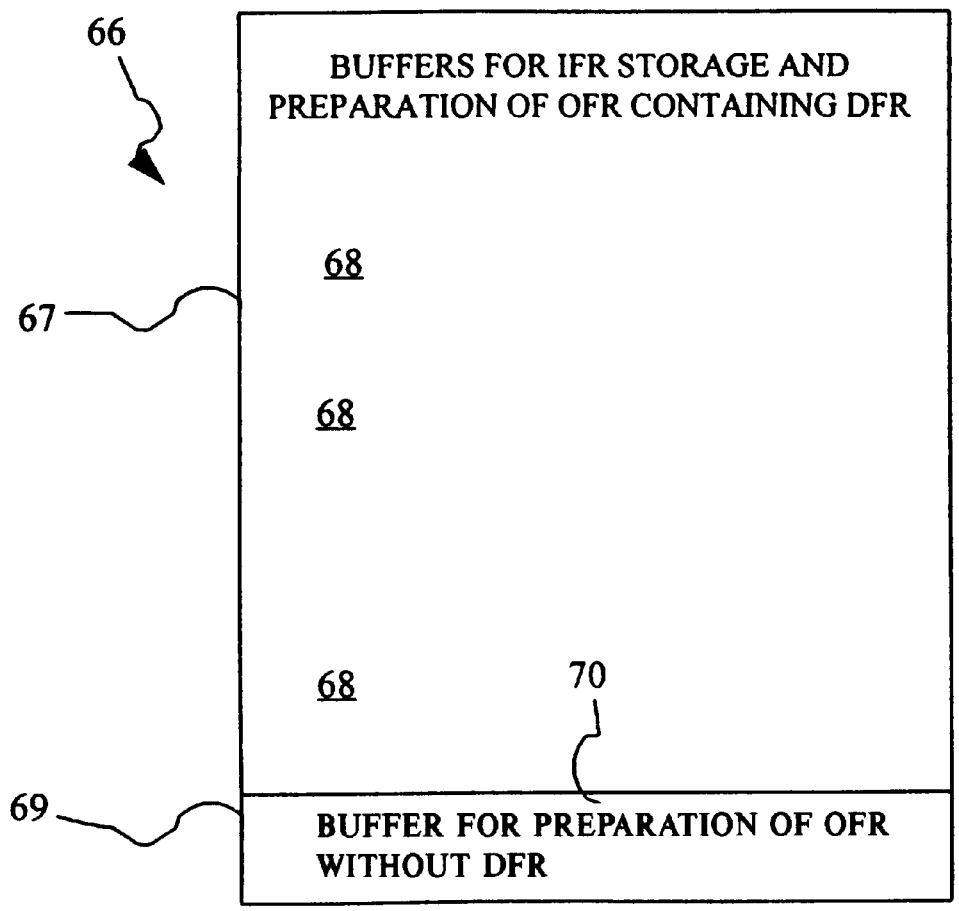
FIG. 12 is a diagram showing the composition of the space provided for frame buffers in the random access memory of the central communication means.

As can be seen in FIG. 12, the space 66 includes a space 67 containing a certain number of buffers 68 storing an uplink frame and preparing a downlink frame as shown in FIG. 5, that is to say containing a data frame, and a space 69 containing a buffer 70 for preparing a downlink frame as shown in FIG. 6, that is to say without a data frame.

Figure 13:
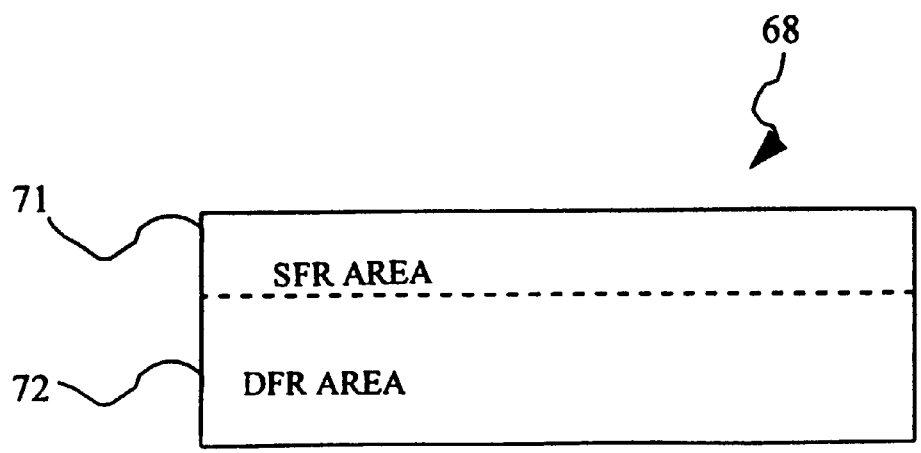
FIG. 13 shows the arrangement which each of the buffers has for storing an uplink frame and preparing a downlink frame containing a data frame.

As can be seen in FIG. 13, the arrangement provided for each of the memories 68 is identical to the format provided for the downlink frames 25, that is to say it determines, at the start of each memory 68, the position of the service frame (SFR in the drawings) area 71, and the position of the data frame area 72, directly after the area 71, the latter having the same length as the field 29 (twenty five octets, whilst the area 72 has the maximum length over which the field 30 can extend (one thousand five hundred and forty octets), a maximum length which is also that of the data frame field 48 of the downlink frames 26.

The memories 68 are used as follows: when the central means 21 receives an uplink frame 26, it writes the data frame 45 which it has in the area 72 of a memory 68, placing the field 48 in the area 72 whilst making the start of this field coincide with the start of this area; and, to prepare a downlink frame as shown in FIG. 5, a downlink frame with which it will retransmit the data frame which it had previously stored in the area 72, the central means 21 writes a service frame 27 in the area 71 of the same memory 68, and then sends a burst transmitting the useful content of this memory 68, that is to say the one located in the space going from the start of the area 71 to the place in the area 72 where the data frame ends.

The arrangement provided for the buffer 70 is identical to the format of the service frames 27, the central means 21 using the memory 70 to prepare the downlink frames as shown in FIG. 6, each of these frames being transmitted by sending a burst transmitting the entire content of the memory 70.

Figure 13A:
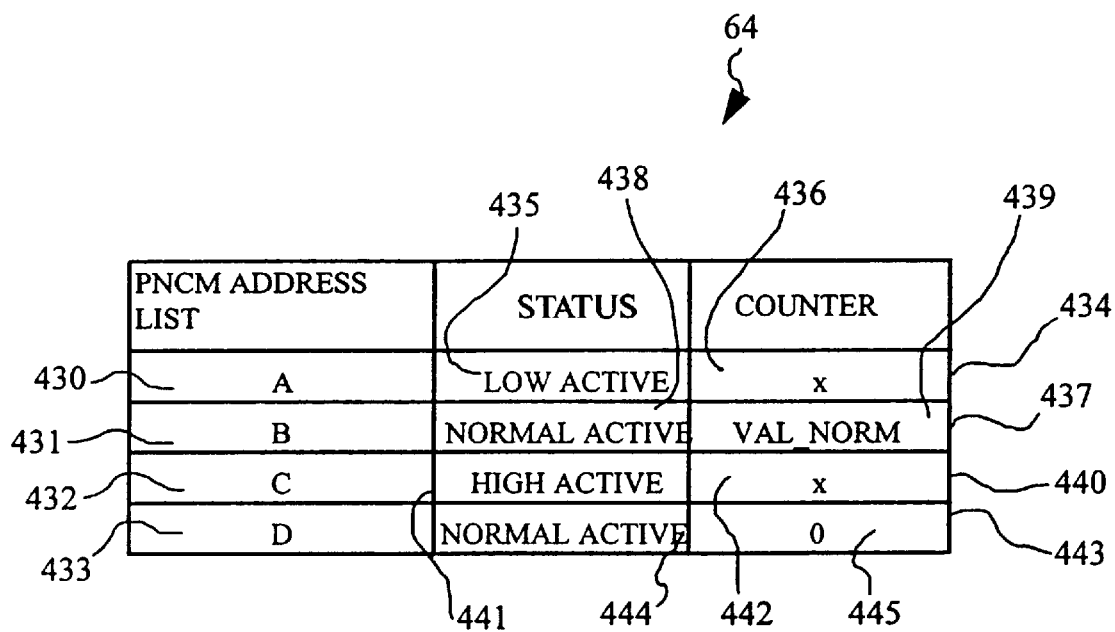
FIG. 13A shows the internal arrangement of an address table allocated priority levels.

As can be seen in FIG. 13A, the table 64 of addresses 430, 431, 432, 433 of peripheral networked communication means contains the address of each of these communication means which is known to the central networked communication means. A priority level for access to the transmission medium is allocated to each address in the address table. Thus the priority level 434, in this case an information item "low active" 435 with which there is associated an information item "x" 436 representing the value of a priority counter described below, is allocated to the address 430 represented here by the letter "A". The priority level 437, in this case an information item "normal active" 438 with which there is associated an information item "Val-norm" 439 representing the value of a priority counter described below, is allocated to the address 431, represented here by the letter "B". The priority level 440, in this case an information item "high active" 441, with which there is associated an item of information "x" 442 representing the value of a priority counter described below, is allocated to the address 432, represented here by the letter "C". The priority level 443, in this case an information item "normal active" 444, with which there is associated an item of information "0" 445 representing the value of a priority counter described below, is allocated to the address 433, represented here by the letter "B".

It should now be noted that, in accordance with the description which follows, "x" can have any value, since the only priority level for which the value of the priority counter is taken into account is the "normal active" level.

Figure 14:
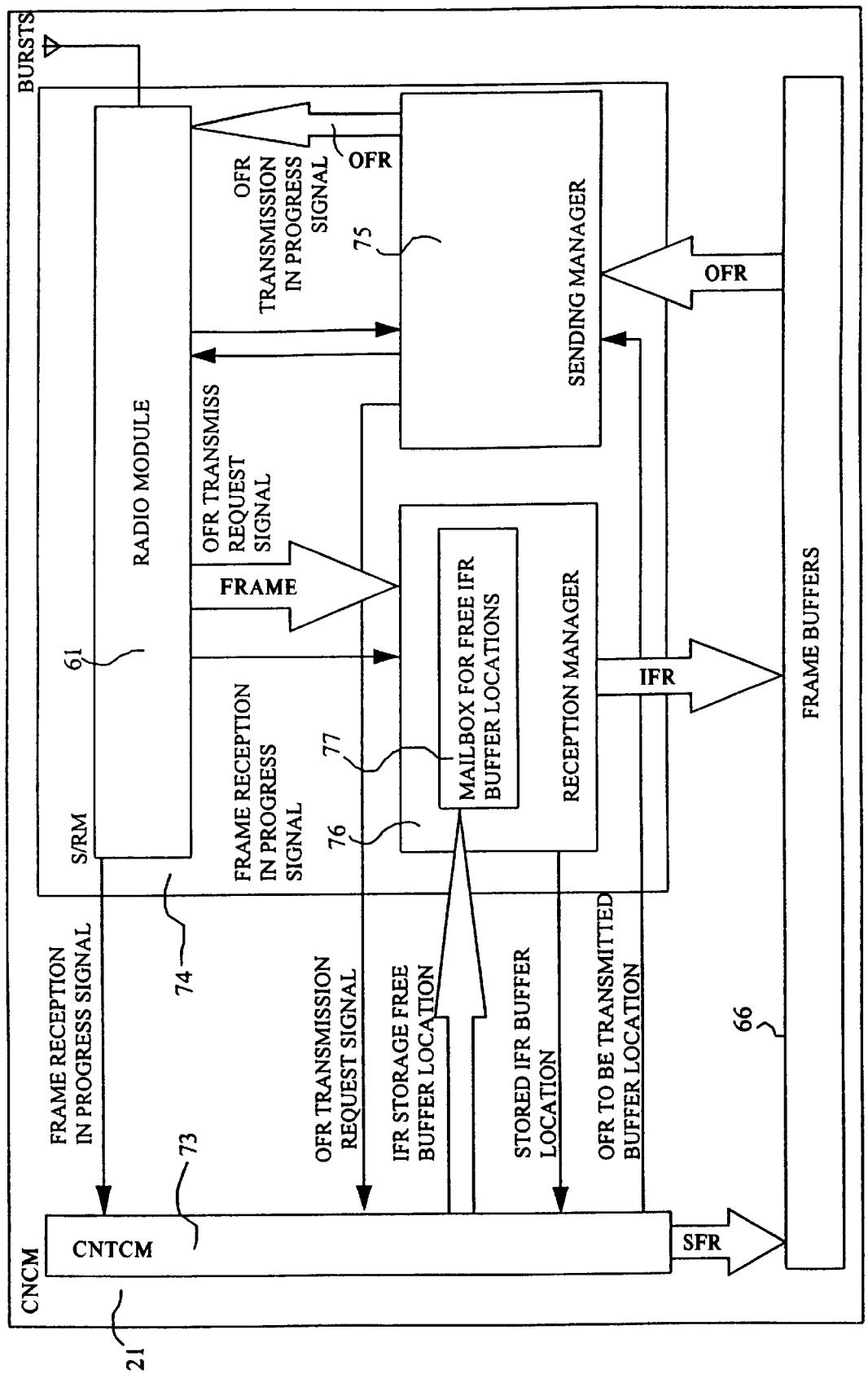
FIG. 14 is a functional diagram of the central networked communication means.

FIG. 14, and more generally the functional diagrams included in the drawings in the following figures, depict the path of the information exchanged by the different means used, by means of a simple arrow, except where it is a case of an operation of reading or writing in a memory, in which case the arrow is of the thick type, thick arrows also having been used for the path of the frames delivered by the radio module, following reception of the bursts transmitting them, and for the frames delivered to the radio module, so that it sends a burst transmitting them.

As indicated above, the program 62 is of the multi-task type by virtue of a real-time nucleus for managing tasks and providing communication, signaling and synchronization mechanisms between the tasks, these mechanisms involving the use notably of mailboxes each peculiar to a task, in which messages can be posted, and semaphores shared by several tasks.

The central means 21 includes, in general terms, a central networked transmission control means (CNTCM in the drawings) 73 and a sending/receiving means (S/RM in the drawings) 74, which exchange information, the sending/receiving means 74 carrying out uplink frame writing and downlink frame reading operations in the space 66 of the random access memory 59 where the frame buffers are located, the central transmission control means 73 for its part carrying out service frame writing operations (TS in the drawings) in the space 66.

The sending/receiving means 74 includes the radio module 61, and uses resources procured by the microcontroller 52 with the help of the program 62, the default parameters 63 and the working memory 65, whilst the central transmission control means 73 uses resources procured by the microcontroller 52 with the help of the program 62, the default parameters 63, the table 64 and the working memory 65.

In addition to the radio module 61, the sending/receiving means 74 includes a sending management means 75, and a reception management means 76, which includes a mailbox 77 in which the central transmission control means 73 posts the locations of the various memories 68 each free for the storage of an uplink frame.

The functioning of the radio module 61 will now be described, with reference particularly to FIGS. 14 and 15.

The radio module 61 puts itself spontaneously in reception mode. In this mode, when it detects the presence of the prefix 50 of what will become a frame 78, it performs a synchronization operation, and when the prefix 50 ends, it causes the signal 79 to go from a low level to a high level, which it makes it keep as long as reception of the signal 51 from the frame 78 lasts, a signal which normally conveys an uplink frame, the radio module returning the signal 79 to the low level when the signal 51 ends. The signal 79 therefore makes it possible to know, respectively when it is at the high level and at the low level, whether or not a frame is in the course of being received. For convenience, rather than to the signal 79, reference will be made, in the drawings and hereinafter, to a so-called frame reception in progress signal, which corresponds to the high level of the signal 79.

The radio module 61 communicates the frame reception in progress signal, on the one hand to the central transmission control means 73, which uses it at the expiry of the periods of duration T whose examples are shown in FIG. 10, and on the other hand to the reception management means 76, which uses it to know whether or not the radio module 61 is in the course of delivering to it the bits of a frame which is being received.

When the sending management means 75 wishes to deliver, to the radio module 61, a downlink frame so that the latter can be transmitted over the shared radio medium, it causes the signal 80, to which the radio module has access, to go from a low level to a high level, the module 61 switches from reception mode to sending mode and then sends the prefix 50 of what will become a frame 81, and, at the same time as it ends the sending of the prefix 50, it causes the signal 82 to which the means 75 has access to go from a low level to a high level, the sending management means 75 detects the rising edge of the signal 82 and then delivers to the radio module the downlink frame to be transmitted, and, when it has ended this delivery, the sending management means 75 causes the signal 80 to go from the high level to the low level, to which the module 61 responds by causing the signal 82 to go from the high level to the low level, and by switching from sending mode to reception mode.

For convenience, rather than to the signal 82, reference will be made, in the drawings and hereinafter, to a so-called downlink frame transmission in progress signal, which corresponds to the high level of the signal 82.

Figure 15:
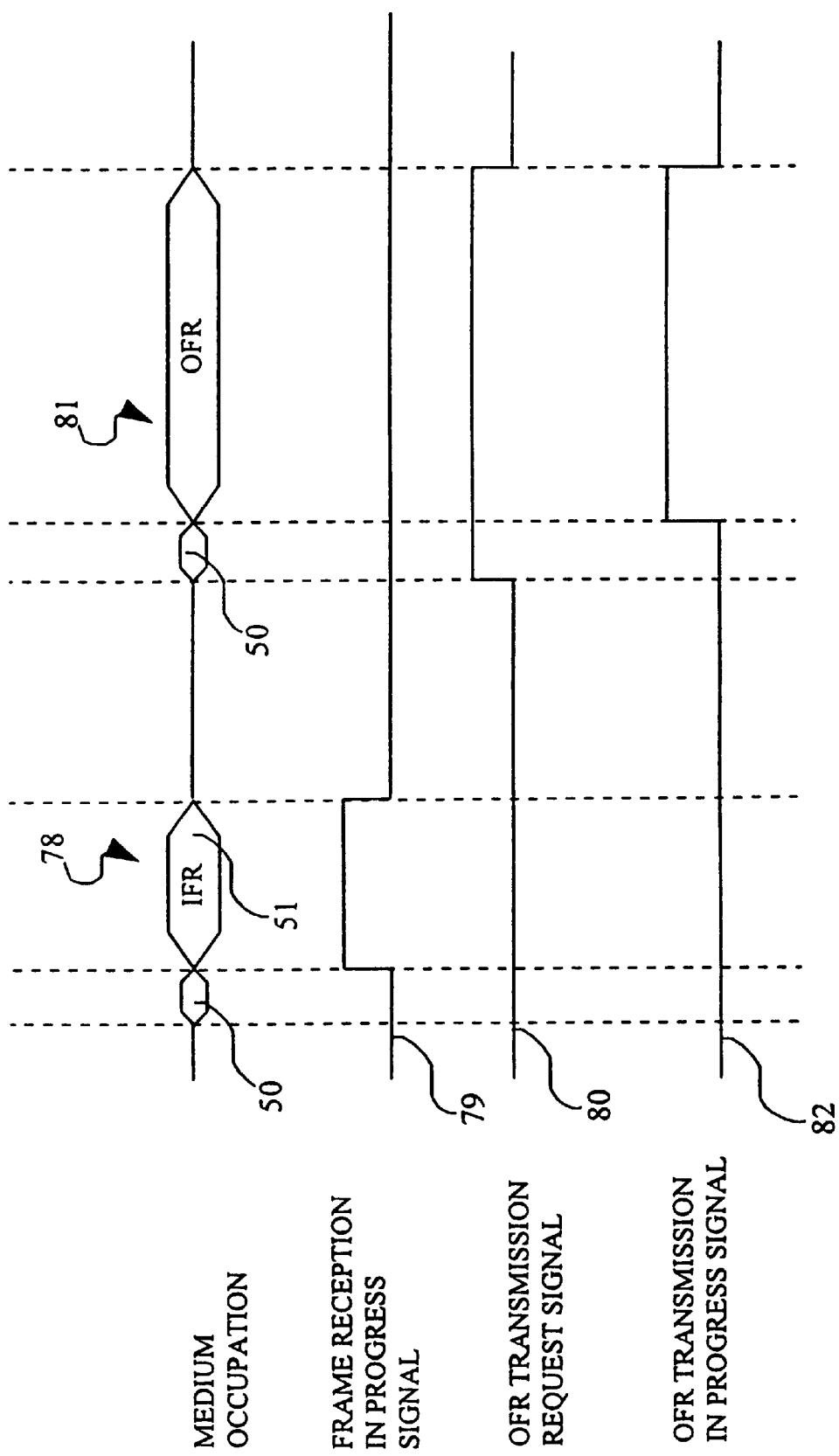
FIG. 15 is a timing diagram illustrating the functioning of the radio module of this central means.

With regard to the signal 80, this is called, in the drawings other than FIG. 15, the downlink frame transmission request signal, the fact that it is caused to go from the low level to the high level being considered to be its activation, and causing it to go from the high level to the low level as its inactivation.

The downlink frame transmission in progress signal is communicated by the radio module solely to the sending management means 75, for the reasons which have just been explained.

The sending management means 75 communicates the downlink frame transmission request signal firstly to the radio module, for the reasons which have just been explained, and secondly to the central transmission control means 73, so that the latter can know the time of termination of the transmission of a downlink frame whose transmission it has requested of the sending management means 75, supplying it with the location of the buffer 68, that is to say the data indicating the location of the memory space where the downlink frame to be transmitted is located.

Figure 16:
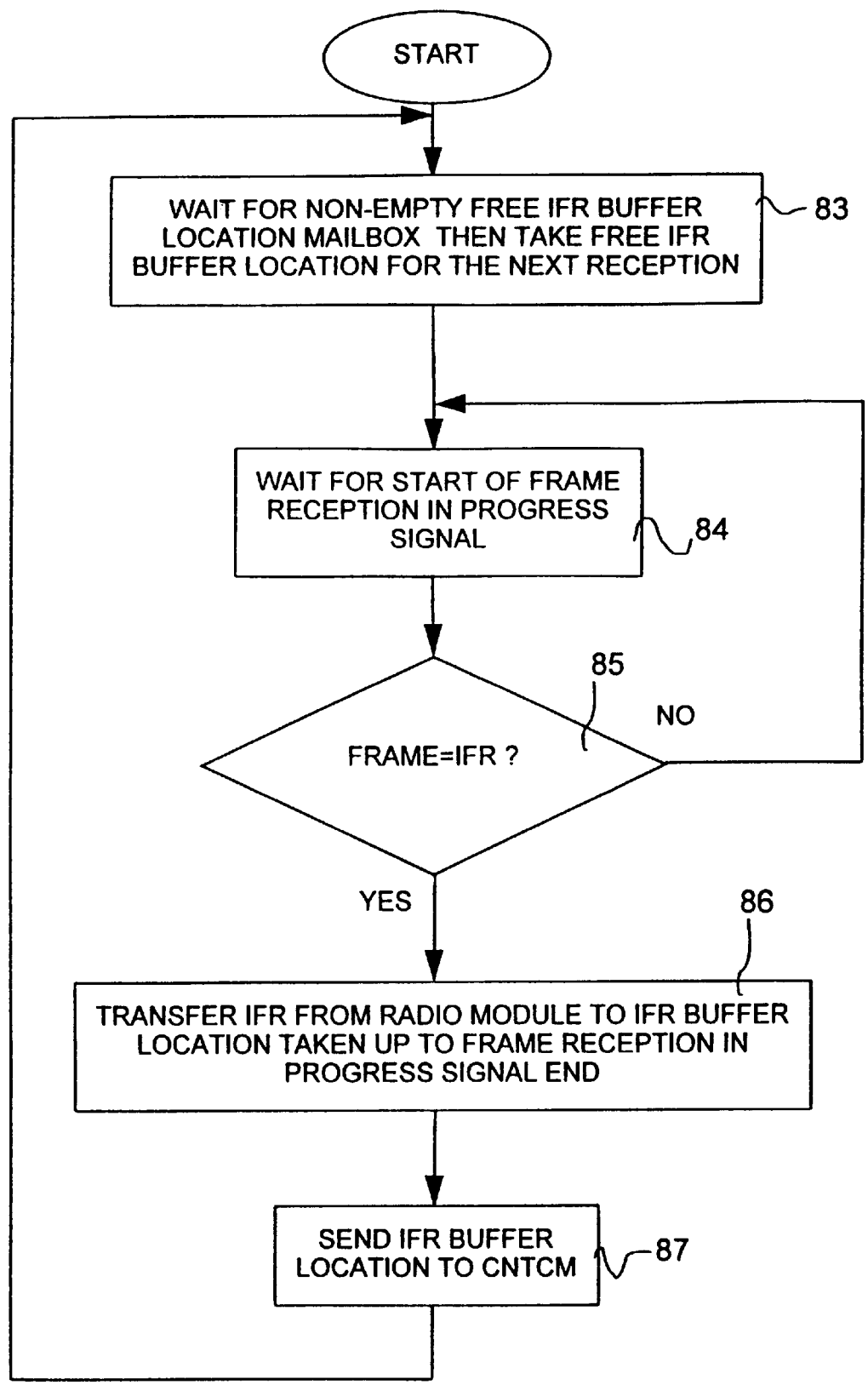
FIGS. 16 and 17 are flow diagrams illustrating the functioning respectively of the reception management means and of the sending management means included in the sending/receiving means of the central communication means.

The functioning of the reception management means 76 is illustrated by the flow diagram in FIG. 16.

Directly after start-up, it enters a loop where it begins by performing an operation 83 in which it waits until there is at least one memory location 68 in the mailbox 77, that is to say the latter is not empty, and, when this becomes the case, it takes from this mailbox a location, and more precisely the one which is the first to have been posted therein where there are several of them, the memory 68 whose location was taken being that which it will use to store the next uplink frame that the radio module 61 sends to it.

The reception management means 76 then goes to an operation 84 where it awaits the start of the frame reception in progress signal, that is to say the rising edge of the signal 79, and, when this event occurs, the means 75 performs a test 85 in which it determines whether the frame which the radio module 61 is in the course of sending to it is indeed an uplink frame coming from one of the peripheral means 24, for example by checking whether an item of network reference information provided in the field 46 is indeed present.

Where the result of the test 85 is negative, the reception management means 76 returns to the operation 84, that is to say it awaits the reception of the next frame, ignoring the one which the radio module is in the course of sending to it.

When the result of the test 85 is positive, the reception management means 76 performs an operation 86 in which it transfers the uplink frame which the radio module 61 is in the course of sending to it into the buffer 68 situated in the last location which it has taken from the mailbox 77, until the end of the frame reception in progress signal, that is to say until the falling edge of the signal 79.

The reception management means 76 then performs an operation 87 in which it sends to the central transmission control means 76 the location of the memory 68 in which the uplink frame which has just been received has been stored, which advises the means 73 of the reception and storage of this frame.

The reception management means 76 then returns to the start of the loop, and will therefore perform iteratively, throughout its functioning, the series of operations which has just been described.

Figure 17:
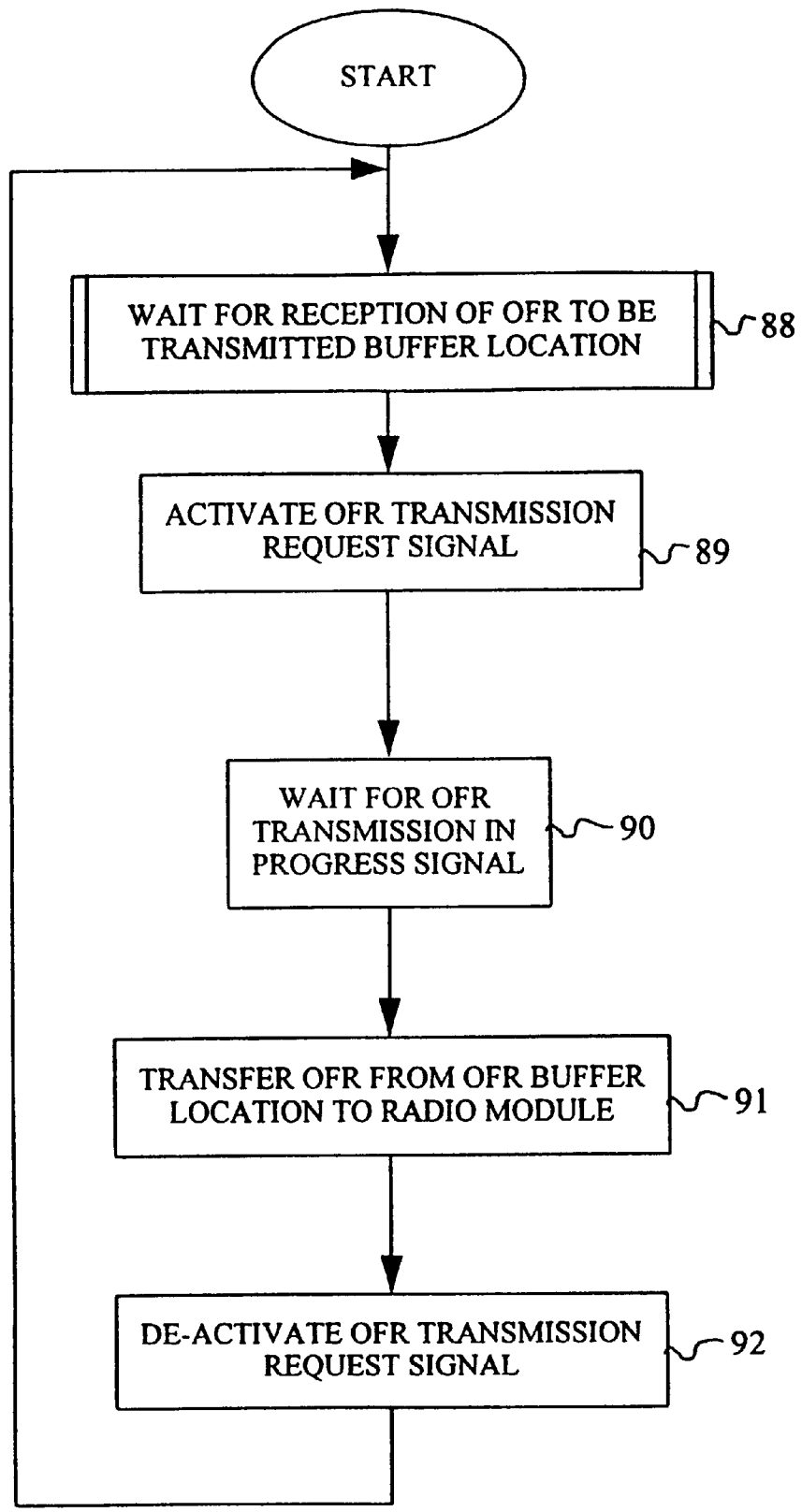

The functioning of the sending management means 75 is illustrated in FIG. 17.

Directly after start-up, it enters a loop in which it begins by performing an operation 88 in which it waits until the central transmission control means 73 sends it a memory location 68 containing a downlink frame to be transmitted over the shared radio medium, that is to say, given that the downlink frame does not necessarily occupy all the memory 68, the location of the part of this memory where the downlink frame is located. It will be noted in this regard that the data frame length information 43 included in the uplink frame 26 (FIG. 9) enables this location to be known in a particularly simple fashion. Thus, if the location is expressed by giving the address of the start of the memory 68 and then its length, the location of the memory 68 in which the downlink frame will be found will be expressed by the address of the start of the memory 68 followed by a length corresponding to the sum of the length of the service frame 27 (twenty five octets) and the length 43 which appeared in the uplink frame which transmitted the data frame included in the present downlink frame.

When the sending management means 75 receives such a location, it performs an operation 89 in which it activates the downlink frame transmission request signal, that is to say it causes the signal 80 to go from the low level to the high level, and then passes to an operation 90 in which it awaits the presence of the downlink frame transmission in progress signal, that is to say the signal 82 is at a high level, and when this event occurs it performs an operation 91 in which it delivers to the radio module 61 the downlink frame contained in the memory location 68 which was delivered to it during the operation 88, and when it has finished delivering this downlink frame it performs the operation 92 in which it inactivates the downlink frame transmission request signal, that is to say it causes the signal 80 to go from the high level to the low level, and then it returns to the start of the loop, and will therefore perform, throughout its functioning, the series of operations which has just been described.

The central transmission control means 73 will now be described in more detail with reference to FIGS. 18 to 24.

The means 73 (FIG. 18) includes: a buffer management means 93; an authorisation-to-send message preparation means 94, including an individual authorisation-to-send message preparation means 601 and a collective authorisation-to-send message preparation means 602, a downlink frame production means 95, including a mailbox 96 in which the buffer management means 93 posts the memory location 68 in which is situated a data frame awaiting transmission and a mailbox 97 in which the means 601 and 602 of the means 94 post authorisation-to-send messages as they are prepared; and an uplink frame analysing means 460 which receives memory locations from the sending/receiving means 74 and reads information coming from this frame in the space 66 of the random access memory 59, which performs an updating of the priority levels for access to the address table 64 in accordance with this information; and which retransmits the memory locations to the buffer management means 93.

Figure 19:
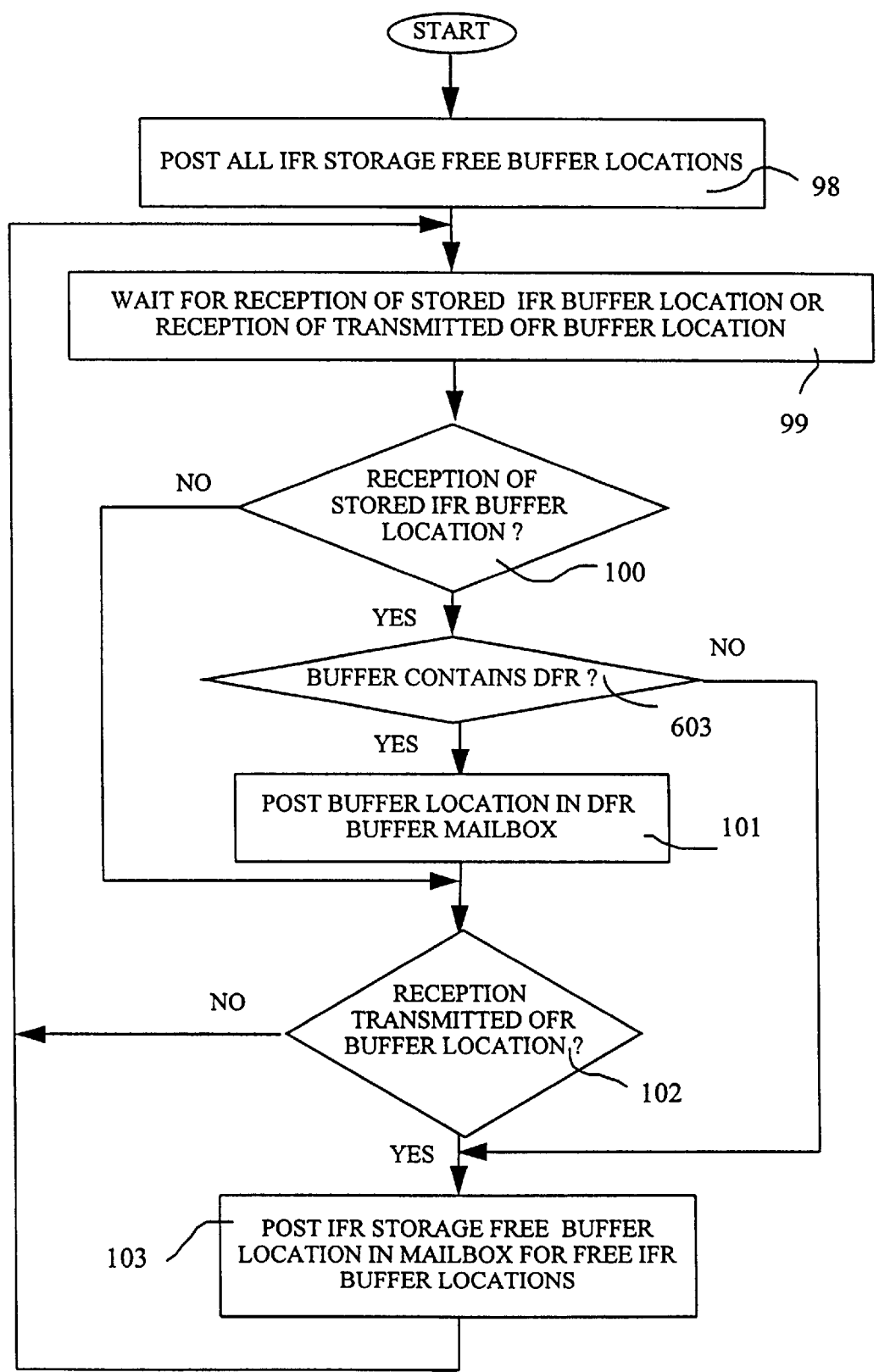
FIG. 19 is a flow diagram illustrating the functioning of the buffer management means of the central transmission control means.

The functioning of the buffer management means 93 is illustrated by the flow diagram in FIG. 19.

After start-up, it performs an operation 98 in which it posts the location of each of the memories 68 in the mailbox 77 of the reception management means 76, the locations in question being stored amongst the default parameters 63.

Once the operation 98 has been accomplished, the management means 93 enters a loop in which it performs an operation 99 in which it waits until it receives, from the sending/receiving means 74, and more precisely from the reception management means 76, a buffer location 68 in which it has stored an uplink frame, or else from the production means 95, a buffer location 68 containing a downlink frame whose transmission has been effected.

When one or other of these two events occurs, the management means 93 goes to a test 100 in which it determines whether or not it is the first event which has occurred.

Where it is indeed the reception of a buffer location 68 in which an uplink frame has just been stored, which has occurred, the management means 93 performs a test 603 in which it determines whether or not the uplink frame stored contains a data frame, and in the affirmative the management means 93 performs an operation 101 in which it posts the location of the memory 68 which it has just received in the mailbox 96 of the production means 95.

Once the operation 101 has been accomplished, or when the result of the test 100 is negative, the management means 93 performs a test 102 in which it determines whether or not the second event has just occurred.

If this is the case, and when the test 603 is negative, it performs an operation 103 in which it posts in the mailbox 77 of the management means 76 the buffer location 68 which it has just received.

Once the operation 103 has been accomplished, and where the result of the test 102 is negative, the management means 93 returns to the start of the loop and will therefore perform iteratively, throughout its functioning, the series of operations which has just been described, with the exception of the operation 98, which is outside the loop and which is therefore performed only just after start-up.

Figure 19A:
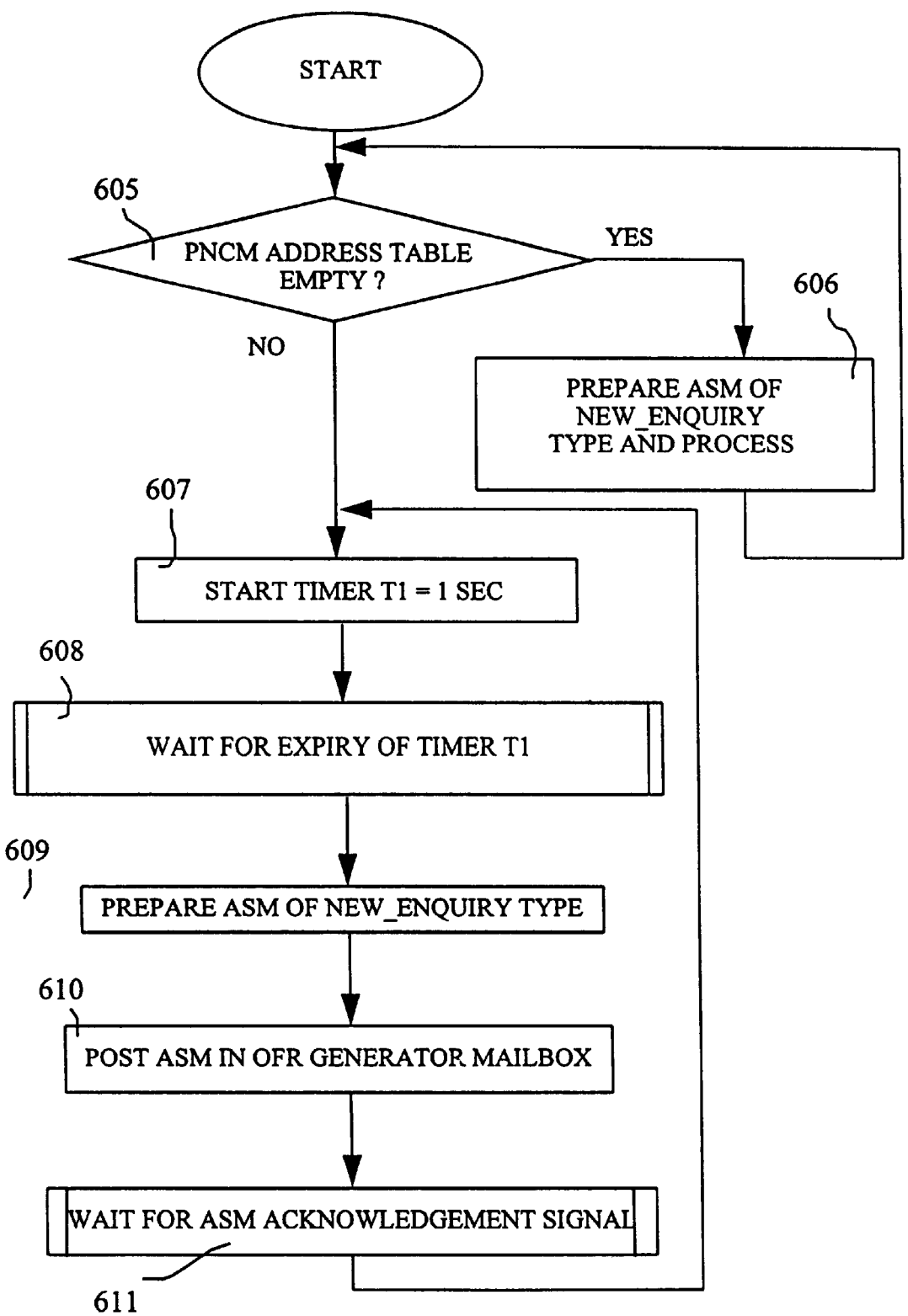
FIGS. 19A and 20 are flow diagrams illustrating respectively the functioning of the means for preparing collective authorisation-to-send messages and of the means for preparing individual authorisation-to-send messages, of the central transmission control means shown in FIG. 18.

The functioning of the collective authorisation-to-send message preparation means 602 is illustrated by the flow diagram in FIG. 19A.

After start-up, it performs a test 605 in which it determines whether or not the central means contains the identification of at least one peripheral means, that is to say whether or not the table 64 is empty.

In the affirmative, the collective authorisation-to-send message preparation means 602 performs an operation 606 in which it prepares an authorisation-to send message of the collective type intended for each of the peripheral means 24 which is a candidate for insertion in the network 20 (messages illustrated in the drawings by NE or new enquiry), then it processes this message, that is to say it posts it in the mailbox 97 of the production means 95 and then awaits the reception of an acknowledgement signal, and then it returns to the test 605, so that the preparation means 602 performs, in a loop, a test 605 and then an operation 606 as long as the central means does not have available the identification of any peripheral means 24.

In the contrary case, that is to say when the test 605 is negative, the preparation means 602 goes to an operation 605 in which it triggers a countdown of a predetermined period, for example one second, this period being that which will elapse between two successive collective authorisation-to-send messages, as shown in FIG. 10A.

The preparation means 602 then performs an operation 608 in which it waits for the countdown initiated in the operation 607 to end, followed by the operations 609 to 611, which are the same as those which it performs in the operation 606.

Once the operation 611 of awaiting the signal of acknowledgement of an authorisation-to-send message is accomplished, the preparation means 602 returns to the operation 607, and will therefore perform iteratively, that is to say in a loop, during its functioning, the operations 607 to 611.

In general terms, the preparation means 601 constitutes a means of allocating, to each of the communication means, authorizations to send over the medium, according to its priority level. For this purpose it performs, iteratively as from start-up, a series of operations in which it prepares an authorisation-to-send message for the peripheral means 24 having a current address, going from one series of operations to the following each time it receives, from the downlink frame production means 95, a signal to take into account an authorisation-to-send message, and using, in each above-mentioned new series of operations, as the current address, the following address in the table 64, in an order related to the priority levels allocated, in this table, to the said addresses. In addition, the preparation means 601 performs an updating of these priority levels in a decreasing direction.

To start up the preparation means 601, use is made of the table 64 of addresses allocated priority levels, and optionally associated priority counters, so that certain peripheral means 24, which normally have greater requirements for the transmission of data frames, receive authorisation-to-send messages with a greater frequency than the others.

Figure 20:
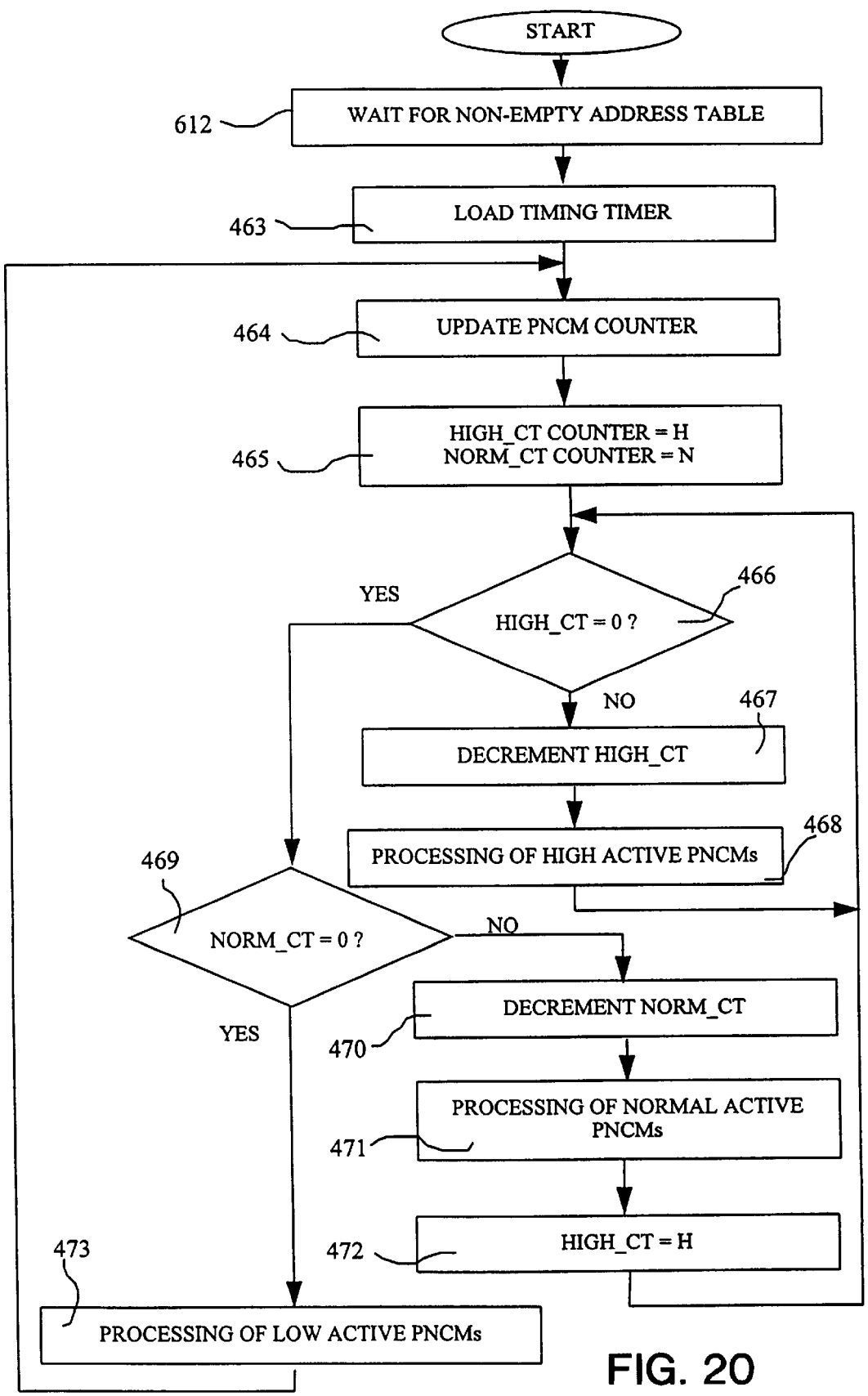

The functioning of the individual authorisation-to-send message preparation means 601 is shown in more detail by the flow diagram in FIG. 20.

Directly after start-up, the preparation means 601 performs an operation 612, in which it waits for the central means 21 to have identified at least one peripheral means 24, that is to say the table 64 is not empty.

When this event occurs, the means 61 performs an operation 463 of initiating a countdown which on the one hand allocates to a counter (working memory 175, counter not shown) a predetermined number of time delay periods, a period for example equal to a multiple of an operating cycle of a clock (not shown) of the central networked communication means, and on the other hand initiates a decrementation of this counter by a step of one unit.

Figure 20A:
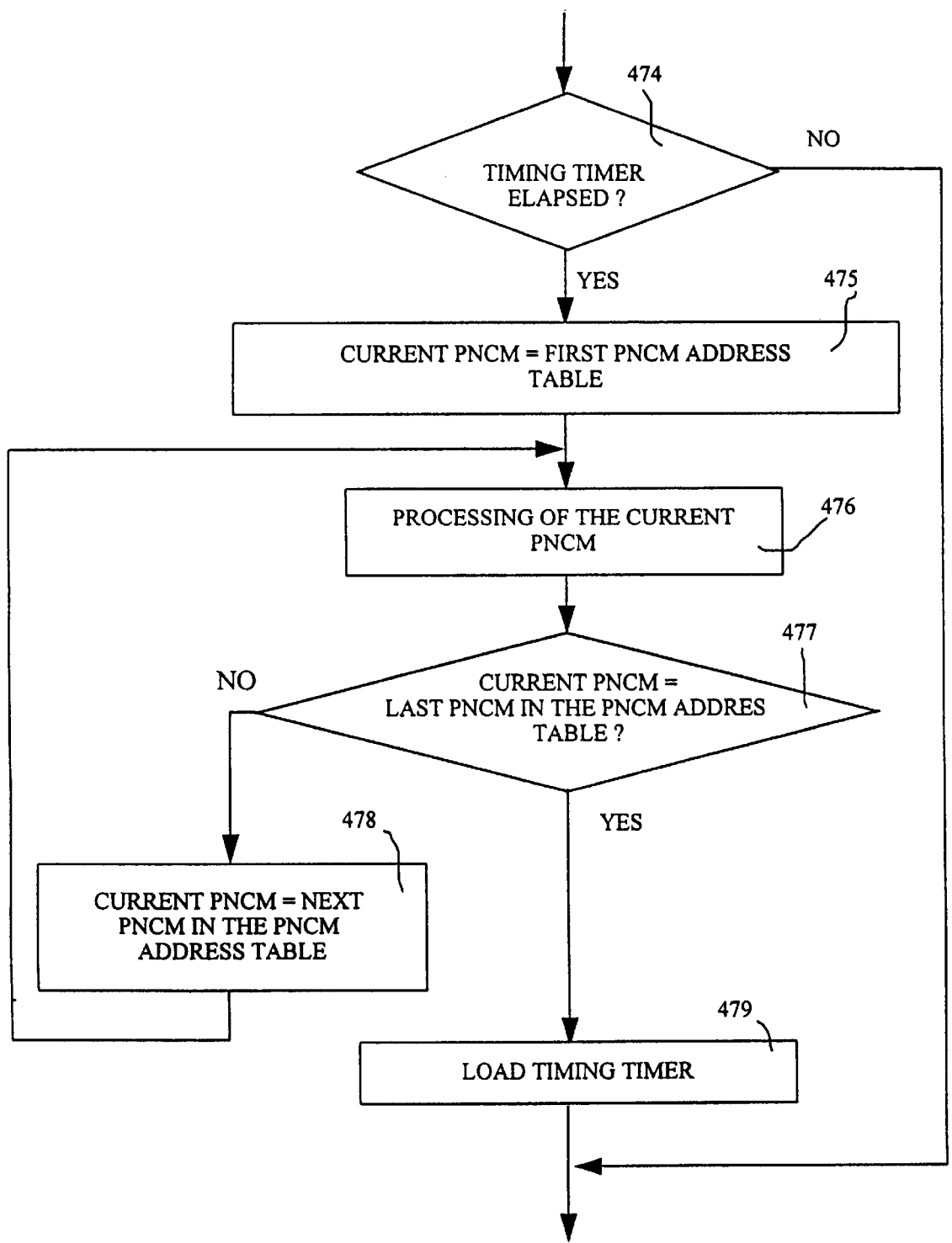
FIGS. 20A to 20D are flow diagrams showing in more detail respectively the operation of updating the counter of a peripheral means, the processing operation of high active peripheral means, the processing operation of the normal active peripheral means, and the processing operation of the low active peripheral means, shown in the flow diagram in FIG. 20.

Following the operation 463, the authorisation-to send message preparation means 601 commences functioning in a loop, beginning with an operation 464 of updating a counter of a peripheral networked communication means, described with regard to FIG. 20A.

Figure 20B:
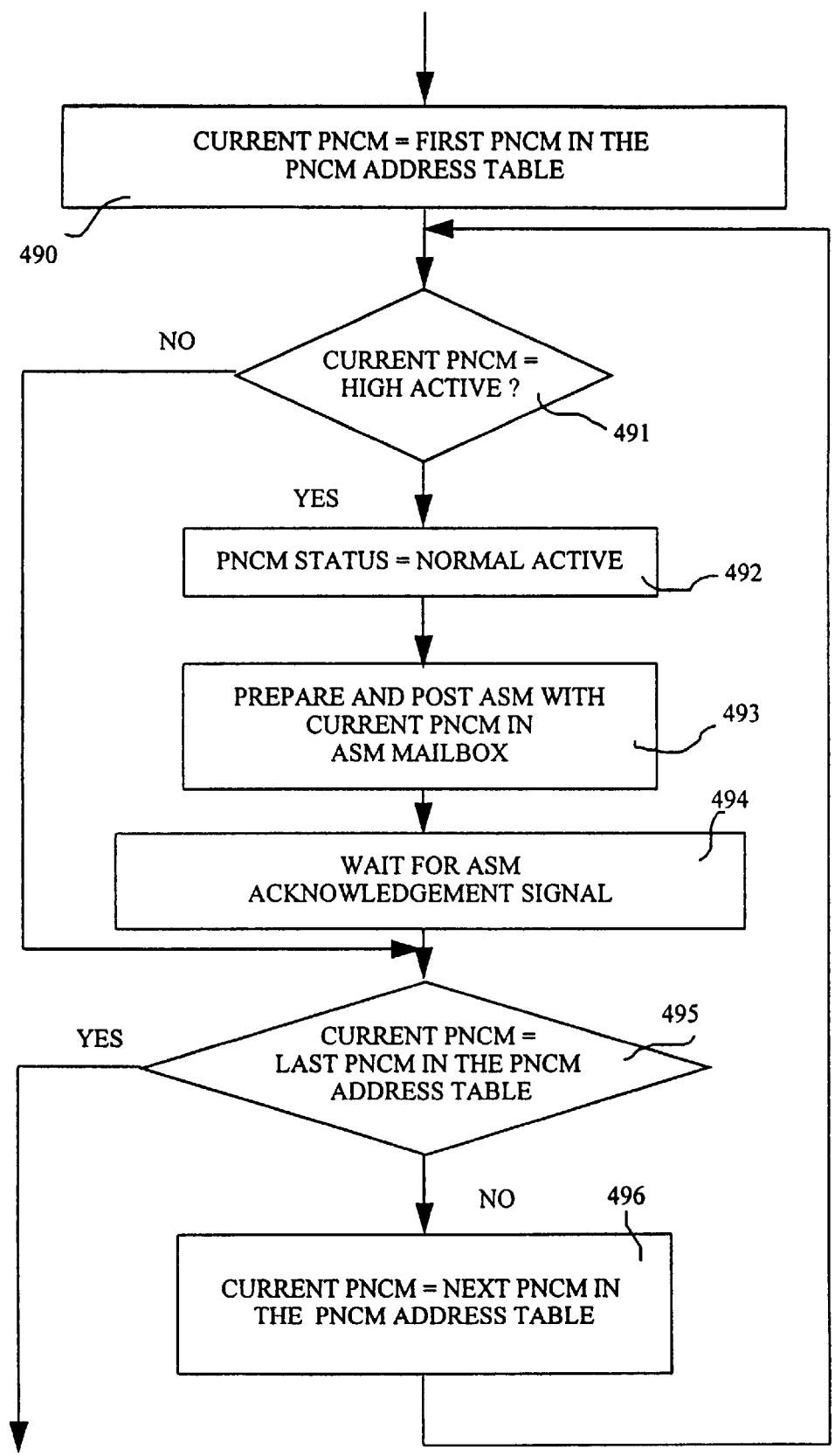
Figure 20C:
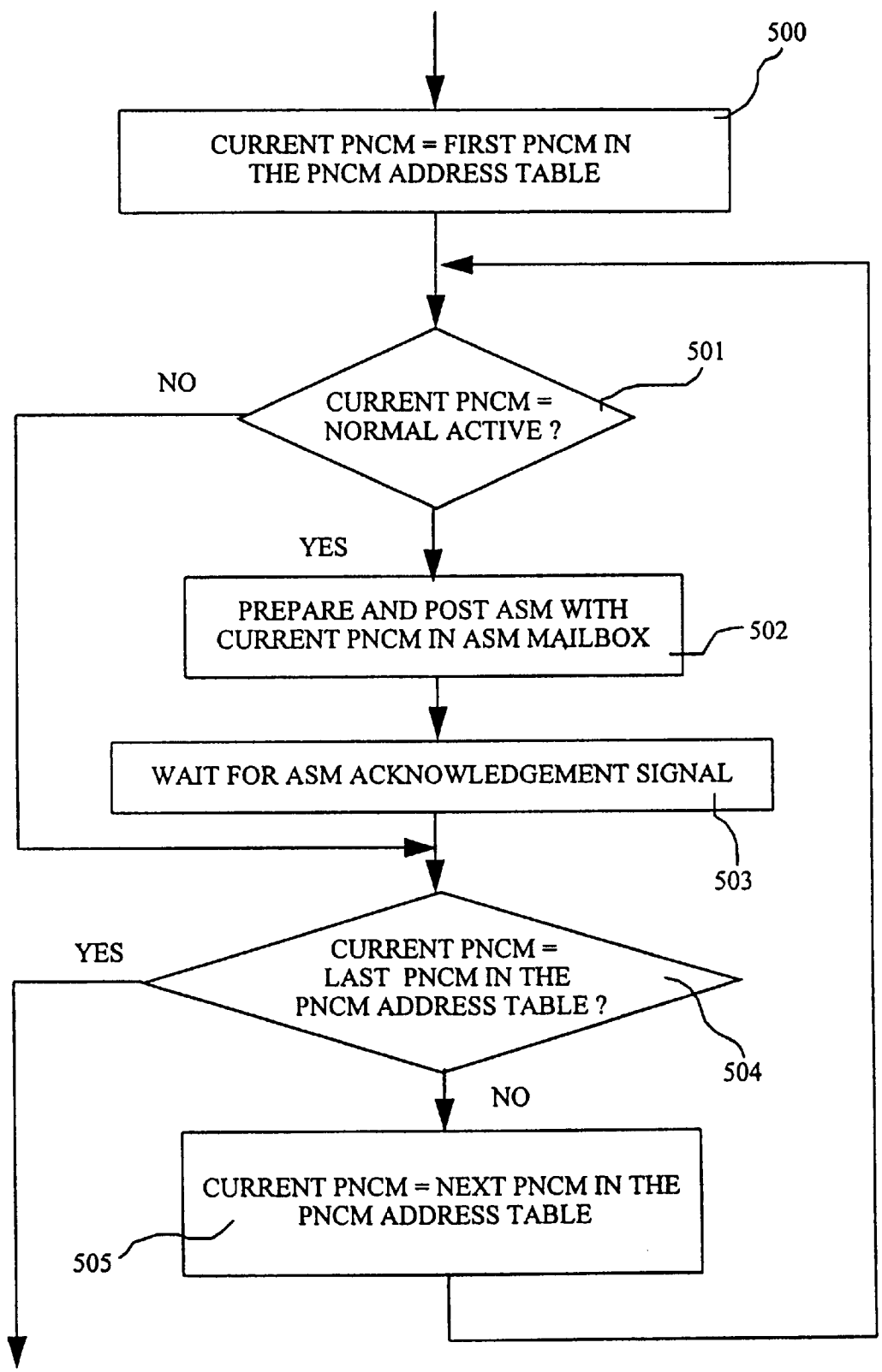

This operation 464 begins with a test which determines whether or not the end of the countdown 474 has been reached Where the countdown is finished, the operation 475 consists of taking, as the so-called "current" peripheral networked communication means, the first peripheral networked communication means in the table 64 of the addresses of such means. Then the operation 476 is the processing of the so-called current peripheral networked communication means, an operation detailed in FIG. 20E.

This operation 476 begins with a test 480 which determines whether or not the priority level allocated to the address of the current peripheral means, in the table 64, is "normal active". In the affirmative, the test 481 determines whether or not the priority counter allocated to the address of the current peripheral means in the table 64 is equal to zero. In the affirmative, the operation 482 allocates, as the priority level, to the peripheral networked communication means, the "low active" level. If not, the operation 483 decrements by a step of one unit the priority counter for the "normal active" priority level allocated to the address of the current peripheral networked communication means.

Where the test 480 gives a negative result, or at the end of either of the operations 482 and 483, the authorisation-to-send preparation means 601 goes to the test 477 (FIG. 20A).

The test 477 consists of determining whether the peripheral networked communication means is the last peripheral networked communication means in the address table 64. In the affirmative, the operation 479 re-initiates a countdown in which the number of steps is preferably identical to that of the countdown initiated during the operation 463. If not, by means of the operation 478, the peripheral networked communication means which follows the so-called current peripheral means in the address table 64, replaces it and thus becomes the new peripheral means referred to as "current" in the implementation of the flow diagram, and then the authorisation-to-send message preparation means 601 returns to the operation 476, thus effecting a loop including the operation 476, the test 477 and the operation 478.

Where the test 474 is negative or where the timer loading operation 479 is completed, the authorisation-to-send message preparation means 601 goes to the operation 465 (FIG. 20) by means of which the priority counter associated with all the addresses whose priority level is "high active" is set to the predetermined numerical value "H", and the priority counter associated with all the addresses whose priority is "normal active" is set to the predetermined numerical value "N". Then the test 466 determines whether or not the priority counter associated with the "high active" priority level is equal to zero. In the affirmative, the operation 467 effects a decrementation by a step of one unit of the value of the priority counter associated with the "high active" priority level and then the operation 468 effects the processing of the peripheral networked communication means whose priority level is "high active", a processing described in FIG. 20B.

The first processing operation of the peripheral means whose priority level is "high active" is the operation 490, which consists of calling "current" the first peripheral means represented by the address table 64. Then the test 491 determines whether or not, in the address table 64, the address of the current peripheral networked communication means is allocated the "high active" priority level. In the affirmative, the priority level allocated to the said address in the table 64 becomes "normal active" in the course of the operation 492. Then the operation 493 prepares and posts the authorisation-to-send message which solely authorises the current peripheral networked communication means to transmit a frame in return for this authorisation-to-send message in the authorisation-to-send message mailbox.

Then the operation 494 consists of awaiting the acknowledgement signal for the said authorisation-to-send message.

If the result of the test 491 is negative or when the operation 494 is completed, the test 495 determines whether or not the current peripheral means is the one whose address is the last in the address table 64. If the result is negative, the operation 496 takes the address which follows, in the address table 64, that of the current peripheral means and gives the name "current" to the networked communication means which has this address, and then the test 491 and the operations and tests which follow it in the above description are reiterated with this new current peripheral means.

If the result of the test 495 is negative, the test 466 is reiterated along with the operations and tests which follow it in the above description.

If the result of the test 466 is negative, the test 469 determines whether or not the value of the priority counter of the "normal active" priority level is nil. If the result of the test 469 is negative, the operation 470 consists of decrementing this priority counter by a step of one unit, and then the operation 471 consists of processing the peripheral networked communication means whose address is, in the table 64, given the "normal active" priority level, in accordance with the operations presented in FIG. 20C.

The first of these operations, numbered 500, consists of calling "current" the peripheral networked communication means whose address is the first in the address table 64. The test 501 determines whether or not the address of the current peripheral communication means is given the "normal active" priority level. If the result of the test 501 is positive, the operation 502 prepares and posts the authorisation-to-send message which authorises solely the current peripheral networked communication means to transmit a frame in return for this authorisation-to-send message in the authorisation-to-send message mailbox. Then the operation 503 consists of awaiting the signal acknowledging the said authorisation-to-send message.

If the result of the test 501 is negative or when the operation 503 is completed, the test 504 determines whether or not the current peripheral means is the one whose address is the last in the address table 64. If the address is negative, the operation 505 takes the address which follows, in the address table 64, that of the current peripheral means and gives the name "current" to the networked communication means which has this address, and then the test 501 and the operations and tests which follow it in the above description are reiterated with this new current peripheral means.

If the result of the test 504 is positive, the operation 472 (FIG. 20) consists of the priority counter associated with all the addresses whose priority level is "high active" being set to the predetermined numerical value "H", and then the test 466 and the operations and tests which follow it in the above description are reiterated.

Figure 20D:
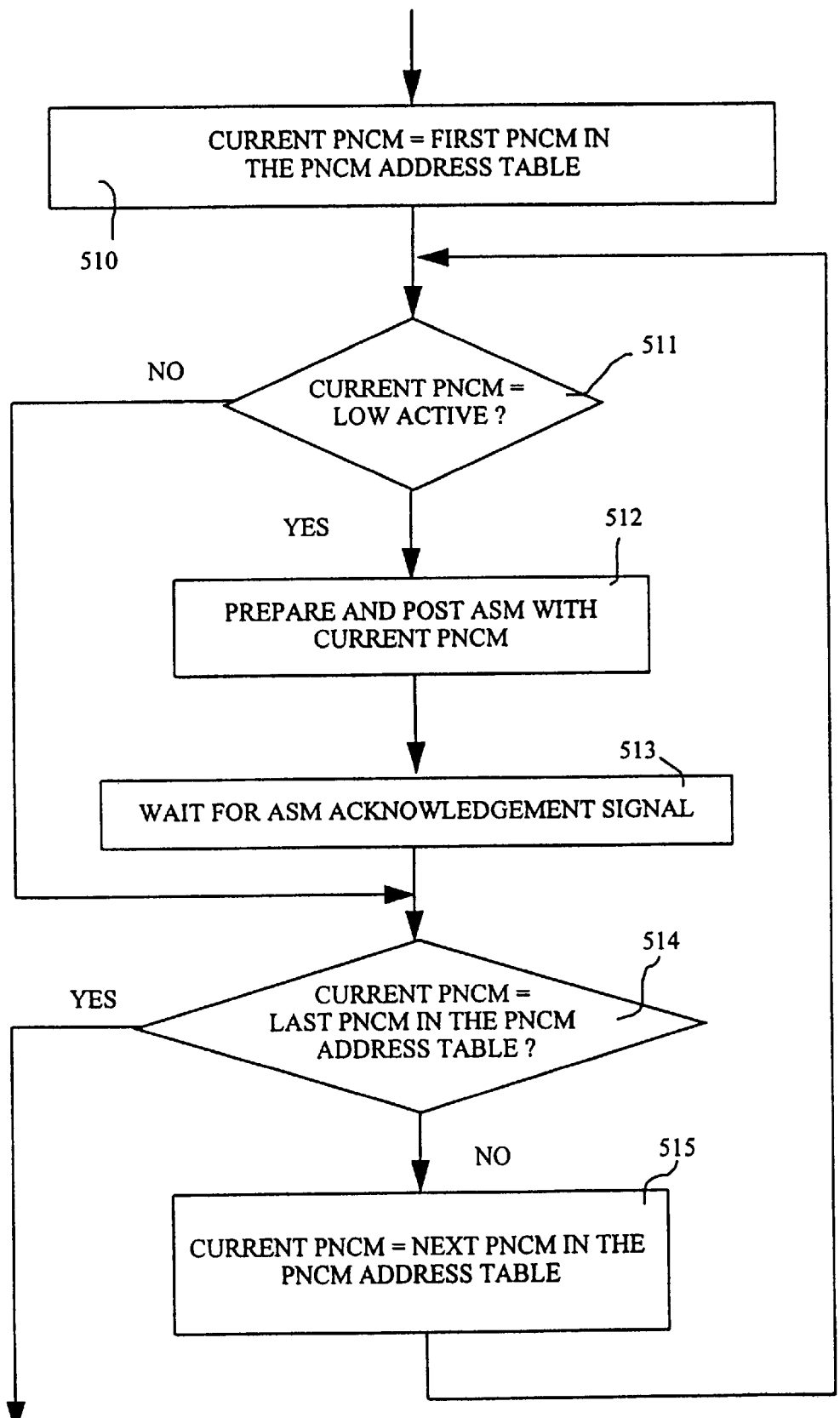
Figure 20E:
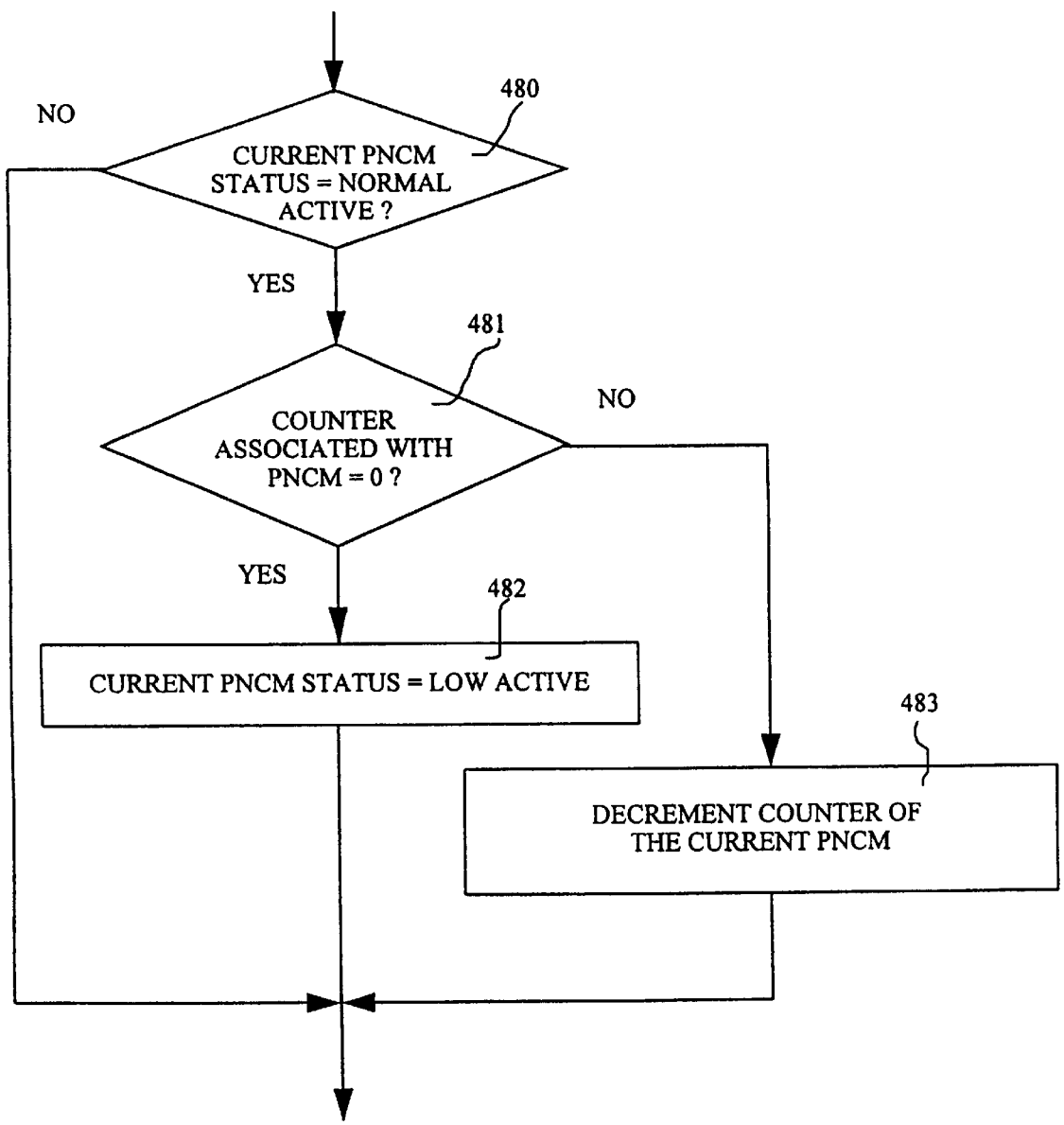
FIG. 20E is a flow diagram showing in more detail the processing operation of the current peripheral means of the flow diagram of FIG. 20A.

If the result of the test 469 is positive, the operation 473, which is detailed in FIG. 20D, effects the processing of the peripheral means whose priority level is "low active". This processing begins with the operation 501, which consists of calling "current" the peripheral networked communication means whose address is the first in the address table 64. The test 511 determines whether or not the address of the current peripheral communication means has the "low active" priority level. If the result of the test 511 is positive, the operation 512 prepares and posts the authorisation-to-send message which authorises solely the current peripheral networked communication means to transmit a frame in return for this authorisation-to-send message in the authorisation-to-send message mailbox. Then the operation 513 consists of awaiting the signal acknowledging the said authorisation-to-send message.

It will be noted that, by means notably of the operations 468, 471, 473, 493, 502 and 512, the means of allocating authorizations to send, that is to say in this case the authorisation-to-send message preparation means 601, regularly effects the allocation, to each communication means, including those whose priority level is the lowest, of at least one authorisation to send by means of the transmission medium.

If the result of the test 511 is negative or when the operation 513 is completed, the test 514 determines whether or not the current peripheral means is the one whose address is the last in the address table 64. If the result is negative, the operation 515 gives the name "current" to the networked communication means whose address in the address table 64 follows that of the preceding current peripheral means, and then the test 511 and the operations and tests which follow it in the above description are reiterated. If the result of the test 514 is positive, the test 464 and the operations and tests which follow it in the above description are reiterated. According to this embodiment, the authorisation-to-send message preparation device 601 effects sequentially on the one hand the updating of the "normal active" priority level to the "low active" priority level, in the address table 64, and on the other hand the preparation of authorizations to send.

According to the flow diagrams presented above, with regard to FIGS. 20, 20A, 20B, 20C, 20D and 20E, a peripheral networked communication means whose address has, in the table 64, the "high active" priority level, receives a number equal to the product of the numbers N and H of authorisations to send whilst a peripheral networked communication means whose address has, in the table 64, the "normal active" priority level, receives a number N thereof, and a peripheral networked communication means whose address has, in the table 64, the "low active" priority level, receives only one thereof. These ratios N and H are preferably parametrizable.

Figure 20F:
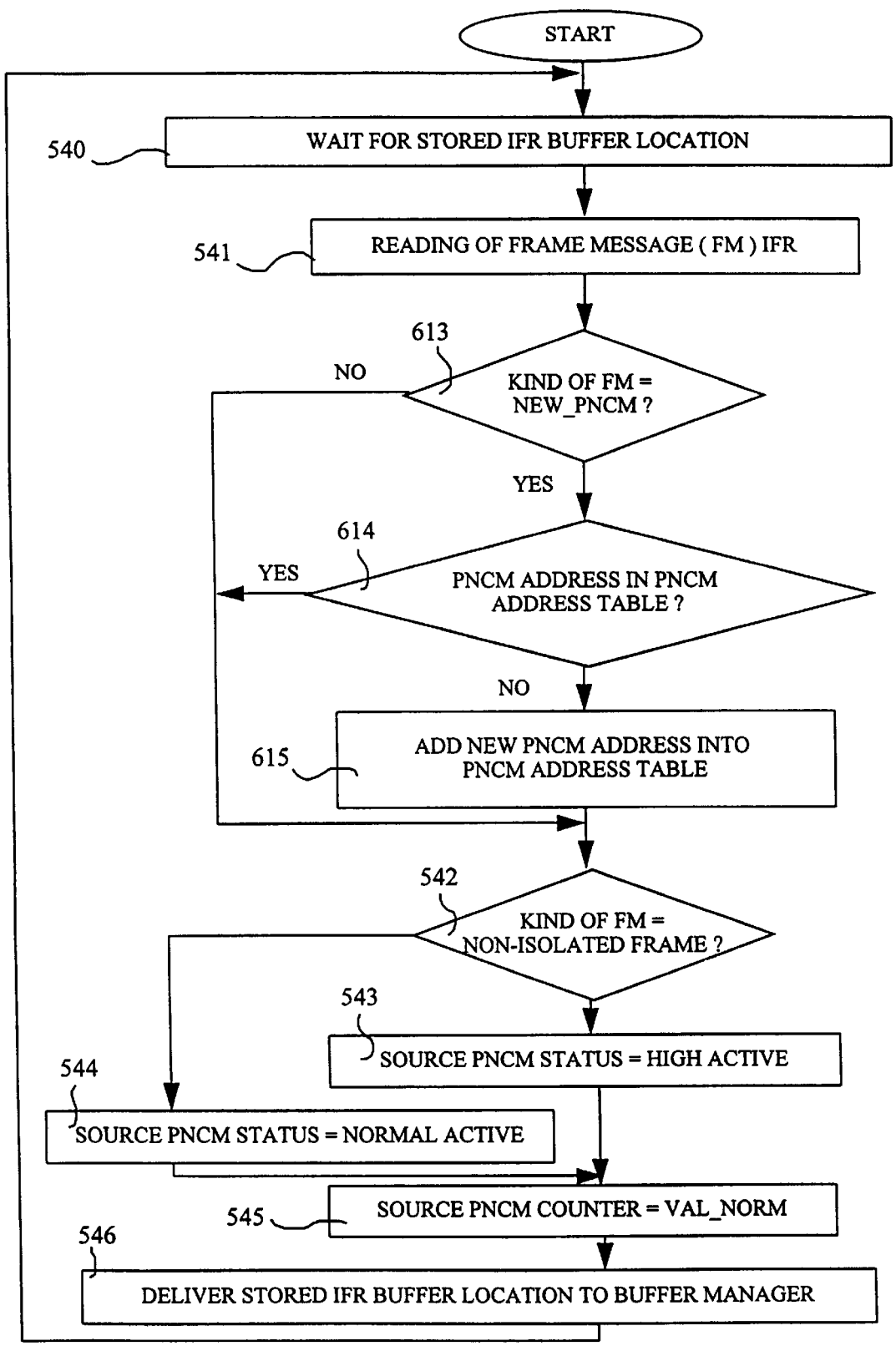
FIG. 20F is a flow diagram illustrating the functioning of the uplink frame analysing means of the central transmission control means shown in FIG. 18, according to a variant referred to as the "third priority management variant"

The uplink frame analysing means 460 functions in accordance with the flow diagram illustrated in FIG. 20F. First of all it performs the operation 540, which consists of awaiting an uplink frame location stored in a memory space 66 in the random access memory 59, this location reaching it from the sending/receiving means 74. When it has received such a location, the uplink frame analysing means performs an operation 541 of reading a frame message (FM in the drawings) in the uplink frame, by reading a part of the memory space 66 which stores the said frame.

The analysing means 460 then performs a test 613 in which it determines whether or not this frame message is a request for insertion in the network 20 (a message illustrated in the drawings by NPNCM or new PNCM).

In the affirmative, that is to say where the frame message is a request for insertion in the network 20, the analysing means 460 performs, for safety reasons, a test 614 in which it determines whether or not the address 423 appearing in this frame message appears in the table 64, and, in the negative, it performs the operation 615 in which it adds this address in the table 64.

Once the operation 615 is accomplished, or when the test 613 is negative, or when the test 614 is positive, the analysing means 460 performs a test 542, in which it determines whether or not the nature of the frame is a so-called "isolated" frame, that is to say whether the peripheral networked communication means has indicated respectively that it had not determined any other uplink frame to send ("isolated frame" being the value of the message nature information 422 as presented in FIG. 9A and presented in the frame message stored in the memory space 66), or whether it had already determined at least one uplink frame to send (the said value then being "non-isolated frame").

Where the result of the test 542 is positive, the operation 543 gives, in the address table 64, to the address of the peripheral means which transmitted the said frame, the "high active" priority level. If the result of the test 542 is negative, the operation 544 gives, in the address table 64, to the address of the peripheral means which transmitted the said frame, the "normal active" priority level.

Following any one of the operations 543 or 544, the operation 545 sets, in the address table 64, at the numerical value "Val-norm", for example equal to 3, the priority counter which is associated with the priority level given to the address of the peripheral means which transmitted the uplink frame.

Then the operation 546 consists of delivering to the memory space management means 93 the location of the memory space where the uplink frame is stored. Following the operation 546, the uplink frame analysing means returns to the operation 540 and this, as well as the operations and tests which follow it in the flow diagram illustrated in FIG. 20F, are reiterated.

Figure 21:
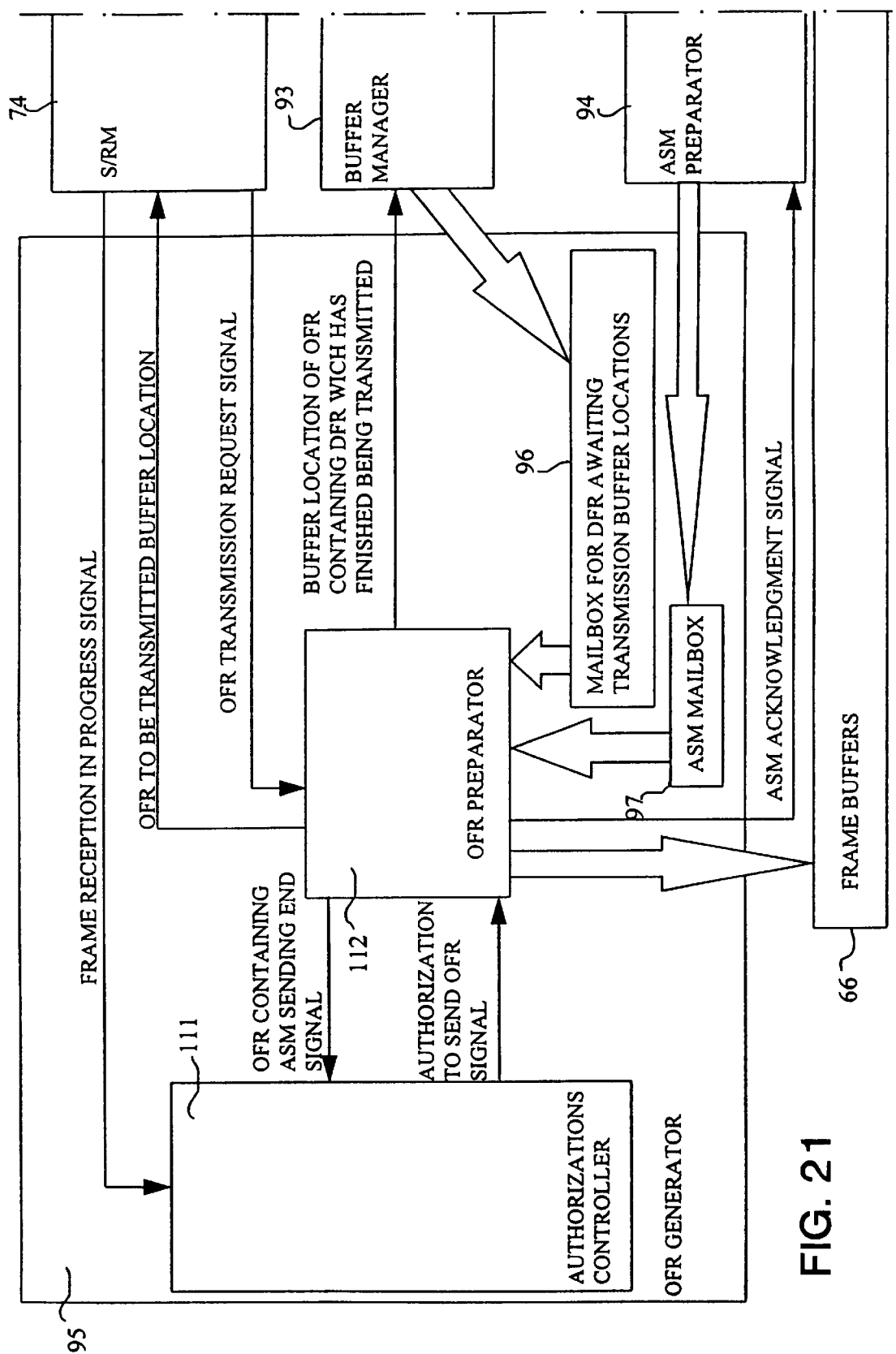
FIG. 21 is a partial functional diagram of the central networked communication means, showing more particularly the downlink frame production means included in the central transmission control means.

FIG. 21 shows in more detail the downlink frame production means 95. This includes an authorisation controlling means 111 and a downlink frame preparation means 112.

The controlling means 111 serves to determine whether or not a period of authorisation to transmit a downlink frame is in progress, a period which is in progress, as has been seen with the help of FIG. 10, at all times except during the periods of time T and the periods of reception of an uplink frame which has begun to be received during a period of time T.

Figure 22:
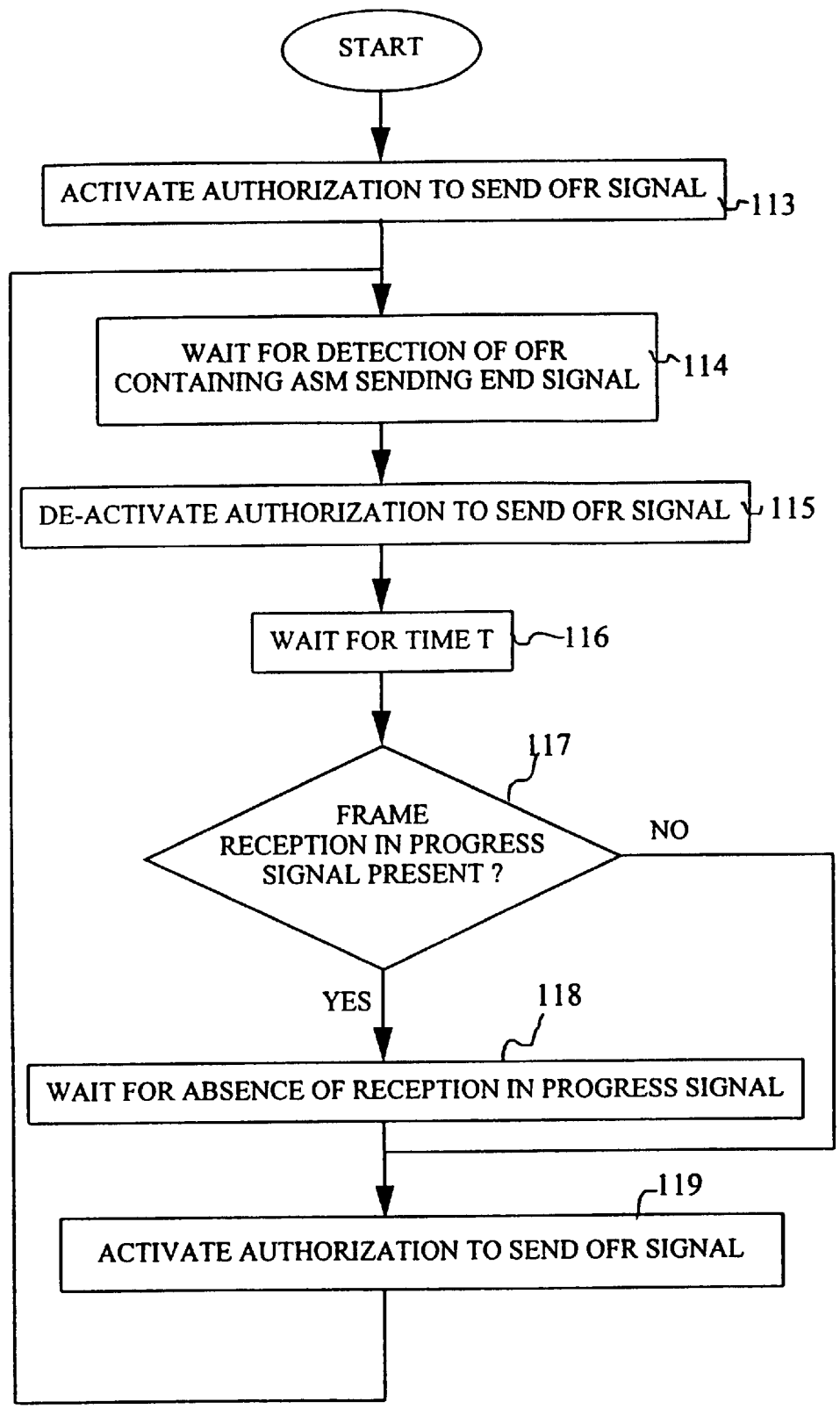
FIGS. 22 and 23 are flow diagrams illustrating the functioning respectively of the authorisation controlling means and of the downlink frame preparation means included in the downlink frame production means.

The functioning of the authorisation controlling means 111 is illustrated in FIG. 22.

After start-up, the means 111 performs an operation 113 during which it activates a downlink frame authorisation-to-send signal which is communicated to the preparation means 112, and then it enters a loop in which the first operation 114 is that of awaiting the detection of a downlink frame end-of-sending signal containing an authorisation-to-send message, a signal which is communicated to the controlling means 111 by the preparation means 112.

When this event occurs, that is to say for example at the end of sending of the signal 51 of the burst 49A or of the burst 49C shown in FIG. 10, the controlling means 111 first of all performs the operation 115 of activating the downlink frame authorisation-to-send signal, and then the operation 116 of awaiting the time T, and when the latter has elapsed it performs the test 117 in which it determines whether or not a frame reception in progress signal is present, that is to say whether the signal 79 (FIG. 15) is respectively at its high level or at its low level.

In the affirmative, it performs the operation 118 of awaiting the absence of the frame reception in progress signal, that is to say waiting for the signal 79 to be at its low level, and then awaiting an operation 119 in which it activates the downlink frame authorisation-to-send signal which had been inactivated in the operation 115.

When the result of the test 117 is negative, the controlling means 111 passes directly to the operation 119. Once the operation 119 has been performed, the controlling means 111 returns to the start of the loop, and will therefore perform iteratively, throughout its functioning, the series of operations which has just been described, with the exception of the operation 113, which is outside the loop and which it performs only just after start-up.

Figure 23:
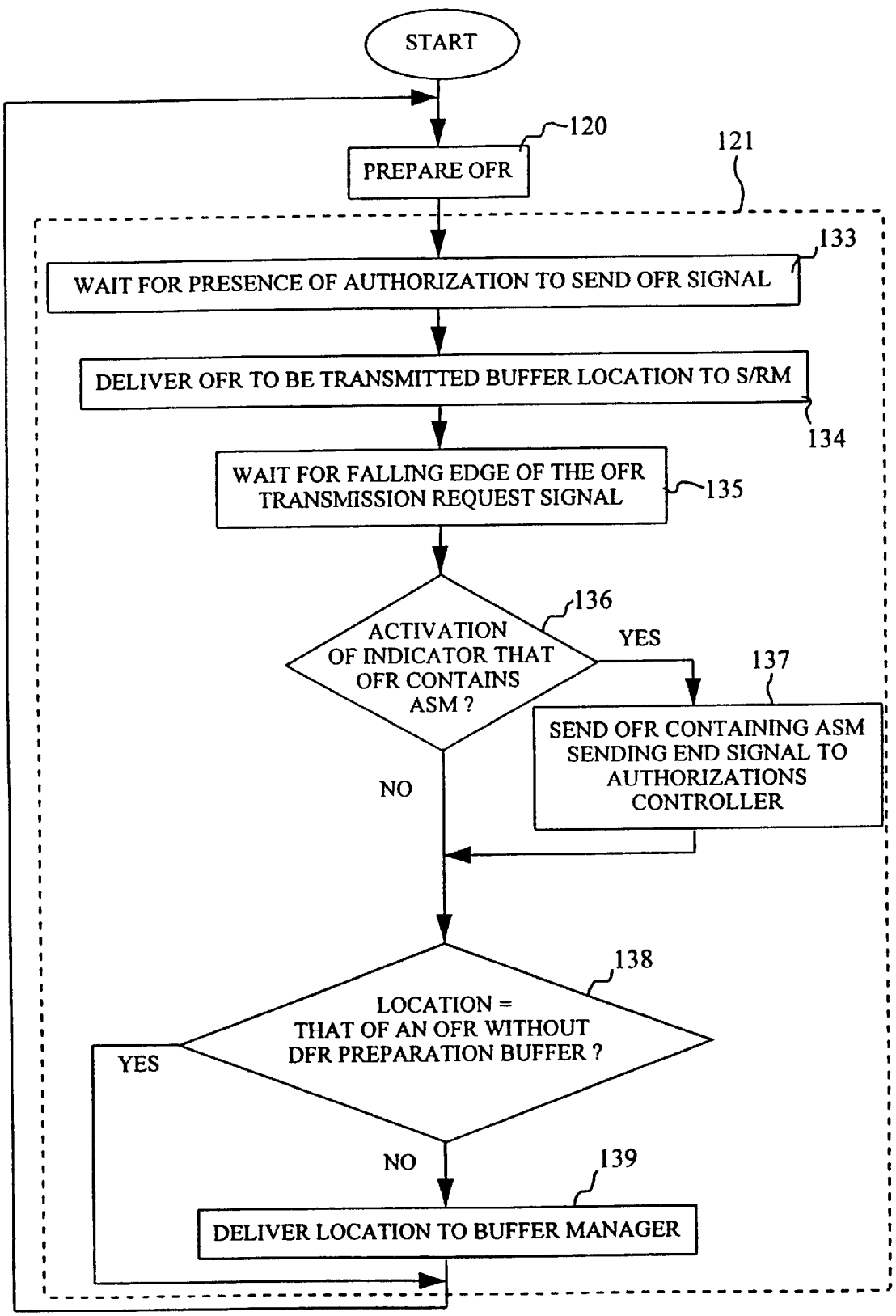

The functioning of the preparation means 112 is illustrated by the flow diagram in FIG. 23.

Directly after start-up, the preparation means 112 enters a loop in which it performs an operation 120 of preparing a downlink frame, then an operation 121 of transmitting this downlink frame, and then it returns to the start of the loop, and will therefore perform iteratively, throughout its functioning, an operation 120 followed by an operation 121.

Figure 24:
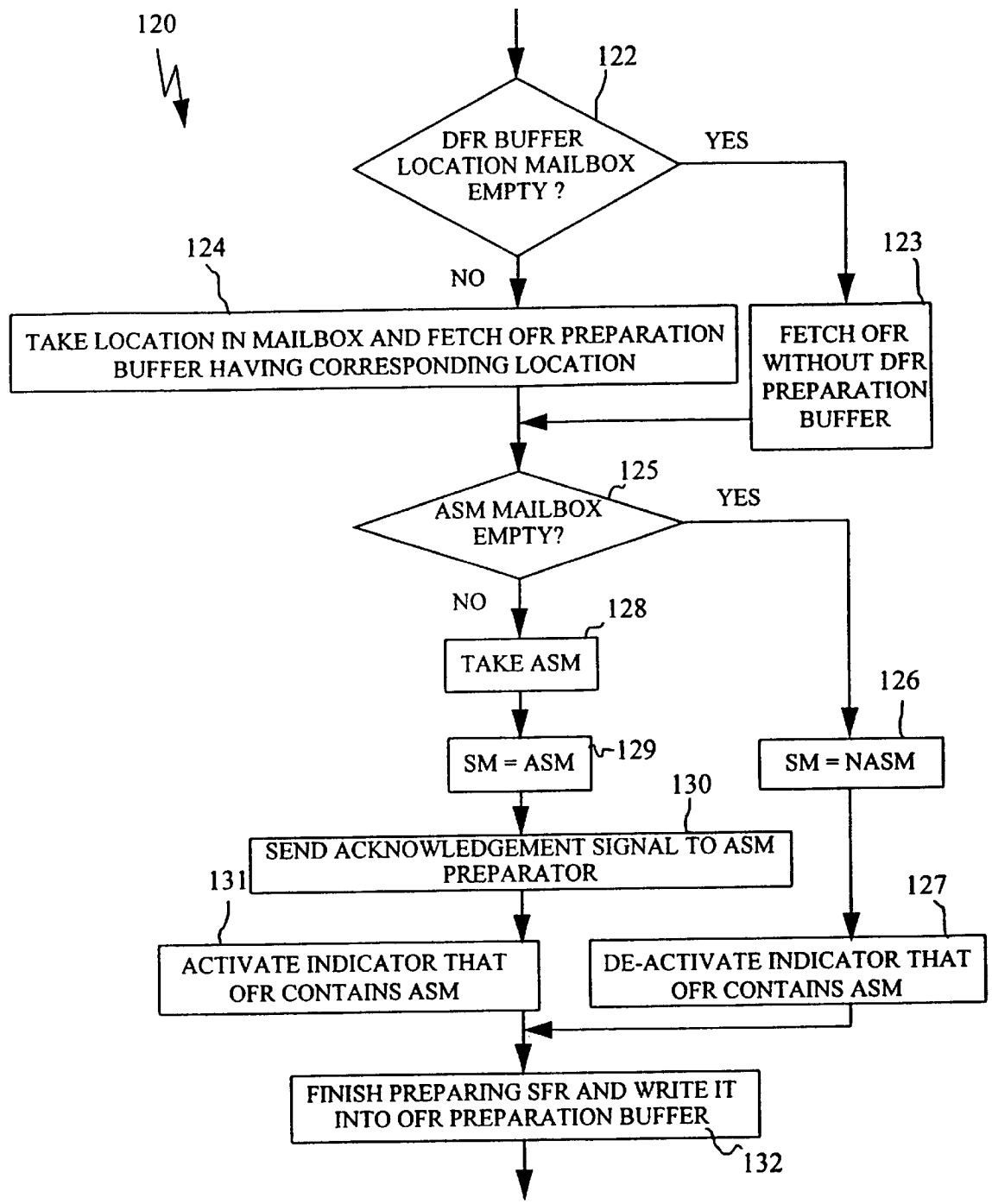
FIG. 24 shows in more detail the operation of preparing a downlink frame included in the flow diagram in FIG. 23.

The detail of the operation 120 of preparing a downlink frame is shown in FIG. 24.

The operation 120 begins with a test 122 for determining whether or not there is an absence of a memory location 68 containing a data frame awaiting transmission, that is to say whether or not the mailbox 96 is empty.

In the affirmative, the means 112 performs an operation 123 in which it takes account of the fact that it is the buffer memory 70 for preparing a downlink frame without a data frame which is to be used for the present downlink frame.

When the result of the test 122 is negative, the preparation means 112 performs the operation 124 in which it takes, from the mailbox 96, a memory location 68, and takes account of the fact that it is the buffer memory 68 corresponding to the location taken which is to be used for the preparation of the present downlink frame.

In the example illustrated, the preparation means 112 takes from the mailbox 96 the location which is the first to have been posted therein but, in a variant which is not illustrated, the concept of priority is involved, related for example to the destination address appearing in the field 13 (FIG. 3) of the different data frames received, so that the routing of those which are destined for certain peripheral means 24 is more rapid in the routing of the data frames destined for other peripheral means 24 for which the routing time may be longer.

After having performed the operation 123 or the operation 124, the preparation means 112 performs a test 125 in which it determines whether or not there is an absence of an authorisation-to-send message in the mailbox 97 in which the preparation means 94 posts the authorisation-to-send messages which it prepares.

In the affirmative, that is to say in practice where the test 125 is performed at a time when the means 94 has not yet had the time to prepare and post an authorisation-to-send message, the preparation means 112 performs an operation 126 in which it takes into account, as a service message to be included in the present downlink frame, a preconstituted no-authorisation-to-send message, loaded in the operating memory 65 using the parameters 63 at the start-up of the central means 21, and then performs an operation 127 in which it inactivates, where it was active, an indicator that the present downlink frame contains an authorisation-to-send message, this indicator appearing in the operating memory 65.

Where the test 125 is negative, the preparation means 112 performs an operation 128 in which it takes the authorisation-to-send message present in the mailbox 97, and then an operation 129 in which it takes account of this authorisation-to-send message as a service message (SM in the drawings) to be included in the present downlink frame, and then an operation 130 in which it sends to the preparation means 94 a signal acknowledging an authorisation-to-send message, and finally and operation 131 in which it activates, where it is inactive, the indicator that the present downlink frame contains an authorisation-to-send message.

Once the operation 127 or the operation 131 has been accomplished, the preparation means 112 performs an operation 132 in which it finishes preparing the service frame of the present downlink frame, for example with regard to the data frame length information 32 and the additional information 33 (FIG. 7), and then the preparation means 112 writes the service frame in the buffer taken into account for the preparation of the present downlink frame, that is to say it writes the service frame either in the memory 70 or in the area 71 of the memory 68 whose location it took from the mailbox 96.

The details of the operation 121 which the preparation means 112 then performs will now be described with reference to FIG. 23.

The operation 121 begins with the operation 133 of awaiting the presence of the signal authorising to send a downlink frame which the authorisation controlling means 111 communicates to it.

When this event occurs, the preparation means 112 performs an operation 134 in which it delivers to the sending/receiving means 74, and more precisely to the sending management means 75 thereof, the memory location 68 or the memory location 70 in which the present downlink frame is to be found, and then it performs an operation 135 in which it awaits the falling edge of the downlink frame transmission request signal 80, that is to say the preparation means 112 remains blocked as long as a burst transmitting the present downlink frame has not finished being transmitted.

When the end of transmission of this burst occurs, the preparation means 112 passes to a test 136 in which it determines whether or not the indicator that the downlink frame contains an authorisation-to-send message is activated.

In the affirmative, it performs an operation 137, in which it sends to the authorisation controller 111 a downlink frame end-of-sending signal containing an authorisation-to-send message, and then passes to the test 138, whereas, when the test 136 is negative, the preparation means 112 passes directly to the test 138.

In the latter, the preparation 112 determines whether or not the buffer location which it has sent to the sending/receiving means in the operation 134 is the buffer 70. In the negative, that is to say where it was a case of a buffer 68, the preparation means 112 sends the location of this memory 68 to the buffer management means 93, the latter posting the corresponding location in the mailbox 77 of the reception management means 76, so that the means 76 can once again use this buffer 68 to store a new uplink frame.

The operation of transmitting a downlink frame 121 ends after the operation 139, when the test 138 was negative, or directly after this test, when it was positive.

Variants of the central transmission control means 73 will now be described.

Figure 25:
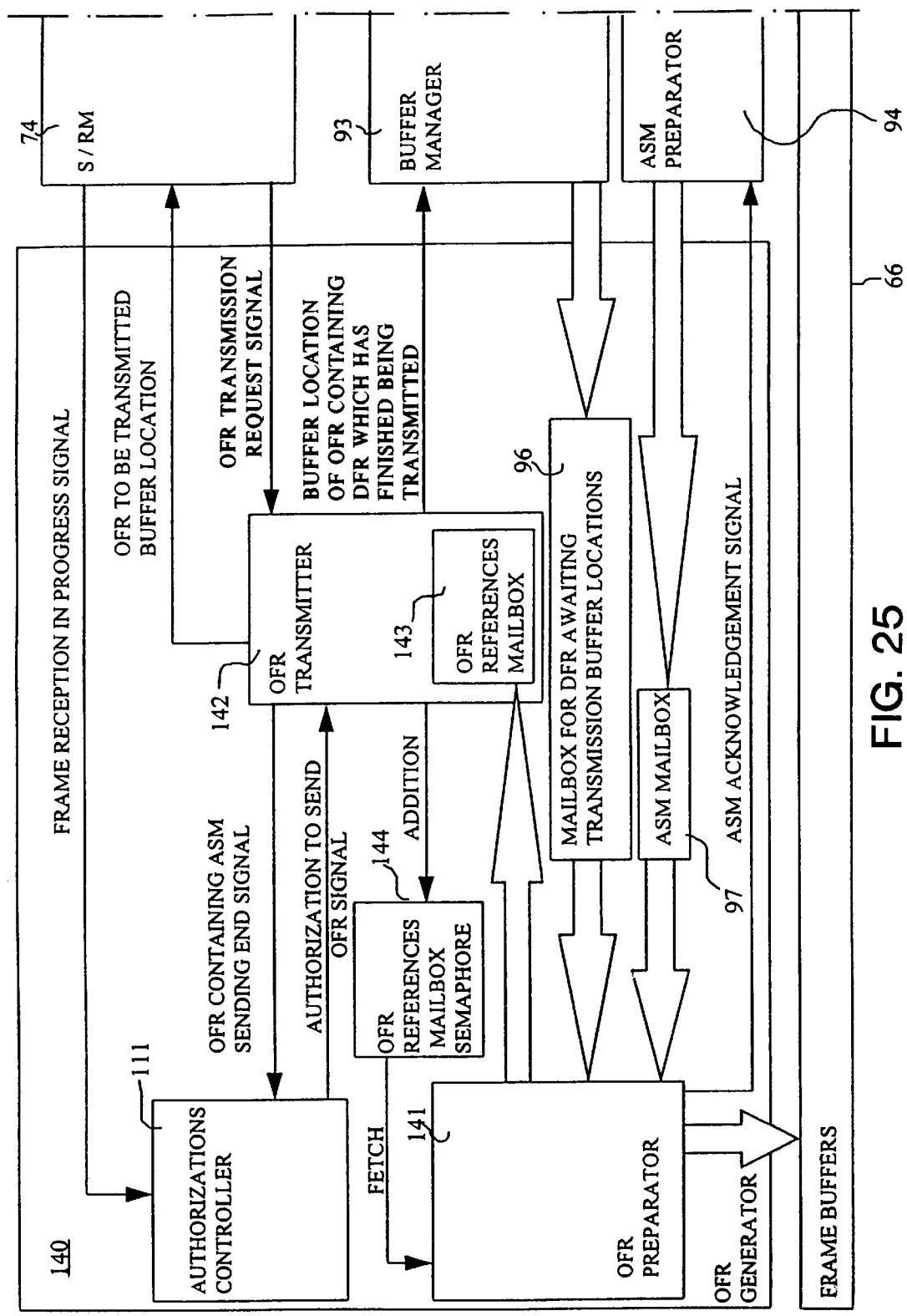
FIG. 25 is a diagram similar to FIG. 21, for a second embodiment of the downlink frame production means.

In a first variant, the downlink frame production means 95 is replaced by the downlink frame production means 140 shown in FIG. 25.

As can be seen particularly by comparing FIGS. 21 and 25, the production means 140 is differentiated from the production means 95 by the fact that the preparation means 112 is replaced by an assembly formed by a downlink frame preparation means 141, a downlink frame transmitting means 142 which includes a mailbox 143 in which the preparation means 141 posts the references of the downlink frames which it prepares, that is to say on the one hand the location of the buffer 68 in which the downlink frame is to be found and on the other hand the active or inactive state of the indicator that the downlink frame contains an authorisation-to-send message, and a semaphore 144 to which the preparation means 141 and the transmitting means 142 have access, respectively to take units therefrom and add them thereto, the semaphore 144 being used by the preparation means 141 to enable it to know the filling level of the mailbox 143.

In general terms, the preparation means 141 iteratively performs a series of operations in which it prepares a downlink frame and waits for there to be a free location in the box 143 to post therein the references of the downlink frame which it has just prepared.

Figure 26:
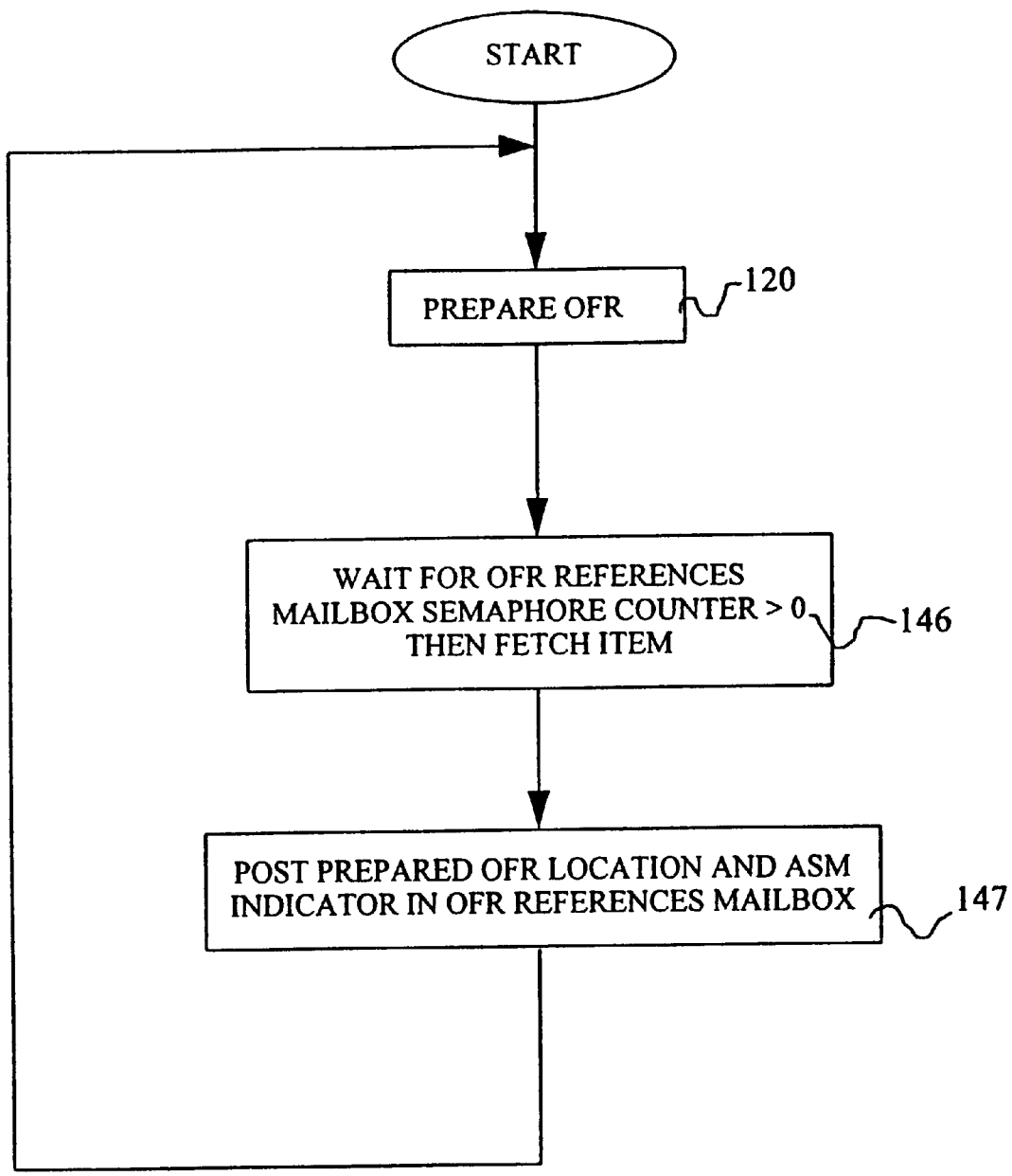
FIGS. 26 and 27 are flow diagrams illustrating the functioning respectively of the downlink frame preparation means and of the downlink frame transmission means of the downlink frame production means shown in FIG. 25.

The functioning of the preparation in 141 is illustrated in more detail by the flow chart in FIG. 26.

After start-up the preparation means 141 directly enters a loop where it begins by performing the same operation 120 (FIG. 24) of preparing a downlink frame as the preparation means 112 of the production means 95.

Once the operation 120 has been accomplished, it passes to an operation 146 of taking a unit from the semaphore 144, that is to say more precisely that it immediately takes the unit from the semaphore counter if this is positive, whilst, if the counter is at zero, it waits for this counter to become positive in order to take the unit. As will be seen below when the functioning of the transmitting means 142 is described, this amounts to taking account of the filling of the mailbox 43 and, when it is full, waiting for one of its locations to become free.

Once the operation 146 has been accomplished, the preparation means 141 performs the operation 147, in which it posts in the mailbox 143 the buffer location 68 in which is found the downlink frame which it prepared during the operation 120 which it has just performed, and the active or inactive state of the indicator that this downlink frame contains an authorisation-to-send message, that is to say the references of this downlink frame.

Once the operation 147 has been accomplished, the preparation means 141 returns to the start of the loop, and will therefore perform iteratively, throughout its functioning, the series of operations which has just been described.

Figure 27:
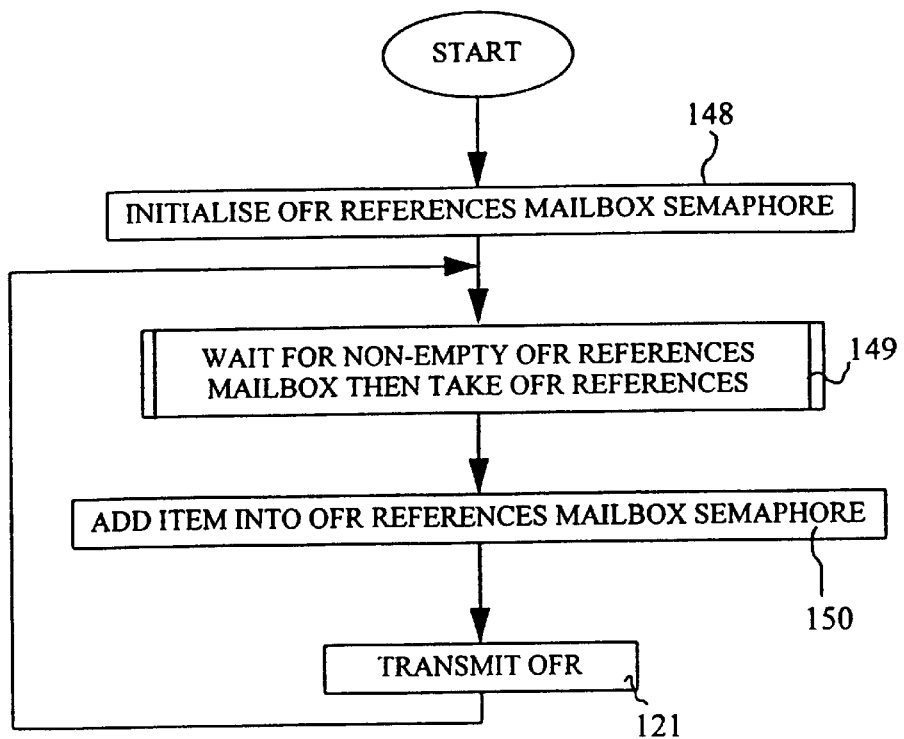

The functioning of the transmitting means 142 is illustrated by the flow diagram in FIG. 27.

After start-up, the transmitting means 142 performs an operation 148 in which it initialises the semaphore 144, that is to say it acts on the semaphore counter to make it equal to the number of locations that there are in the mailbox 143.

The transmitting means 142 then enters a loop where it begins by performing an operation 149 in which it waits until at least one location in the mailbox 143 is filled by the references of a downlink frame, that is to say this mailbox is not empty, and when this event occurs it takes the references which are to be found in one of the locations of the mailbox 143.

In the example illustrated, where several locations are filled, the transmitting means 142 takes the references from the location which is the first to have been filled.

In variants, not illustrated, of the transmitting means 142, use is made of concepts of priority, for example in order for the downlink frames containing a data frame whose destination address corresponds to that of certain peripheral means 24 enjoying a routing priority, to be transmitted before the downlink frames including a data frame whose destination address is that of a peripheral means 24 whose degree of routing priority is lower.

It will be observed that, in order to leave the waiting provided for in the operation 149, it was necessary for the preparation means 141 to have posted at least one set of references in the mailbox 143, and therefore for it to have taken at least one unit from the counter of the semaphore 144.

Once the operation 149 has been accomplished, the transmitting means 142 performs the operation 150 in which it adds one unit to the counter of the semaphore 144.

The transmitting means 142 then performs the same operation of transmitting the present downlink frame as the one performed by the preparation means 112 of the production means 95, that is to say the operation 121 whose details are given in FIG. 23.

The transmitting means 142 then returns to the start of the loop, and will therefore perform iteratively, throughout its functioning, the series of operations which has just been described, with the exception obviously of the initialisation operation 143, which is outside the loop and which is therefore only performed just after start-up.

Figure 28:
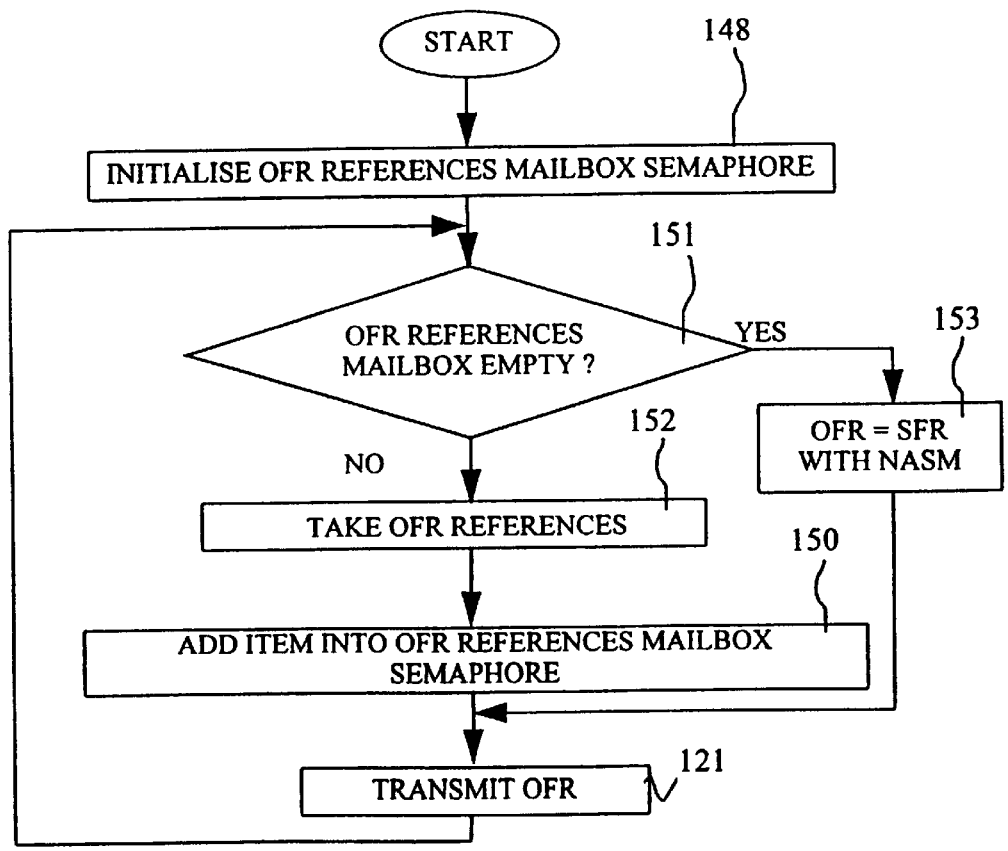
FIG. 28 is a flow diagram similar to that in FIG. 27, for a variant of the downlink frame transmission means.

In a variant of the transmitting means 142, whose functioning is illustrated by the flow diagram in FIG. 28, the situation of remaining blocked when the mailbox 43 is empty is avoided by replacing the operation 149 with a test 151 for determining whether or not this mailbox is empty with an operation 152 of taking a set of references of a downlink frame, identical to the one forming part of the operation 149, this operation 152 being performed when the test 151 is negative and being followed by the operation 150, and with an operation 153 which is performed when the test 151 is positive, the operation 153 being followed directly by the operation 121.

In this operation 153, a set of preconstituted downlink frame references is taken, this set including a memory location in which there appears a downlink frame as shown in FIG. 6, that is to say without a data frame, the service message being of the no-authorisation-to-send message type, the preconstituted set of references also including inactive state information for the indicator that the downlink frame contains an authorisation-to-send message.

The variant of the transmitting means 142 functioning as shown in FIG. 28 therefore does not remain blocked when the mailbox 143 is empty, and causes the shared radio medium to be occupied by a downlink frame consisting of a simple frame 27 whose service message 31 is of the no-authorisation-to-send message type.

A description will now be given, with reference to FIGS. 29 to 32, of a second variant of the central transmission control means 73, in which there are no no-authorisation-to-send messages, that is to say all the service messages indicate to a peripheral means 24 that it is authorised to transmit an uplink frame in return.

Figure 29:
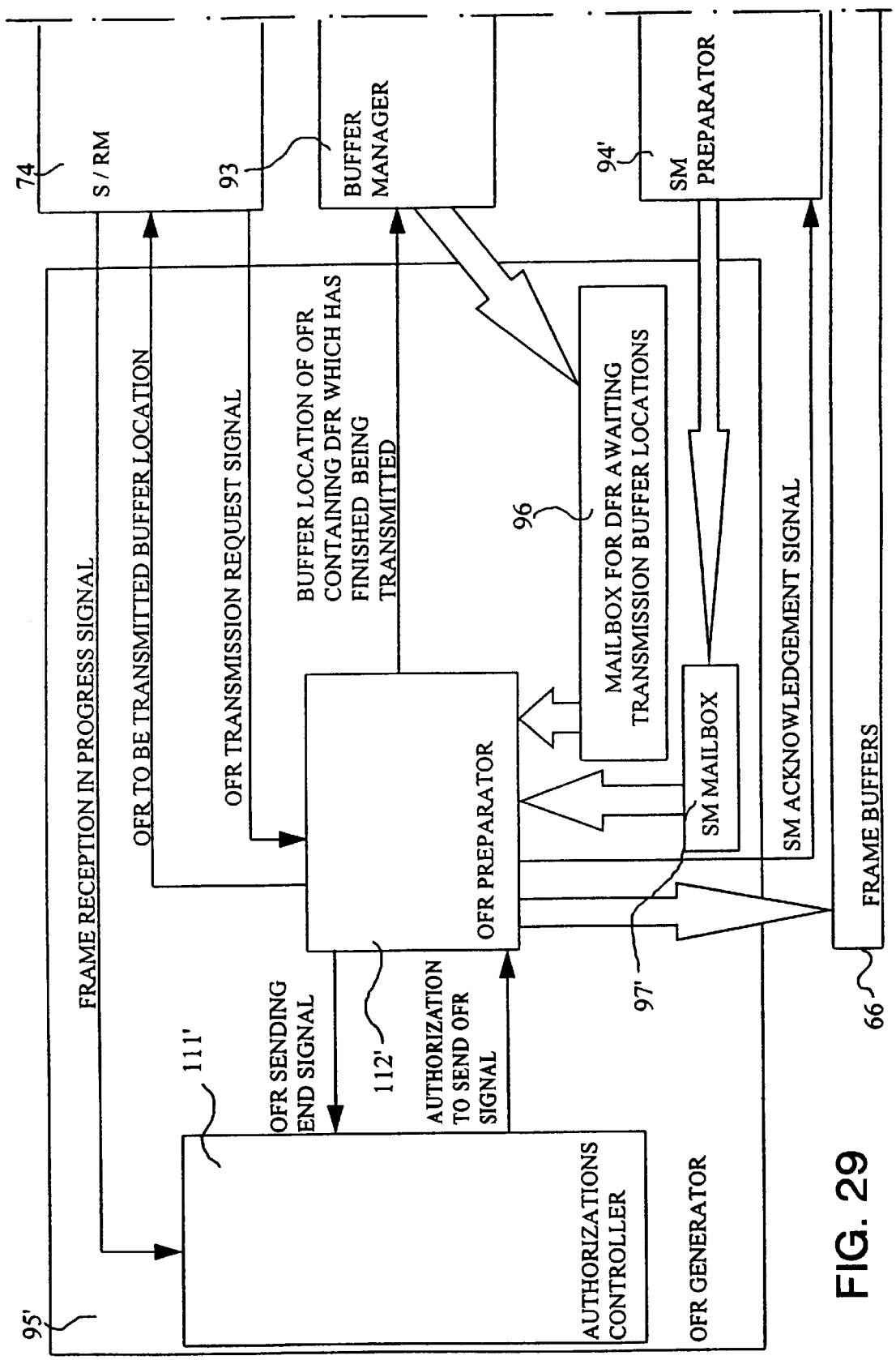
FIGS. 29 to 32 are respectively similar to FIGS. 21 to 24, for a variant of the first embodiment of the downlink frame production means illustrated in the latter figures.

In this variant, as can be seen by comparing FIGS. 21 and 29, the means 94 preparing authorisation-to-send messages is replaced by a means 94' preparing service messages, and the downlink frame production means 95 is replaced by a downlink frame production means 95'.

The description given above for the preparation means 94 is also valid for the preparation means 94', provided that the references to an authorisation-to-send message is replaced by references to a service message.

With regard to the production means 95', the same reference as for the means 95 has been used for similar components, but given a "prime" index.

Figure 30:
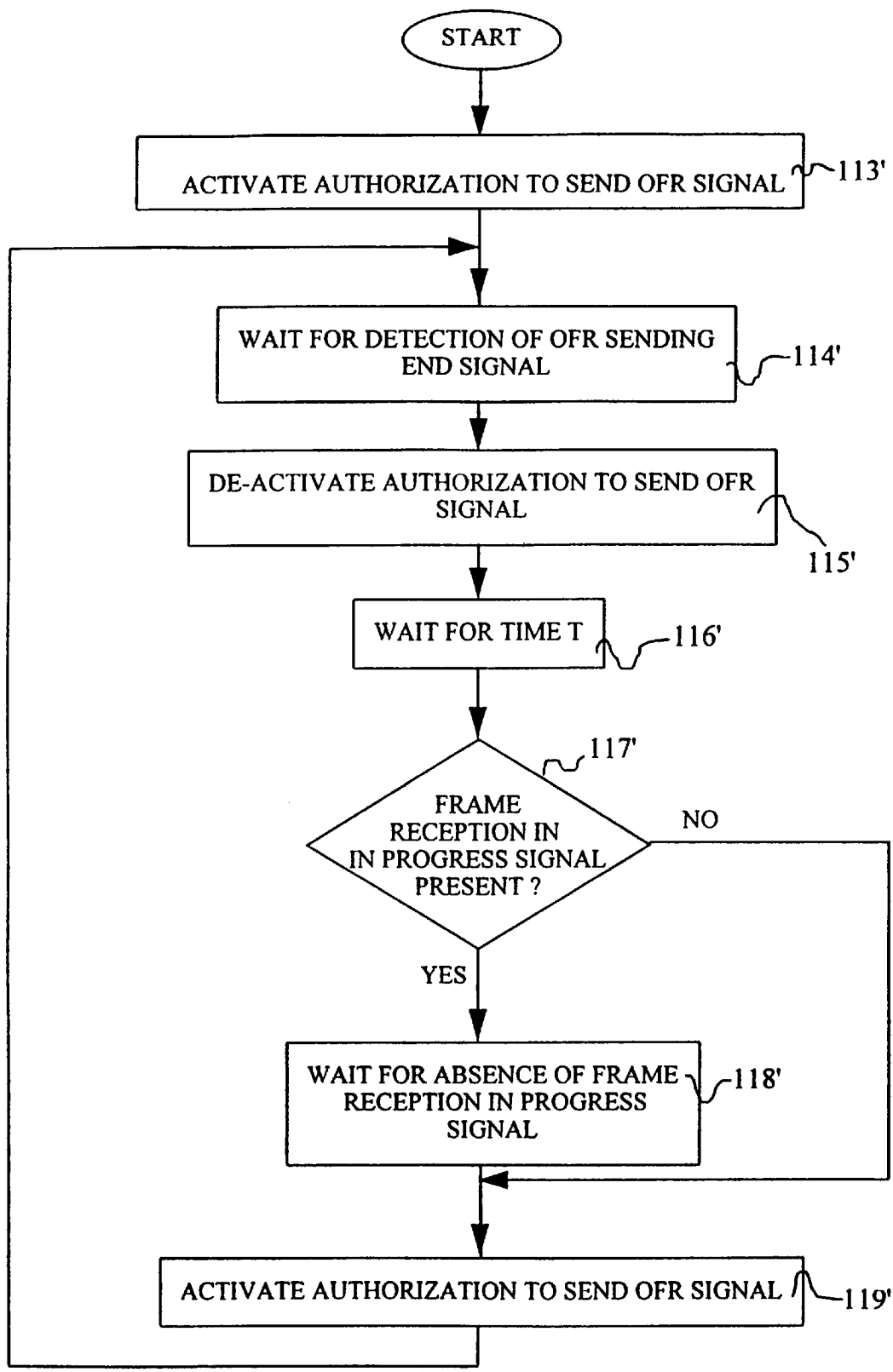

The functioning of the authorisation controlling means 111' is illustrated by the flow diagram in FIG. 30.

It can be seen, by comparing FIGS. 22 and 30, that the controlling means 111' functions exactly like the controlling means 111, the signal sent to it by the downlink frame preparation means 112' being simply a downlink frame end-of-sending signal rather than a downlink frame end-of-sending signal containing an authorisation-to-send message.

Figure 31:
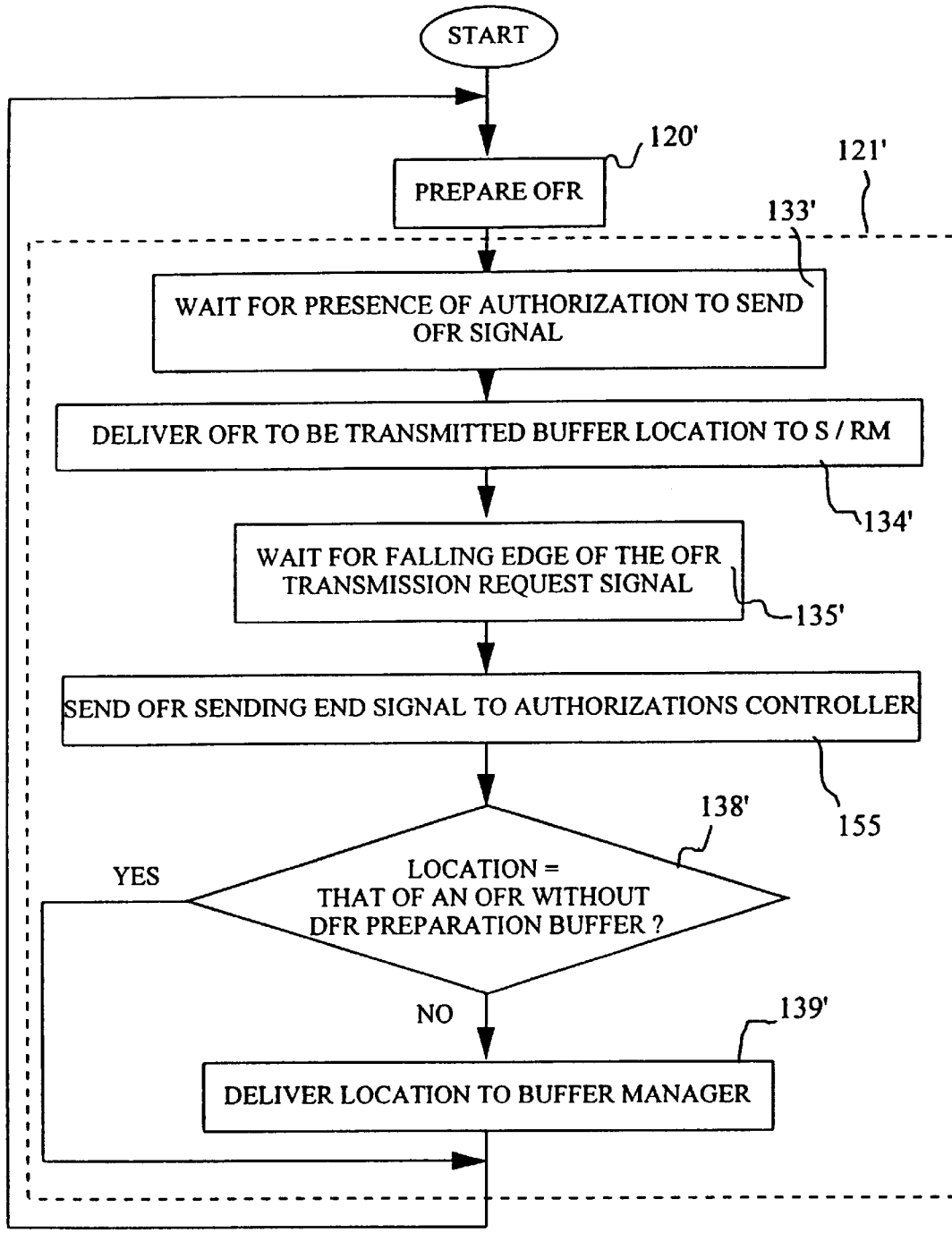

The functioning of the downlink frame preparation means 112' is illustrated in FIG. 31.

Figure 32:
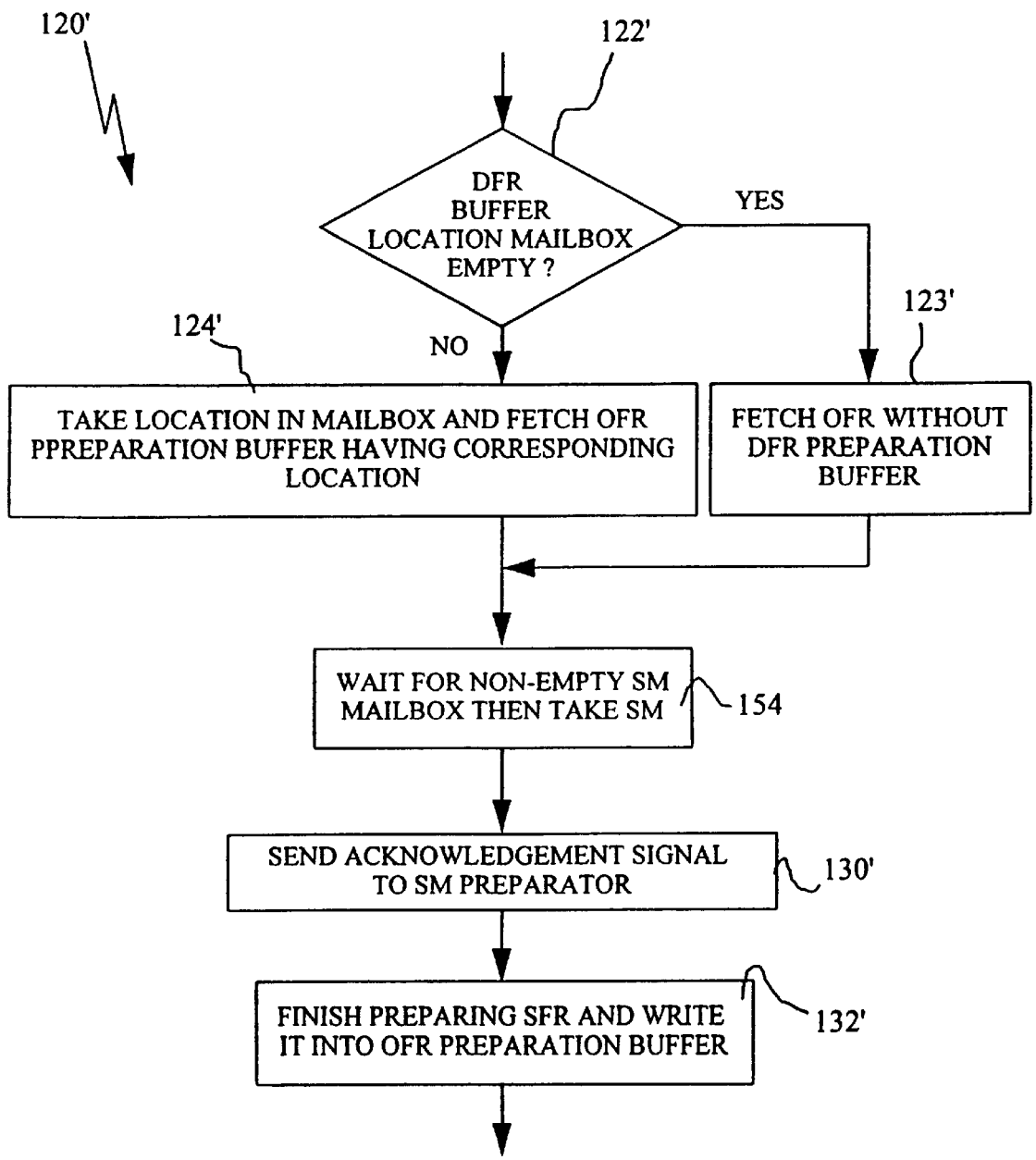
Figure 33:
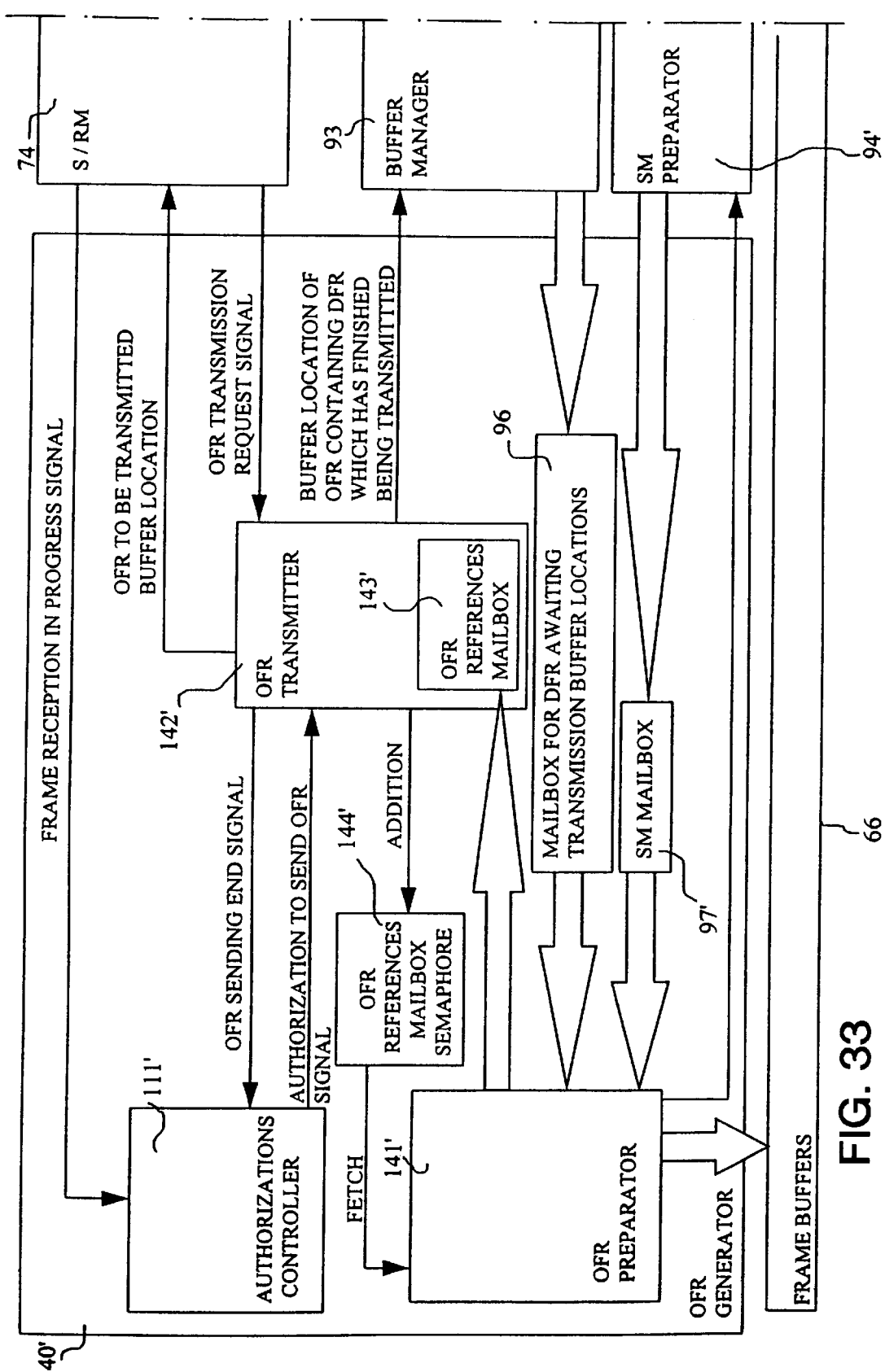
FIGS. 33 to 35 are respectively similar to FIGS. 25 to 27, for a variant of the second embodiment of the downlink frame production means illustrated in the latter figures.

The details of the downlink frame preparation operation 120' are shown in FIG. 32.

It can be seen, by comparing FIGS. 24 and 32, that the operation 120' is distinguished from the operation 120 by the fact that, after the operation 123' or the operation 124', an operation 154 is simply performed in which there is a wait, if necessary, until the mailbox 97' is no longer empty, then the service message present therein is taken, and this service message is taken into account as to be included in the present downlink frame, the operation 154 being directly followed by the operation 130' where the preparation means 112' sends to the preparation means 94' a service message acknowledgement signal, the operation 130' being directly followed by the operation 132', which is identical to the operation 132.

With regard to the operation 121', it can be seen by comparing FIGS. 23 and 31 that it is identical to the operation 121 with the exception of the fact that the test 136 does not exist, and that it is directly an operation 155 similar to the operation 137 which is performed, that is to say the operation of sending a downlink frame end-of-transmission signal to the authorisation controller 111'.

A description will now be given of a third variant of the central transmission control means 73, corresponding in fact to the variant described with reference to FIGS. 25 to 27, but in the case where there are no no-authorisation-to-send messages.

As above, the same numerical references have been employed for similar components, but given a "prime" index.

In general terms, the differences between the production means 140' and the production means 140 are the same as between the means 95' and the means 95.

It will also be noted that the references of a data frame which are posted in the mailbox 143' correspond simply to the buffer location 80 in which there appears the downlink frame prepared by the preparation means 141'.

Figure 34:
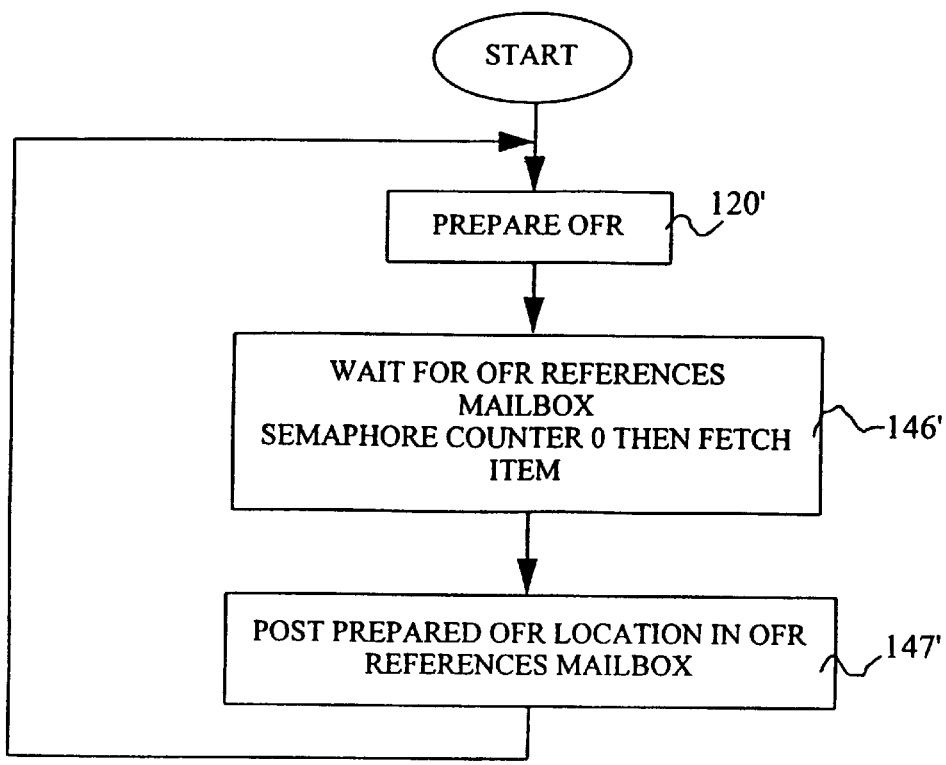

It can also be seen, by comparing FIG. 34, which illustrates the functioning of the preparation means 141', with FIG. 26, which illustrates the functioning of the preparation means 141, that the operation 147' is distinguished from the operation 147 by the fact that there is no authorisation-to-send message indication information posted in the mailbox 143', and more generally that the preparation means 141' and 140 have a similar functioning.

Figure 35:
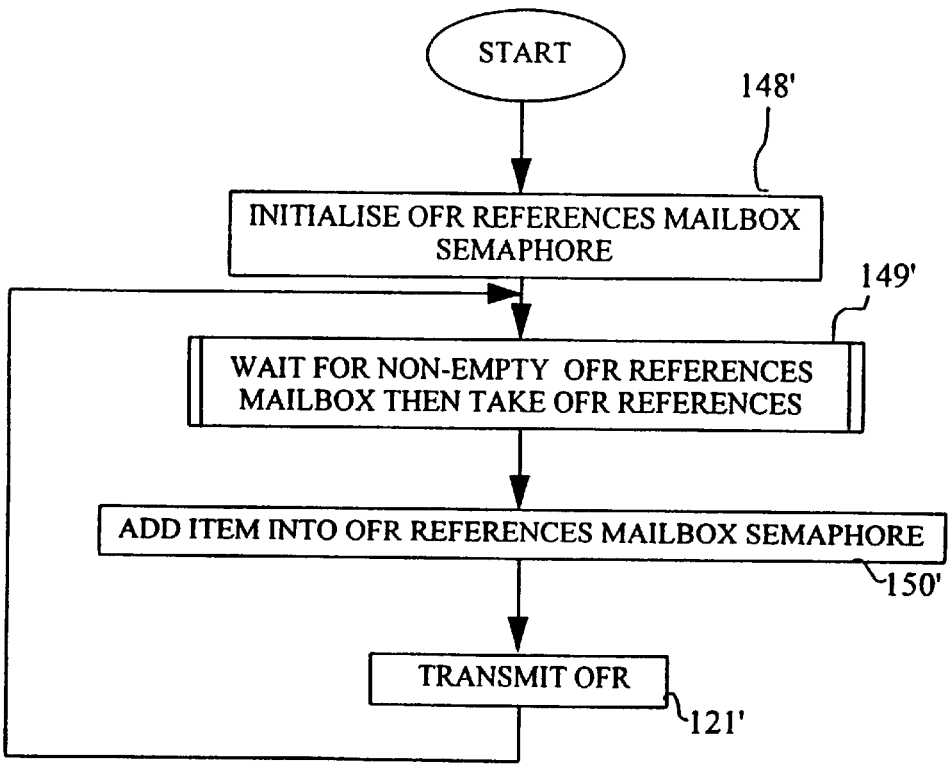

Likewise, by comparing the flow diagram in FIG. 35, which illustrates the functioning of the transmitting means 142', with the flow diagram in FIG. 27, which illustrates the functioning of the transmitting means 142, it can be seen that these two transmitting means have a similar functioning.

In other variants, not illustrated, the co-operation between the downlink frame preparation means and the authorisation-to-send or service message preparation means takes place through the use of a semaphore rather than an acknowledgement signal.

A description will now be given, with the help of FIGS. 36 to 50B, of the device which is used as a peripheral means 24 for the terminals 23 of the network 20.

Figure 36:
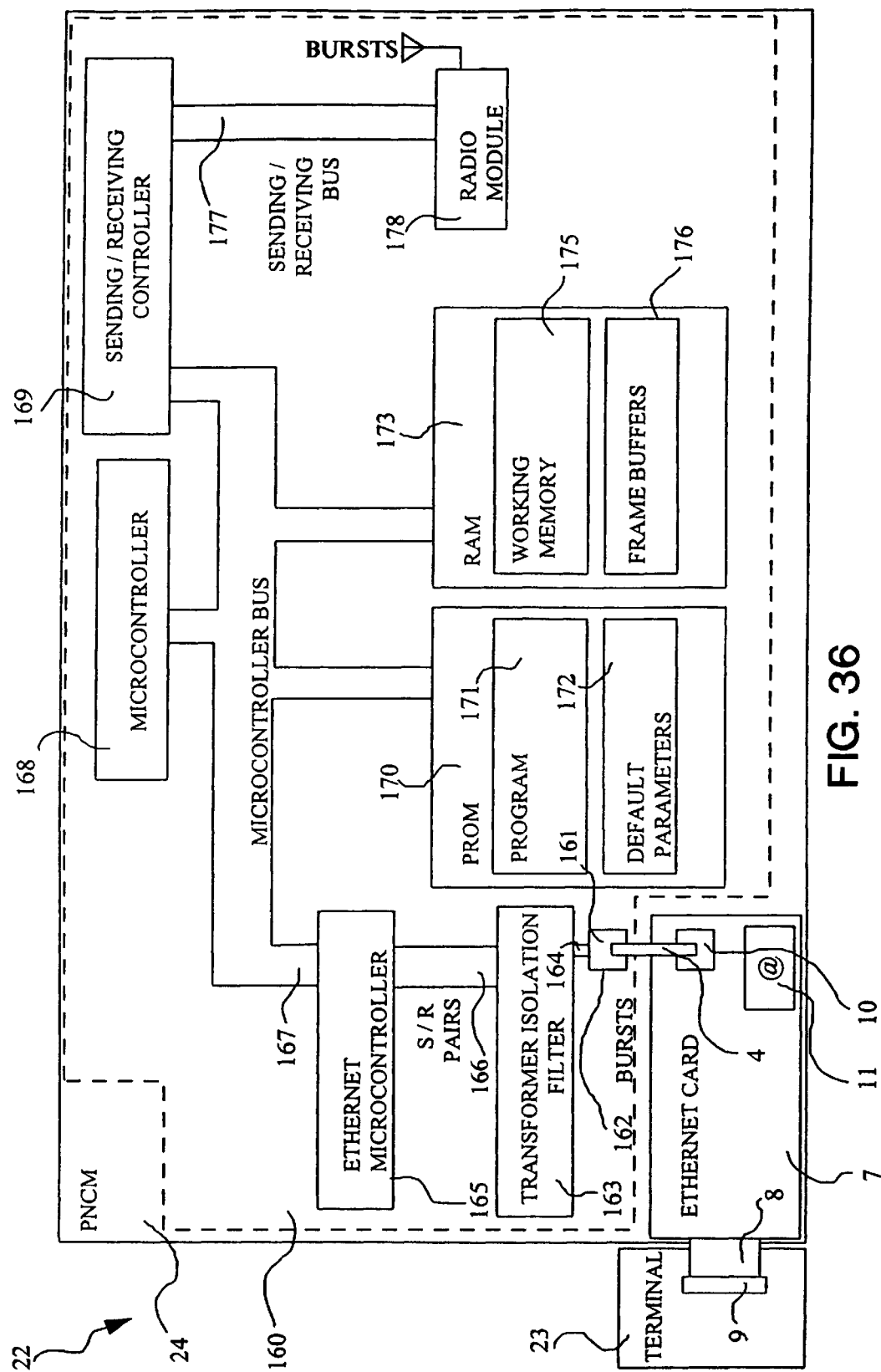
FIG. 36 is an electronic diagram of one of the data stations of the network in FIG. 4, showing more particularly the peripheral networked communication means.

As can be seen in FIG. 36, the peripheral means 24 includes an ETHERNET card 7, co-operating with the terminal 23 and with the cable 4, one of the end connectors of which is plugged into its port 10, as explained with the help of FIGS. 1 to 3, and a communication converter 160 having a port 161 into which the other end connector of this cable 4 is plugged.

The communication converter 160 has a female RJ-45 connector 162 to give the port 161, a transformer isolation filter 163 connected to the connector 162 by conductors 164, an ETHERNET microcontroller 165 connected to the filter 163 by sending/receiving pairs 166, the ETHERNET microcontroller 165 also being connected to a microcontroller bus 167 which connects it to a part of the converter 160 which has the same structure, on the electrical level, as the central means 21, with the exception of the serial connection bus and the RS-232 connector, as well as the non-volatile memory.

The converter 160 thus includes a microcontroller 168 connected by means of the bus 167, in addition to the ETHERNET microcontroller 165, to a sending/receiving controller 169, to a programmable read only memory 170 containing the program 171 of the microcontroller 168 and the default parameters 172 which enable the converter 160 to be initialised at start-up, and to a volatile random access memory 173 including a space occupied by the working memory 175 and a space 176 occupied by frame buffers; and the sending/receiving controller 169 is thus connected, in addition to the microcontroller bus 167, to a sending/receiving bus 177 which connects it to a radio module 178.

On the hardware level, in the example illustrated, the microcontroller 168, the sending/receiving controller 169 and the radio module 178 are produced in the same way as the microcontroller 152, the sending/receiving controller 56 and the radio module 61 respectively.

The ETHERNET microcontroller is for example the one sold by FUJITSU under the reference MB86964, or the one sold by NATIONAL SEMICONDUCTOR® under the reference SONIC®-T, and the filter 163 can be respectively the one sold by PULSE ENGINEERING under the reference PE-65746 or the one sold by VALOR under the reference SF-1020.

Figure 37:
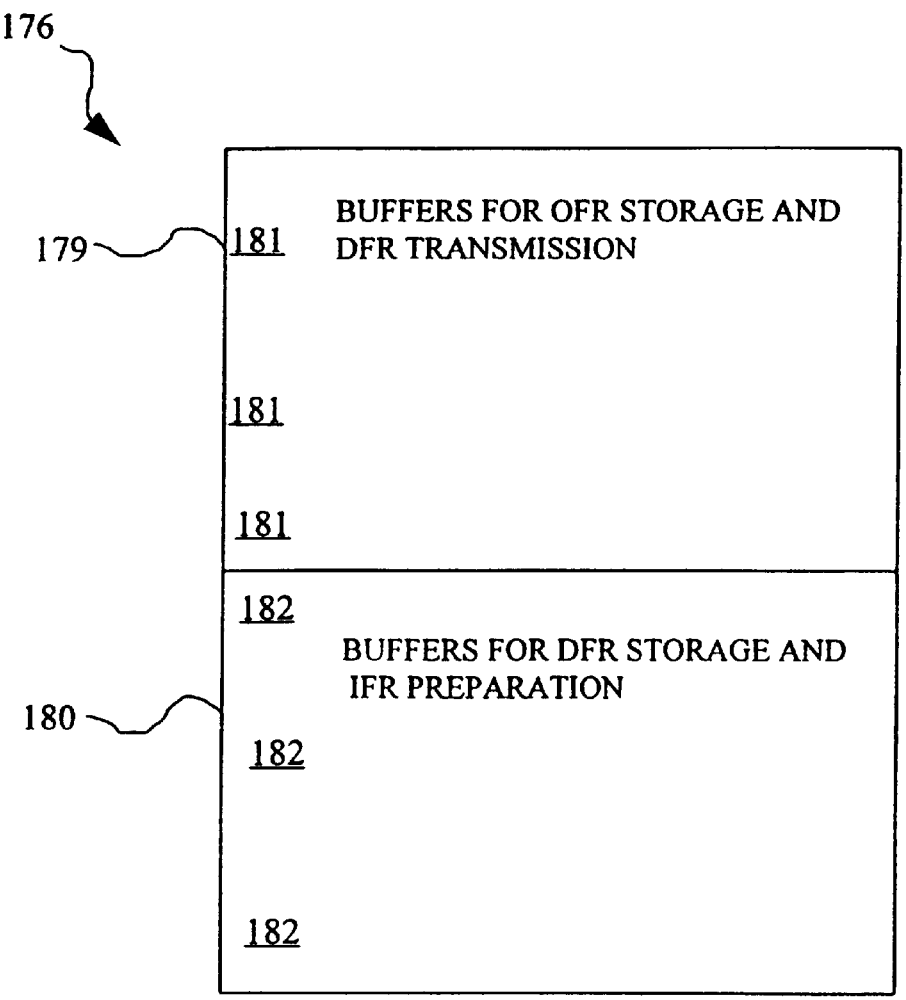
FIG. 37 is a diagram showing the composition of the space provided for frame buffers in the RAM of the communication converter forming part of the peripheral means.

The organisation of the space 176 occupied by the frame buffers is shown in FIG. 37.

The space 176 includes a space 179 containing a certain number of buffers 181 for storing a downlink frame and transmitting a data frame, and a space 180 containing a certain number of buffers 182 for storing a data frame and preparing an uplink frame, and a space 620 containing a buffer 621 for preparing an uplink frame without a data frame, that is to say including a frame message of the type illustrated by NPNCM.

The arrangement provided for each of the buffers 181 is the same as the one provided for the buffers 68 (FIG. 13), that is to say it fixes at the start of each memory 181 the position of an area for a service frame having the same length as the field 29 (twenty five octets) and, directly after the service frame area, a data frame area having a maximum length over which the field 30 can extend or the maximum length of a data frame 12.

Figure 38:
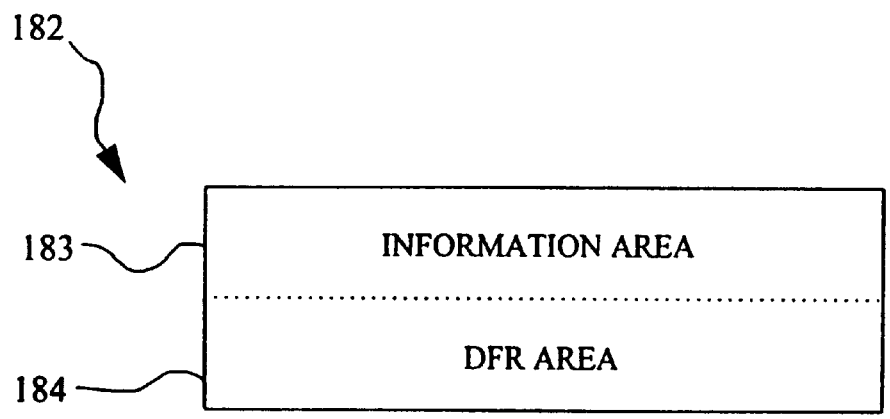
FIG. 38 shows the arrangement which each of the buffers for storing a data frame and preparing an uplink frame has.

The arrangement provided for each of the memories 182 is shown in FIG. 38 and is identical to the format provided for the uplink frames 26 (FIG. 9), that is to say it fixes at the start of each memory 82 the position of an information area 183 and directly after that the position of a data frame area 184, the area 183 having the same length as the whole formed by the fields 46 and 47 (twenty octets), whilst the area 184 has a maximum length over which the field 48 or the data frame 12 can extend (one thousand five hundred and forty octets).

When the communication converter 160 receives a downlink frame 25 by means of the shared radio transmission medium, it writes the data frame 28 which it includes in the data frame area of a memory 181, placing the field 30 in this area whilst making the start of this field coincide with the start of this area, the data frame thus stored by the communication converter 160 then being able to be transmitted by the latter to the ETHERNET card 7 whilst making a burst appear at the transmission terminals of the port 161.

The burst transmitting the data frame to the ETHERNET card transmits the useful content of the data frame area of the memory 181, that is to say the one located in the space going from the start of this area as far as the point where this data frame ends.

The use of the buffers 182 is similar, but in the direction ETHERNET bursts to radio bursts: when the converter 160 sees a burst transmitting a data frame 12 appearing on the pair of reception terminals of its port 161, it writes this frame in the area 184 of a memory 182, making the start of this frame coincide with the start of this area; and to prepare an uplink frame 26 with which it will transmit the data frame that it had previously stored in the area 184, the communication converter 160 writes the length information 43 and the additional information 44 in the area 183 of this memory 182, and then sends, over the shared radio medium, a burst transmitting the useful content of this memory 182.

Figure 39:
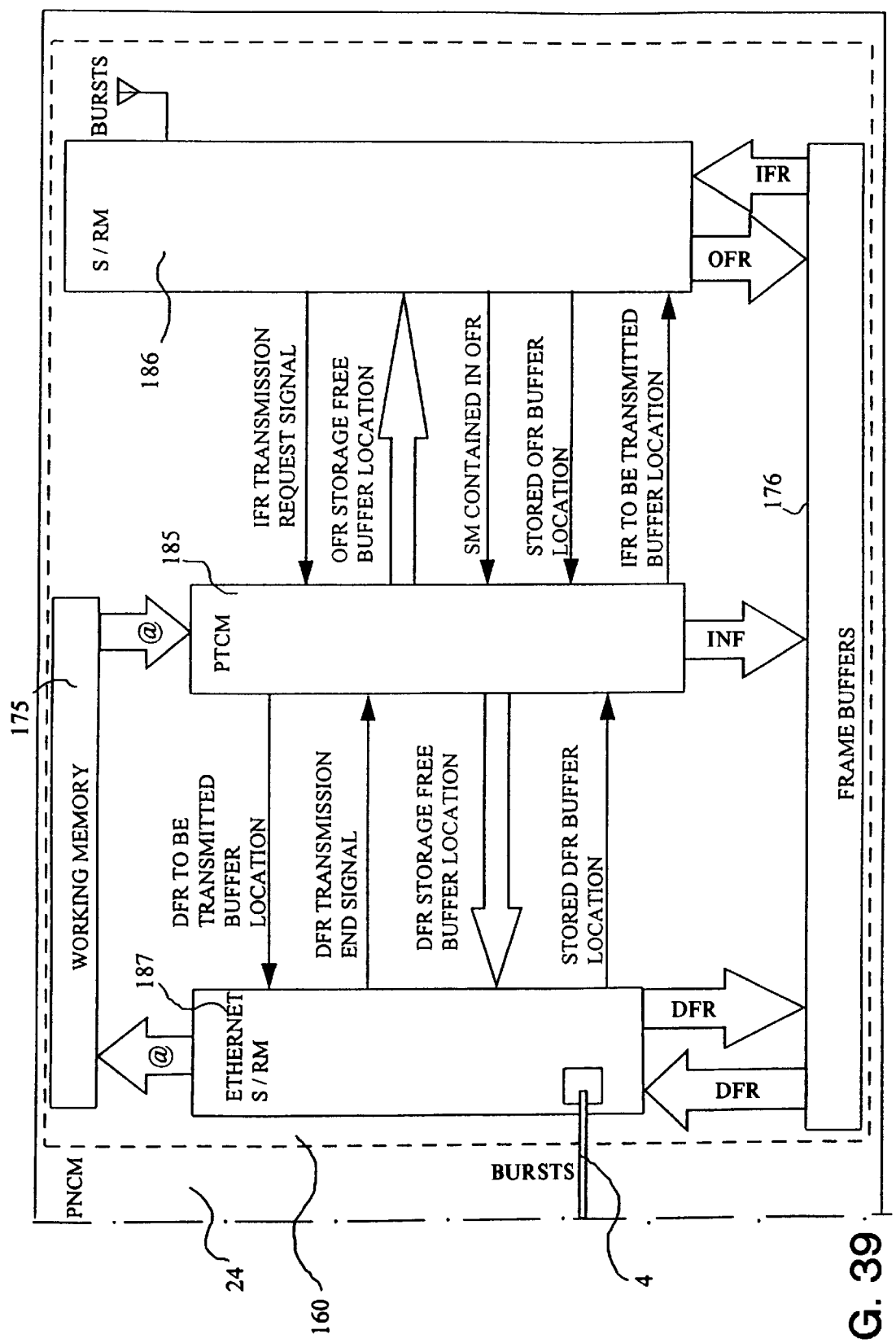
FIG. 39 is a partial functional diagram of the peripheral means, showing more particularly the communication converter.

On the functional level, as shown in FIG. 39, the communication converter 160 includes, in general terms, a networked peripheral transmission control means (PTCM in the drawings) 185, a means of sending/receiving over the shared radio medium (S/RM in the drawings) 186, which exchanges information with the peripheral transmission control means 185, and a means of sending/receiving over the ETHERNET transmission medium 4 (ETHERNET S/RM in the drawings) 187, which also exchanges information with the peripheral transmission control means 185, the sending/receiving means 186 carrying out operations of writing downlink frames and reading uplink frames in the space 176 of the random access memory 173 where there are found the frame buffers, the sending/receiving means 187 carrying out operations of writing and reading data frames in the space 176, the peripheral transmission control means 185 for its part carrying out operations of writing information in this space, the sending/receiving means 187 also carrying out, when it receives for the first time, after start-up, a data frame 12 by means of the cable 4, an operation of writing, in the operating memory 175, the source address which appears in the additional information field 14, a source address which corresponds to the MAC address 11 of the ETHERNET card 7 to which the other end of the cable 4 is connected, the peripheral transmission control means 185 carrying out operations of reading this address, in order to compare it with the address 38 which appears in the service message of the downlink frames reaching it in order to know whether or not this service message is intended for the present peripheral means 24, the address appearing for the latter in the table 64 of the central means 21, corresponding, in the example illustrated, to the MAC address 11 of the ETHERNET card 7 which the present peripheral means 24 has.

Figure 40:
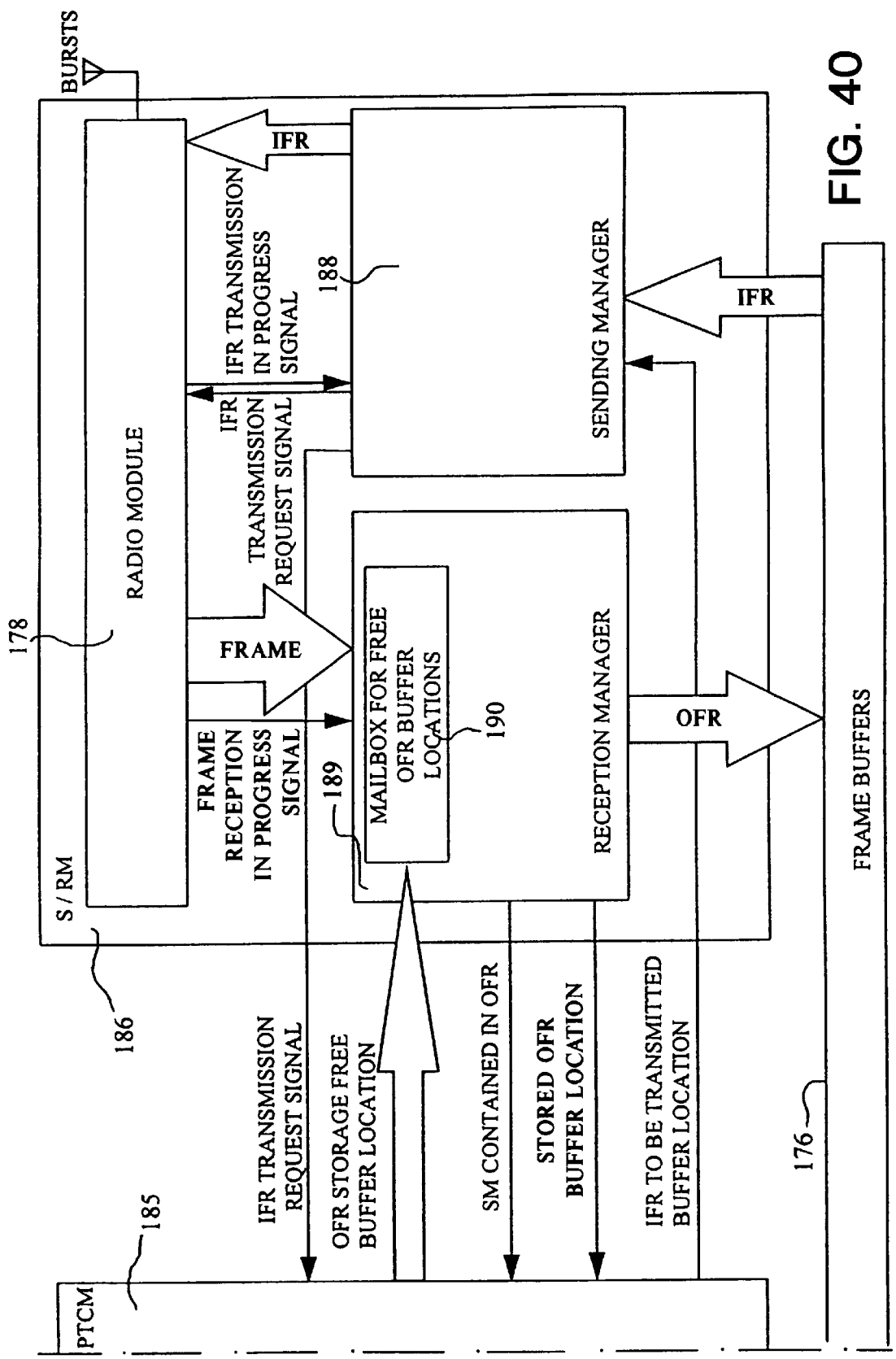
FIG. 40 is a partial functional diagram showing particularly the sending/receiving means which the communication converter has.

A description will now be given, with reference to FIGS. 40 to 42, of the constitution of the sending/receiving means 186, and the way in which it co-operates with the peripheral transmission control means 185 and with the space 176 where the frame buffers are located.

In general terms, the sending/receiving means 186 corresponding to the sending/receiving means 74 of the central means 21 but processing the downlink and uplink frames, as does the means 74 respectively for the uplink and downlink frames; and the information exchanged by the sending/receiving means 186 and the peripheral transmission control means 185 correspond to those exchanged by the sending/receiving means 74 and the central transmission control means 73, but with the change which has just been indicated, with the frame reception in progress signal which is not communicated to the peripheral transmission control means 185, and with the transfer by the sending/receiving means 186, directly in the course of the reception of a downlink frame, of the service message contained in the latter.

More precisely, the sending/receiving means 186 includes the radio module 178, and uses resources procured by the microcontroller 168 with the help of the program 171, default parameters 172 and working memory 175.

In addition to the radio module 178, the sending/receiving means 186 includes a sending management means 188, and a reception management means 189, which has a mailbox 190 in which the peripheral transmission control means 185 posts the locations of the different buffer memories 181 each free for the storage of a downlink frame.

As already indicated, the radio module 178 is produced in the same way as the radio module 61 of the central means 21. Its operation is therefore the same as that described with the help of FIG. 15, provided obviously that the references to an uplink frame are changed to a reference to a downlink frame, and vice versa.

Figure 41:
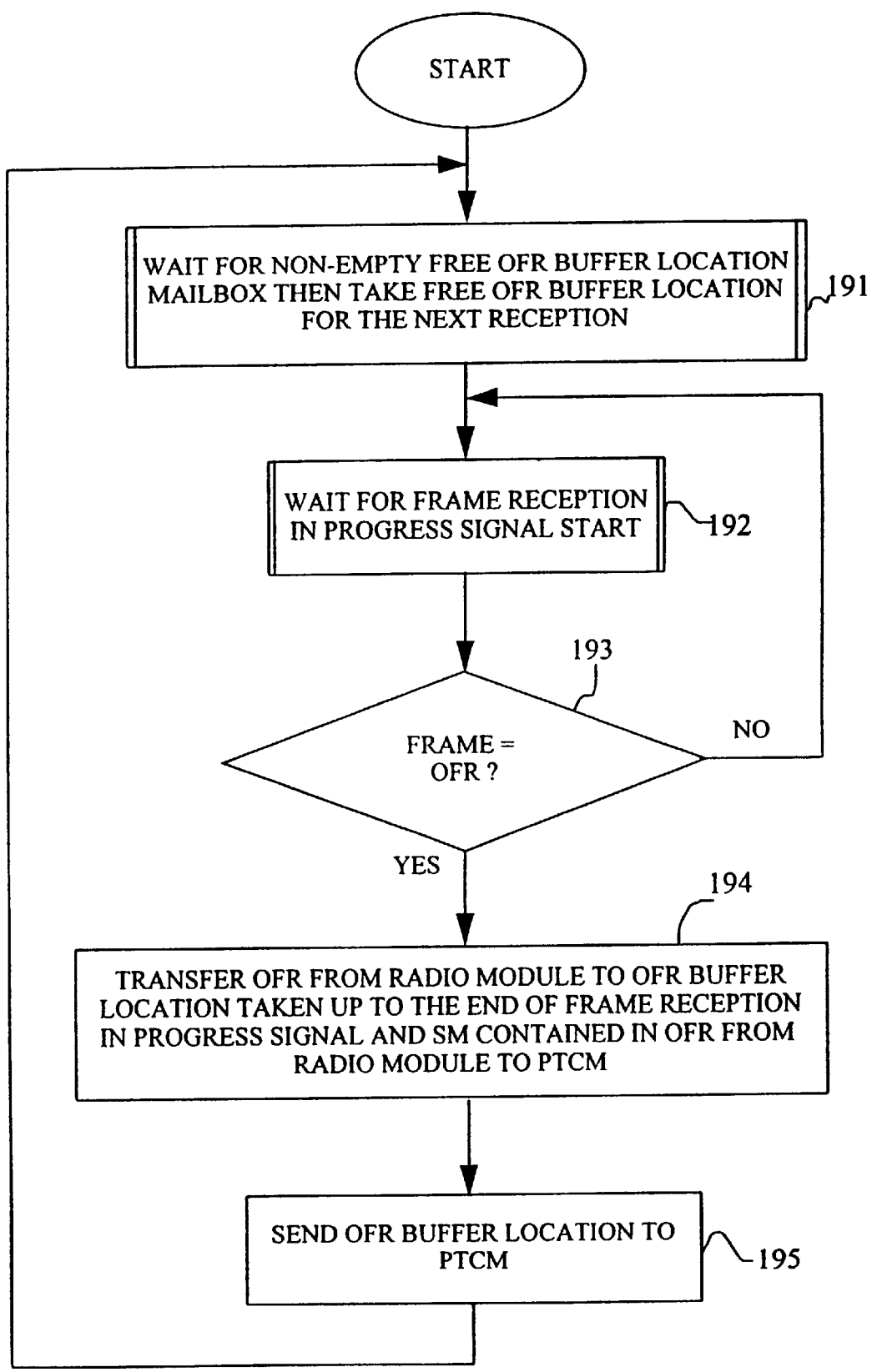
FIGS. 41 and 42 are flow diagrams illustrating the functioning respectively of the reception management means and of the sending management means which this sending/receiving means has.

The functioning of the reception management means 189 is illustrated by the flow diagram in FIG. 41.

Directly after start-up, the management means 189 enters a loop where it begins by performing an operation 191 in which it waits until there is at least one memory location 181 in the mailbox 190, that is to say the latter is not empty, and when this becomes the case, it takes a location from this mailbox, and more precisely the one which is the first to have been posted therein where there are several of them, the memory 181 whose location it has taken being that which it will use to store the next downlink frame which the radio module 178 sends to it.

The management means 189 then goes to an operation 192 in which it awaits the start of the frame reception in progress signal and, when this event occurs, the management means 189 performs a test 193 in which it determines whether the frame which the radio module 178 is in the process of delivering to it is indeed a downlink frame coming from the central means 21, for example by checking whether the service message 31 provided in the field 34 is indeed present.

Where the result of the test 193 is negative, which occurs in particular when the frame received is an uplink frame coming from another peripheral means 24, the management means 189 returns to the operation 192, that is to say it awaits reception of the next frame, ignoring the one that the radio module is in the process of delivering to it.

Where the result of the test 193 is positive, the management means 189 performs an operation 194 in which, on the one hand, it transfers the downlink frame which the radio module 178 is in the process of delivering to it, into the buffer 181 situated in the last location which it has taken from the mailbox 190, until the end of the frame reception in progress signal, and on the other hand it transfers the service message contained in this downlink frame to the peripheral transmission control means 185.

The management means 189 then performs an operation 193 in which it sends, to the means 185, the location of the memory 181 in which it has stored the downlink frame which it has just received, which informs the peripheral transmission control means 185 of the reception and storage of this frame.

The management means 189 then returns to the start of the loop and will therefore perform iteratively, throughout its functioning, the series of operations which has just been described.

It will be observed that, where there is no buffer 181 available for the reception of a downlink frame, the management means 189 remains locked at the operation 191, and therefore ignores any frames which the radio module 178 might deliver to it.

Figure 42:
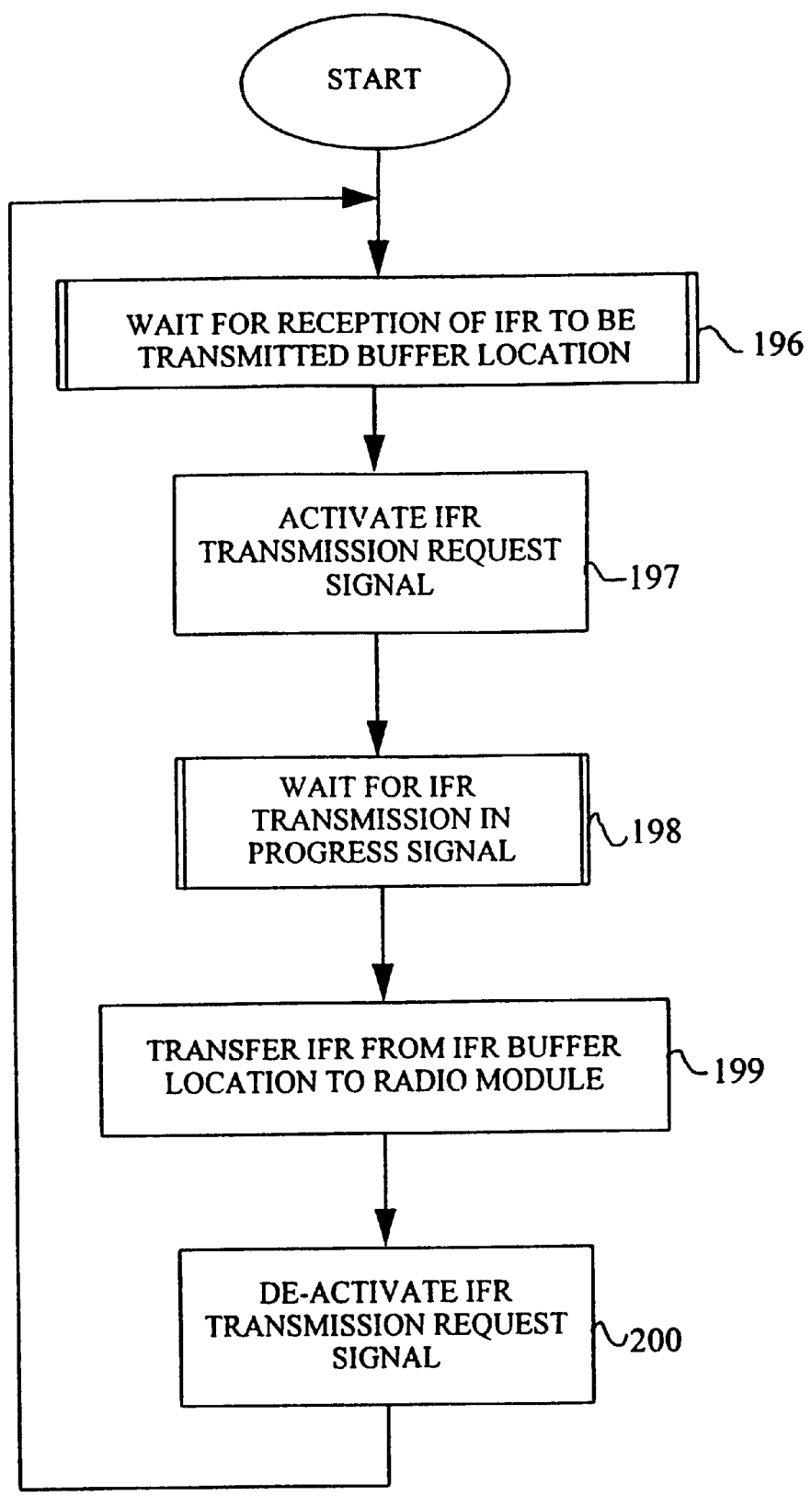

The functioning of the sending management means 188 is illustrated by the flow diagram in FIG. 42.

Directly after start-up, it enters a loop in which it begins by performing an operation 196 in which it waits for the peripheral transmission control means 185 to deliver to it a memory location 182 containing an uplink frame to be transmitted over the shared radio medium.

When this event occurs, the management means 188 performs an operation 197 in which it activates the downlink frame transmission request signal, and then goes to an operation 198 in which it awaits the presence of the uplink frame transmission in progress signal.

When this event occurs, the management means 188 performs an operation 199 in which it delivers to the radio module 178 the uplink frame contained in the memory location 182 which has been delivered to it in the course of the operation 196, and when it has finished delivering this uplink frame it performs the operation 200 in which it inactivates the downlink frame transmission request signal, then it returns to the start of the loop and will therefore perform, throughout its functioning, the series of operations which has just been described.

A description will now be given, with reference to FIGS. 43 to 47, of the details of the constitution and functioning of the peripheral transmission control means 185.

The latter uses resources procured by the microcontroller 168 with the aid of the program 171, default parameters 172 and working memory 175.

Figure 43:
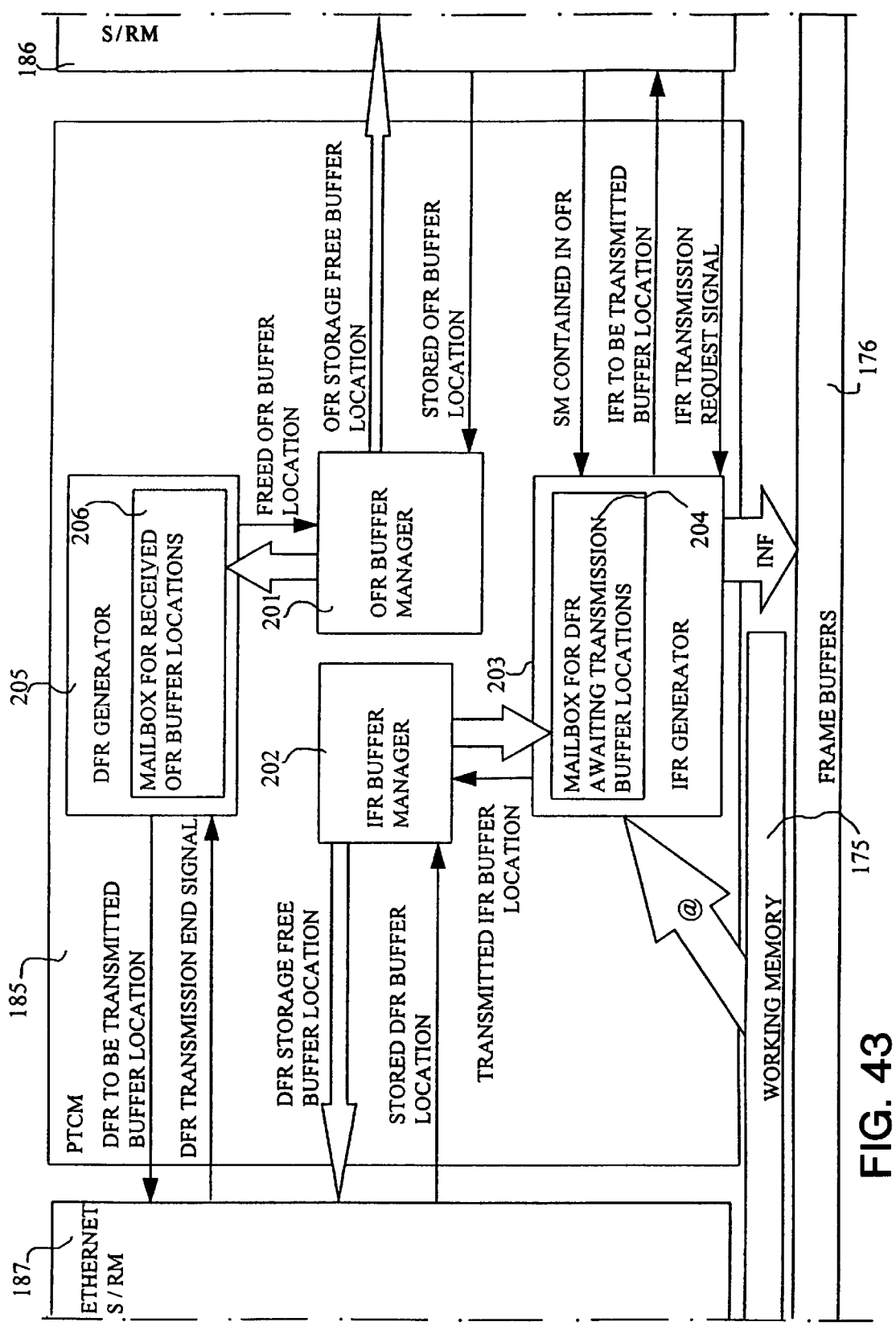
FIG. 43 is a partial functional diagram of the peripheral means, showing particularly the peripheral transmission control means which its communication converter has.

As can be seen in FIG. 43, the control means 185 includes a means 201 of managing buffers 181, a means 202 of managing buffers 182, a means 203 producing uplink frames, including a mailbox 204 in which the management means 202 posts the locations of buffers 182 in which a downlink frame awaiting transmission is situated, and a means 205 producing data frames, including a mailbox 206 in which the management means 201 posts the locations of buffers 181 in which is situated a downlink frame received by means of the shared radio medium.

Figure 44:
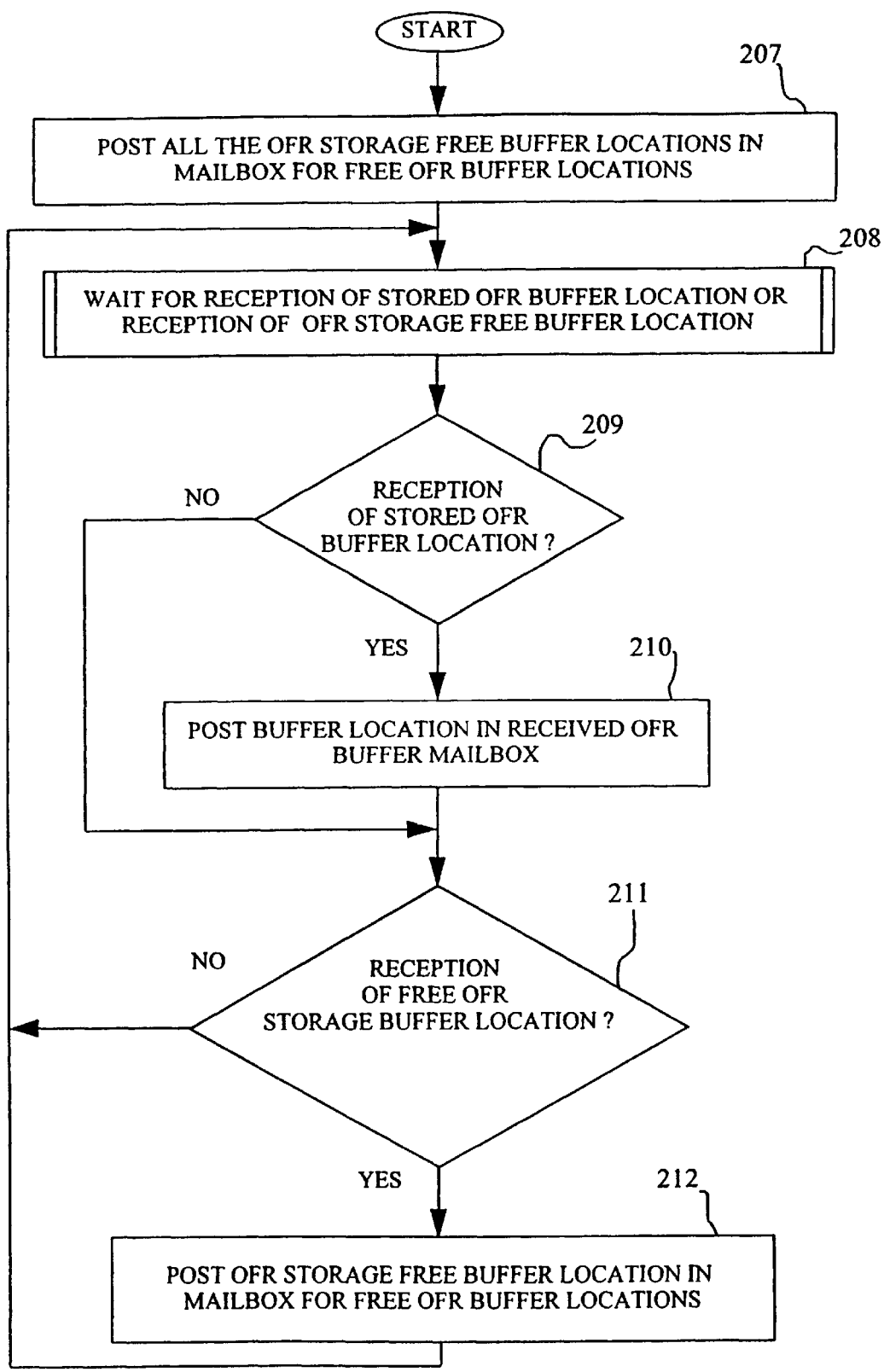
FIGS. 44 and 45 are flow diagrams illustrating the functioning respectively of the downlink frame buffer management means and of the uplink frame buffer management means which the peripheral transmission control means has.

The functioning of the management means 201 is illustrated by the flow diagram in FIG. 44.

After start-up, it performs an operation 207 in which it posts the location of each of the buffers 181 in the mailbox 190 of the reception management means 189, the locations in question being stored amongst the default parameters 172.

Once the operation 207 has been accomplished, the management means 201 enters a loop in which it performs an operation 208 in which it waits until it receives, from the sending/receiving means 186, and more precisely from the reception management means 189, a buffer location 181 in which a downlink frame has been stored, hereinafter referred to as the first event, or else until it receives, from the production means 205, a buffer location 181 containing a data frame whose transmission over the ETHERNET medium 4 has been effected, hereinafter referred to as the second event.

When one or other of these two events occurs, the management means 201 goes to a test 209 in which it determines whether or not it is the first event which has occurred.

Where it is indeed the reception of a buffer location 181 in which a downlink frame has just been stored, which has occurred, the management means 201 performs an operation 210 in which it posts the memory location 181 which it has just received, in the mailbox 206 of the production means 205.

Once the operation 201 has been accomplished, or when the result of the test 209 is negative, the management means 201 performs a test 211 in which it determines whether or not the second event has just occurred.

In the affirmative, it performs an operation 212 in which it posts in the mailbox 190 of the reception management means 189, the buffer memory location 181 which it has just received.

Once the operation 212 has been accomplished, and where the result of the test 211 is negative, the management means 201 returns to the start of the loop, and will therefore perform iteratively, throughout its functioning, the series of operations which has just been described with the exception of course of the operation 207, which is outside the loop, and which is therefore performed only just after start-up.

Figure 45:
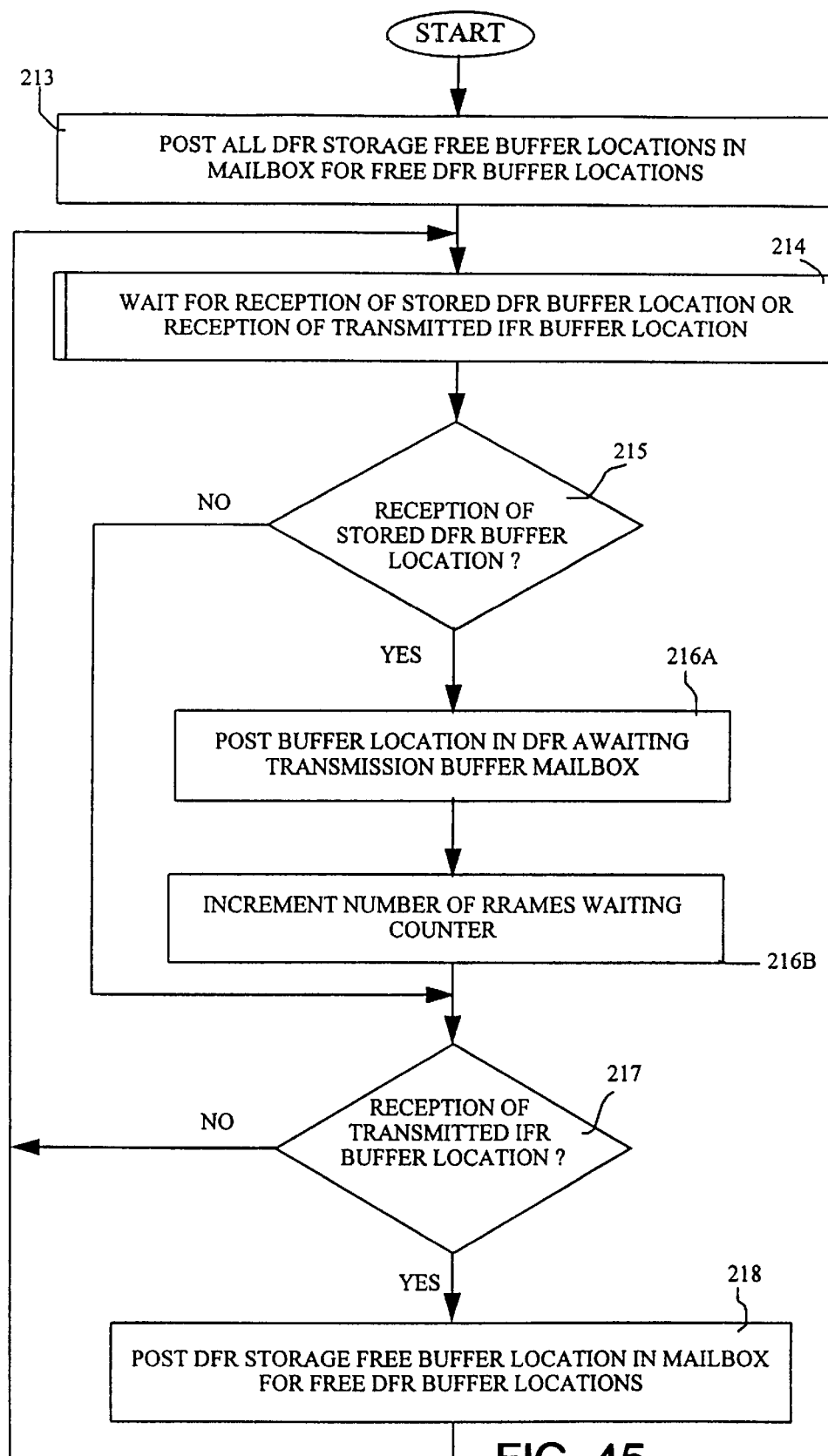
Figure 45A:
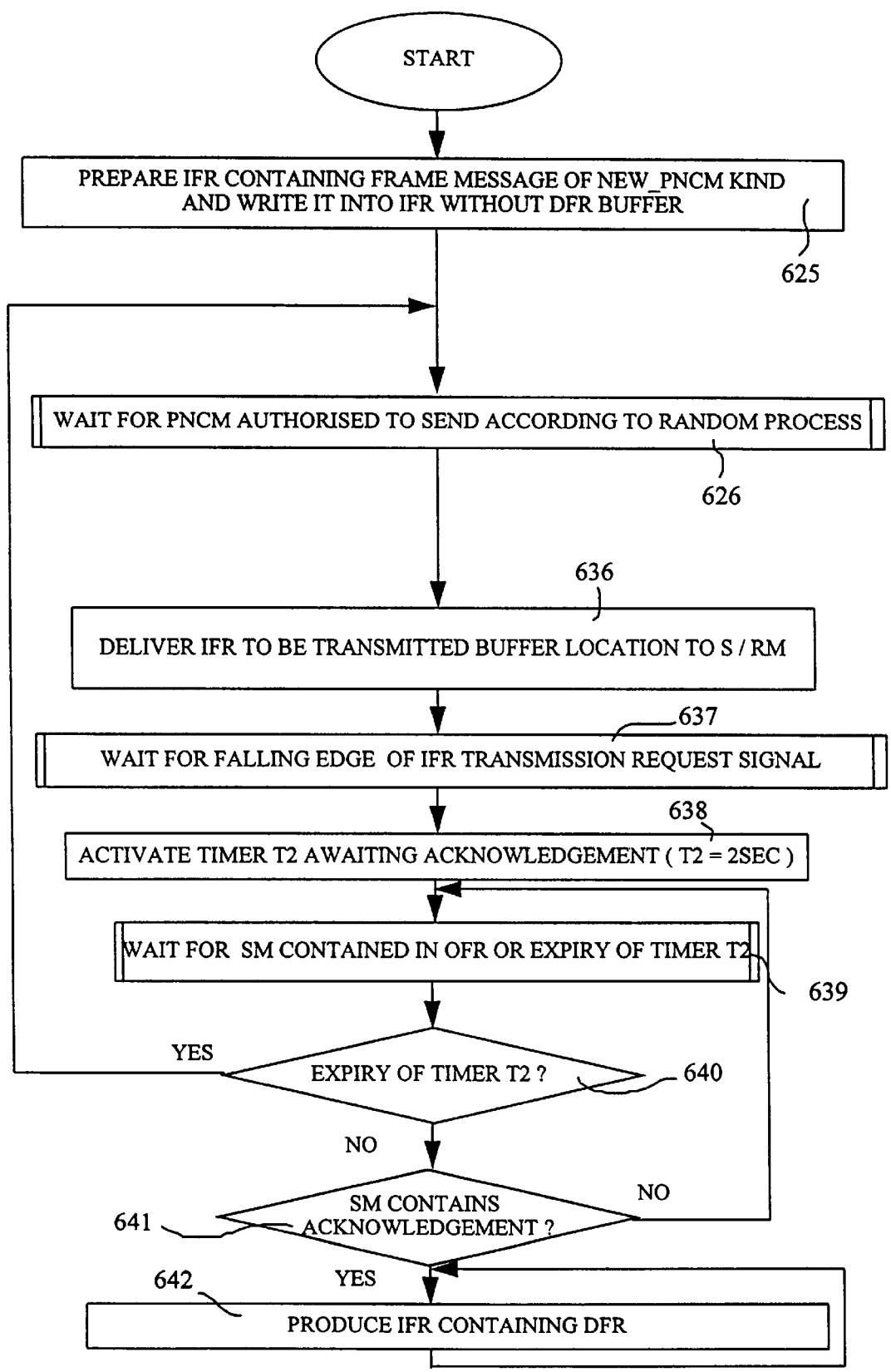
FIG. 45A is a flow diagram illustrating the functioning of the uplink frame production means which the peripheral transmission control means has.

The functioning of the means 202 of managing buffers 182 is illustrated by the flow diagram in FIG. 45.

After start-up, it performs an operation 213 in which it posts the location of each of the memories 182 in the mailbox of a data frame reception management means included in the ETHERNET sending/receiving means 187, the locations in question being stored amongst the default parameters 172.

Once the operation 213 has been accomplished, the management means 202 enters a loop in which it performs an operation 214 in which it waits until it receives, from the ETHERNET sending/receiving means 187, and more precisely from its data frame reception management means, a buffer location 182 in which a downlink frame received by the ETHERNET medium 4 has been stored, hereinafter referred to as the first event, or else until it receives, from the uplink frame production means 203, a buffer memory location 182 containing an uplink frame whose transmission over the shared radio medium has been performed, hereinafter referred to as the second event.

When one or other of these two events occurs, the management means 202 goes to a test 215 in which it determines whether or not it is the first event which has occurred.

Where it is indeed the reception of a buffer location 182 in which a data frame 12 has just been stored, which has occurred, the management means 202 performs an operation 216A in which it posts the memory location 182 which it has just received in the mailbox 204 of the production means 203, and then the operation 216B by which it increments a counter for the number of frames waiting, in the working memory of the peripheral networked communication means. It should be noted in this regard that this counter is initialised at the value zero at the start of the functioning of the communication means.

Once the operation 216 has been accomplished, or when the result of the test 215 is negative, the management means 203 performs a test 217 in which it determines whether or not it was the second event which caused the interruption of the waiting operation 214.

In the affirmative, it performs an operation 218 in which it posts in the mailbox of the data frame reception management means of the ETHERNET sending/receiving means 187, the buffer location 182 which it has just received.

Once the operation 218 has been accomplished, and where the result of the test 217 is negative, the management means 203 returns to the start of the loop, and will therefore perform iteratively, throughout its functioning, the series of operations which has just been described, with the exception of course of the operation 213 which is outside the loop and which is therefore performed only just after start-up.

Figure 46:
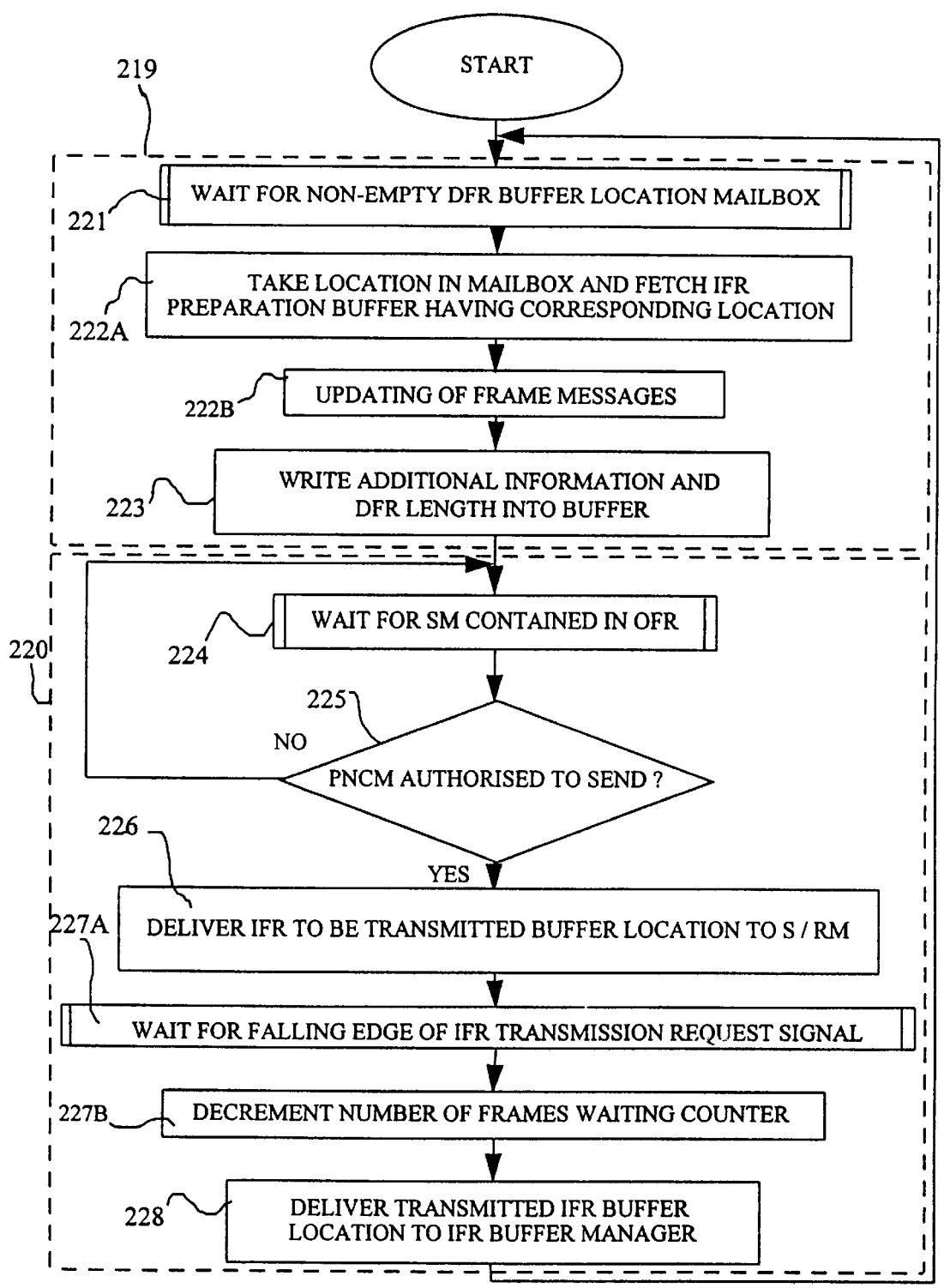
FIG. 46 is a flow diagram showing in more detail the operation of producing an uplink frame containing a data frame of FIG. 45A.
Figure 46A:
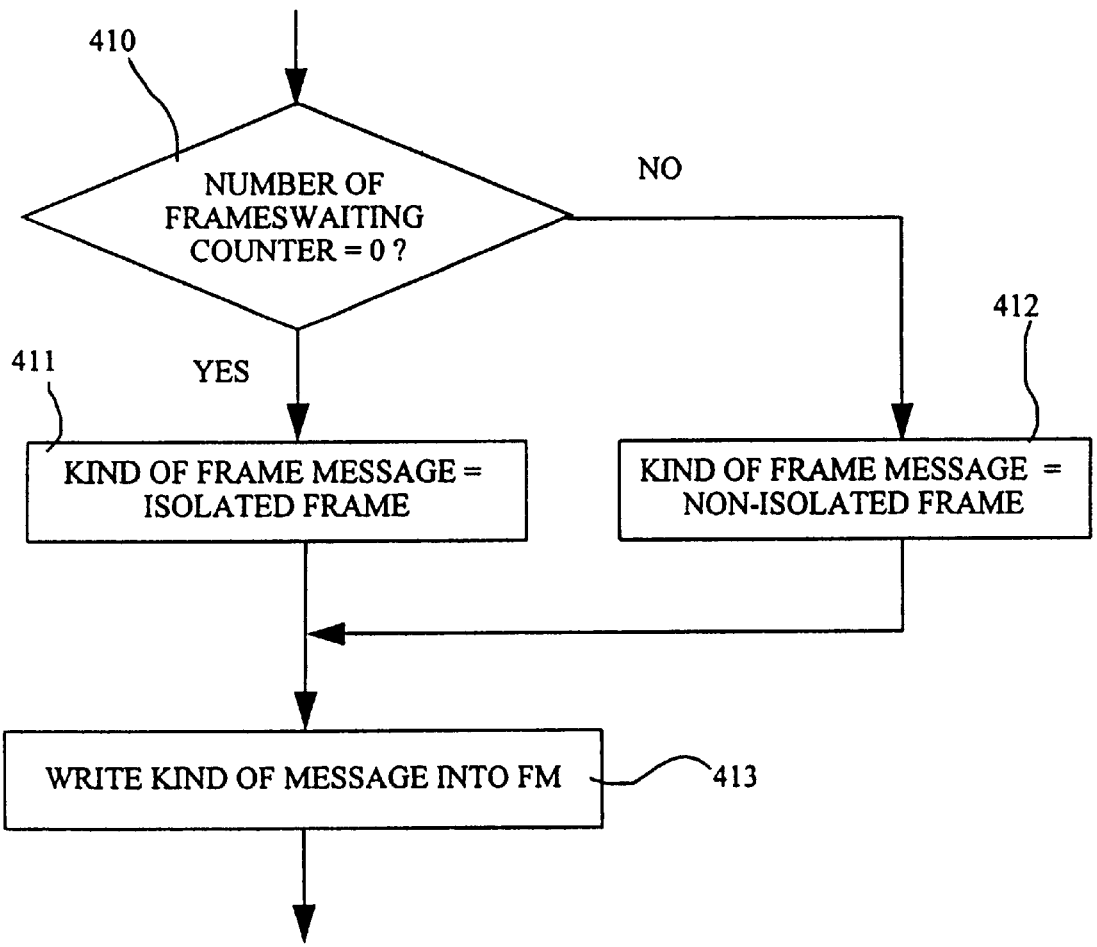
FIG. 46A is a flow diagram showing in more detail the operation of updating the frame message of the flow diagram of FIG. 46.

The functioning of the uplink frame preparation means 203 is illustrated by the flow diagram in FIG. 46A.

Directly after start-up, the production means 203 performs an operation 625 in which it prepares an uplink frame 26 without a data frame 45, whose frame message 420 includes message nature information 422 which is that requesting insertion in the network 20, and whose address is that which appears in the working memory, and in which the means 203 then writes this uplink frame in the buffer memory 621.

Figure 45B:
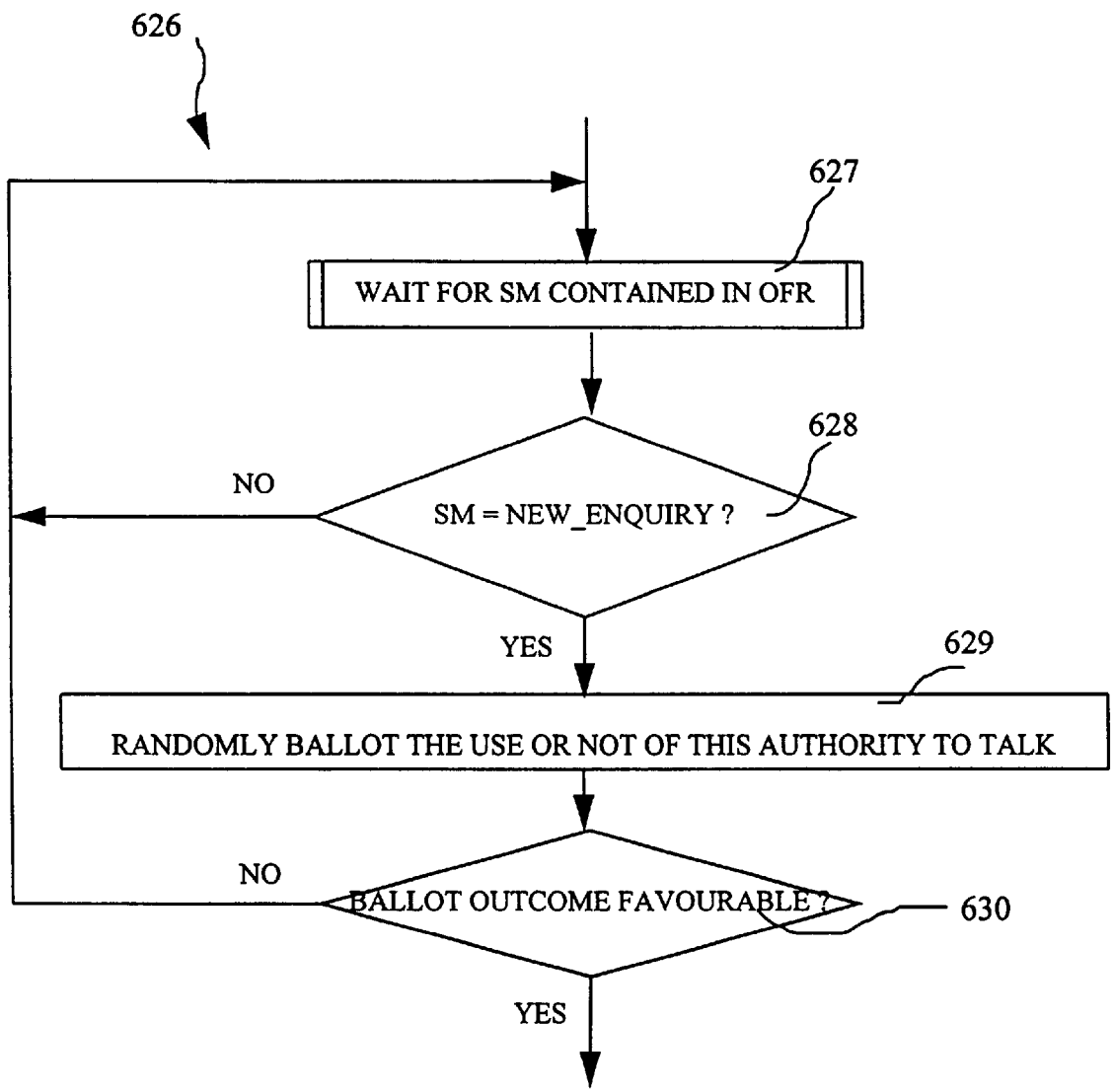
FIG. 45B shows in more detail the operation of waiting until the peripheral means is authorised to send according to a random process.

Once the operation 625 is accomplished, the means 203 enters a loop where it begins by performing the operation 626 of waiting to be authorised to send in accordance with a random process, the details of which are shown in FIG. 45B.

The operation 626 commences with an operation 627 of awaiting the service message contained in a downlink frame, and continues, when this event occurs, with a test 628 for determining whether this service message is of the collective type intended for the present peripheral means seeking to be inserted in the network 20.

When the result of the test 628 is negative, the means 203 performs an operation 629 in which it effects a balloting of the random type, the result of which is one of the two values respectively favorable and unfavorable.

Once the operation 629 is accomplished, the means 203 performs the test 630 in which it determines whether or not the balloting is favorable.

When the test 628 or the test 630 is negative, the means 203 returns to the operation 627 whilst, when the test 630 is positive, the operation 626 is terminated.

It will be noted that the random-type balloting effected in the operation 629 is designed to have a probability p of being favorable, with p being parametrizable.

Figure 45C:
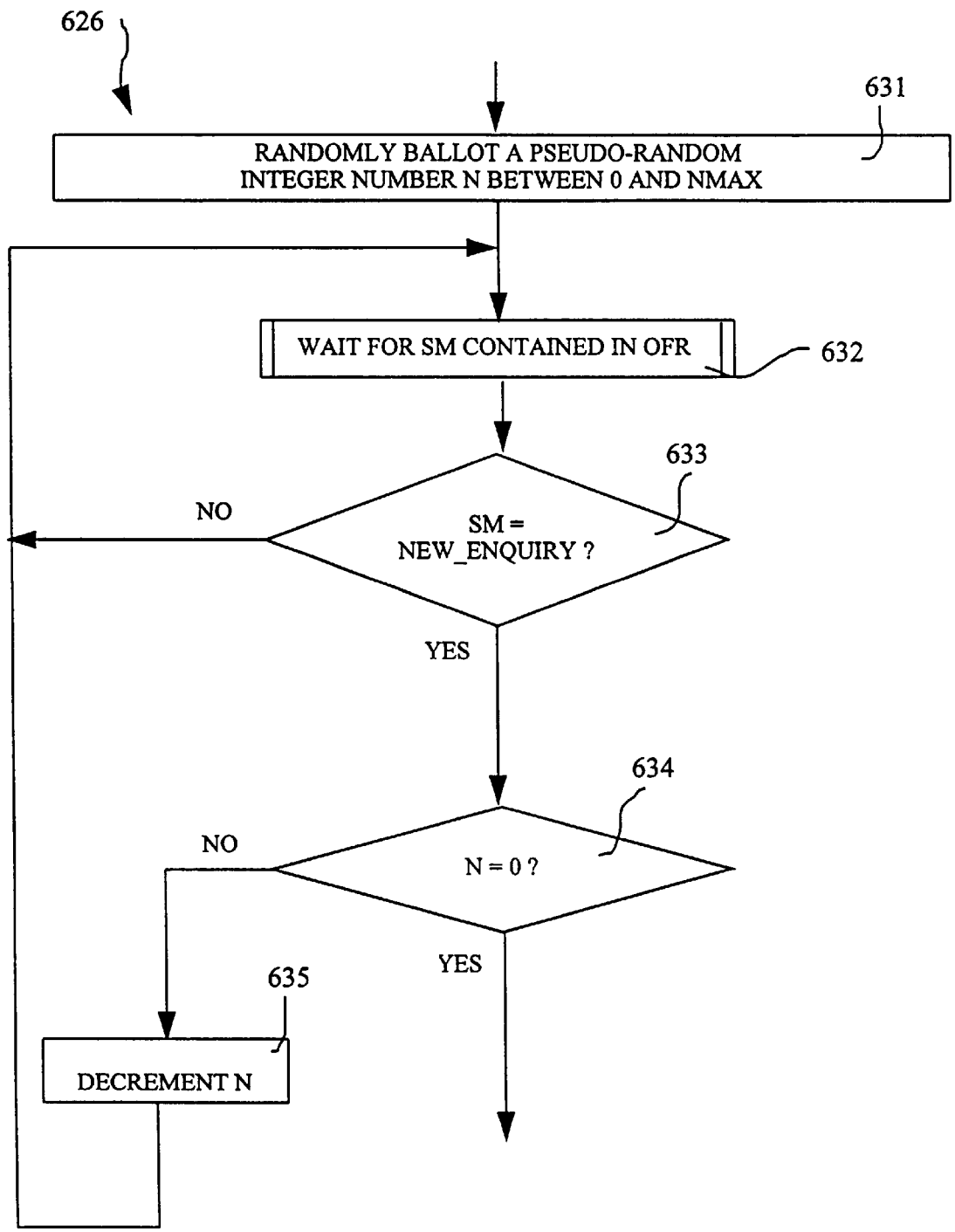
FIG. 45C shows a variant of this operation.

FIG. 45C shows a variant for the operation 626.

This begins with an operation 631 of effecting a random-type balloting, the result of which is an integer N between 0 and a maximum value NMAX.

Once the operation 631 is accomplished the means 203 performs an operation 632 in which it waits until it receives a service message contained in a downlink frame.

When this event occurs, it performs the test 633, identical to the test 628.

When this test is positive, the means 203 performs the test 634 in which it determines whether or not the integer N balloted in the operation 631 is equal to zero.

In the negative, the means 203 performs the operation 635 in which it increments the number N and then returns to the operation 632, an operation to which it also returns when the test 633 is negative.

On the other hand, when the test 634 is positive, the operation 626 is terminated.

It can be seen that, in the latter, it is necessary to wait, after the operation 631, until N service messages of the type marked NE or new enquiry in the drawings have been received, before the operation is terminated.

It will be noted that, in the example illustrated, NMAX is parametrizable, and that the chance of balloting the different integers N is equiprobable.

As can seen in the operation 45A, when the operation 626 is accomplished the means 203 goes to an operation 636 in which it delivers to the sending/receiving means the location of the buffer 621, and then it goes to the operation 637 in which it awaits the falling edge of the uplink frame transmission request signal, that is to say for the sending of the burst transmitting the frame contained in the buffer 621 to be terminated.

The means 203 then goes to the operation 638 in which it activates a countdown awaiting an acknowledgement, for example a period of two seconds.

The production means 203 then goes to an operation 639 in which it waits either until it receives a service message contained in a downlink frame, or until the countdown initiated in the operation 638 has expired.

When one or other of these two events occurs, the production means 203 performs the test 640 in which it determines whether it is the second event which has occurred.

In the affirmative, that is to say where the predetermined period, for example of two seconds, provided for the acknowledgement has elapsed, the production means 203 returns to the operation 626.

When the test 640 is negative, the production means 203 performs a test 641 in which it determines whether or not the service message received contains an acknowledgement, that is to say whether it is of the individual authorisation-to-send message type addressed to the present peripheral means.

In the negative, the means 203 returns to the operation 639, whilst in the affirmative it enters a loop in which it iteratively performs the operation 642 of producing an uplink frame containing a data frame, that is to say with a functioning in which it knows that it is identified by the central means.

It will be observed that, when the countdown awaiting acknowledgement initiated in the operation 638 ends without an acknowledgement being received, that is to say with the test 640 being negative, the production means 203 recommences all the procedure which it commenced with the operation 626, that is to say it considers that its request for insertion in the network has not been taken into account by the central means, for any reason, which may notably be that another peripheral means has simultaneously sent an uplink frame, so that a collision has occurred.

It will also be observed that the central means is liable to send a certain number of service messages, and notably individual authorisation-to-send messages which are not intended for the present peripheral means, so that it is advantageous to repeat the procedure at the operation 639 when the test 641 is negative. Details of the operation 642 are shown in FIG. 46.

Directly after the start of this operation, the production means 203 performs an operation 219 of preparing an uplink frame, and then it performs an operation 220 of transmitting this uplink frame, so that it will perform iteratively, throughout its functioning an operation 219 followed by an operation 220.

The operation 219 of preparing an uplink frame commences with an operation 221 in which the uplink frame production means 203 awaits, if necessary, until there is at least one memory location 182 in the mailbox 204, that is to say the latter is not empty.

When this event occurs, the uplink frame production means 203 performs an operation 222A in which it takes from the mailbox 204 a memory location 182 and takes account of the fact that it is the buffer memory 182 corresponding to the location taken which is to be used for the preparation of the present uplink frame.

In the example illustrated, where the mailbox 204 has several locations, the memory 203 takes the one which is the first to have been posted therein but, in a variant which is not illustrated, a concept of priority is involved, as explained above with regard to the preparation means 112 of the central transmission control means 73.

After performing the operation 222A, the uplink frame production means 203 performs an operation 222B of updating the frame message. This operation 222B is presented in detail with regard to FIG. 46A. It includes first of all the test 410, which determines whether or not the counter for the number of frames waiting in the working memory is zero. If the result of the test 410 is affirmative, the operation 411 gives, to the nature of the frame message incorporated in the first uplink frame, a so-called "isolated frame" form which indicates that the peripheral networked communication means no longer has a frame to transmit, following the said first frame. If the result of the test 410 is negative, the operation 412 gives to the nature of the frame message incorporated in the first uplink frame, a so-called "non-isolated frame" form which indicates that the peripheral networked communication means still has uplink frames to transmit, following the said first frame.

Following one or other of the operations 411 or 412, the uplink frame production means 203 performs the operation 413, which consists of writing in the relevant buffer, or memory space, the nature of the frame message defined by one of the operations 411 or 412. Then the means 203 performs an operation 223 in which it writes, in the information area 183 of the memory 182 which took it in the operation 122, the data frame length information 43 and the additional information 44.

It will be noted that it is by virtue of the location taken from the mailbox 204 in the operation 222 that the production means 203 knows the length of this data frame, the locations posted in the mailbox 204 consisting of the address in the random access memory 173 of the start of the data frame area 184 and the length of the data frame which is stored therein.

When the operation 223 is accomplished, the uplink frame allowing the transmission of the data frame stored in the present buffer memory 182 has finished being prepared, and the production means 203 will pass directly to the operation 220 in which it transmits it.

The operation 220 begins with the operation 224 of awaiting, from the sending/receiving means 186, and more precisely from its reception management means 189, a service message contained in a downlink frame which is in the course of reception.

When this event occurs, the production means 203 performs the operation 225 in which it analyses the service message which it has just received in order to determine whether or not the latter authorises it to send an uplink frame in return.

The central transmission control means 73 of the central means 21 producing downlink frames whose service message may be either an authorisation-to-send message or a no-authorisation-to-send message, the operation 225 includes first of all the operation of determining whether the information 37 about the nature of the message contained in the field 40 indicates that it is a question of a no-authorisation-to-send message or an authorisation-to-send message. When it is a case of a no-authorisation-to-send message, the result of the operation 225 is negative and the production means 203 returns to the waiting operation 224.

When the information 37 indicates that it is a case of an authorisation-to-send message, the means 203 then determines whether the address 38 contained in the field 41 correspond to the one which has been written in the operating memory 175 by the ETHERNET sending/receiving means 187, as explained above.

If there is correspondence, the result of the operation 225 is positive and the production means 203 goes to the operation 226.

In the variant of the central means 21 where the central transmission control means 73 is replaced by the first variant thereof described above, that is to say the one in which the downlink frame production means 95 is replaced by the means 140 (FIGS. 25 to 28), and more generally in all cases where the service message can be either of the authorisation-to-send message type or of the no-authorisation-to-send message type, the operation 225 is performed in the same way.

In the variants of the central means 21 where the central transmission control means 73 is replaced by the second and third variants described above, with reference to FIGS. 29 to 35, and more generally in all cases where the service message is solely of the authorisation-to-send message type, the operation 225 is limited to a simple operation of comparing the address 38 of the service message with the one written by the sending/receiving means 187 in the operating memory 175.

In the operation 226 which it performs when the result of the operation 225 is positive, the production means 203 delivers to the sending/receiving means 186, and more precisely to its sending management means 188, the present memory location 182, and then it performs an operation 227A in which it awaits the falling edge of the uplink frame transmission request signal, that is to say the production means 203 remains blocked as long as a burst transmitting the present uplink frame has not finished being transmitted.

When the completion of the transmission of this burst occurs, the production means performs the operation 227B by which it decrements the counter of the number of frames waiting, by a step of one unit, in the working memory of the peripheral networked communication means, this counter being, as illustrated in FIG. 45, incremented during the operation 216B. The production means 203 then goes to an operation 228 in which it delivers, to the management means 202, the location of the present memory 182, so that the management means 202 can post it in the mailbox of the data frame reception management means of the sending/receiving means 187, so that the latter can once again use this buffer 182 to store a new data frame reaching the converter 160 over the ETHERNET medium 4.

When the end of transmission of this burst occurs, the production means 203 goes to an operation 228 in which it delivers to the management means 202 the location of the present memory 182, so that the management means 202 can post it in the mailbox of the data frame reception management means of the sending/receiving means 187, so that the latter can once again use this buffer 182 for storing a new data frame reaching the converter 160 over the ETHERNET medium 4.

In a variant, not illustrated, of the peripheral transmission control means 185, the production means 203 is replaced with an uplink frame preparation means and with an uplink frame transmitting means, in a manner similar to that in which the downlink frame preparation means 112 of the downlink frame production means 95 is replaced in the downlink frame production means 140 with a downlink frame preparation means 141 and with a downlink frame transmitting means 142, that is to say with two means which perform in parallel respectively the operation 219 of preparing an uplink frame and the operation 220 of transmitting such a frame, with the uplink frame preparation means performing an operation 219 on each occasion when there is a free location in the mailbox of the uplink frame transmitting means, and with the latter performing an operation 220 of transmitting an uplink frame as long as its mailbox is not empty.

Figure 47:
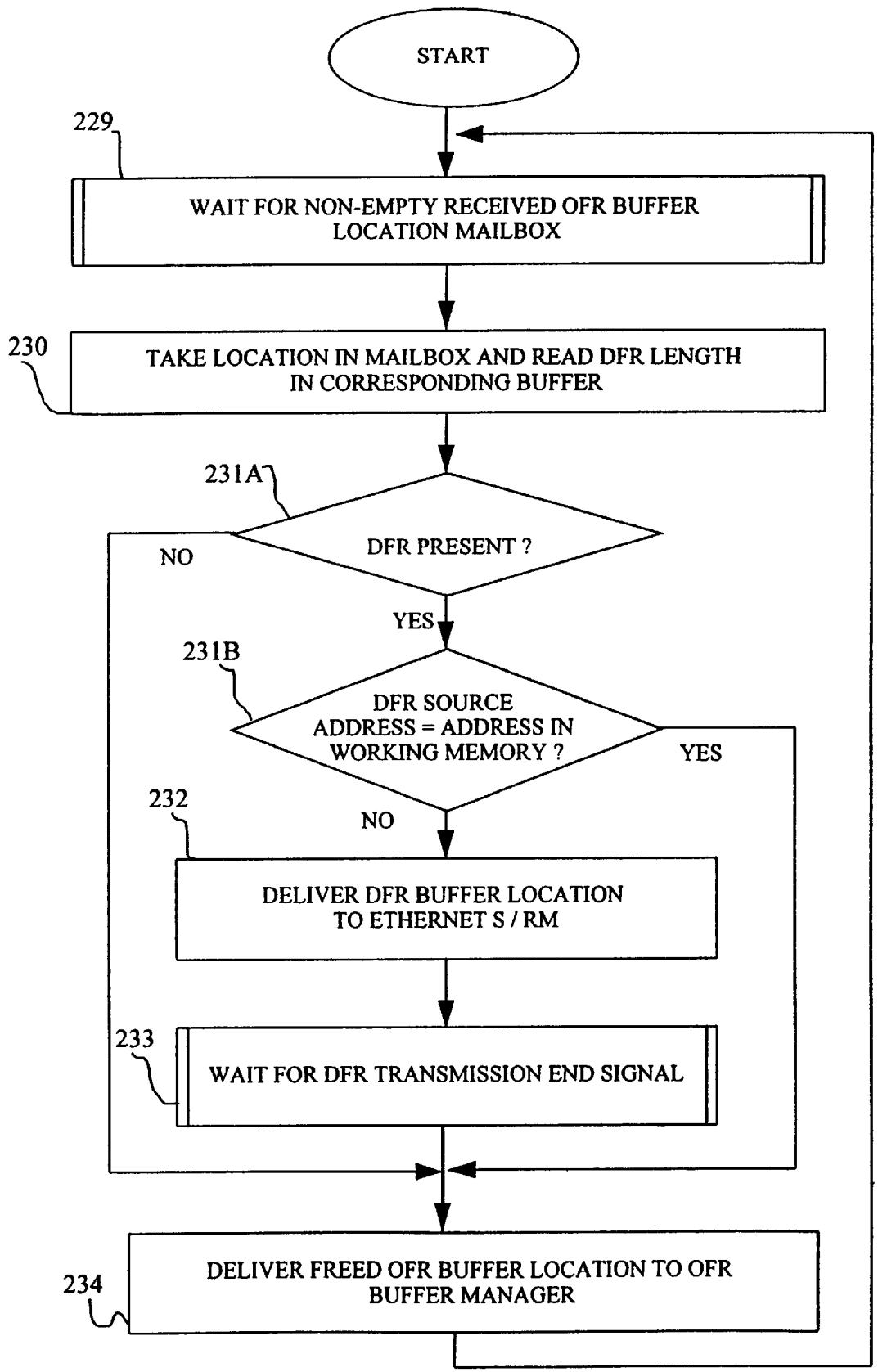
FIG. 47 is a flow diagram illustrating the functioning of the data frame production means which the peripheral transmission control means has.

The functioning of the data frame production means 205 is illustrated by the flow diagram in FIG. 47.

Directly after start-up, the production means 205 enters a loop in which it commences by performing an operation 229 in which it waits until there is present in the mailbox 206 at least one buffer location 181 in which the sending/receiving means 186 has stored a downlink frame, that is to say this mailbox is not empty.

When this event occurs, the production means 205 goes to an operation 230 in which it takes in the mailbox 206 a memory location 181, the first to have been posted therein where there are several of them, and then it reads, in the buffer 181 corresponding to this location, the data frame length information 43 which appears in the field 46 of the downlink frame which is stored therein.

The means 203 then performs the test 231A in which it determines whether or not the information 43 which it has read is greater than zero, that is to say whether or not there is a data frame present in the downlink frame stored.

In the affirmative, the production means 205 performs an operation 231B in which it takes the destination address appearing in this data frame and determines whether or not this address corresponds to the one stored in the working memory 175.

In the negative, the production means 205 does whatever is necessary for the ETHERNET sending/receiving means 187 to transmit this data frame over the ETHERNET transmission medium 4: it thus first of all performs the operation 232, in which it delivers to the sending/receiving means 187 the location of the data frame area of the present buffer 181, that is to say the address in the memory 173 of the start of the data frame area and the length thereof, and then goes to the operation 233 in which it waits until the ETHERNET sending/receiving means sends to it a signal of the end of transmission of this data frame.

When this event occurs, or when the result of the test 231A or 231B is respectively negative or positive, the production means 205 performs an operation 234 in which it delivers to the management means 201 the memory location 181 in which appeared the downlink frame including the data frame which has just been transmitted over the ETHERNET transmission medium 4, so that the management means 201 posts this location in the mailbox 190 of the reception management means 189 of the radio sending/receiving means 186, so that this buffer 181 can once again be used to store a new downlink frame.

Once the operation 234 has been accomplished, the production means 205 returns to the start of the loop, and will therefore perform iteratively, throughout its functioning, the series of operations which has just been described.

Figure 47A:
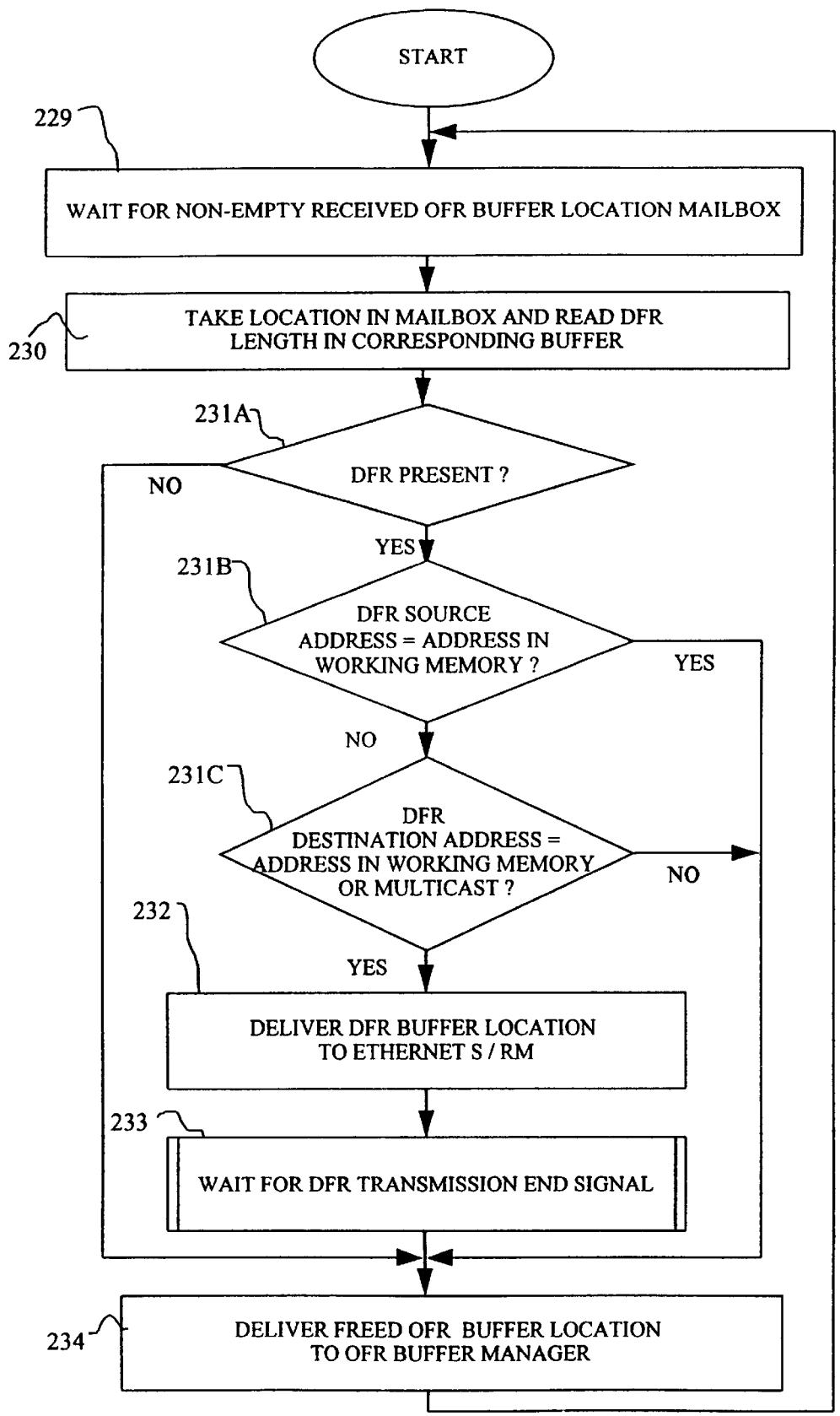
FIG. 47A shows a variant of this flow diagram.

FIG. 47A illustrates the functioning of a variant of the production means 205.

It can be seen, by comparing FIGS. 47 and 47A, that this variant has identical functioning, but, when the test 231B is negative, instead of directly ensuring that the ETHERNET sending/receiving means 187 transmits the data frame, the variant of the production means 205 performs an operation 231 in which it takes the destination address of the data frame and determines whether or not this address corresponds to the address stored in the working memory or is a multi-destination (multicast) address, ensuring that the means 187 transmits the data frame only if the operation 231C is positive.

When this operation is negative, the variant of the production means 205 goes directly to the operation 234.

In variants, not illustrated, of the production means 205, a concept of priority is introduced, in order to transmit to the terminal 23, where there are several data frames present in the buffers 181 whose locations appear in the mailbox 206, the one from amongst these data frames which is to be transmitted on this occasion over the ETHERNET medium 4.

A description will now be given, with the help of FIGS. 48 to 50, of the constitution and functioning of the ETHERNET sending/receiving means 187.

The latter includes, as described with reference to FIG. 36, the ETHERNET microcontroller 165 with the sending/receiving pairs 166, filter 163, conductors 164 and connector 162, and uses resources procured by the microcontroller 168 with the aid of the program 171, default parameters 172 and working memory 175.

Figure 48:
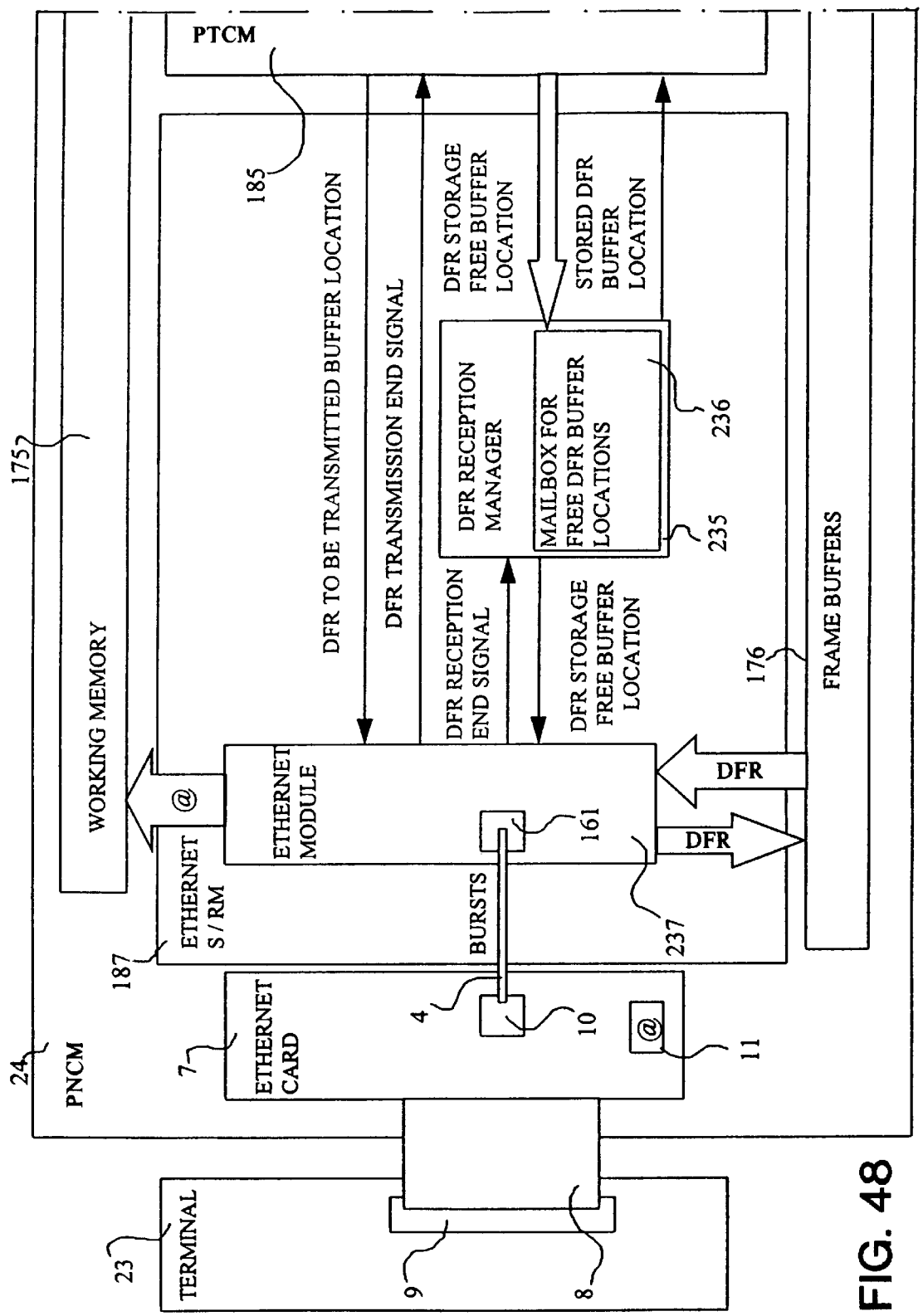
FIG. 48 is a partial functional diagram of one of the data stations of the network of FIG. 4, showing particularly the ETHERNET sending/receiving means which the communication converter of the peripheral networked communication means has.

As can be seen in FIG. 48, the ETHERNET sending/receiving means 187 includes a data frame reception management means 235 provided with a mailbox 236, and an ETHERNET module 237.

As explained above, it is the management means 202 which posts in the mailbox 236 the buffer locations 182 which are free for the storage of a data frame arriving in the communication converter 160 over the ETHERNET transmission medium 4, and it is the data frame reception management means 235 which sends to the management means 202 the memory location 182 where such a data frame was stored.

With regard to the co-operation of the management means 235 with the ETHERNET module 237, the latter receives from the management means 235, at start-up, a buffer location 182 in which it stores the first data frame which reaches it, after start-up, over the ETHERNET medium 4, and, once the data frame has finished being received, the ETHERNET module 237 sends to the management means 235 a data frame reception signal, which enables the management means 235 to know that there is a data frame stored in the memory location 182 which it had previously delivered to the ETHERNET module 237, and to send to the latter a new buffer location 182.

The ETHERNET module 237 also co-operates directly with the data frame production means 205 of the peripheral transmission control means 185, which delivers to it, as explained previously, one by one, the data frame area locations of the buffers 181 in which a downlink frame was stored, the ETHERNET module 237 on each occasion advising the production means 205 of the transmission of the data frame present in this location by means of a data frame end of transmission signal.

Figure 49:
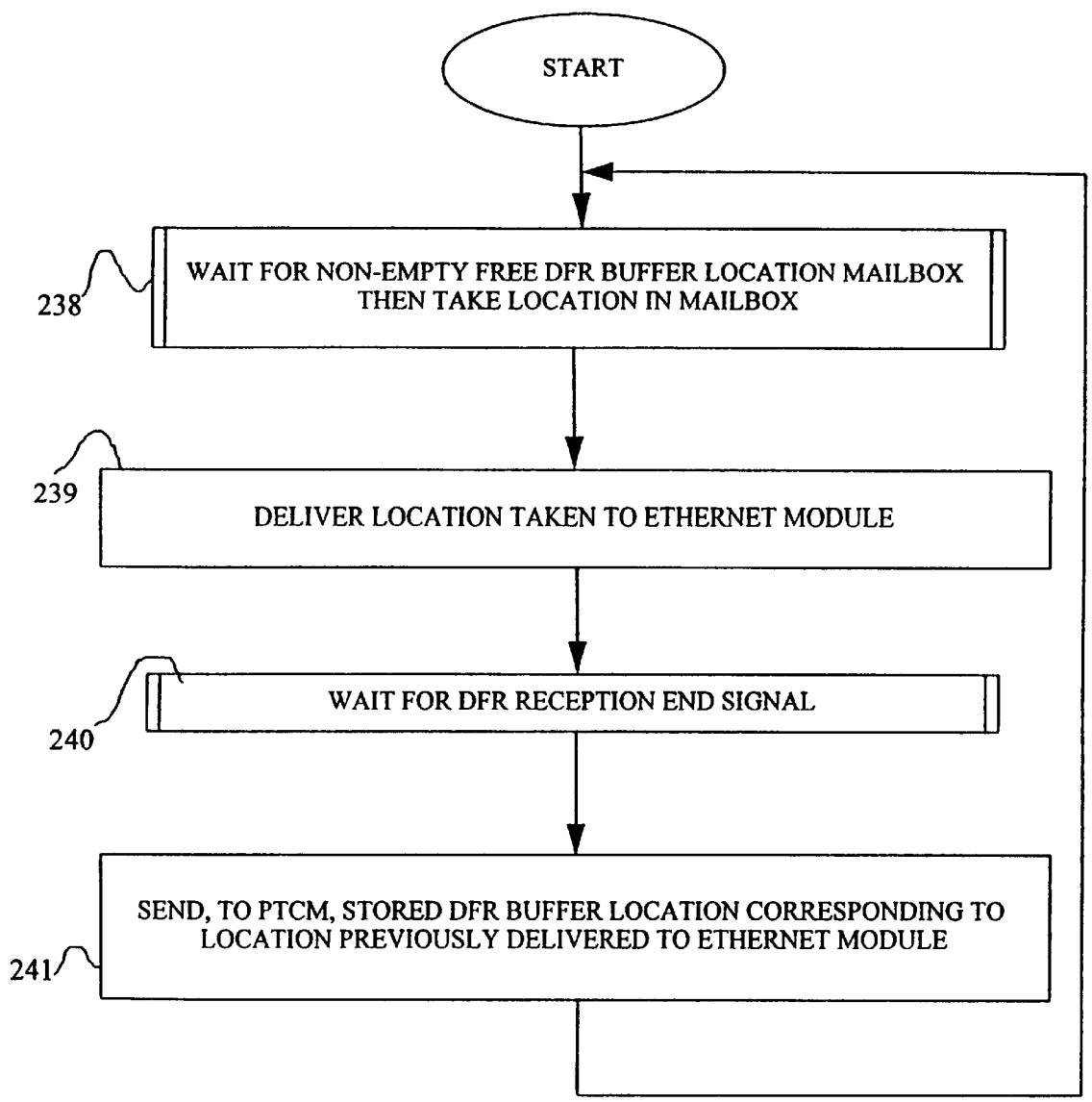
FIGS. 49 and 50 are flow diagrams illustrating the functioning respectively of the data frame reception management means and of the ETHERNET module which this ETHERNET sending/receiving means has.

The functioning of the data frame reception management means 235 is illustrated by the flow diagram in FIG. 49.

Directly after start-up, it enters a loop where it begins by performing an operation 238 in which it waits until there is at least one memory location 182 present in the mailbox 236, that is to say until the latter is not empty, and when this becomes the case, it takes from this mailbox a location, and more precisely the one which is the first to have been posted therein where there are several of them.

The management means 235 then goes to an operation 239 in which it delivers to the ETHERNET module 237 the location which it has just taken, so that the module 237 uses the corresponding memory 182 in order to store therein the next data frame which it receives over the ETHERNET medium 4.

The management means 235 then goes to an operation 240 in which it waits until the module 237 sends it the data frame end-of-reception signal, the reception of this signal signifying that the module 237 has stored a data frame received over the medium 4 in the memory 182 whose location the means 235 had communicated to it in the course of the preceding operation 239.

When the management means 235 receives the data frame end-of-reception signal, it goes to the operation 241 in which it sends to the peripheral transmission control means 185, and more precisely to the management means 202 thereof, this same buffer location 182, as explained above.

Once the operation 241 has been accomplished, the management means 235 returns to the start of the loop, and will therefore perform, throughout its functioning, the series of operations which has just been described.

Figure 50:
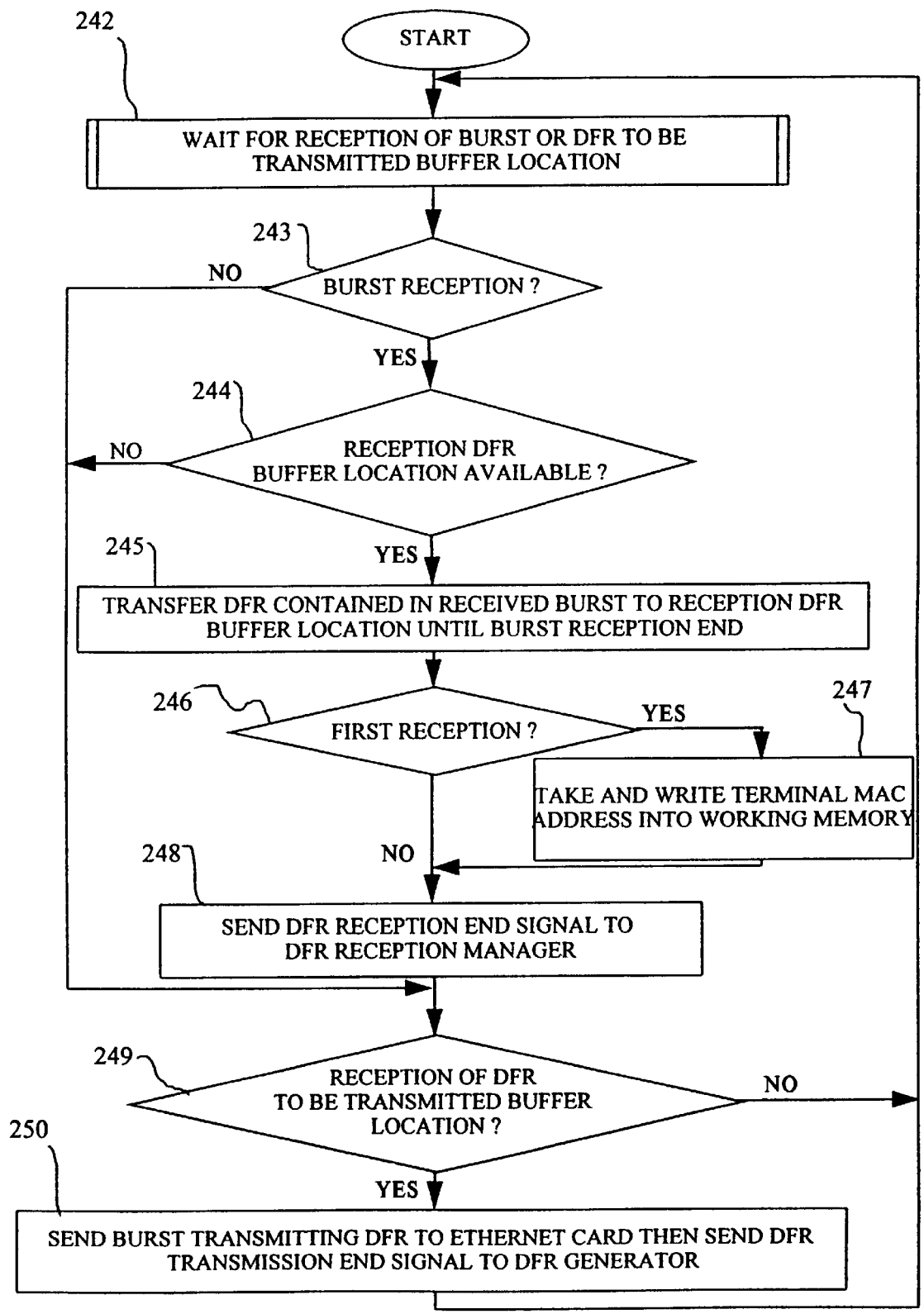

The functioning of the ETHERNET module 237 is illustrated by the flow diagram in FIG. 50.

Directly after start-up, the module 237 enters a loop in which it begins by performing an operation 242 of awaiting the reception of a burst over the ETHERNET medium 4 or the reception of a buffer location 181 in which there is a data frame to be transmitted over this medium.

When one or other these two events occurs, the module 237 performs a test 243 in which it determines whether or not it is the first event which has occurred.

In the affirmative, the module 237 performs a test 244 in which it determines whether or not it has available a memory location 182, that is to say whether the management means 235 has delivered to it one which it has not yet used.

In the affirmative, the module 237 performs an operation 245 in which it transfers the data frame contained in the burst which it is in the process of receiving, into the area 184 of the memory 182 whose location it has available.

When the burst transmitting this data frame has finished being received, the module 237 goes to a test 246 in which it determines whether or not it is the first time that it receives a data frame by means of the ETHERNET medium 4, this test for example being performed by means of an indicator which is inactivated at start-up and which the module 237 activates as soon as it has received a data frame.

When the result of the test 246 is positive, the module 237 performs an operation 247 in which it takes the source address appearing in the field 14 of the data frame received, a source address which corresponds to the MAC address 11 of the ETHERNET card 7 associated with the terminal 23, and then the module 237 writes this address in the working memory 175.

When the operation 247 is accomplished, or when the result of the test 246 is negative, the module 237 performs an operation 248 in which it sends to the management means 235 the data frame end-of-reception signal.

When the operation 248 is accomplished, or where one or other of the tests 243 or 244 is negative, the module 237 performs a test 249 in which it determines whether or not the second event has just occurred.

In the affirmative, that is to say when the production means 205 has just delivered to the module 237 the location of the data frame area of a buffer 181, the module 237 performs an operation 250 in which it sends over the ETHERNET medium 4 a burst transmitting the data frame contained in this memory 181, and in which it then sends a data frame end-of-transmission signal to the production means 205 of the peripheral transmission control means 185.

When the operation 250 is accomplished, or when the test 249 is negative, the module 237 returns to the start of the loop, and will therefore perform, throughout its functioning, the series of operations which has just been described.

Figure 50A:
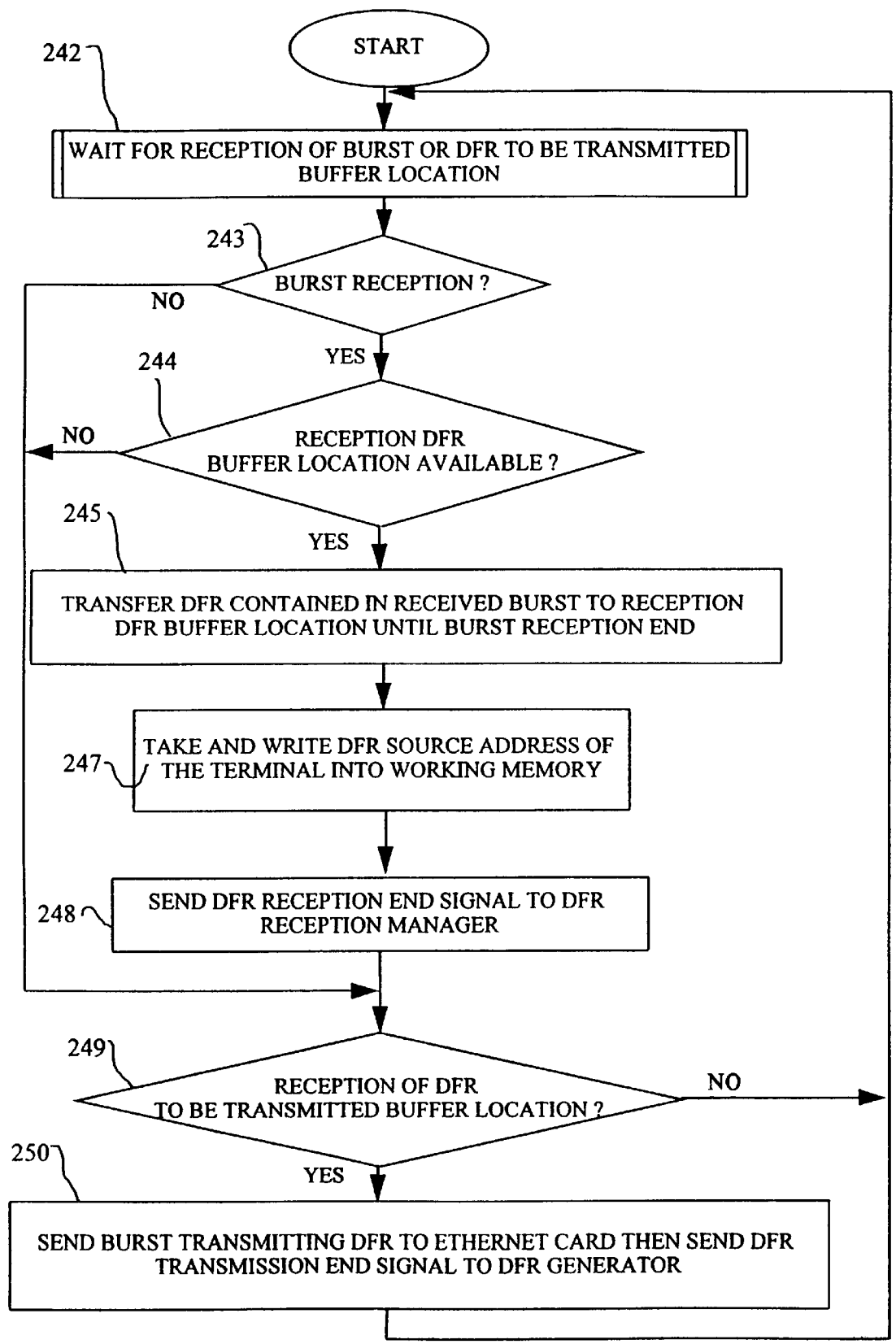
FIGS. 50A and 50B show variants of the flow diagram of FIG. 50.

FIG. 50A shows the functioning of a variant of the module 237, this functioning being identical to that shown in FIG. 50, with the exception of the fact that the test 246 is not performed, that is to say the ETHERNET module in all cases goes directly from the operation 245 to the operation 247.

Thus there will be permanently in the operating memory 175 the source address appearing in the last data frame received by means of the medium 4.

This offers the advantage, where the converter 160 is able to be connected to a different ETHERNET card 7 during its functioning, of being certain to have the correct address permanently.

Figure 50B:
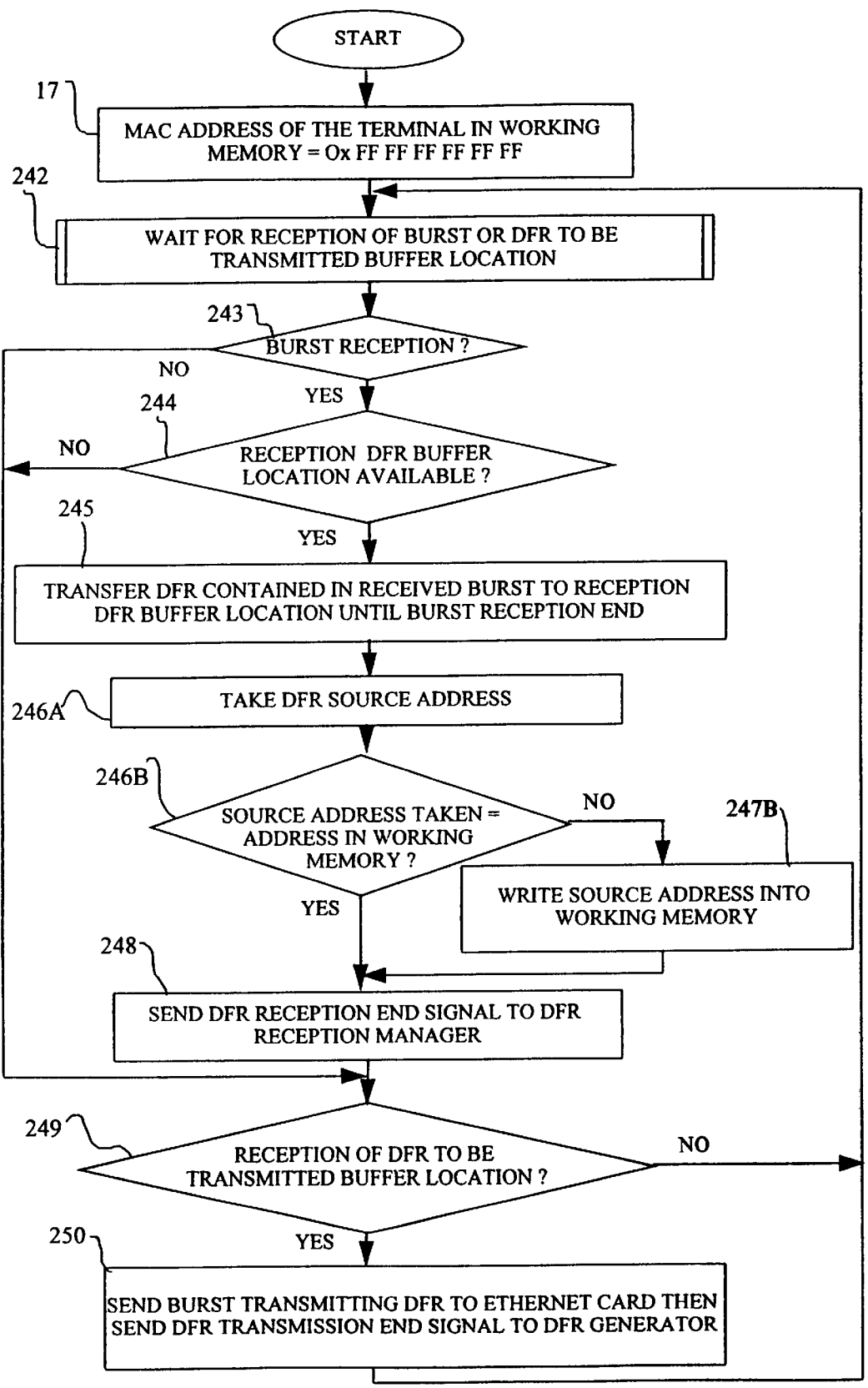

FIG. 50B illustrates the functioning of another variant of the module 237 in which the operations 246 and 247 are replaced by the operations 246A, 246B and 247B, whilst, just after start-up, and before entering the loop, an operation 17 is performed.

In the latter operation, there is written in the working memory 175, an address in which all the bits are at one, that is to say the general broadcast address.

Given that this address cannot be that of a peripheral means, any problems caused by the fact that a random initialisation of the address appearing in the working memory 175 may happen to be the address of another peripheral means, are avoided.

It will be noted that it is advantageous also to perform the initialisation operation 17 in the embodiments of the ETHERNET module whose functioning is shown respectively in FIGS. 50 and 50A.

In the variant whose functioning is illustrated in FIG. 50B, after performing the operation 245 and then the operation 246A of taking the source address of the data frame, the ETHERNET module performs a test 246B in order to determine whether or not this source address corresponds to that which appears in the working memory 175.

In the negative, it performs the operation 247B in which it writes the source address read in the working memory and then goes to the operation 248, whilst in the affirmative it passes directly to this operation 248.

It will be observed that, just like the ETHERNET module whose functioning is shown in FIG. 50A, the source address of the last data frame received is permanently in the working memory, but that the operations of writing this address in the working memory is avoided so long as it has not changed, which is normally the case.

Figure 51:
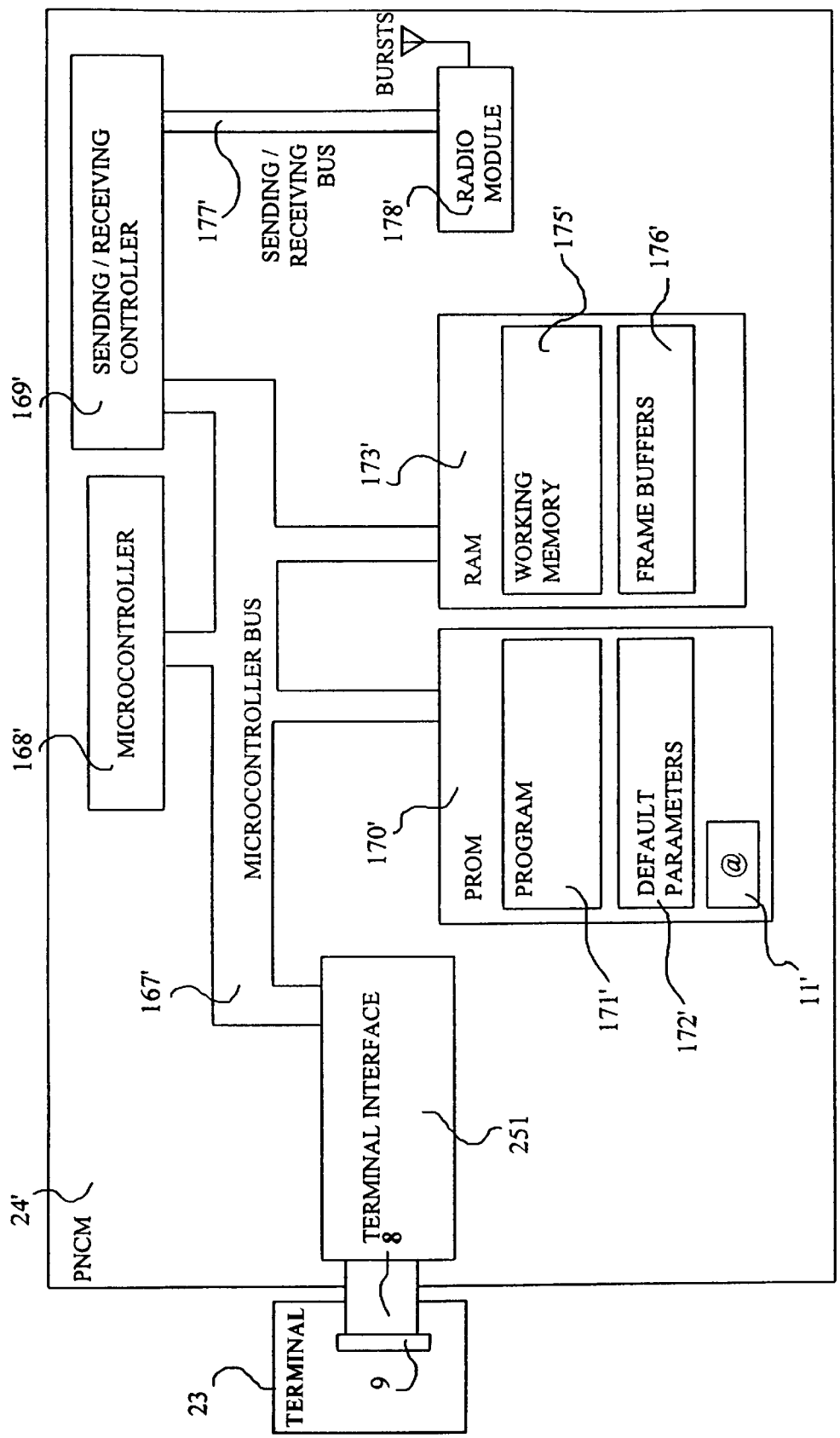
FIG. 51 is an electronic diagram similar to FIG. 36, for a variant of the peripheral networked communication means presented directly in the form of a card connected to the ISA bus of the terminal.

It will be observed, in general terms, that the communication converter 160 makes it possible to have, in a particularly simple and convenient manner, a peripheral networked communication means 24, when there is already a data station of the type marked 2A to 2G in FIG. 1, since it suffices to plug in the two ends of a cable 4.

Where the individual networked communication means forming part of the data station available is in conformity with a recommendation or standard other than those mentioned above, variants of the converter 160 are used which are similar but in which the sending/receiving means 187 is replaced by a sending/receiving means which is similar but adapted to the MAC protocol of the data station, and more precisely the individual networked communication means to which a connection is made.

Where the terminal 23 is not associated with an available individual networked communication means, the device 24' shown in FIG. 51 is used, which is similar to the communication converter 160 but co-operates directly with the terminal 23.

In FIG. 51, the same numerical references have been used for the components of the peripheral means 24' as for the means 24, but given a "prime" index.

As can be seen by comparing FIGS. 36 and 51, the peripheral means 24' is similar to the converter 160, but with the assembly formed by the connector 162, the filter 163, the conductors 164, the ETHERNET microcontroller 165 and the sending/receiving pairs 166 being replaced by a terminal interface 251 provided with an ISA bus male connector 8 designed to be plugged into the female connector 9 of the terminal 23, and with the programmable read-only memory 170' having an MAC address 11'.

Figure 52:
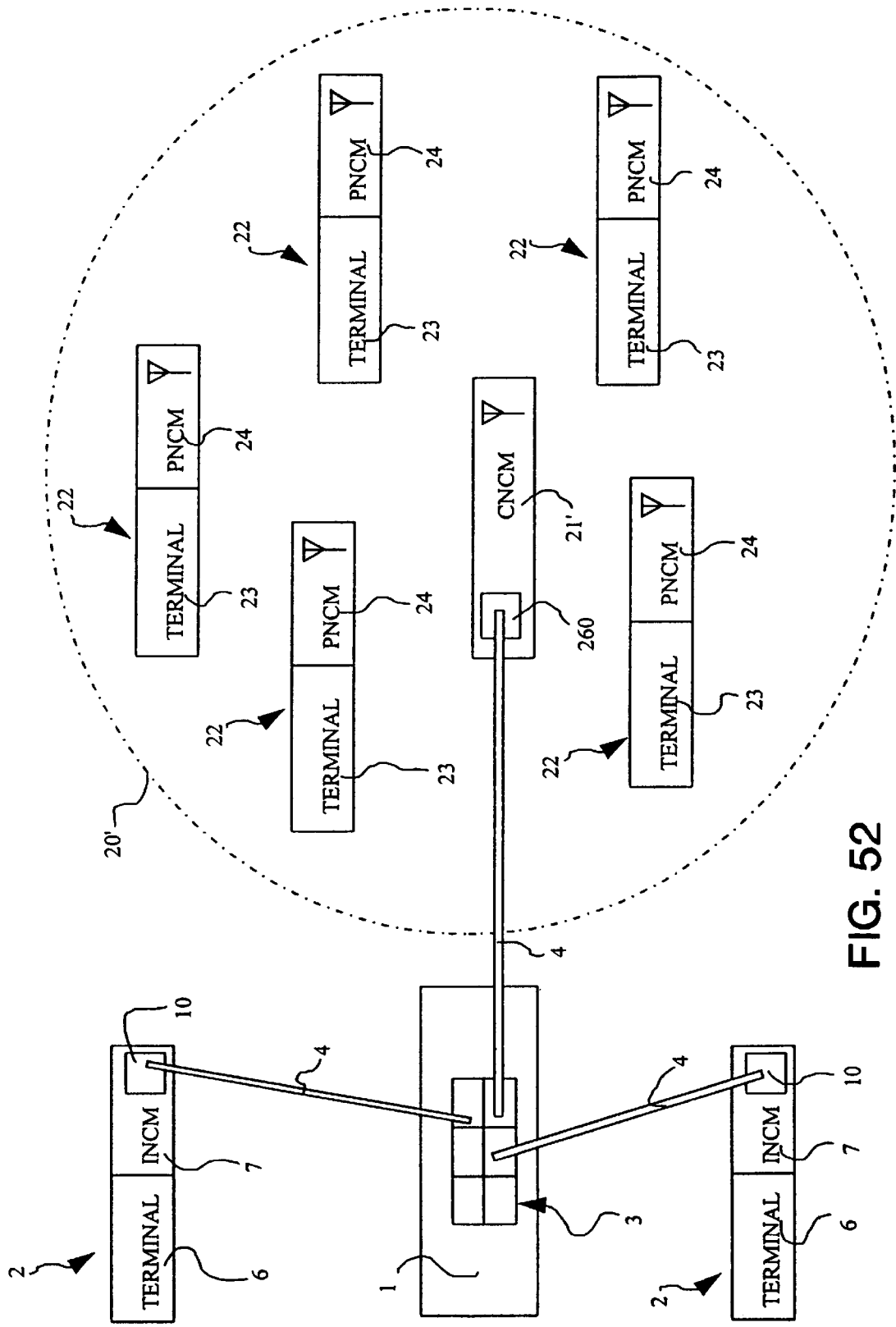
FIG. 52 shows, from the topological point of view, a local network of the type shown in FIG. 1 and a local network of the type shown in FIG. 4, interconnected by means of a second embodiment of the central networked communication means, adapted for this purpose.

On the functional level, the peripheral means 24' is similar to the converter 160, but with the ETHERNET sending/receiving means 187 being replaced by a sending/receiving means co-operating directly with the terminal 23, the electrical signals which it sends or receives at the connector 8 to deliver to the terminal a sequence of data or to have delivered to it by the latter a series of data accompanied by a destination address, being transformed in the terminal 23, by the driver which was installed therein for the device 24', into signals compatible with the aforementioned logic interface, for example of the NDIS or ODI type.

Where it is desired to interconnect a network of the type shown in FIG. 1 and a network of the type shown in FIG. 4, it is possible to perform the interconnection by means of the central networked communication means, as shown in FIG. 52.

The wireless network 20' shown in the latter is similar to the network 20 but with the central networked communication means 21 replaced by a means 21' having a port 260 for a cable 4 or 5 forming part of a shared transmission medium of the type shown in FIG. 1, for example the particularly simple medium shown in FIG. 52, consisting of a concentrator 1 and three cables 4 each having one of their end connectors plugged into a port of a unit 3 of the concentrator 1, and the other end connector plugged respectively into the port of the individual networked communication means 7 of one or other of the data stations 2 or into the port 260 of the central means 21'.

By virtue of the interconnection of the two networks, any terminal from amongst the terminals 6 or 23 can send, by means of its individual networked communication means 7 or 24, a data sequence to another one of the terminals 6 or 23, independently of the location of the terminals in one or other of the two networks.

The central networked communication means 21' and variants thereof will now be described with reference to FIGS. 53 to 73.

Figure 53:
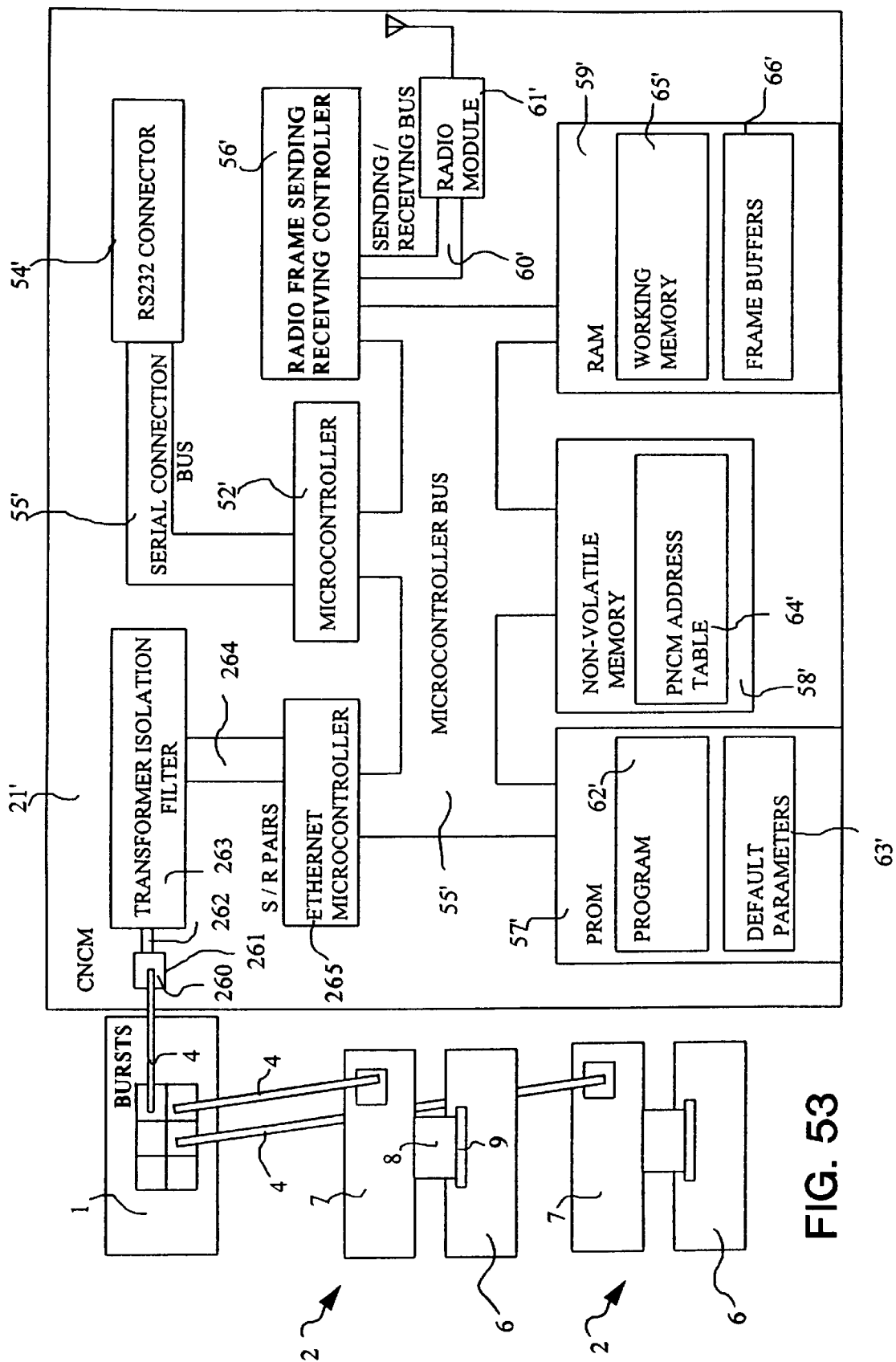
FIG. 53 is an electronic diagram showing particularly this second embodiment of the central means.

As can be seen by comparing FIGS. 11 and 53, the device which is used as the central means 21' has the same components as the device which is used as the central means 21, to which the same reference numerals have been given, but allocated a "prime" index, and also a set of components allowing connection of the ETHERNET transmission medium.

This set includes the RJ45 connector 261 connected to the conductors 262, a transformer isolation filter 263 connected to the conductors 262 and to the sending/receiving pairs 264, and an ETHERNET microcontroller 265 connected to the pairs 264 and to the microcontroller bus 55'.

The information given above about the manner of procuring or producing the microcontroller 52, the sending/receiving controller 56, the radio module 61, the transformer isolation filter 163 and the ETHERNET microcontroller 165 are valid respectively for the microcontroller 52', the sending/receiving controller 56', the radio module 61', the filter 263 and the ETHERNET microcontroller 265.

The content of the memories 57' to 59' is similar to that of the memories 57 to 59, with however the content of the random access memory 59' being a little different, a certain number of counters being provided in the working memory 65', the space 66' for its part being occupied by a number of additional buffers.

Figure 54:
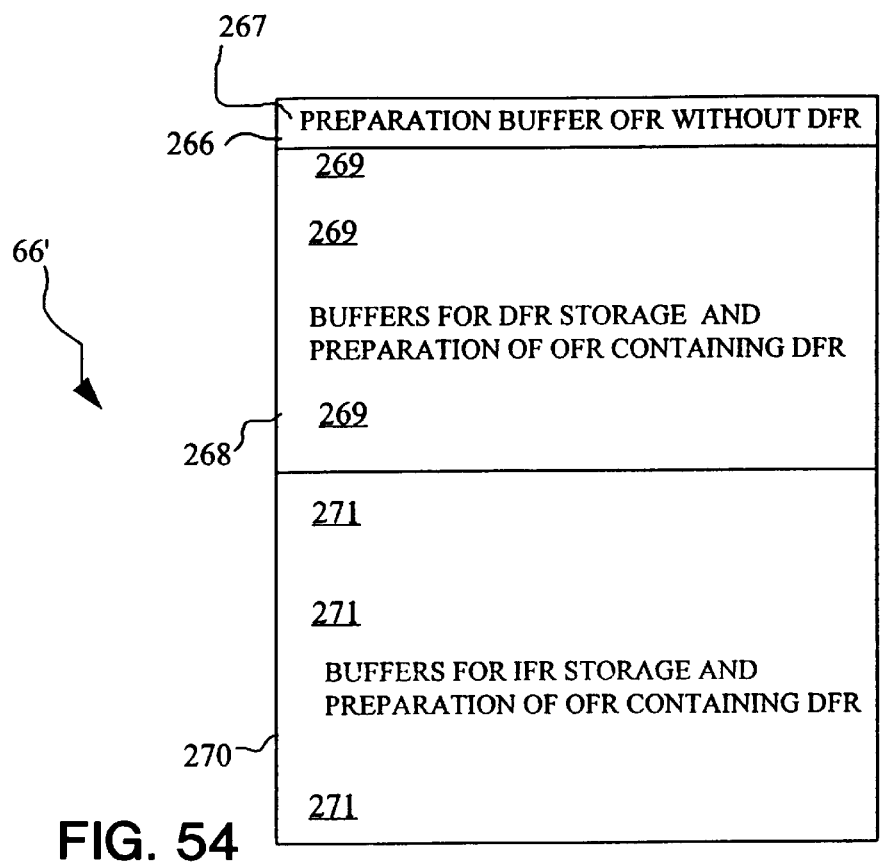
FIG. 54 is a diagram showing the composition of the space provided for frame buffers in the random access memory of this central means.

As can be seen in FIG. 54, the latter space includes a space 266 containing a memory 267 which is identical and having the same use as the memory 70 of the central means 21, a space 268 containing a certain number of buffers 269 for storing a data frame 12 and preparing a downlink frame as shown in FIG. 5, that is to say containing a data frame, each of the memories 269 being arranged like the memories 68 of the central means 21, and being used for storing, in its data frame area, a data frame reaching the central means 21' over the ETHERNET transmission medium, and then for preparing a downlink frame with which the means 21' will retransmit this data frame, and finally a space 270 containing a certain number of buffers 271 identical to the memories 68 of the central means 21, and having the same use.

Figure 55:
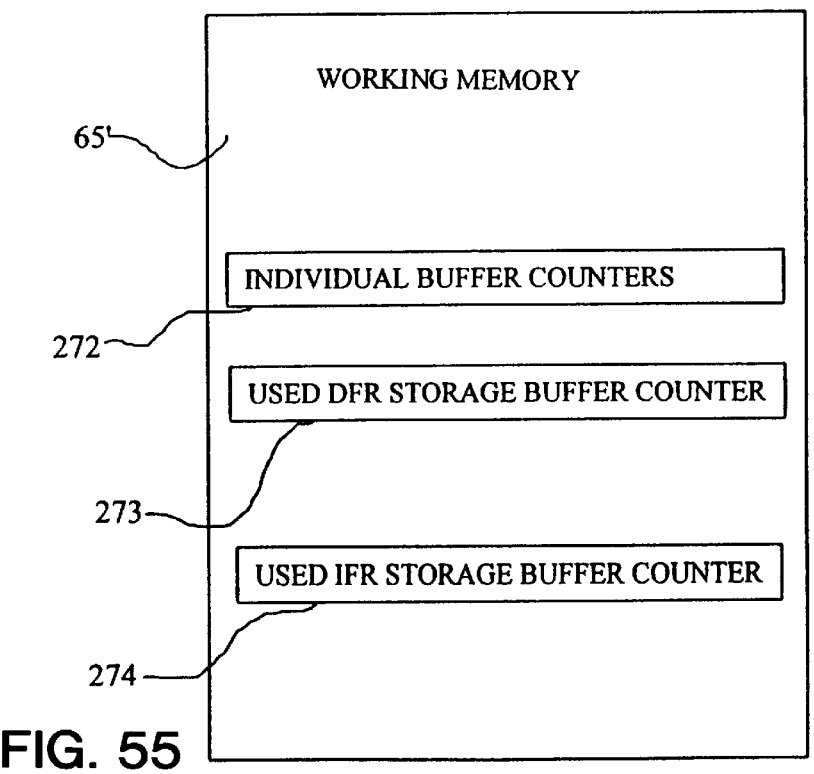
FIG. 55 is a diagram showing certain elements of the working memory provided in this random access memory.

The working memory 65', as can be seen in FIG. 55, has an assembly 272 including an individual counter for each buffer 269 and 271, a counter 273 of the number of buffers 269 used, and a counter 274 of the number of buffers 271 used.

The counters 272 each make it possible to know whether the buffer with which it is associated is respectively free, occupied by a data frame which must be transmitted by one or other of the radio or ETHERNET shared transmission media, or occupied by a data frame which must be transmitted over each of its media, the counters 273 and 274 serving respectively to determine whether there is saturation, that is to say absence of a free buffer, respectively in the space 268 and in the space 270.

Figure 56:
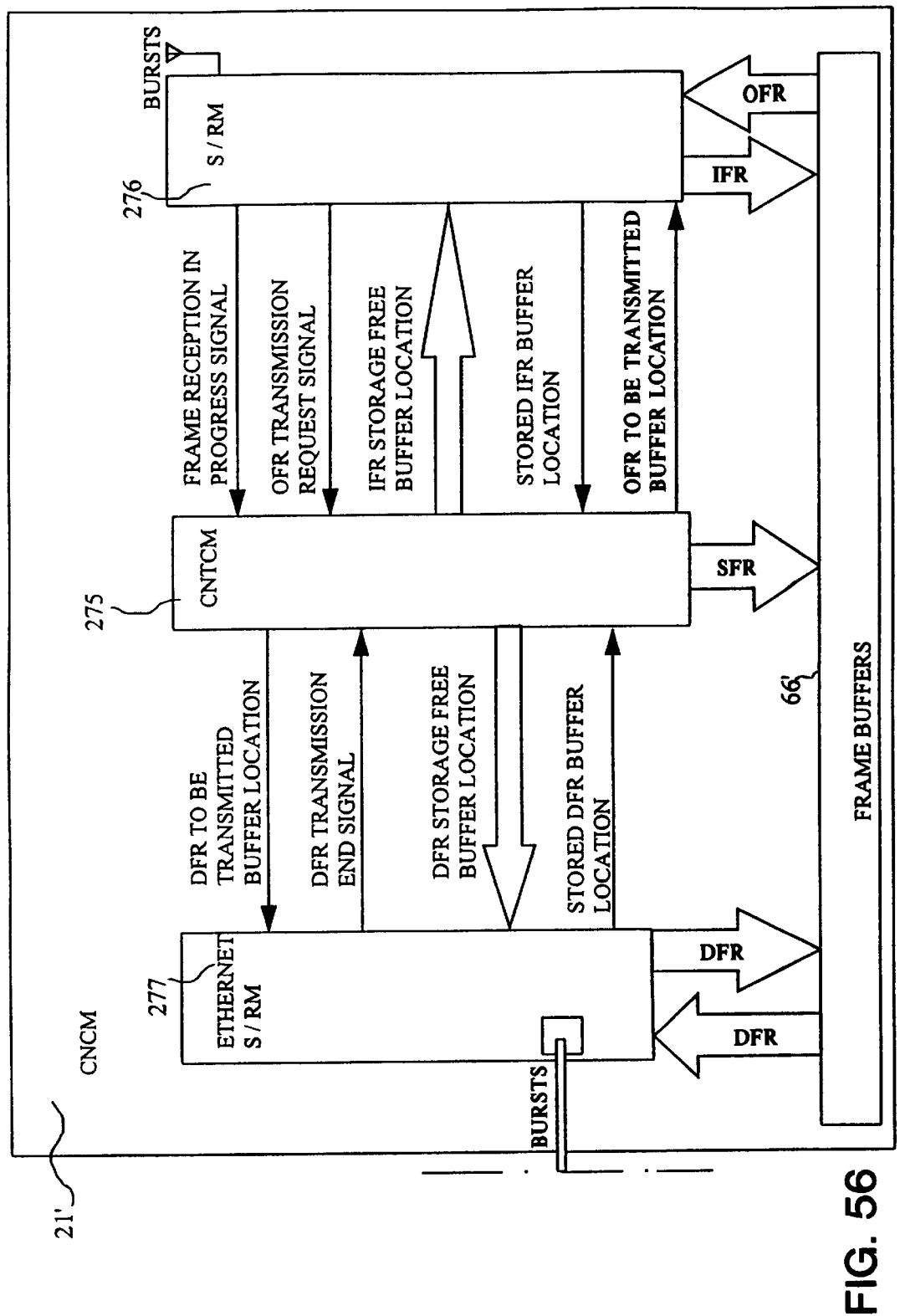
FIG. 56 is a functional diagram of this embodiment of the central networked communication means.

On the functional level, as shown in FIG. 56, the central means 21' includes, in general terms, a central transmission control means 275, a means 276 of sending/receiving over the shared radio medium, and a means 277 of sending/receiving over the shared ETHERNET medium.

The means 275 and 276 exchange the same information as the means 73 and 74 of the central means 21, and carry out writing/reading operations in the frame buffer space 66', similar to those performed by the means 73 and 74 of the central means 21 in the space 66.

The central transmission control means 275 and the ETHERNET sending/receiving means 277 for their part exchange the same information as the means 185 and 187 of the communication converter 160, with the means 277 performing writing/reading operations in the memory space 66', similar to those performed by the means 187 in the memory space 176.

Figure 57:
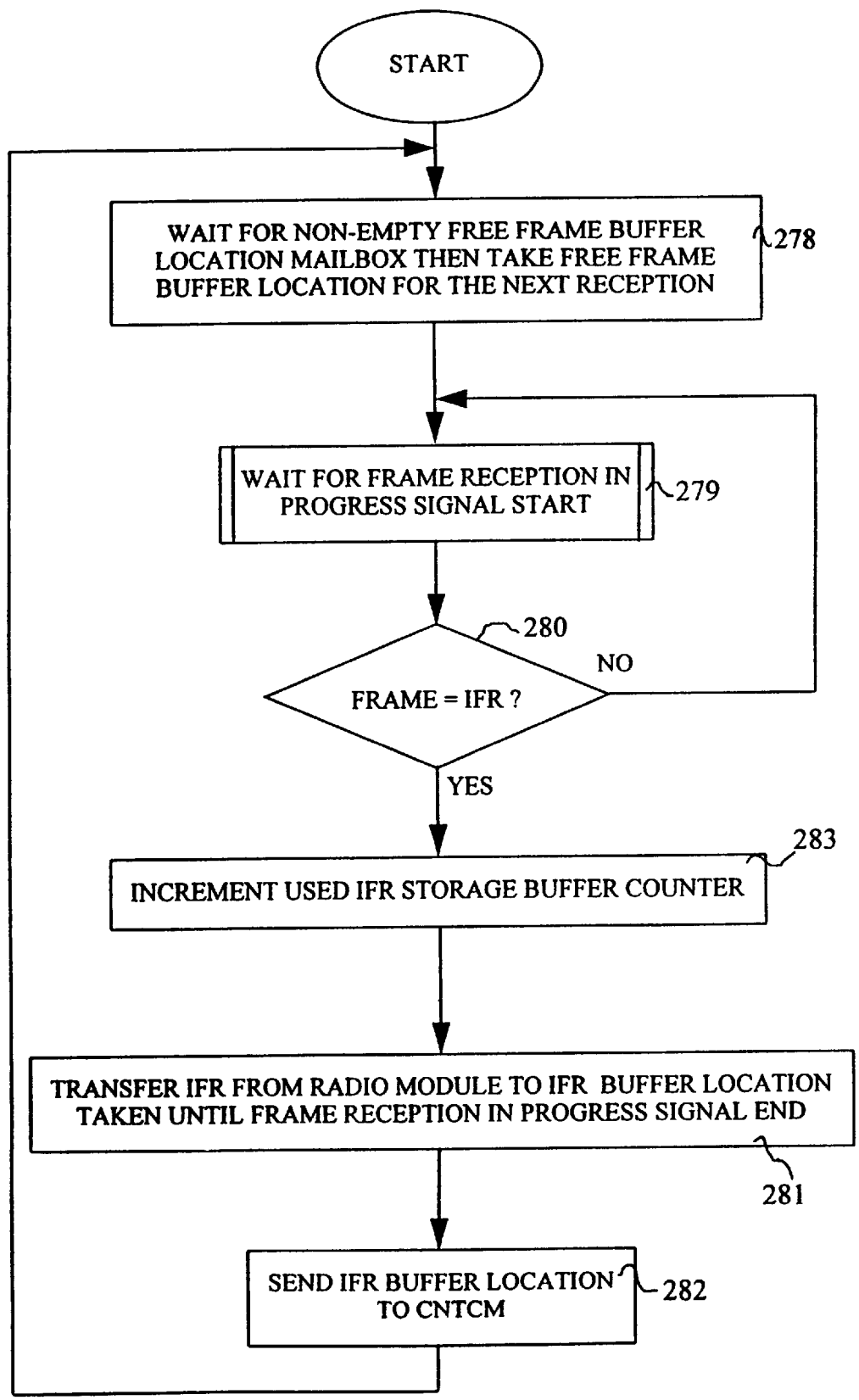
FIG. 57 is a flow diagram illustrating the functioning of the reception management means which this sending/receiving means of this central means has.

The description given above for the sending/receiving means 74 is valid for the sending/receiving means 276, with the exception of the functioning of its reception management means, which is illustrated by the flow diagram in FIG. 57.

As can be seen by comparing the latter figure with FIG. 16, the reception management means of the sending/receiving means 276 performs in a loop the same series of operations as the management means 76, the operations 278 to 282 corresponding respectively to the operations 83 to 87, but with in addition, when the test 280 is positive, an operation 283 in which the reception management means of the means 276 increments the counter 274 by the number of buffers 271 used.

It will be observed that, where there is no buffer 271 available for the reception of an uplink frame, the reception management means of the means 276 remains blocked at the operation 278, and therefore ignores any frames which the radio module might deliver to it.

The transmission control means 275 will now be described with reference to FIGS. 58 to 64.

Figure 58:
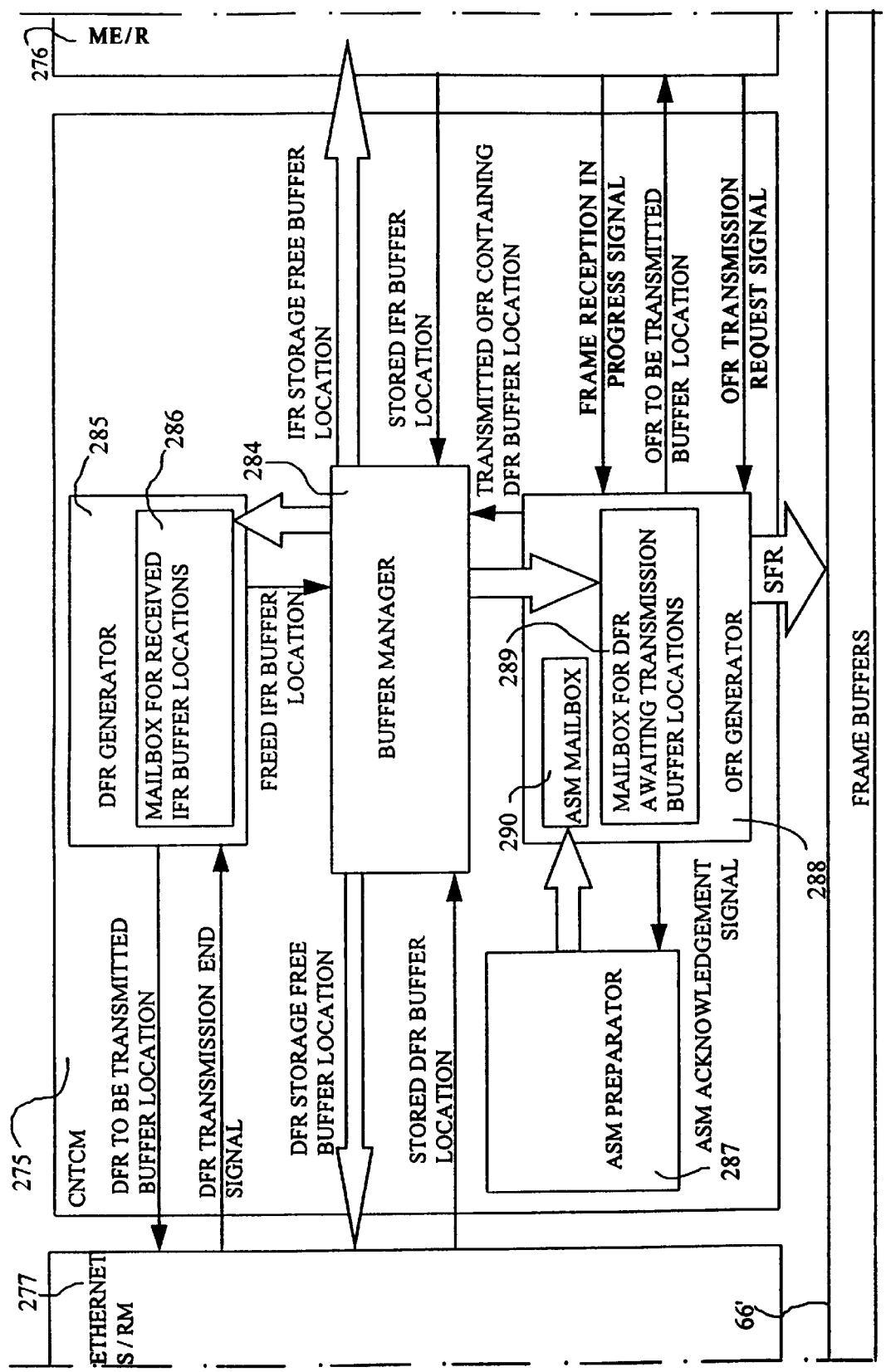
FIG. 58 is a partial functional diagram of this central communication means, showing particularly the central transmission control means which it has.

As shown in FIG. 58, the control means 275 includes a buffer management means 284, a data frame production means 285 including a mailbox 286 in which the management means 284 posts buffer memory locations 271, an authorisation-to-send message preparation means 287, and a downlink frame production means 288, including a mailbox 289 in which the management means 284 posts memory locations 269 to 271, and a mailbox 290 in which the preparation means 287 posts authorisation-to-send messages as it prepares them.

The data frame production means 285 has a functioning similar to that of the production means 205 of the communication converter 160, the description given above for its functioning, notably with regard to FIG. 47, being valid for the production means 285 provided that the references to the sending/receiving means 187, the mailbox 206 and the management means 201 are changed respectively to references to the ETHERNET sending/receiving means 277, the mailbox 286 and the management means 284.

The authorisation-to-send message preparation means 287 has the same functioning as the means 94 of the central means 21, the description given above notably with reference to FIG. 20 also being valid for the preparation means 287, provided that the references to the production means 95, the mailbox 97 and the table 64 are changed respectively to references to the production means 288, the mailbox 290 and the table 64'.

Figure 59:
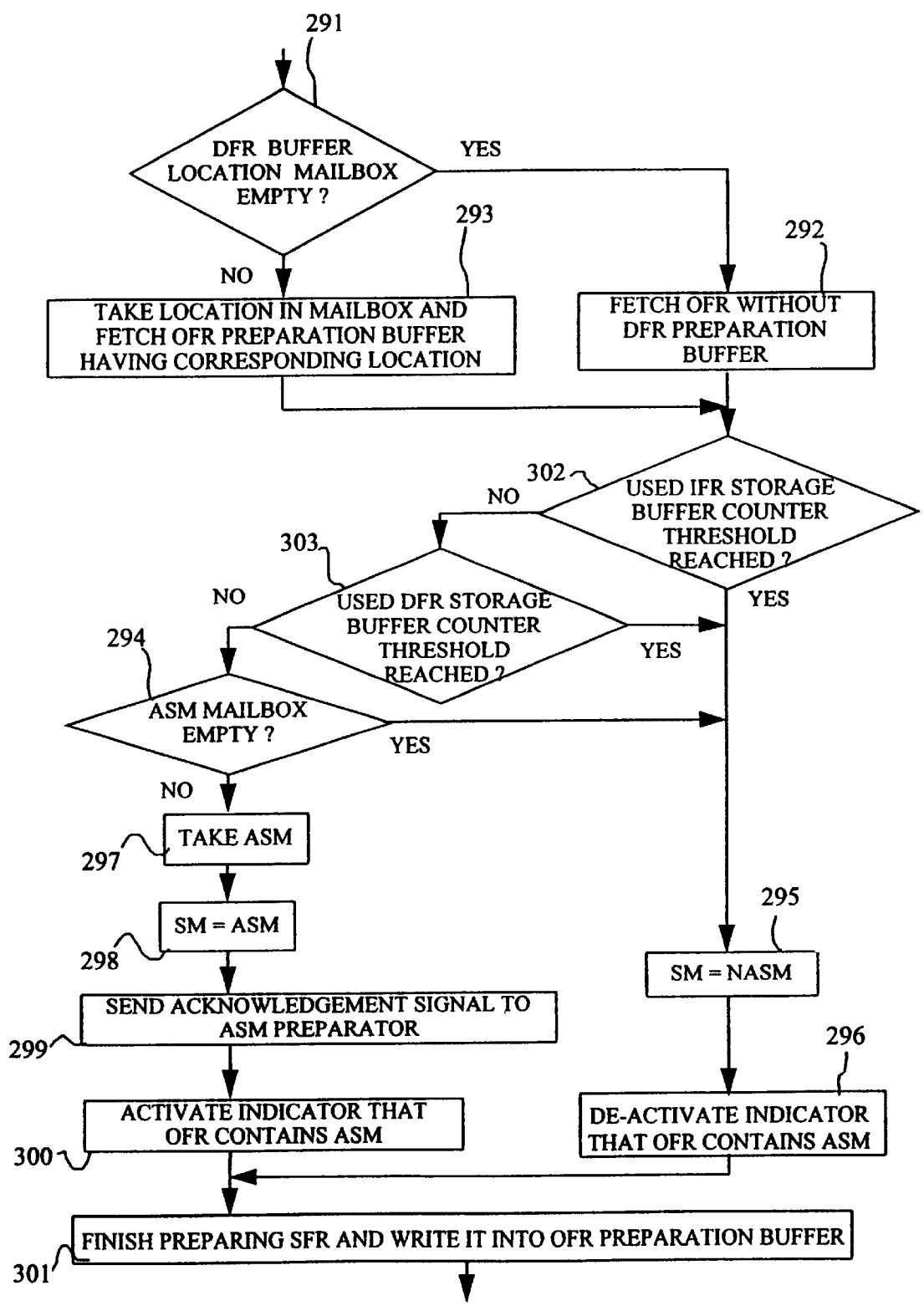
FIG. 59 is a flow diagram illustrating the operation of preparing a downlink frame performed by the downlink frame production means shown in FIG. 58.

The functioning of the production means 288 is similar to that of the production means 95 of the central means 1, the production means 288 having a constitution similar to that shown in FIG. 21, the authorisation controlling means which it includes having a functioning similar to that shown in FIG. 22, and the preparation means which it includes has a functioning similar to that shown in FIG. 23, with however the operation of preparing a downlink frame being not the one shown in FIG. 24 but the one illustrated by the flow diagram in FIG. 59.

As can be seen by comparing FIGS. 24 and 59, the operation of preparing a downlink frame performed by the production means 288 includes operations 291 to 301 which are respectively the same as the operations 122 to 132 of the operation 120, but after having accomplished one or other of the operations 292 or 293, the production means 288 goes to the test 294 only if the tests 302 and 303 are negative, the operation 295 being performed not only when the test 294 is positive but also when one or other of the tests 302 or 303 is positive.

In the test 302, the production means 288 determines whether the saturation threshold of the memory space 270 is attained, that is to say a predetermined number of buffers 271 are occupied, this test being performed in practice by determining whether or not the counter 274 has reached a value equal to this predetermined number.

The test 303 performed by the production means 288 is similar, but for the buffers 269 of the space 268, in practice by means of the counter 273.

It will be observed that, where one or other of the spaces 268 or 270 is saturated, the production means 288 includes, in the downlink frame which it is in the process of preparing, a service message of the no-authorisation-to-send message type, so that, as soon as it has transmitted the present downlink frame, the central means 21' can send a new downlink frame, so that a buffer 269 or 271 can be released as quickly as possible.

It should be stated in this regard that the reception management means of the sending/receiving means 276 remains locked on standby when it does not have any buffer location 271 available, that is to say when its mailbox is empty, so that any uplink frames which it may receive in the meantime are ignored, and it will be noted that a similar phenomenon occurs in the ETHERNET sending/receiving means 277.

In variants which are not illustrated the production means 288 is replaced by a production means having, with respect to it, the same differences as the production means 140 with respect to the production means 95 of the central means 1.

In other variants, the preparation means 287 is replaced by a preparation means differentiated from it in the same way as the preparation means 94' is differentiated from the preparation means 94 of the central means 21, and the production means 288 is replaced by a production means differentiated in the same way as the production means 95' or 140' is differentiated from the production means 95 of the central means 21.

The buffer management means 284 will now be described with the help of FIGS. 60 to 64.

Figure 60:
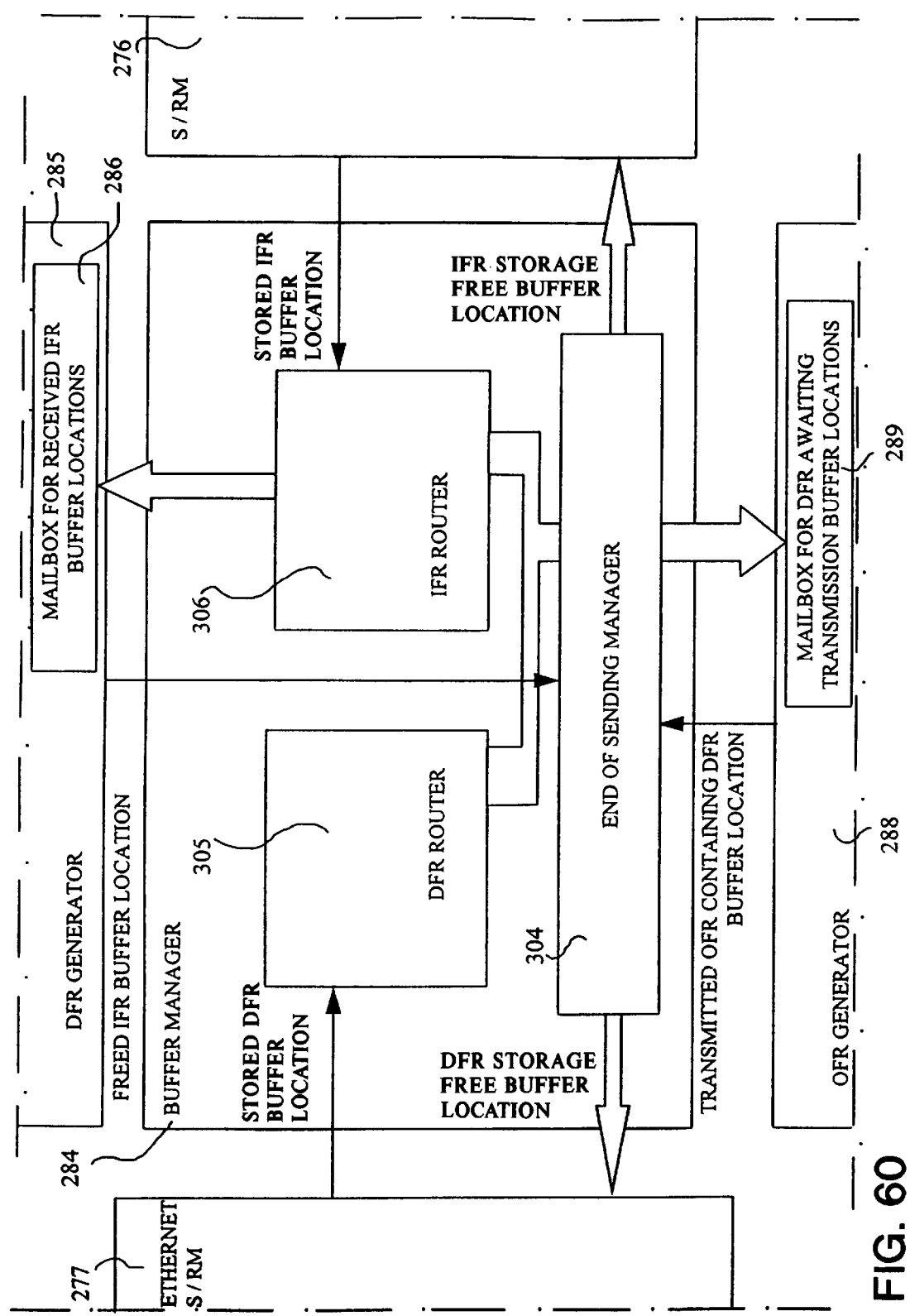
FIG. 60 is a partial functional diagram of the second embodiment of the central networked communication means, showing particularly its buffer management means.

As can be seen in FIG. 60, the management means 284 includes an end-of-sending management means 304 which posts buffer locations 269 and 271 respectively in the mailbox of the reception management means of the sending/receiving means 277 and of the sending/receiving means 276, a data frame routing means 305 which posts in the mailbox 289 buffer locations 269 which have been communicated to it by the sending/receiving means 277, and an uplink frame routing means 306 which posts in the mailboxes 286 and 289 buffer locations 271 which have been communicated to it by the sending/receiving means 276.

Figure 61:
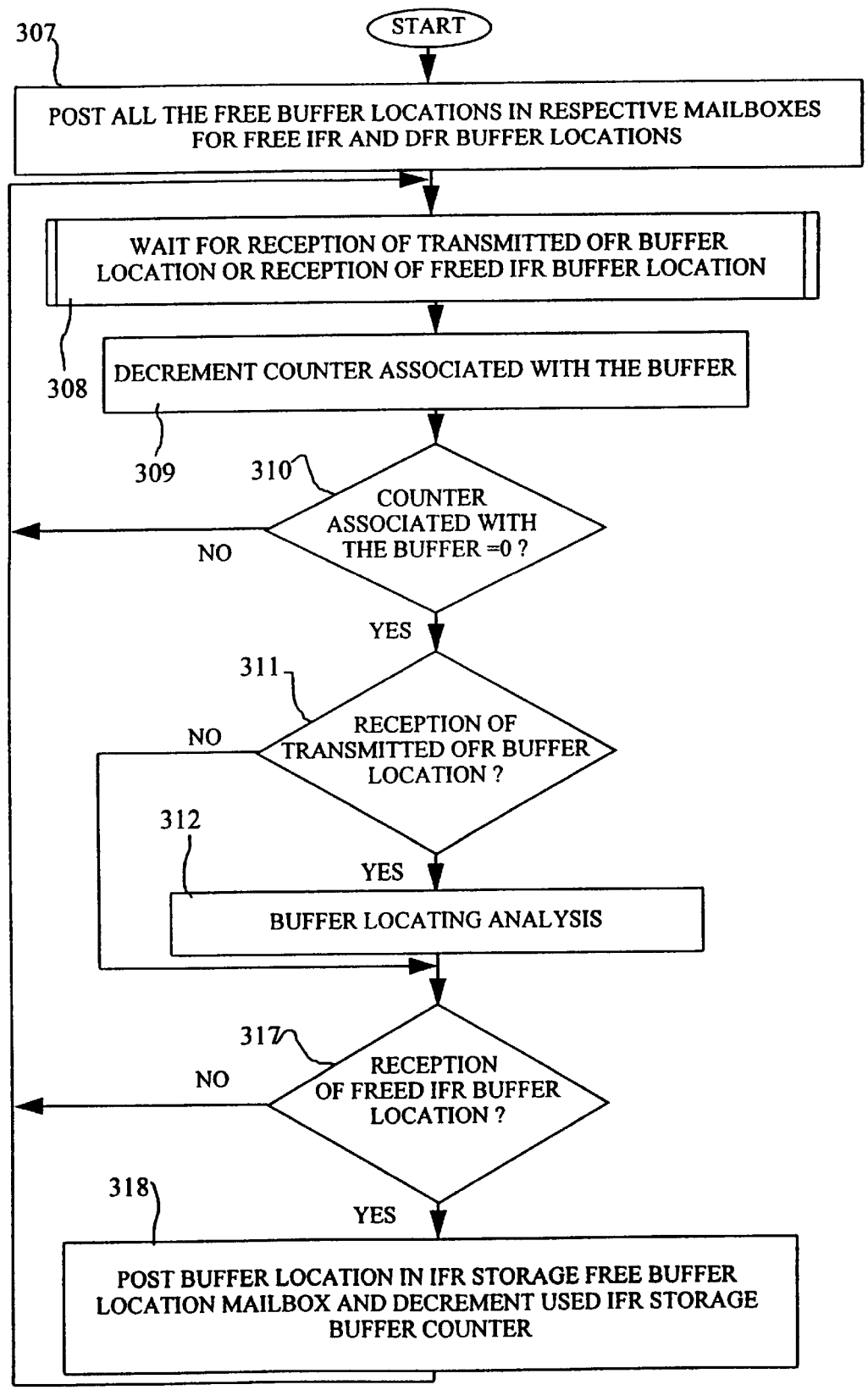
FIG. 61 is a flow diagram illustrating the functioning of the end-of-sending management means which this buffer management means has.

The functioning of the end-of-sending management means 304 is illustrated by the flow diagram in FIG. 61.

After start-up, it performs an operation 307 in which it posts the location of each of the memories 269 in the mailbox of the reception management means of the sending/receiving means 277, and each of the memory locations 271 in the mailbox of the reception management means of the sending/receiving means 276.

Once the operation 307 has been accomplished, the management means 304 enters a loop, where it begins by performing the operation 308 of waiting until it receives, from the downlink frame production means 288, the location of a buffer memory 269 or 271 containing a downlink frame which has just been transmitted over the shared radio medium, hereinafter referred to as the first event, or else until it receives from the production means 285 the location of a buffer memory 271 containing a downlink frame which has just been transmitted over the shared ETHERNET medium, hereinafter referred to as the second event.

Figure 62:
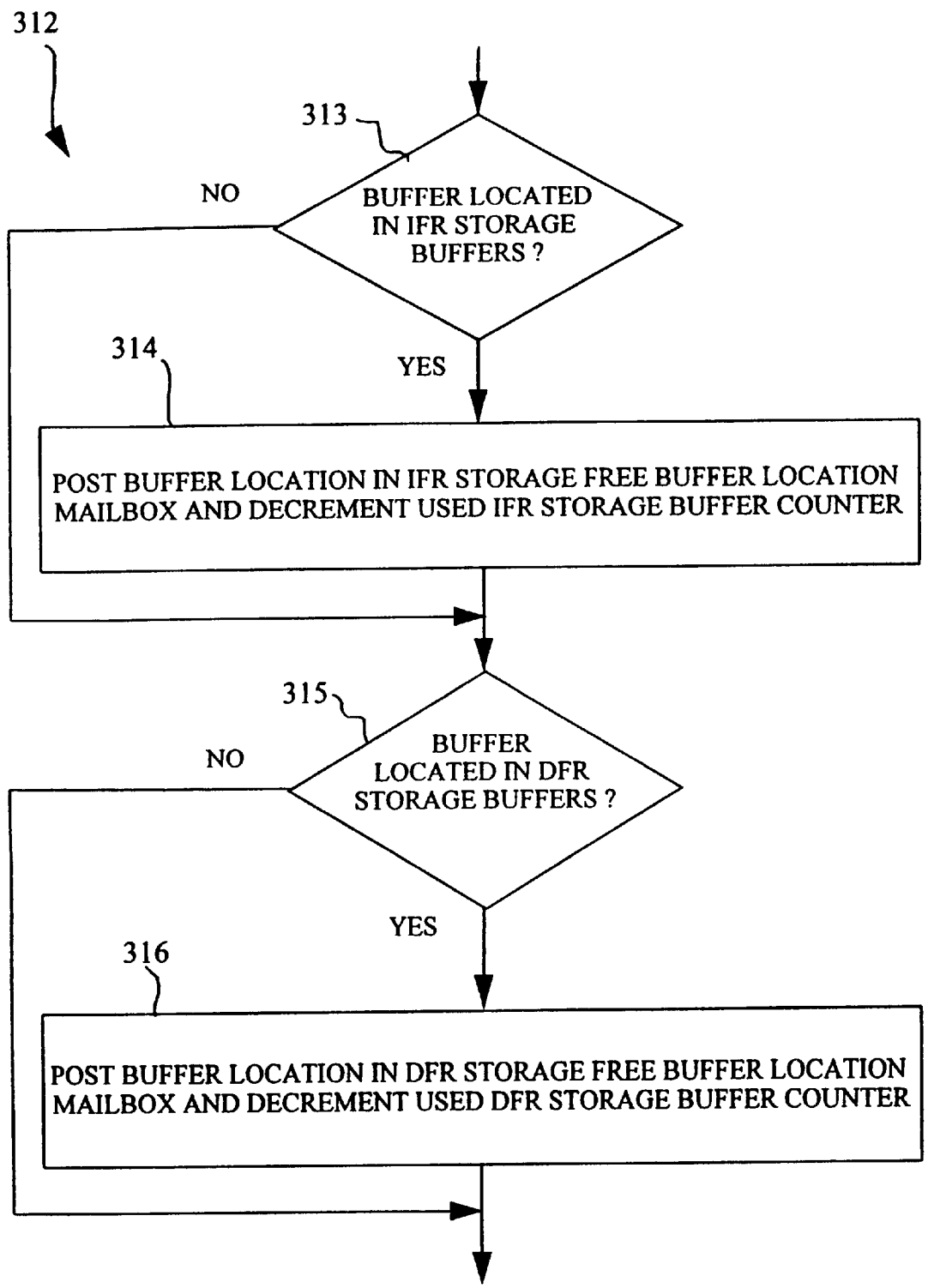
FIG. 62 is a flow diagram setting out the operation of analysing the location of the buffer, shown in FIG. 61.

When one or other of these two events occurs, the management means 304 goes to an operation 309 in which it decrements the individual counter, forming part of the assembly 272, associated with the memory 269 or 271 whose location it has just received, and then the management means 304 performs a test 310 in which it determines whether or not the individual counter which has just been decremented is at zero. As will be seen below, because of the values to which the routing means 305 or 306 takes the individual counter and the decrementation performed in the operation 309, the individual counter can be at zero only if the data frame of the buffer with which it is associated has been transmitted everywhere where it ought to have been, that is to say, according to circumstances, over the shared radio medium, over the shared ETHERNET medium, or over both of them.

Where the test 310 is positive, the management means 304 performs the test 311 in which it determines whether the interruption of the waiting 308 has been produced by the first or the second event.

Where the test 311 is positive, that is to say where it is the reception of a buffer location coming from the downlink frame production means 288 which has occurred, the management means 304 performs an operation 312 of analysing the location of this buffer, the detail of which is given in FIG. 62.

The operation 312 begins with a test 313 in which the management means 304 determines whether or not the buffer whose location it has just received is in the space 370.

When the result of the test 313 is positive, that is to say when the memory whose location it has just received is a memory 271, the management means 304 performs the operation 314 in which it posts the location of this memory 271 in the mailbox of the reception management means of the sending/receiving means 276, and in which it decrements, with a step of one unit, the counter 274 of the buffer 271 used.

Once the operation 314 has been accomplished, or where the test 313 is negative, the management means 304 performs a test 315 in which it determines whether or not the buffer location which it has just received forms part of the space 268.

When the result of the test 315 is positive, that is to say when it is a case of a buffer 269, the management means 304 performs an operation 316 of the same type as the operation 314 but with regard to the data frames received by the ETHERNET shared medium, that is to say an operation in which it posts the buffer location which it has just received in the mailbox of the reception management means of the sending/receiving means 277, and in which it decrements the counter 273.

The operation 312 ends once the operation 316 is accomplished, or when the result of the test 315 is negative.

Once the operation 312 is accomplished, or when the result of the test 311 is negative, that is to say when it was not the first event which had caused the interruption of the waiting operation 308, the management means 304 performs the test 317 in which it determines whether or not the second event has just occurred.

In the affirmative, that is to say where the location received comes from the data frame production means 285, the management means 304 performs an operation 318 identical to the operation 314, that is to say an operation in which it posts the location of the buffer memory 271 received in the mailbox of the reception management means of the sending/receiving means 276, and in which it decrements, with a step of one unit, the counter 274.

Once the operation 318 has been accomplished, or when the result of the test 317 is negative or when the result of the test 310 is negative, the sending management means 304 returns to the start of the loop, and will therefore perform, throughout its functioning, the series of operations which has just been described, with the exception obviously of the initialisation operation 307, which it performs only just after start-up.

Figure 63:
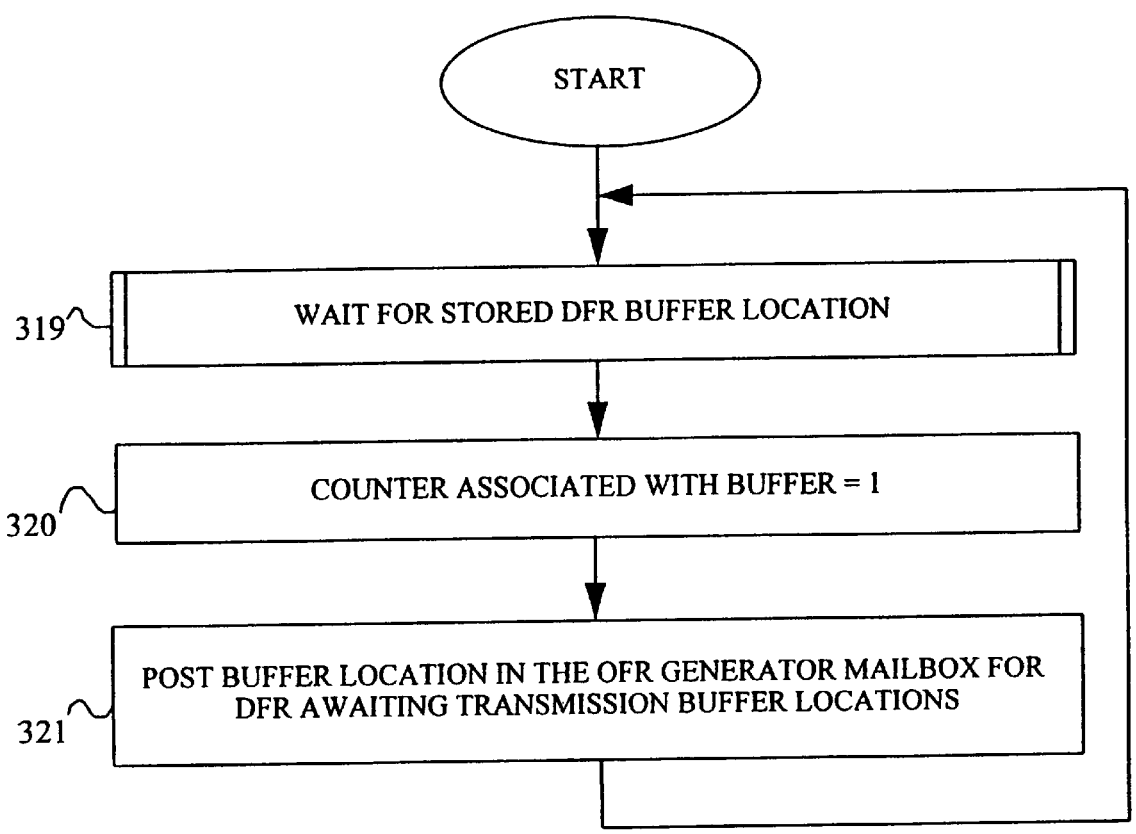
FIGS. 63 and 64 are flow diagrams illustrating the functioning respectively of the data frame routing means and of the uplink frame routing means of the buffer management means shown in FIG. 60.

The functioning of the data frame routing means 305 is illustrated by the flow diagram in FIG. 63.

Directly after start-up, the means 305 enters a loop where it begins by performing the operation 319 of waiting until it receives, from the ETHERNET sending/receiving means, and more precisely from its reception management means, a memory location 269 in the data frame area of which the sending/receiving means 277 has stored a data frame received by means of the ETHERNET shared transmission medium.

When this event occurs, the routing means 305 goes to an operation 320 in which it puts the number 1 in the individual counter, forming part of the assembly 272, associated with this buffer 269, and then goes to the operation 321 in which it posts the location of this buffer in the mailbox 289 of the production means 288.

Once the operation 321 has been accomplished, the data frame routing means 305 returns to the start of the loop, and will therefore perform, throughout its functioning, the series of operations which has just been described.

Figure 64:
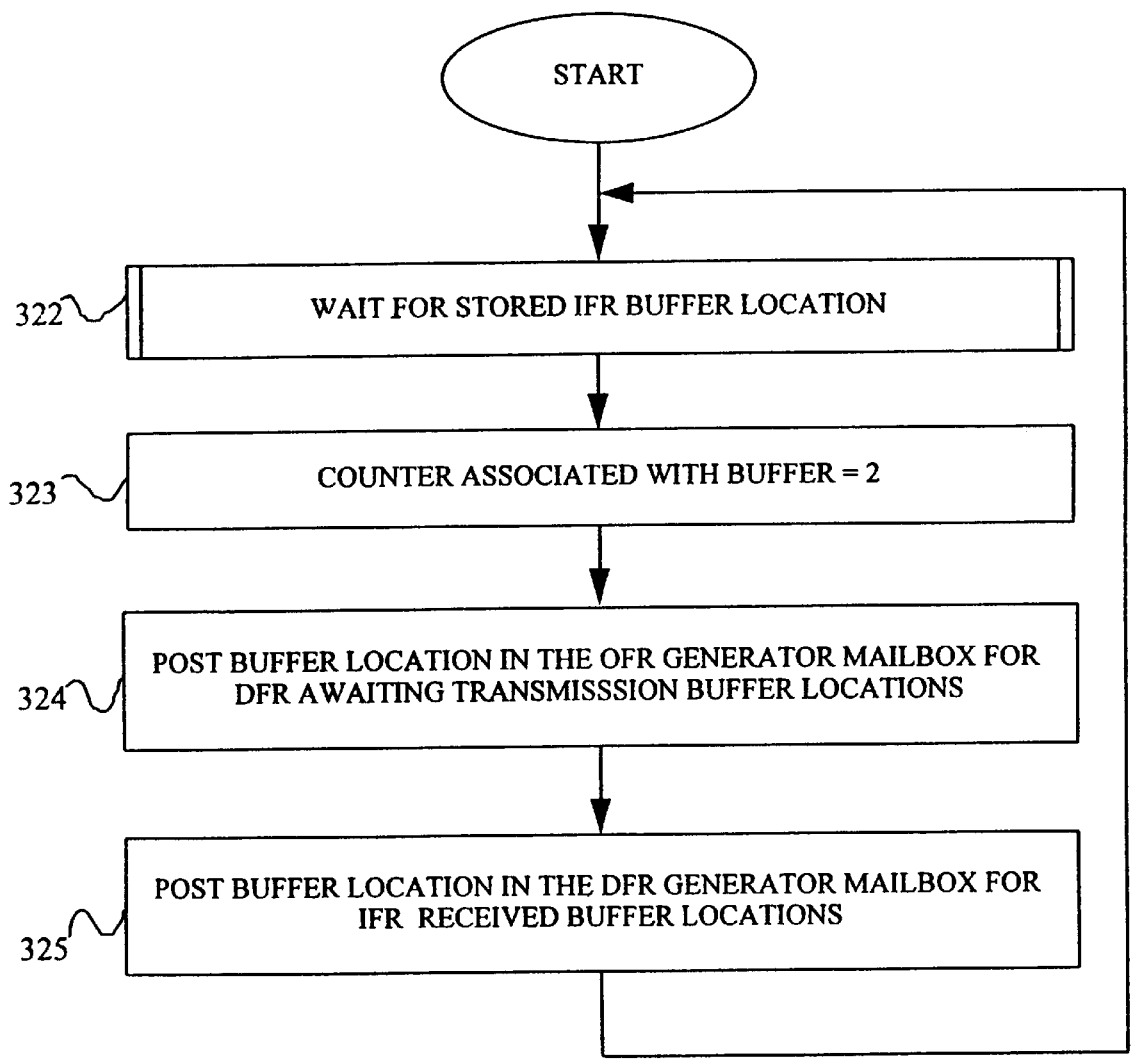

The functioning of the uplink frame routing means 306 is illustrated by the flow diagram in FIG. 64.

Directly after start-up, the means 306 performs an operation 322 in which it waits until it receives, from the sending/receiving means 276, and more precisely from the reception management means thereof, a buffer memory location 271 in which an uplink frame has just been stored.

When this event occurs, the means 306 performs an operation 323 in which it puts the number 2 in the individual counter, forming part of the assembly 272, associated with this buffer 271, and then it goes to an operation 324 in which it posts the location of this buffer in the mailbox 289 of the production means 288, and an operation 325 in which it posts this location in the mailbox 286 of the production means 285.

Once the operation 325 has been accomplished, the means 306 returns to the start of the loop and will therefore perform, throughout its functioning, the series of operations which has just been described.

It can be seen that, when an uplink frame is stored in a memory 271, the routing means 306 passes the individual counter of this memory to the number 2, so that the first time that one or other of the production means 285 and production means 288 has delivered the location of this memory to the end-of-sending management means 304, the test 310 is negative, and it will be necessary to wait until the second of the production means 285 and 288 has delivered this location to the management means 304, so that the test 310 becomes positive, and this location is delivered to the reception management means of the sending/receiving means 276.

Figure 65:
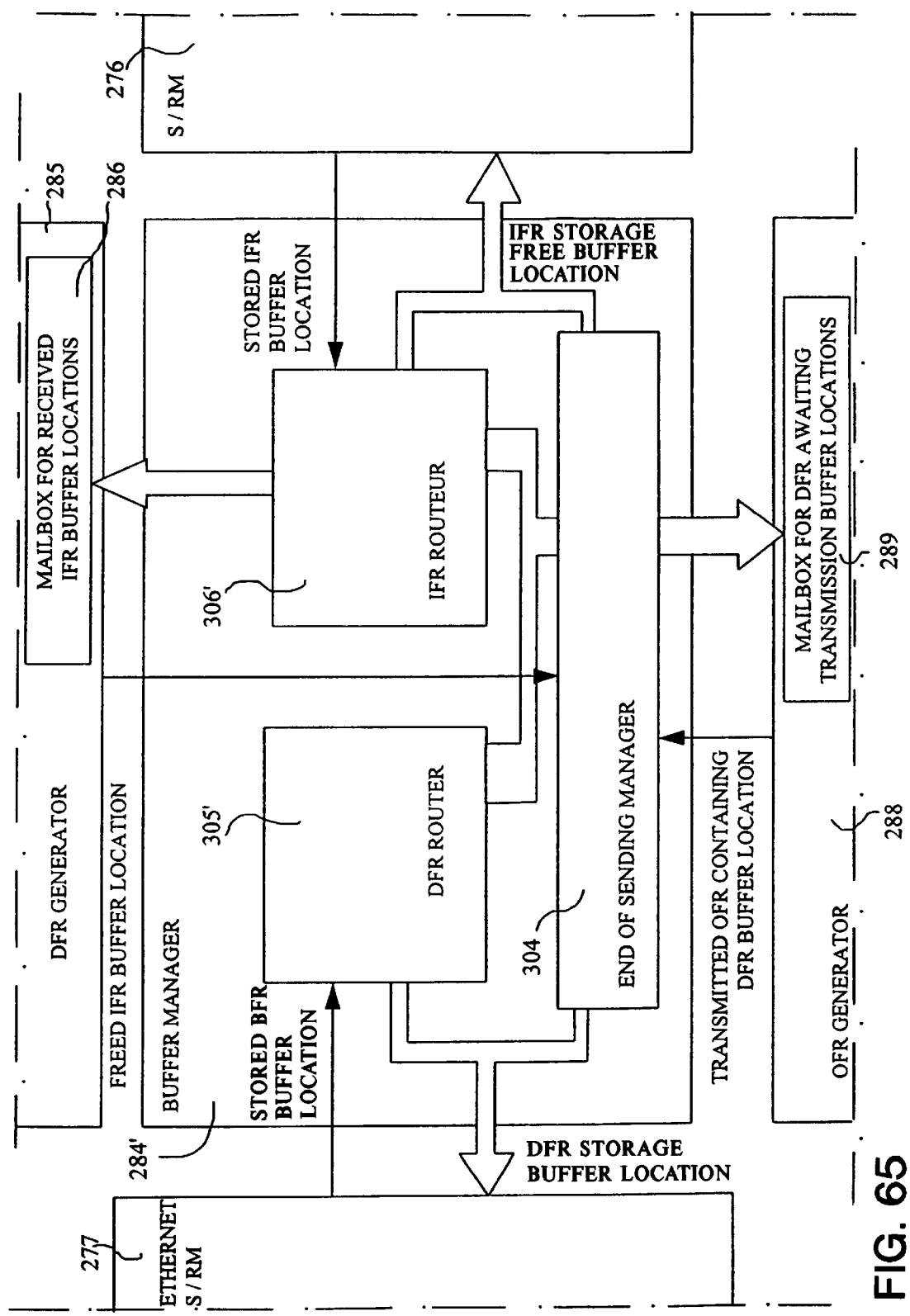
FIG. 65 is a diagram similar to that in FIG. 60, for a variant of the buffer management means in which the data frame and uplink frame routing means effect a filtering.

A variant 284' of the buffer management means 284 will now be described with reference to FIGS. 65 to 67.

In general terms, the means 284' is similar to the means 284, but with the routing means 305 and 306 being replaced by routing means 305' and 306' which perform a filtering, that is to say, when the destination address appearing in the field 13 of the data frame stored in the memory location 269 delivered to it by the reception management means of the sending/receiving means 277, shows that this data frame is not destined for one of the peripheral means 24, the routing means 305 directly posts this location in the mailbox of the reception management means of the sending/receiving means 277, and likewise the uplink frame routing means 306' posts the location received, according to the destination address of the data frame stored, either in the mailbox 286 or in the mailbox 289, unless the address is a multi-destination (multicast) address, in which case the data frame is posted in both mailboxes.

Figure 66:
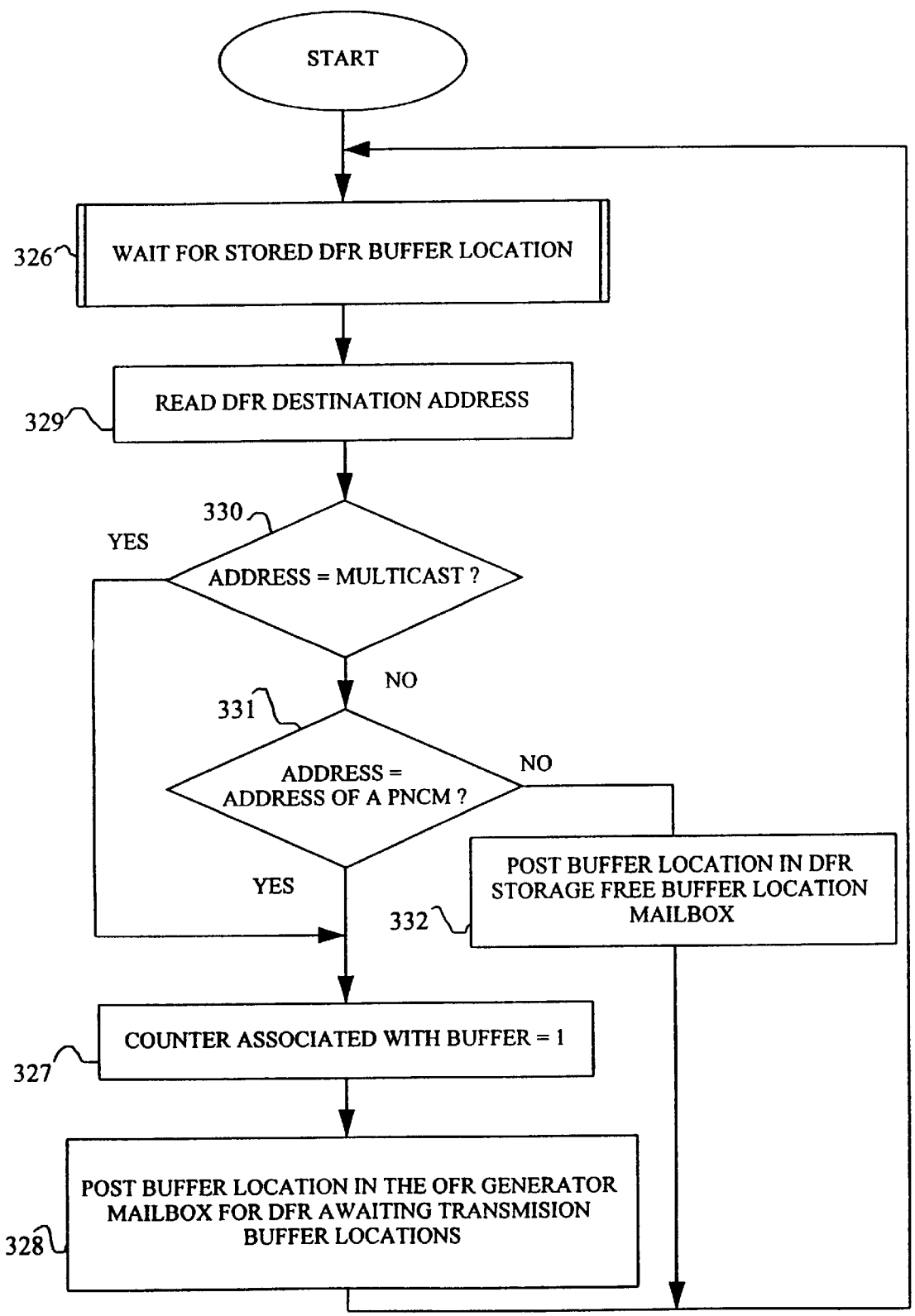
FIGS. 66 and 67 are flow diagrams illustrating respectively the functioning of the data frame routing means and of the uplink frame routing means shown in FIG. 65.

The functioning of the data frame routing means 305' is illustrated by the flow diagram in FIG. 66.

It can be seen, by comparing FIGS. 63 and 66, that the data frame routing means 305' performs, in a loop, a series of operations which includes operations 326 to 328 which are respectively identical to the operations 319 to 321 but, instead of going directly from the operation 326 to the operation 327, the means 305' goes to an operation 329 in which it reads the destination address contained in the field 13 of the data frame stored, and then goes to a test 330 in which it determines whether or not this address is a multicast address.

When the result 330 is negative, the means 305' goes to a test 331 in which it determines whether the destination address is that of a peripheral means 24.

When the result of the test 330 or that of the test 331 is positive, the means 305' goes to the operation 327 and then to the operation 328 before returning to the start of the loop, and when the result of the test 331 is negative, that is to say when the address is neither a multicast address nor the address of a peripheral means 24, the means 305' performs an operation 332 in which it directly posts, in the mailbox of the reception management means of the sending/receiving means 277, the buffer location 269 which has just been delivered to it, and once the operation 332 is accomplished it returns to the start of the loop.

Figure 67:
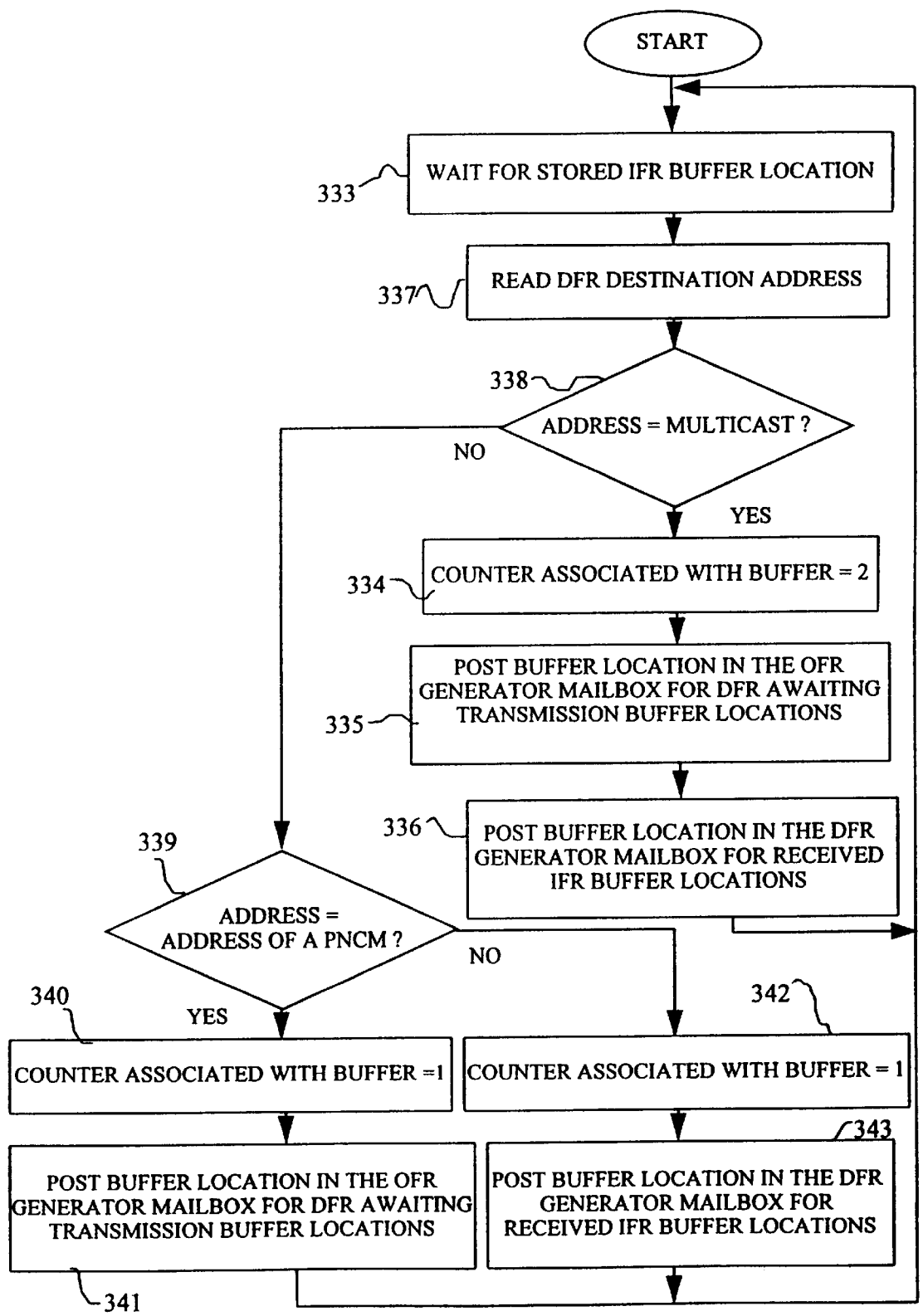

The functioning of the uplink frame routing means 306' is illustrated by the flow diagram in FIG. 67.

It can be seen, by comparing FIGS. 66 and 67, that the series of operations performed in a loop by the means 306' includes operations 333 to 336 which are respectively identical to the operations 332 to 325 but that, when leaving the waiting operation 333, instead of going to the operation 334, the means 306' goes to an operation 337 in which it reads the destination address contained in the field 13 of the memory location 271 which has just been delivered to it, and then goes to a test 338 in which it determines whether or not this address is a multicast address.

Where the test 338 is negative, the means 306' performs the operations 334 to 336 respectively similar to the operations 323 to 325, and then returns to the start of the loop.

Where the test 338 is negative, the means 306' determines, in the course of the test 339, whether or not the destination address is the address of a peripheral means 24.

In the affirmative, it performs the operation 340 of setting at the number 1 the counter associated with the memory 271 whose location has just been communicated to it, and then it performs an operation 341 in which it posts this location in the mailbox 289, and once the operation 341 has been accomplished the means 306' returns to the start of the loop.

When the test 339 is negative, the routing means 306' performs the operation 342 in which it sets at the number 1 the counter associated with the buffer situated at the location which it has just received, and then the operation 343 in which it posts this location in the mailbox 286. Once the operation 343 has been accomplished, the means 306' returns to the start of the loop.

The filtering operations performed by the routing means 305' and 306' can be performed directly by software means or else, as will be seen below, by hardware means by virtue of a content addressable memory.

The ETHERNET sending/receiving means 277 will now be described with reference to FIGS. 68 to 70.

Figure 68:
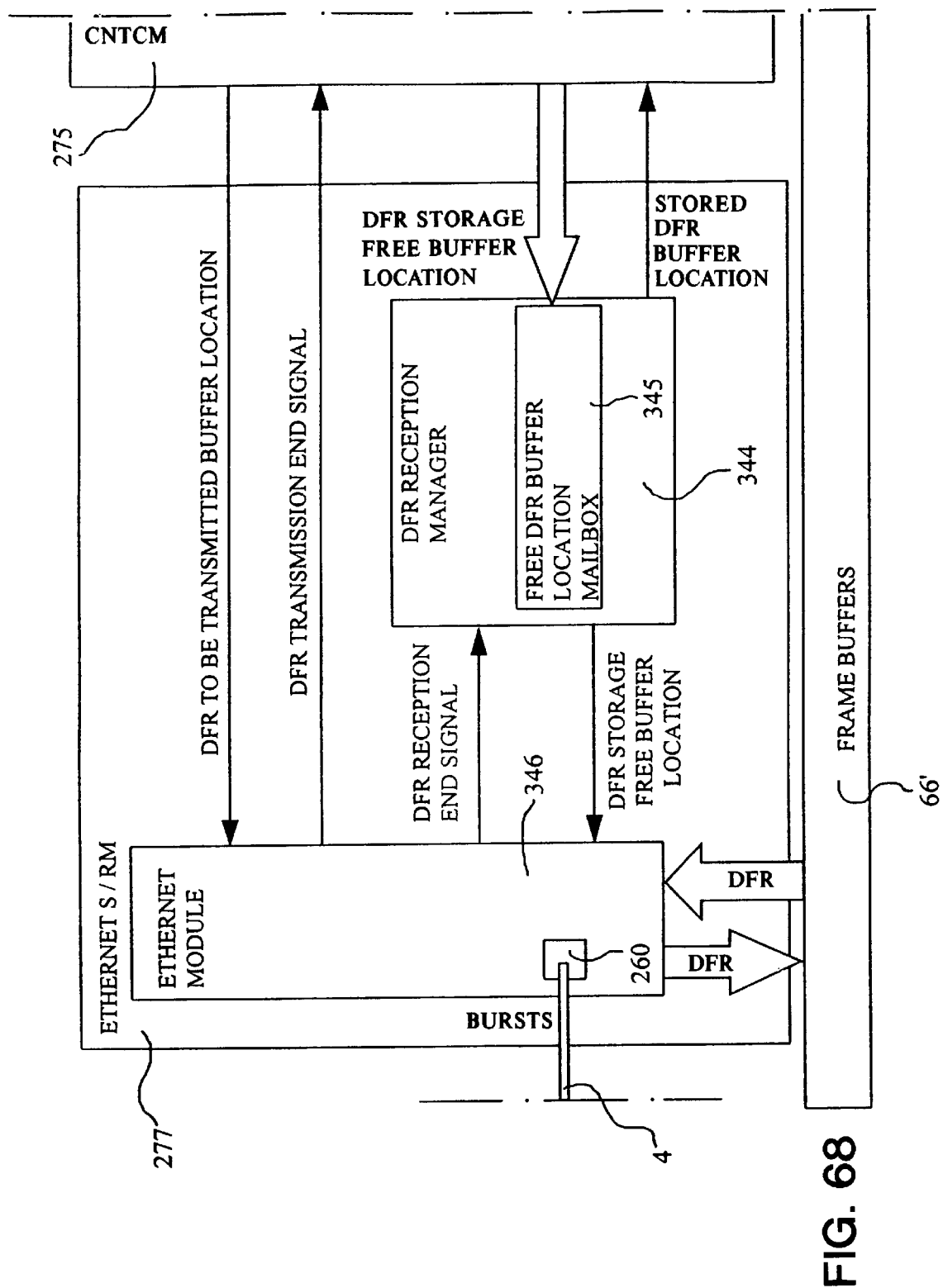
FIG. 68 is a partial functional diagram of the second embodiment of the central networked communication means, showing particularly the ETHERNET sending/receiving means.

As can be seen by comparing FIGS. 48 and 68, the sending/receiving means 277 of the central means 21' is similar to the sending/receiving means 187 of the communication converter 160, the components 344 to 346 corresponding respectively to the components 235 to 237.

Figure 69:
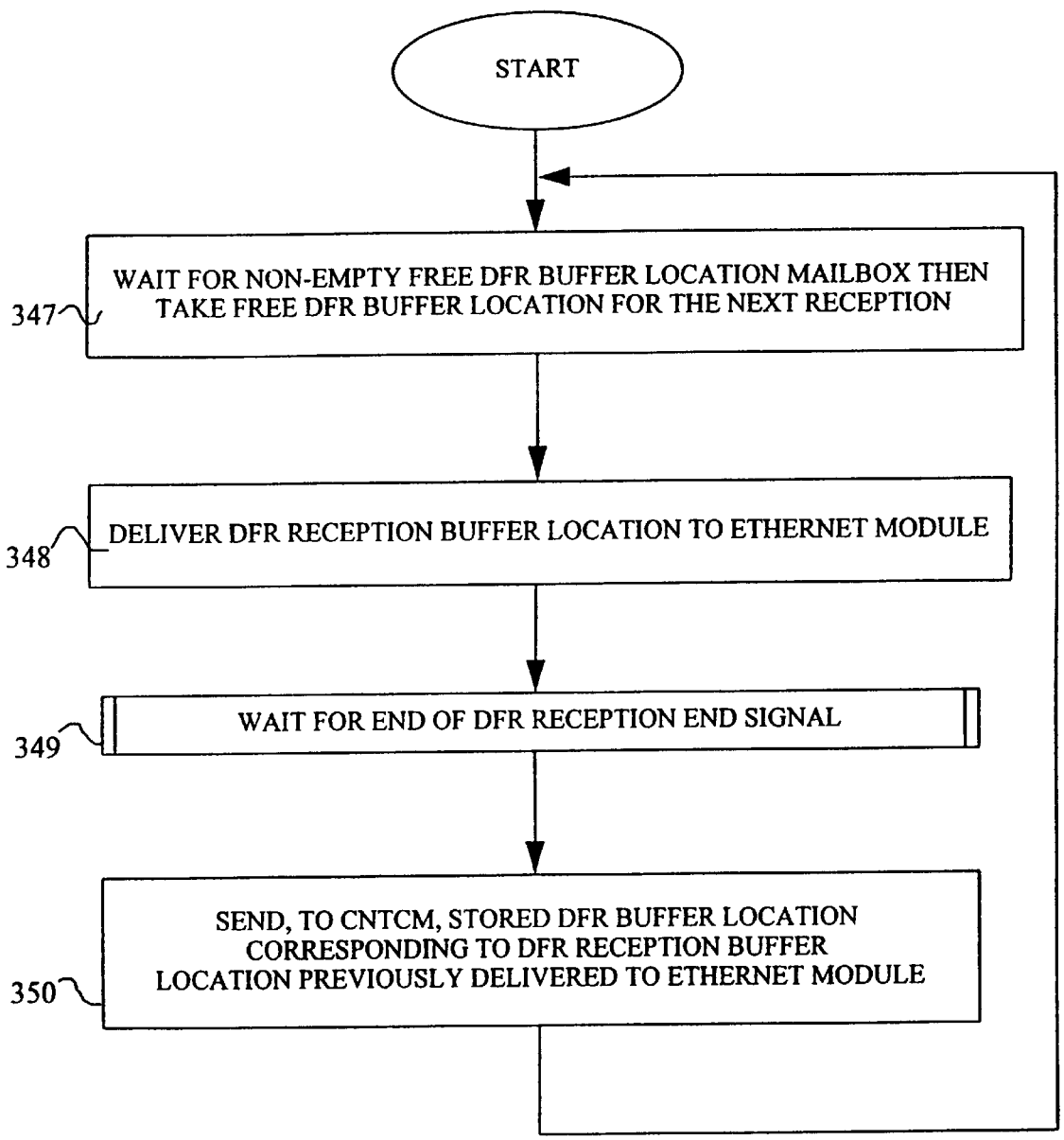
FIGS. 69 and 70 are flow diagrams illustrating the functioning respectively of the data frame reception management means and of the ETHERNET module shown in FIG. 68.

The functioning of the data frame reception management means 344 is illustrated by the flow diagram in FIG. 69.

As can be seen by comparing FIGS. 49 and 69, the management means 344 has the same functioning as the management means 235, the operations 347 to 350 which the management means 344 performs in a loop being respectively similar to the operations 238 to 241.

Figure 70:
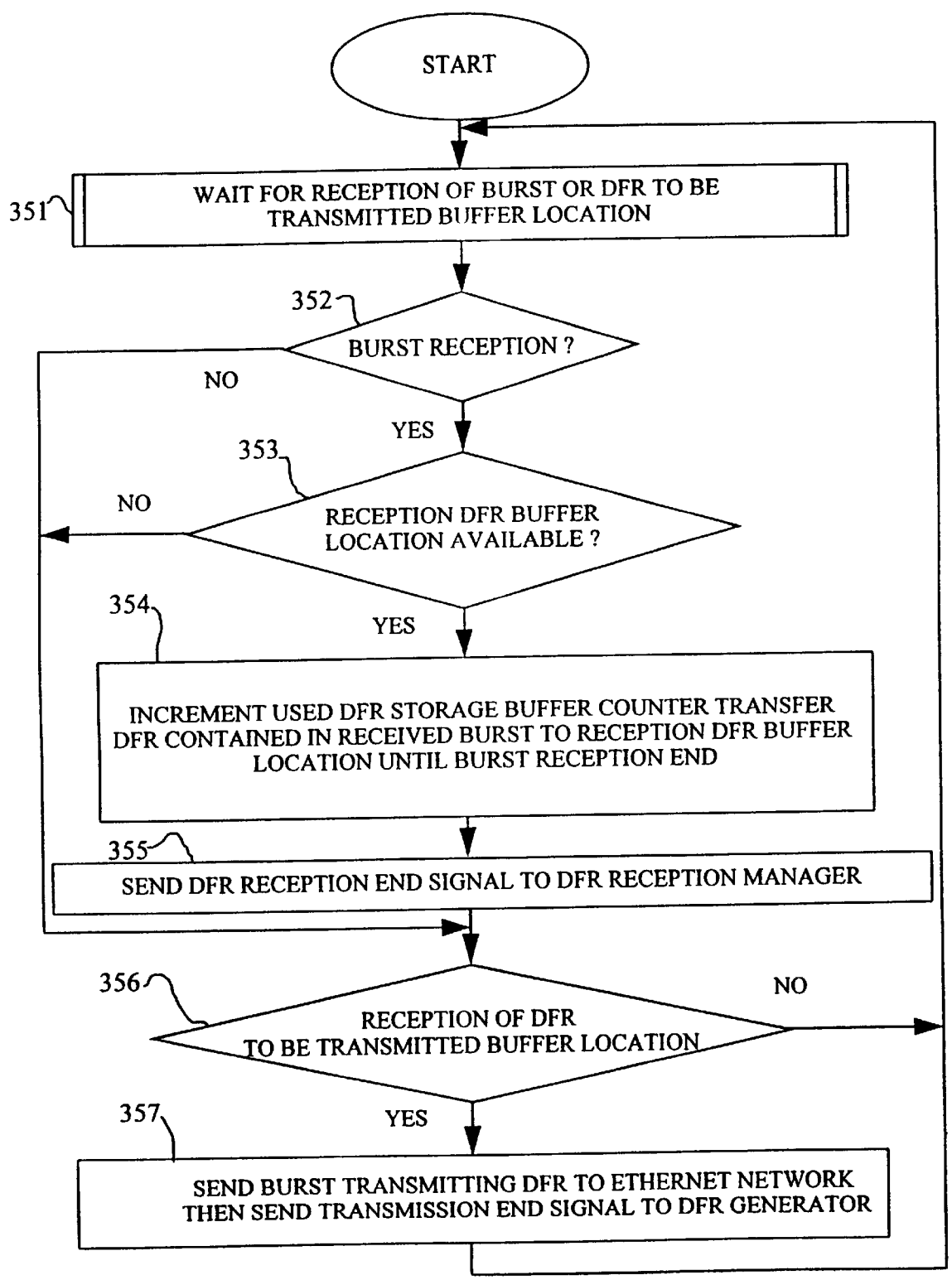

The functioning of the ETHERNET module 346 is illustrated by the flow diagram in FIG. 70.

As can be seen by comparing FIGS. 50 and 70, the operations 351 to 357 which the ETHERNET module 346 performs in a loop are respectively similar to the operations 242 to 245 and 248 to 250 performed by the ETHERNET module 237 of the communication converter 160, the operation 354 including however, in addition to the operations provided for in the operation 245, that of incrementing the counter 273 by the number of buffers 269 used.

Figure 71:
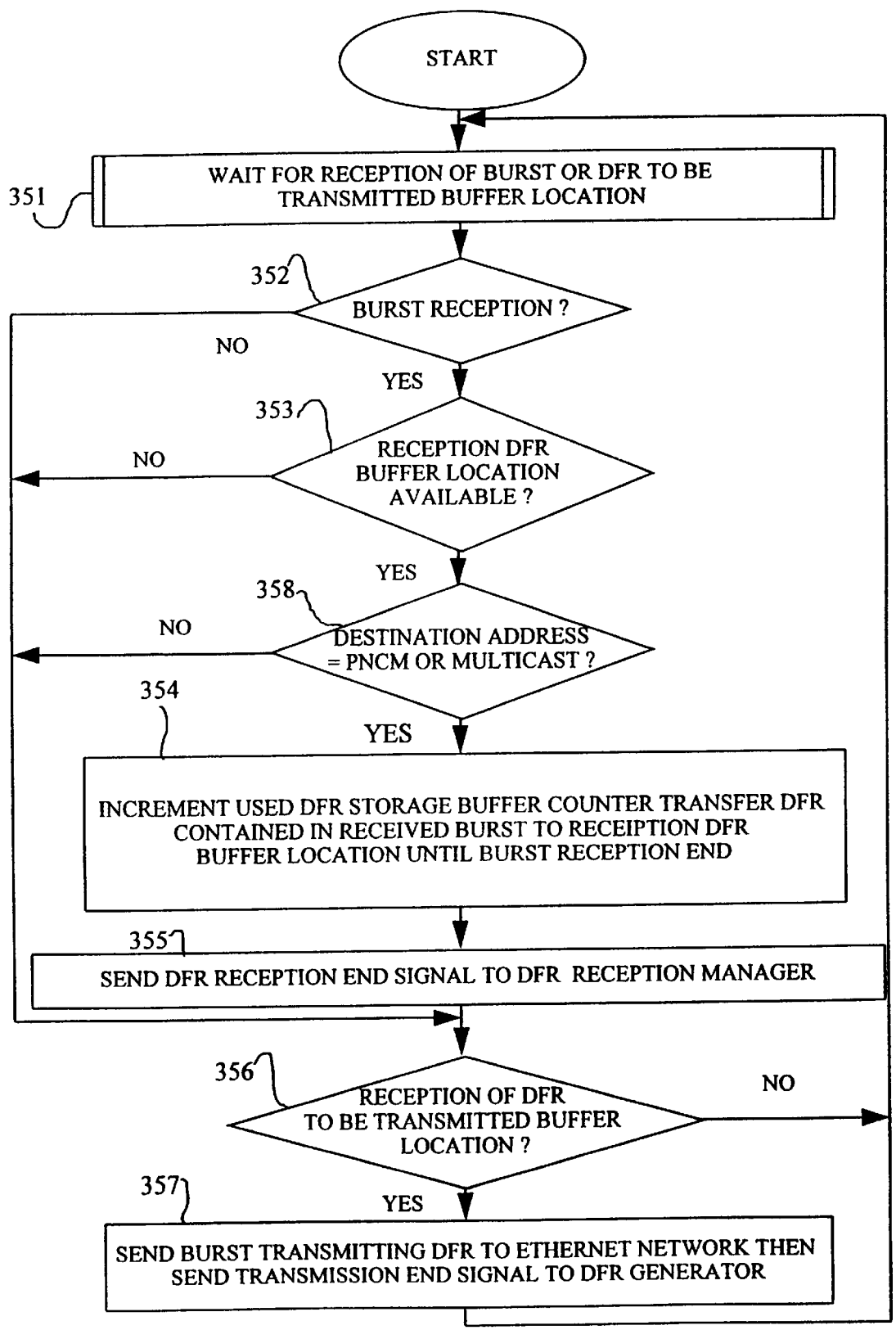
FIG. 71 is a flow diagram illustrating the functioning of a variant of this ETHERNET module, effecting a filtering.

FIG. 71 illustrates the functioning of a variant of the ETHERNET module 346, also performing a filtering, that is to say ignoring the reception of a data frame when its destination address is neither that of a peripheral means 24 nor a multicast address, by means of a test 358 performed when the test 353 is positive, with a move to the operation 354 when this test 358 is positive and to the test 356 when the test 358 is negative.

In practice, the test 358, rather than by means of software resources, may be performed by means of a content addressable memory integrated in the ETHERNET microcontroller 265, or external thereto as explained below with the help of FIGS. 72 and 73.

Figure 72:
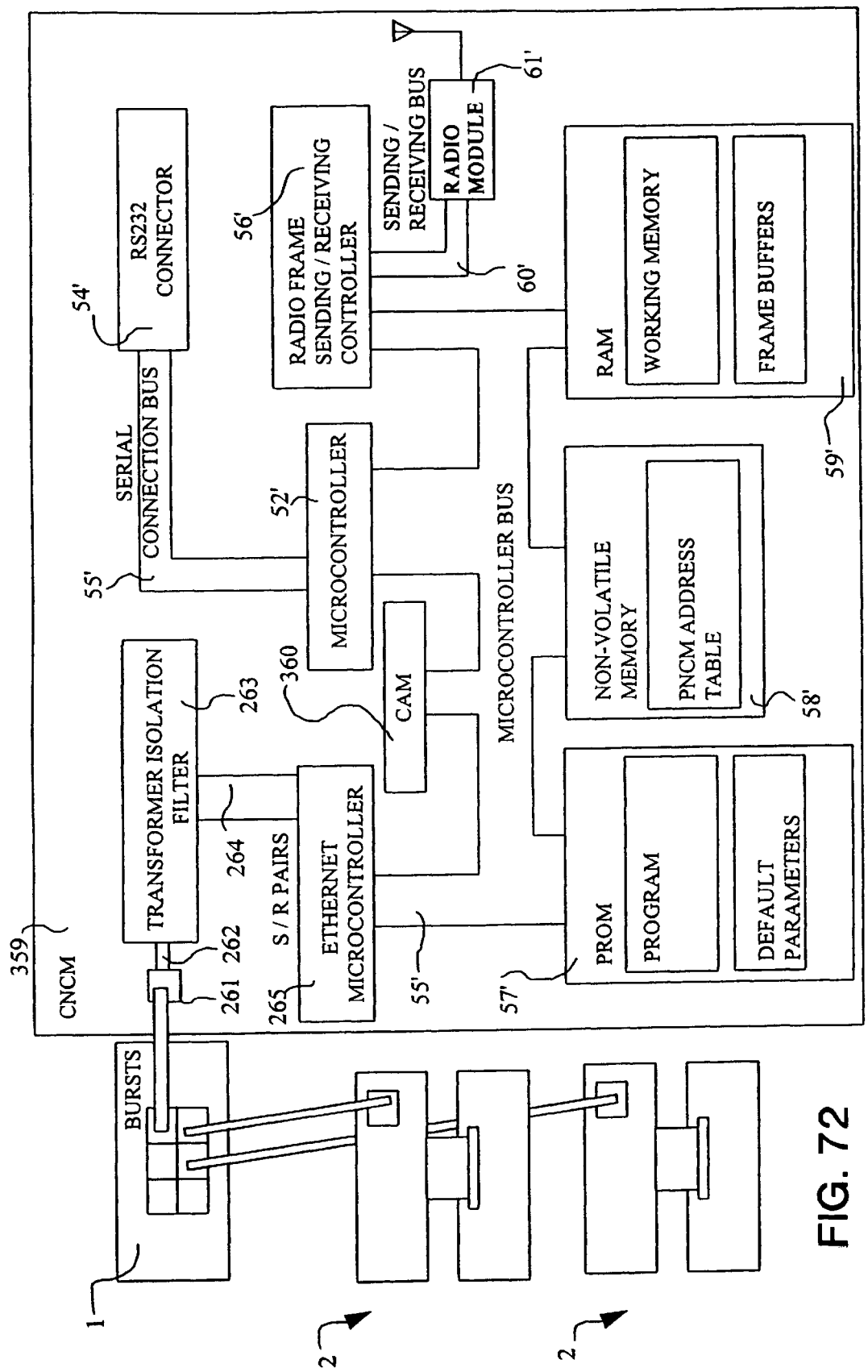
FIG. 72 is an electronic diagram similar to that of FIG. 53, for a variant including a content addressed memory (CAM) used by the microcontroller.

FIG. 72 shows the constitution of a variant 359 of the central means 21', similar to the latter but also including a content addressable memory 360 directly connected to the microcontroller bus 55'.

This content addressable memory 360 is used by the microcontroller 52' for implementing the tests performed by the routing means 350' and 306' on the destination address of the data frames arriving at the central means 359, in order to perform the filtering explained above.

In another variant, the content addressable memory 360 is used by the ETHERNET microcontroller 265 in order to use the variant of the ETHERNET module 346 whose functioning is illustrated by the flow diagram in FIG. 71, that is the ETHERNET module performing a filtering of the data frames received by the ETHERNET transmission medium.

Figure 73:
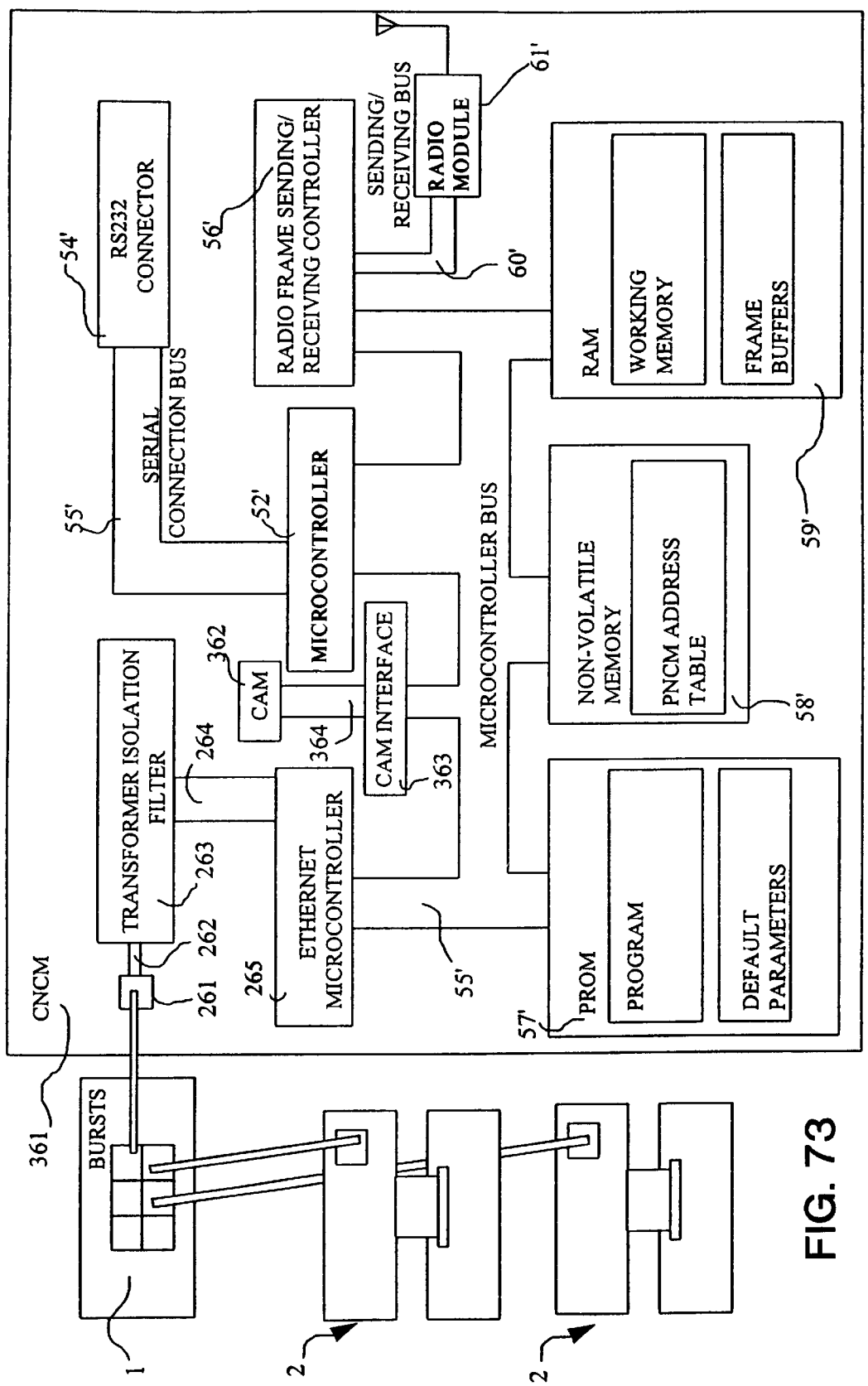
FIG. 73 shows another similar variant, in which an interface is provided between the microcontroller bus and the content addressed memory, so that the latter can be used both by the microcontroller and by the ETHERNET microcontroller.

FIG. 73 shows another variant 361 of the central means 21', having a constitution similar to that of the latter, but with in addition an content addressable memory 362 connected to an interface 363 by conductors 364, the interface 363 being connected to the microcontroller bus 55'.

By virtue of the interface 363, both the ETHERNET microcontroller 265 and the microcontroller 52' can use the content addressable memory 362, which thus serves both for using the variant of the ETHERNET module 346 performing a filtering, and for using the routing means 305' and 306'.

It will be noted that, in general terms, the various variants described above for the central means 21 apply to the central means 21'.

A description will now be given, with reference to FIGS. 74 to 83, of a variant of the communication systems described above, that is to say systems including the central means 21 or one of its variants, and at least one peripheral means 24 or one of its variants.

In this variant, instead of being half-duplex, the shared transmission medium is full-duplex, that is to say allowing simultaneously a transmission in the direction from the central means 21 to the peripheral means 24 (downlink direction) and in the direction from the peripheral means 24 to the central means 21 (uplink direction), the shared radio medium used by the system of this variant therefore being free to transmit an uplink frame independently of the transmission of a downlink frame, and vice versa.

Figure 74:
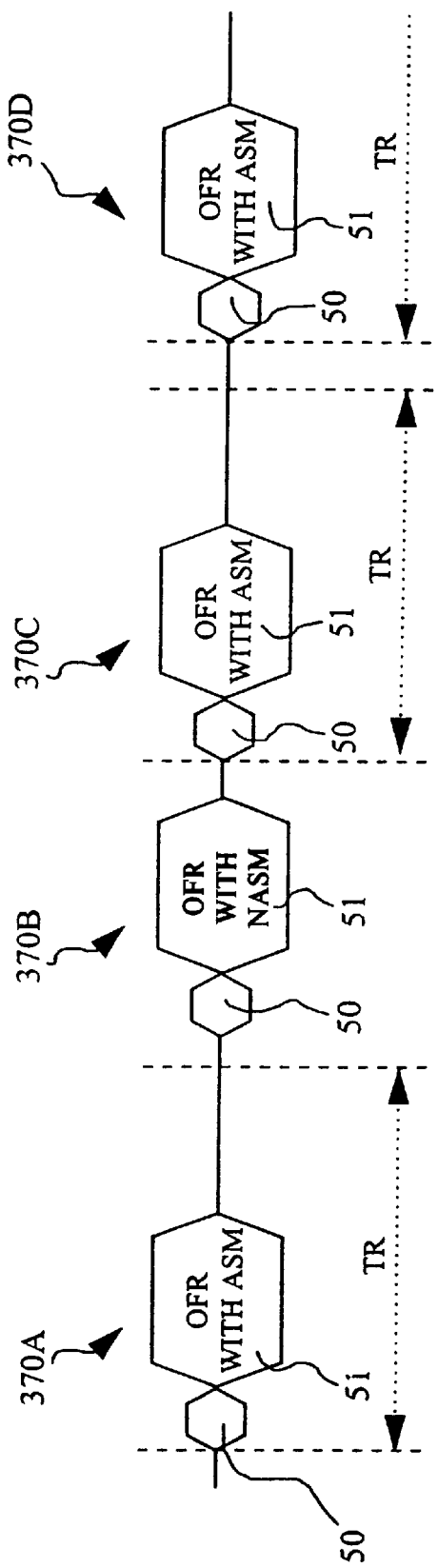
FIG. 74 is a timing diagram similar to that of FIG. 10, but in an embodiment where the radio transmission medium is full duplex.

FIG. 74 shows an example of an occupation of this shared radio medium, in the downlink direction, by four bursts 370A to 370D.

The period TR which can be seen in FIG. 74 is the one which the present variant of the central means 21 allows to elapse as from the moment when there begins the sending of a burst transmitting a downlink frame 25 whose service message 31 is of the authorisation-to-send message type, before transmitting a new downlink frame, unless, during the period of duration TR, it has begun to receive a burst transmitting an uplink frame 26, in which case the central means awaits until it has finished receiving this uplink frame, as will be seen below.

On the other hand, when the present variant of the central means transmits a downlink frame whose service message 31 is of the absence of authorisation-to-send message type, it is able to send a new downlink frame as soon as the transmission of the previous one has ended.

Thus, when the burst 370A ended, the present variant of the central means waited until the period of duration TR had elapsed and, as during it no burst transmitting an uplink frame had appeared on the shared radio medium, the central means considered, as soon as this period had expired, that it could transmit a new downlink frame, which it did with the burst 370B at the end of a period whose duration corresponds to its reaction time.

Given that the downlink frame transmitted by the burst 370B included a no-authorisation-to-send message, the present central means considered that it could send a new downlink frame as soon as the sending of the burst 370B ended, which it did by sending the burst 370C after a reaction time.

The downlink frame transmitted by the burst 370C also included an authorisation-to-send message, which caused the reaction of no peripheral means, the present central means therefore considered that it could send a new downlink frame as soon as the period of duration TR expired, which it did at the end of a reaction time after the burst 370D also transmitting a downlink frame including an authorisation-to-send message.

It will be noted that counting the period TR as from the start of sending of a burst amounts to counting from the end of transmission of the service message contained in the downlink frame transmitted by the burst, given that all the prefixes 50 have the same duration, and that all the service messages 31 have the same length (twelve octets) so that the time necessary for their transmission as from the start of the signal 51 is the same for all the downlink frames.

In summary, if C is the constant time necessary for the sending of the prefix 50 and of the part of the signal 51 situated at its beginning, which serves to transmit the service message, counting the period TR as from the start of the burst amounts to counting the period TR-C from the end of transmission of the service message.

The period TR is chosen as being the shortest period at the end of which it is certain that any peripheral means for which an authorisation-to-send message is destined has been able to begin to transmit an uplink frame in response, if it attempted so to do.

By way of example, the period TR can be around 550 Ts.

It will be noted that, in the examples of bursts illustrated in FIG. 74, the signals 51 are relatively short so that they end before the period of duration TR expires, but that in practice the signals 51 can be extended beyond the expiry of the period of duration TR, as will be seen below.

In general terms, the present variants of the central networked communication means are similar to the embodiment described above, with however a radio module capable of sending and receiving simultaneously, and a downlink frame production means exhibiting the differences which will now be described with the aid of FIGS. 75 and 76.

The functioning of the authorisation controlling means of the full-duplex variant of the different embodiments of the central means described above is illustrated by the flow diagram in FIG. 75.

Figure 75:
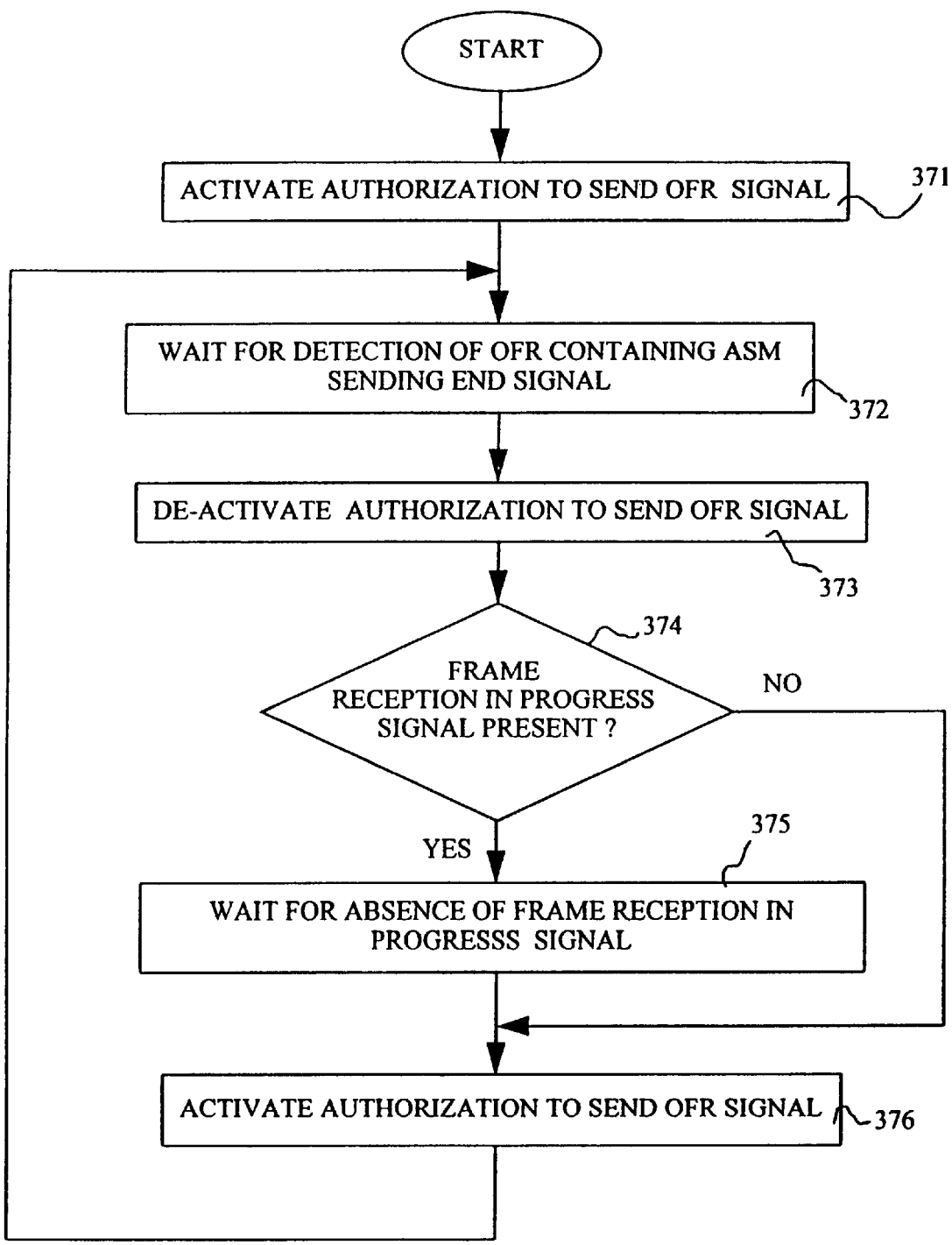
FIGS. 75 and 76 are flow diagrams illustrating respectively the functioning of the authorisation controlling means and of the downlink frame preparation means which a variant of the central networked communication means has, operating in full duplex.

As can be seen by comparing FIGS. 22 and 75, the present authorisation controller functions in a similar manner to a half-duplex authorisation controller, the operations 371 to 376 being respectively identical to the operations 113 to 115 and 117 to 119, but the present authorisation controller performs nothing similar to the operation 116 of awaiting the period T between the operation 373 where it inactivates the signal of authorisation to send a downlink frame, and the test 374 in which it determines whether or not a frame reception in progress signal is present.

It will be noted that the operation 375 of awaiting the absence of the frame reception in progress signal makes it possible to avoid giving a message of authorisation to send to a peripheral means, whereas the preceding peripheral means which received an authorisation-to-send message may still be in the course of sending an uplink frame in response, and the role of the present authorisation controlling means is essentially to avoid this type of situation.

Figure 76:
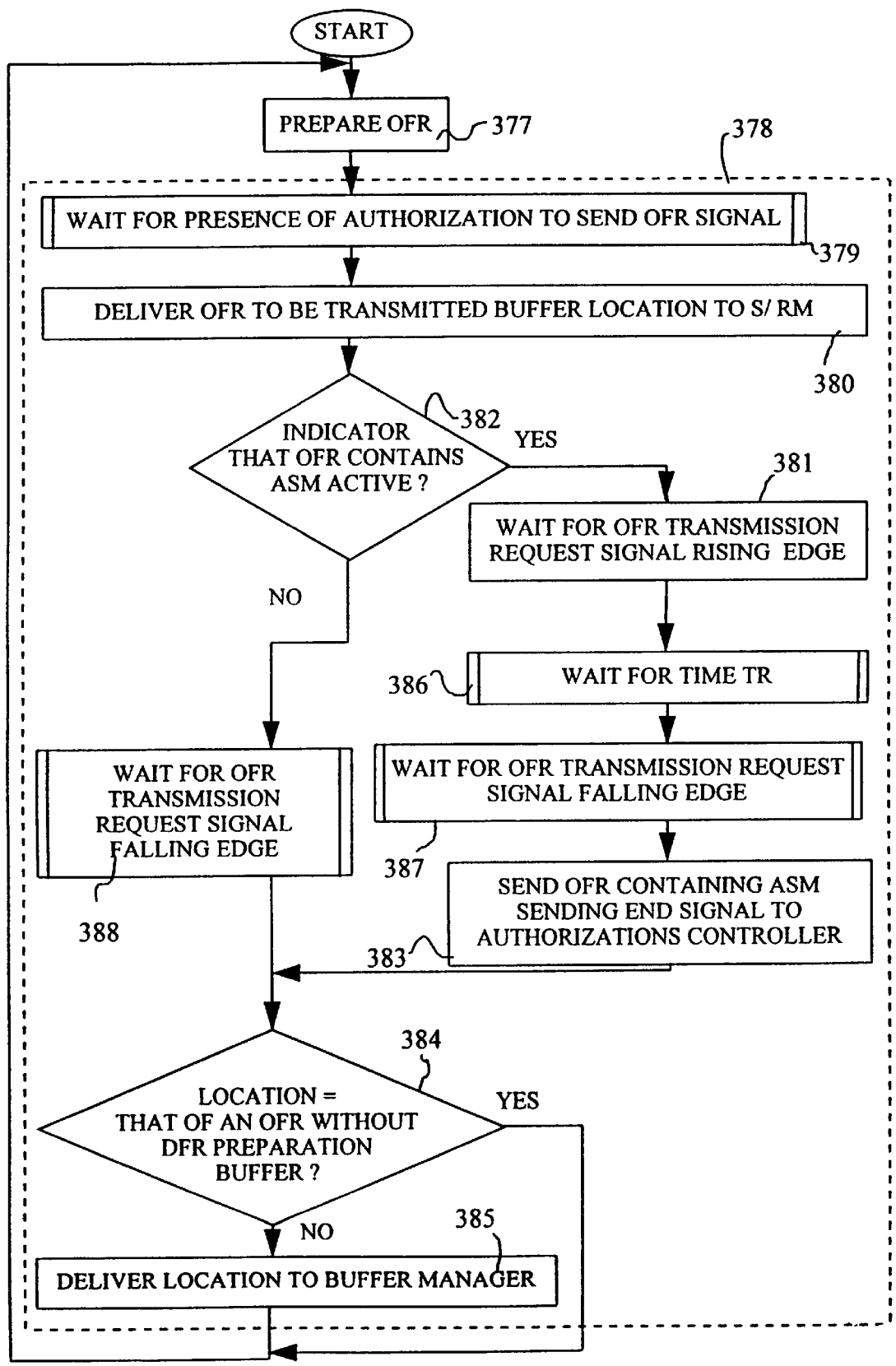

FIG. 76 is a flow diagram illustrating the functioning of the downlink frame preparation means which replaces the preparation means 112 of the central means 21 in its full-duplex variant.

As can be seen by comparing FIGS. 23 and 76, the present preparation performs, in a loop, like the means 112, an operation 377 of preparing a downlink frame followed by an operation 378 of transmitting this downlink frame.

The preparation operation 377 is identical to the operation 120 performed by the means 112, and the operation 378 is similar to the operation 121, with the operations 379 to 385 being respectively identical to the operations 133 to 139, but, after accomplishing the operation 380, instead of going directly to the operation 381, the present preparation means performs the test 382, and it is only if this is positive that it goes to the operation 381.

When the expected event occurs in the latter operation, that is to say the start of sending of a burst transmitting a downlink frame, the present preparation means goes to the operation 386, in which it awaits the period TR and, when the latter has elapsed, it goes to the operation 387 in which it awaits, where the DLF transmission request signal is at the high level, the falling edge of this signal, that is to say where a burst transmitting a downlink frame is in the course of being sent, it awaits the end of sending of this burst, before going to the operation 383.

When the result of the test 382 is negative, the present preparation means performs an operation 388 similar to the operation 387, and then goes to the operation 384.

It will be noted that the operations 386 to 388 means that the present preparation means, after having requested the sending/receiving means to send a downlink frame in the operation 380, remains blocked until both the transmission medium becomes free in the downlink direction and the period of duration TR has elapsed, before going to the operation 383 or directly to the operation 384.

It will be noted that, in the full-duplex variant of the embodiment of the central means 21 where the preparation means 112 is replaced by preparation means 141 and transmitting means 142, the latter is replaced by a transmitting means having a functioning similar to that illustrated by the flow diagram in FIG. 27 or by the flow diagram in FIG. 28, provided that the operation 121 of transmitting a downlink frame is replaced by the operation 378.

In general terms, the full-duplex variant of the different embodiments of the peripheral networked communication means described above corresponds exactly to these embodiments, but with a radio module capable of sending and receiving simultaneously.

A description will now be given, with the aid of FIGS. 77 to 81, of different examples of occupation of the shared radio medium, respectively in the uplink direction and in the downlink direction, the signals relating to the functioning of the radio module also being shown in these figures.

Figure 77:
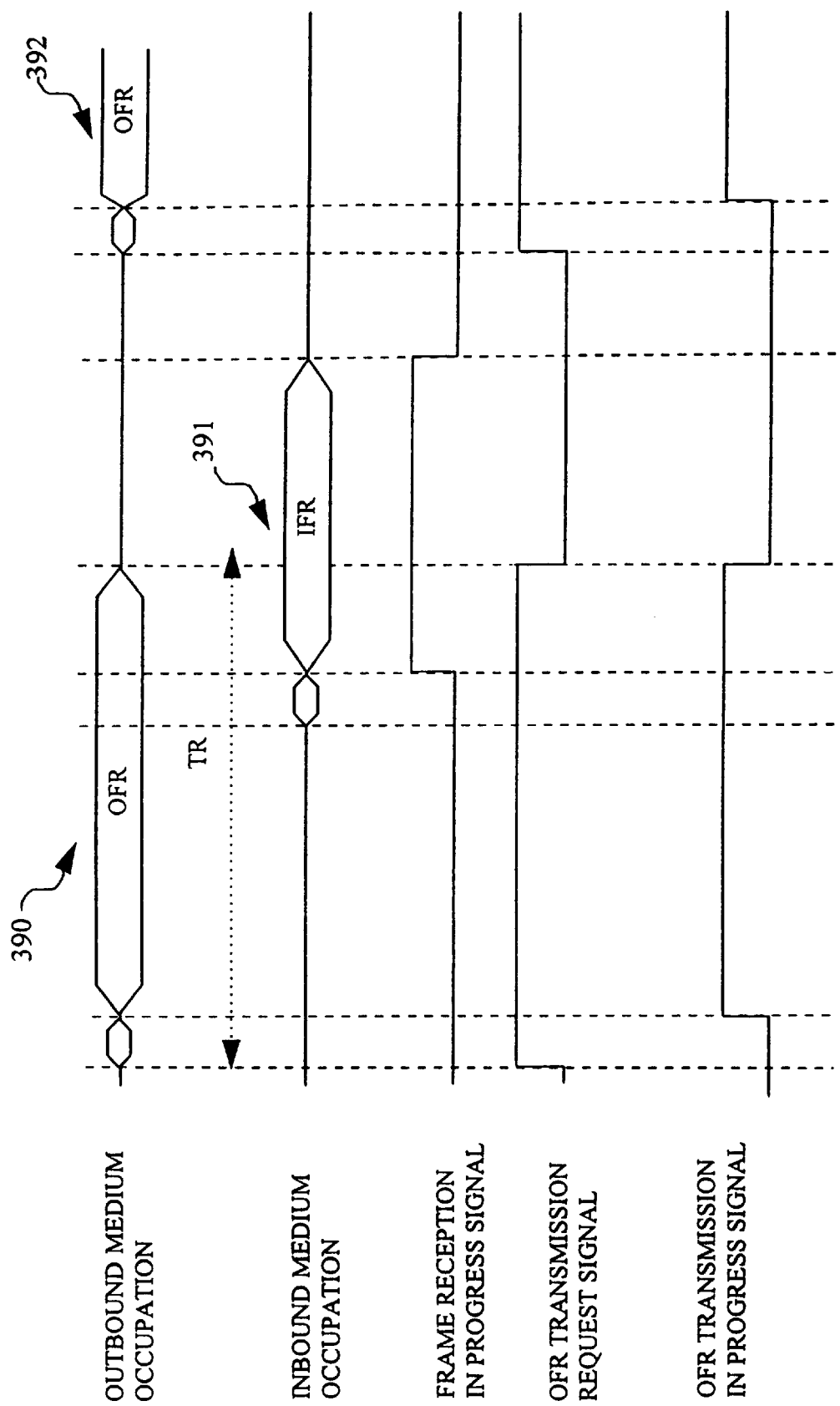
FIGS. 77 to 81 are timing diagrams similar to FIG. 15, showing different situations of occupation of the full-duplex transmission medium in the downlink and uplink directions.

In the example shown in FIG. 77, the central means has sent a burst 390 transmitting a downlink frame containing an authorisation-to-send message and, in return for this message, the destination peripheral means has sent a burst 391 transmitting an uplink frame, even before the sending of the burst 390 is complete, the latter transmitting a data frame of relatively long length, but nevertheless sufficiently short for the burst 390 to end before the expiry of the period of duration TR.

It is therefore by virtue of the authorisation controller whose functioning in FIG. 75 that the present central means has awaited the end of reception of the burst 391 to consider that it could send a new downlink frame, which it did by means of the burst 392, which it began to send after a reaction time.

Figure 78:
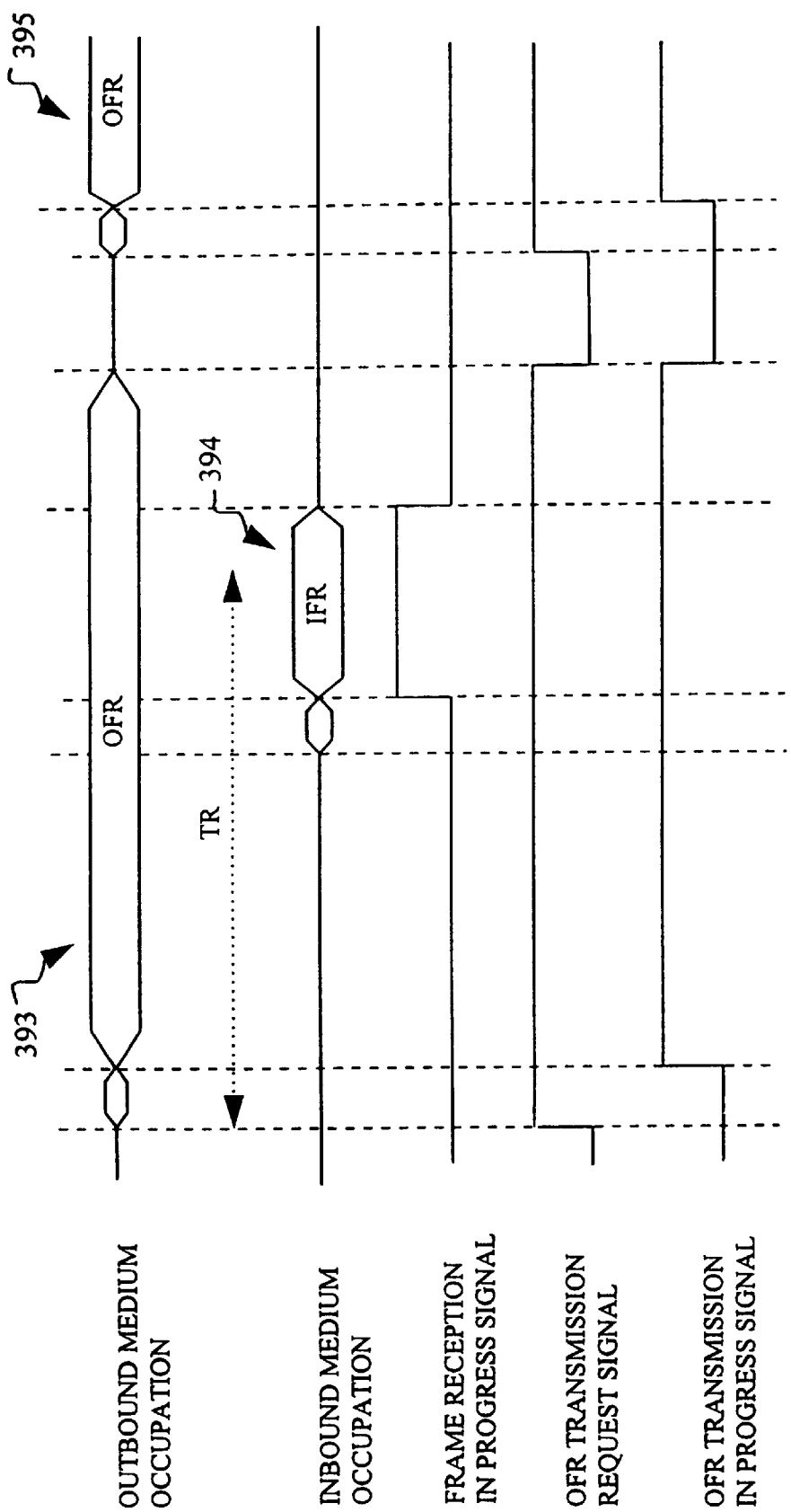

In the example in FIG. 78, the central means has sent a burst 393 transmitting a downlink frame containing an authorisation-to-send message and a particularly long data frame.

In return for the authorisation-to-send message transmitted by the burst 393, the peripheral means for which this authorisation-to-send message is intended has sent the burst 394 transmitting an uplink frame containing a particularly short data frame, so that the burst 394 has ended before the burst 393 has finished.

The downlink frame preparation or transmitting means of the present central means has therefore performed, in the operation 378 of transmitting a downlink frame, successively the operations 386 and 387 before considering that it could send a new downlink frame, that is to say it has awaited the end of sending of the burst 393. Then, after a reaction time, it has sent the burst 395 transmitting a new downlink frame.

Figure 79:
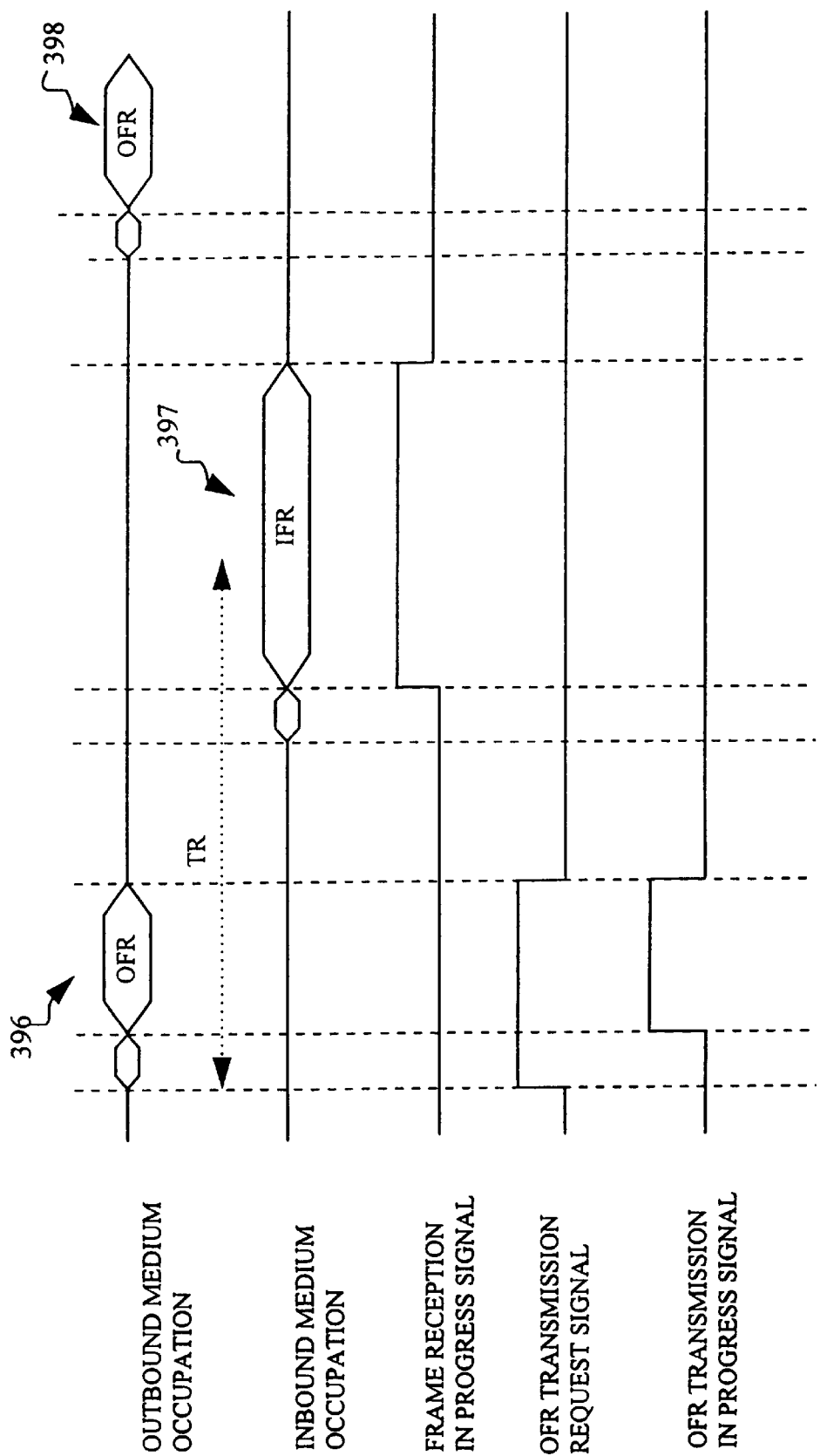

In the example in FIG. 79, the central means has sent a burst 396 transmitting a downlink frame including solely an authorisation-to-send message, so that the burst 396 is particularly short, and was already completed when the destination peripheral means replied by sending the burst 397 transmitting an uplink frame. The central means therefore awaited, because of the operation 365 of its authorisation controller, the end of the burst 397 to consider that it could once again send a downlink frame, which it did after a reaction time, by means of the burst 398.

Figure 80:
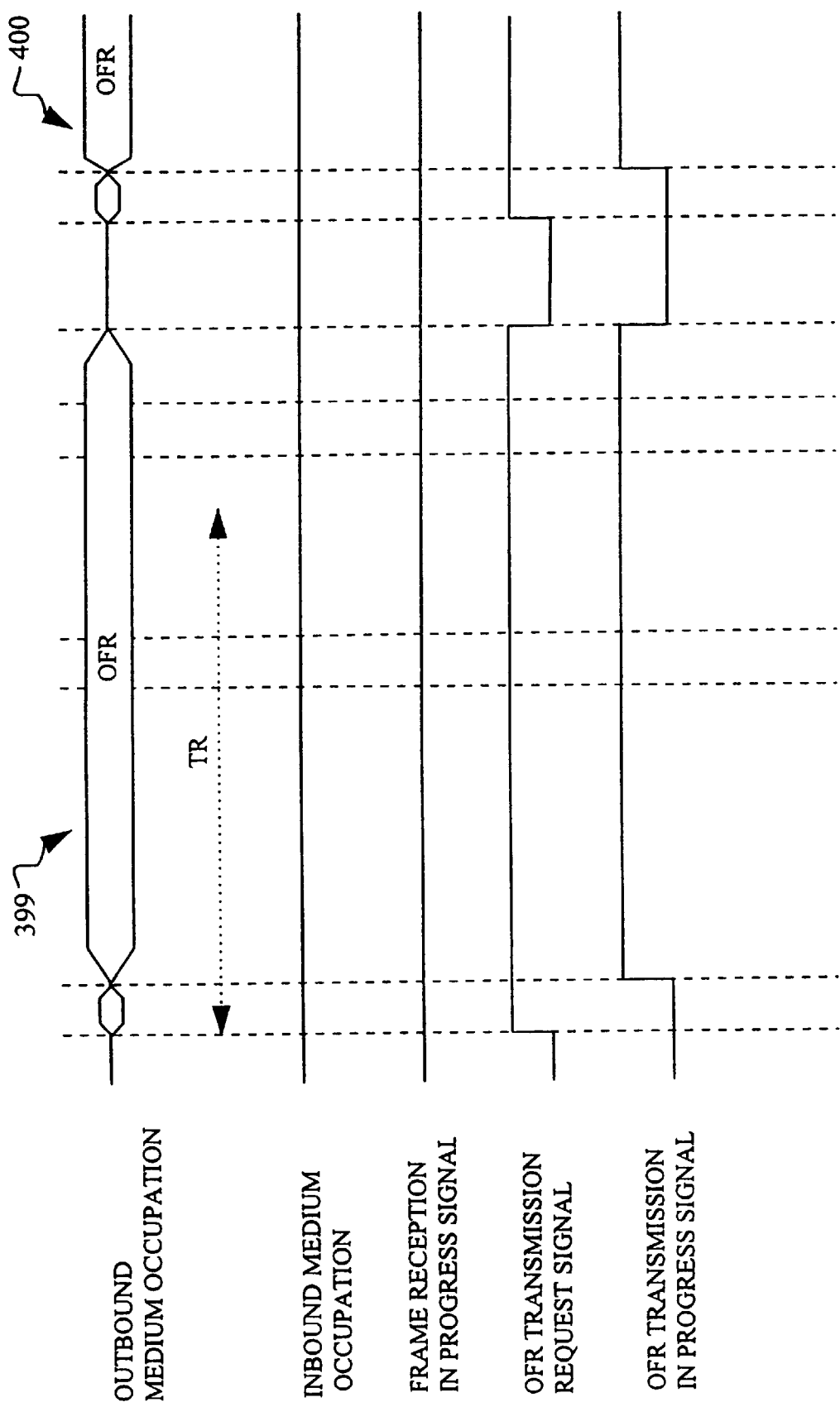

In the example in FIG. 80, the central means has sent a burst 399 transmitting a downlink frame including an authorisation-to-send message and a relatively long data frame, but the peripheral means authorised to send in return by this authorisation-to-send message has not replied, and as the burst 399 was still in the process of being sent when the period of duration TR expired, it was, as indicated previously, the end of sending of this burst which enabled the central means to consider that it could send a new downlink frame, which it did after a reaction time by means of the burst 400.

Figure 81:
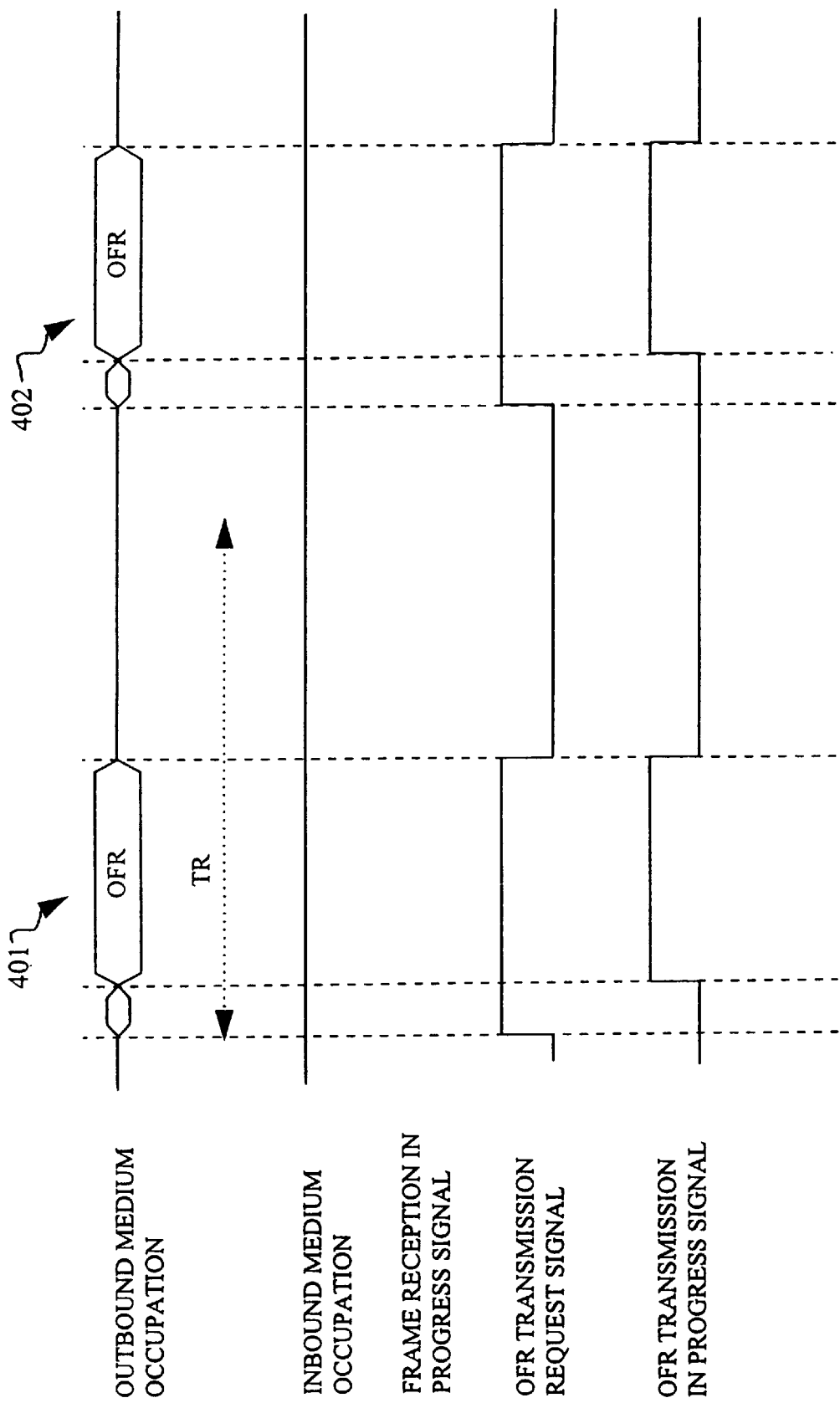

Finally, in the example in FIG. 81, the central means has sent a burst 401 transmitting a downlink frame including an authorisation-to-send message and a relatively short data frame, so that the sending of the burst 401 has ended before the expiry of the period of duration TR.

Since the peripheral means for which the authorisation-to-send message transmitted by the burst 401 is intended did not replied, the central means considered, as from the expiry of the period of duration TR, that it could send a new downlink frame, which it did after a reaction time, by means of the burst 402.

In the above, the difference between the embodiments of the central means 21 in which the service messages can equally well be of the authorisation-to-send message or no-authorisation-to-send message type, and the full-duplex variant of the these embodiments, have just been described.

Figure 82:
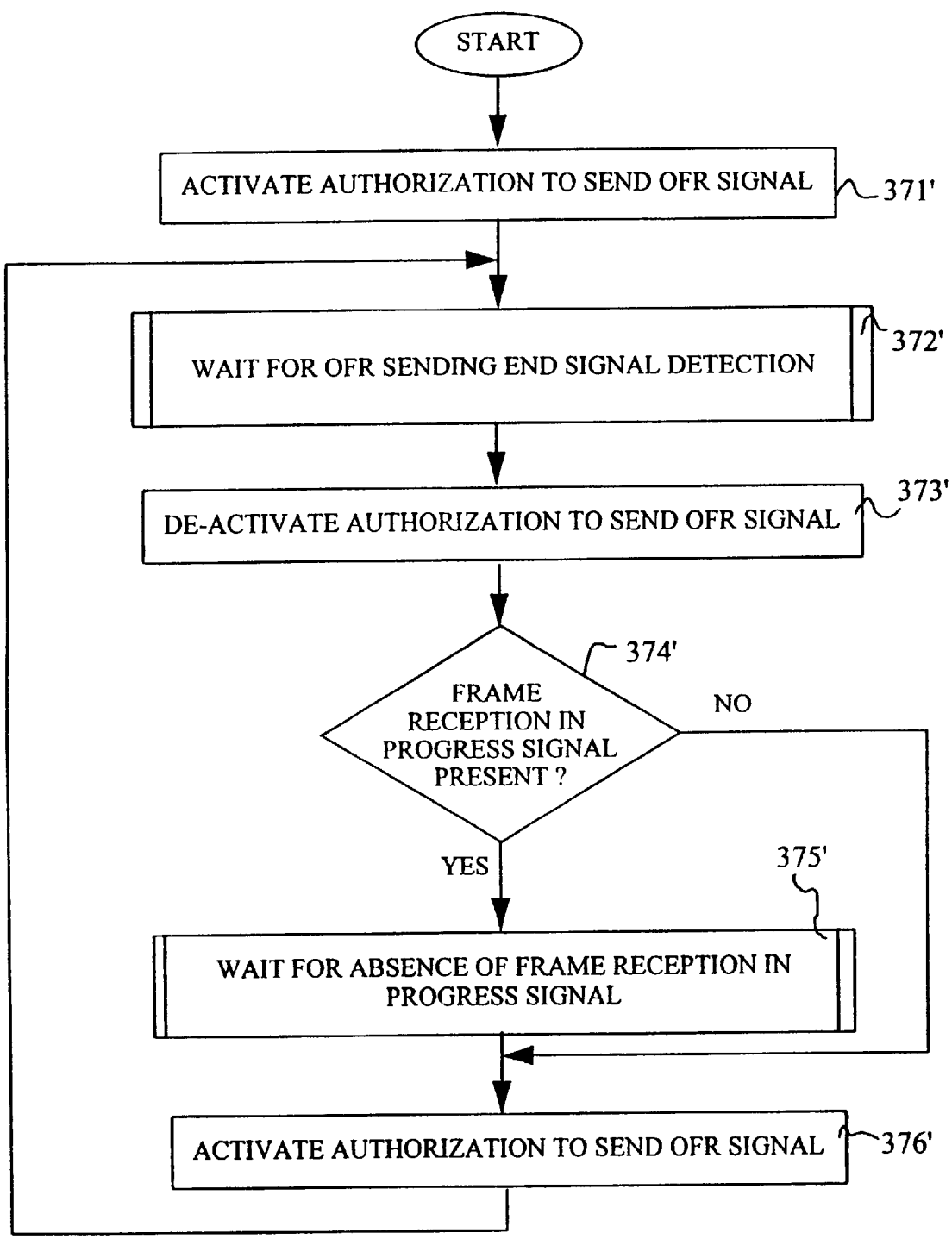
FIGS. 82 and 83 are flow diagrams illustrating the functioning respectively of the authorisation controlling means and of the downlink frame preparation means which the variant of the central networked communication means operating in full duplex has.
Figure 83:
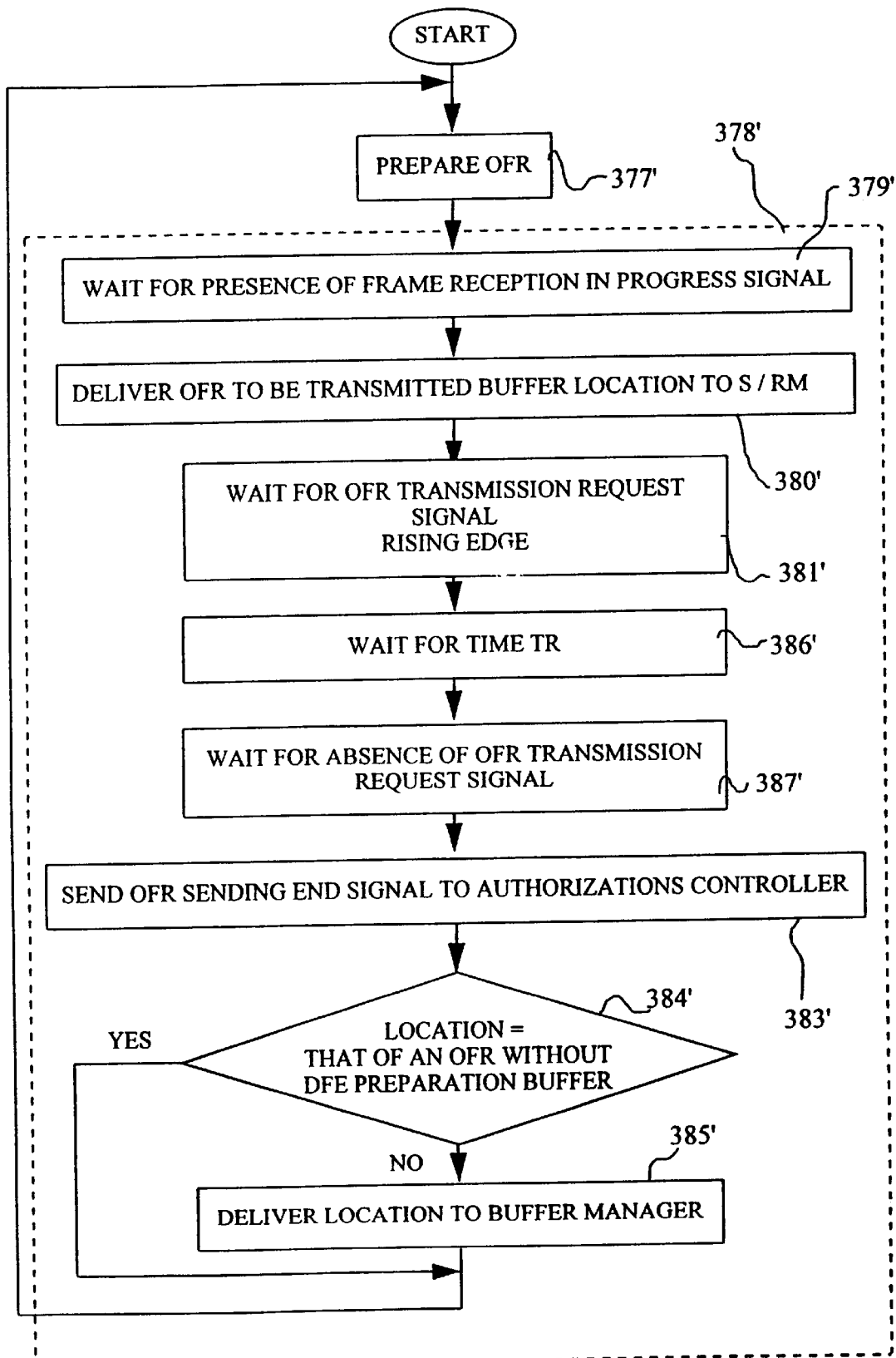

In general terms, the same differences exist between the embodiments of the half-duplex central means in which all the service messages are of the authorisation-to-send message type, and their full-duplex variant, as will be seen more precisely with reference to FIGS. 82 and 83.

The flow diagram in FIG. 82 illustrates the functioning of the authorisation controlling means which replaces the means 111' (FIG. 29) of the half-duplex embodiment.

As can be seen by comparing FIGS. 30 and 82, the present authorisation controlling means functions like the means 111', the operations 371' to 376' being identical respectively to the operations 113' to 115', and 117' to 119', with however a direct passage from the operation 373' to the operation 374', without performing the waiting operation such as the operation 116'.

The flow diagram in FIG. 83 illustrates the functioning of the downlink frame preparation means which replaces the means 112' of the half-duplex embodiment.

As can be seen by comparing FIGS. 31 and 83, the present preparation means functions like the preparation means 112', the operations 377' and 120' being identical, the operation 378' being similar to the operation 121', the operations 379' and 381' and 383' to 385' being identical respectively to the operations 133' to 135', 155, 138' and 139' but, instead of going directly from the operation 381', to the operation 383', the present preparation means performs the operations 386' and 387', which are identical to the operations 386 and 387 of the operation 378 shown in FIG. 76.

In the full-duplex variant of the embodiment of the central means in which the preparation means 112' is replaced by the preparation means 141' and by the transmitting means 142', the latter is replaced by a downlink frame transmitting means whose functioning is that of the flow diagram in FIG. 35, provided that the operation 121' is replaced by the operation 378'.

The different full-duplex variants of the central means which have just been described are obviously valid both for the central means 21 and its different embodiments, and for the central means 21' and its different embodiments.

It should be noted that the invention applies just as well to a time division multiple access (TDMA) protocol, by replacing, in the above description, the authorisation-to-send messages with time slots, each peripheral means being able to transmit only in a time slot allocated to it periodically in a cyclic functioning. According to this embodiment, it is the cycle of the peripheral means authorised to send which is modified in order to take account of variations in priority level. In this way, the peripheral means which have the most uplink frames to transmit are allocated more time slots than those which transmit only a little.

A description will now be given, in particular with regard to FIGS. 13B, 20G and 20H, of the first priority management variant of the preferred embodiment of the present invention.

According to this variant, as in the embodiment described above, when the peripheral means 24 is identified by the central means 21, the message nature information 422 (FIG. 9A) takes the two forms "isolated_frame" and "non_isolated_frame" and:
where this form is "non_isolated_frame", the additional information field presented in FIG. 9A includes the number of frames already determined which remain to be transmitted, following the one which is in the course of being transmitted, by the peripheral networked communication means which effects the transmission of the uplink frame which contains this information;
where this form is "isolated_frame", the additional information field includes the number zero.

Figure 13B:
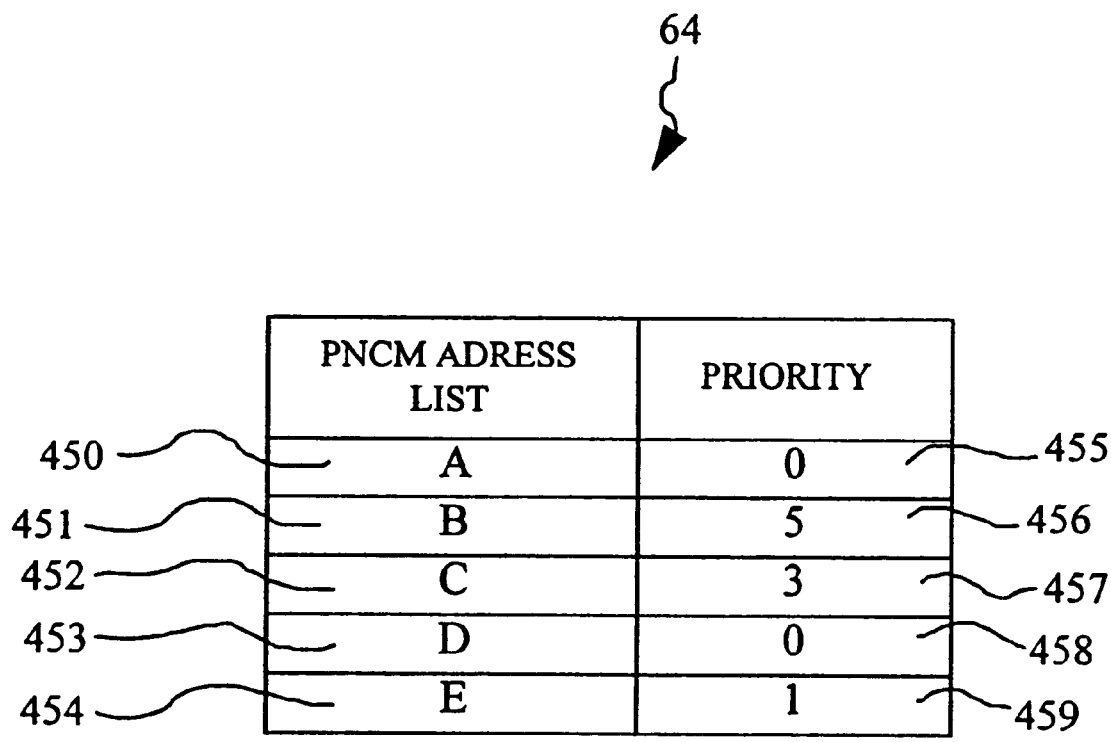
FIG. 13B shows the internal arrangement of an address table allocated priority levels, according to a variant referred to as the "first priority management variant"

As can be seen in FIG. 13B, the table 64 of addresses 450, 451, 452, 453, 454 of peripheral networked communication means contains the address of each of these communication means which is known to the central networked communication means. To each address of the table of addresses 64 there is allocated a priority level (not shown) with which there is associated, in the table 64, the number of frames remaining to be transmitted by the peripheral networked communication means which has this address. As indicated in the previous paragraphs, this number makes it possible to know the "isolated_frame" or "non_isolated_frame" priority level, depending on respectively whether or not the associated counter is equal to zero.

Thus the priority level 455 which is a number "0" is allocated to the address 450, the priority level 456 which is a number "5" is allocated to the address 451, the priority level 457 which is a number "3" is allocated to the address 452, the priority level 458 which is the number "0" is allocated to the address 453 and the priority level 459 which is a number "1" is allocated to the address 454. Each of these priority numbers corresponds to the last number of the additional information field of the frame message of the uplink frame 422 transmitted by the peripheral networked communication means which has the address to which there is allocated the said priority number in the table 64.

Figure 20G:
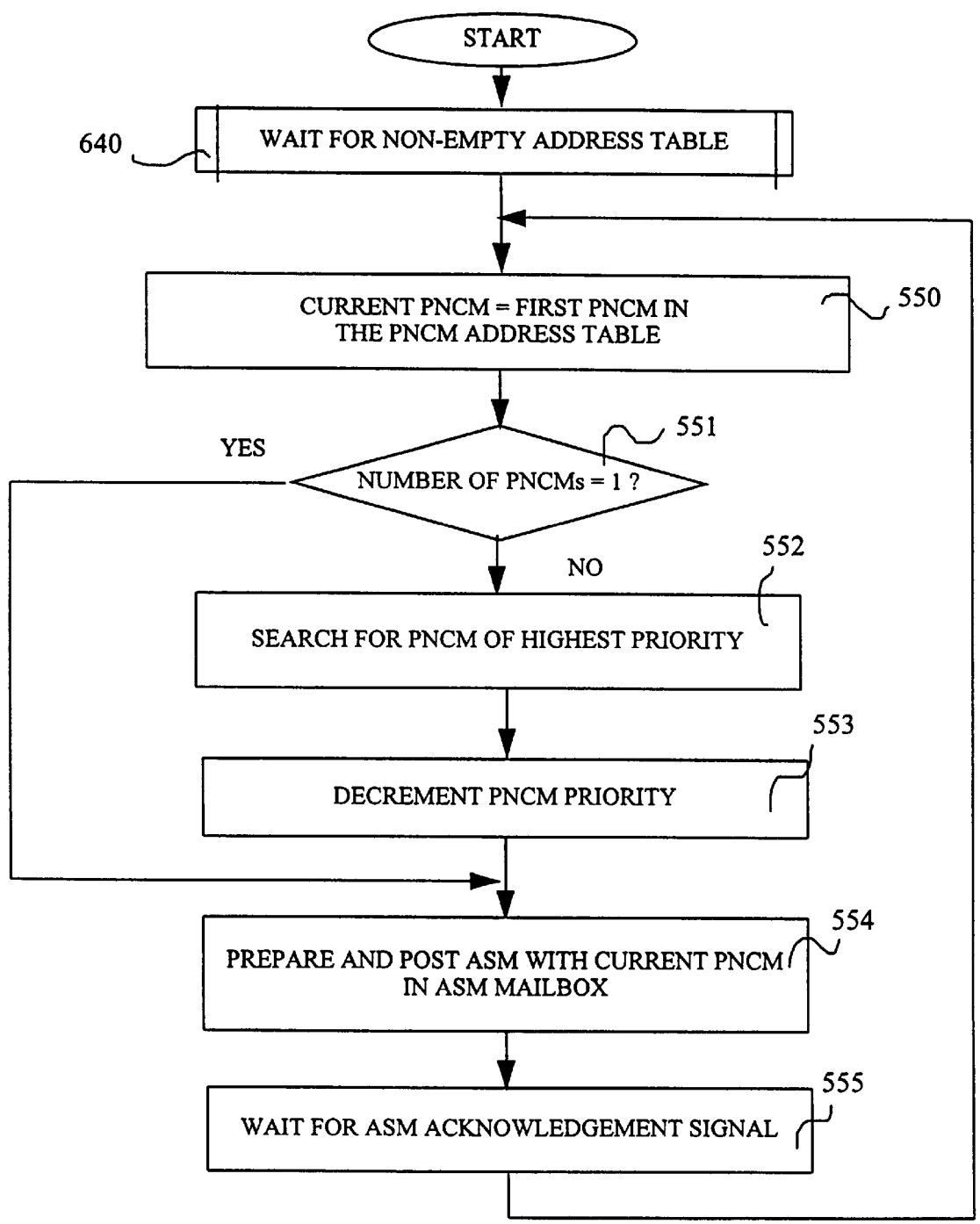
FIG. 20G is a flow diagram illustrating the functioning of a variant of the authorisation-to-send message preparation means of FIG. 20, according to the first priority management variant.

The individual authorisation-to-send message preparation means 601 functions, in this variant, in accordance with the flow diagram illustrated in FIG. 20G. The authorisation-to-send message preparation means 601 first of all performs, as in the flow diagram in FIG. 20, an operation 640 of waiting for the table 64 not to be empty, and then it enters a loop where it begins by performing the operation 550 in which it terms "current" the peripheral networked communication means whose address is the first in the address table 64.

Then the test 551 determines whether or not the number of peripheral networked communication means is equal to 1. In the negative, the operation 552 seeks the peripheral networked communication means whose address is given, in the address table 64, the highest priority level. Then, during the operation 553 it decrements, by a step of one unit, the priority level of the said communication means.

Where the result of the test 551 is positive, or after the operation 553, the operation 554 prepares and posts the authorisation-to-send message which authorises solely the said current peripheral networked communication means to transmit a frame in return for this authorisation-to-send message, in the authorisation 25 to-send message mailbox.

Then the operation 555 consists of awaiting the signal acknowledging the said authorisation-to-send message. Finally, the authorisation-to-send message production device returns to the operation 550 and this, and the operations and tests which follow it in the flow diagram illustrated in FIG. 20G, are reiterated.

Figure 20H:
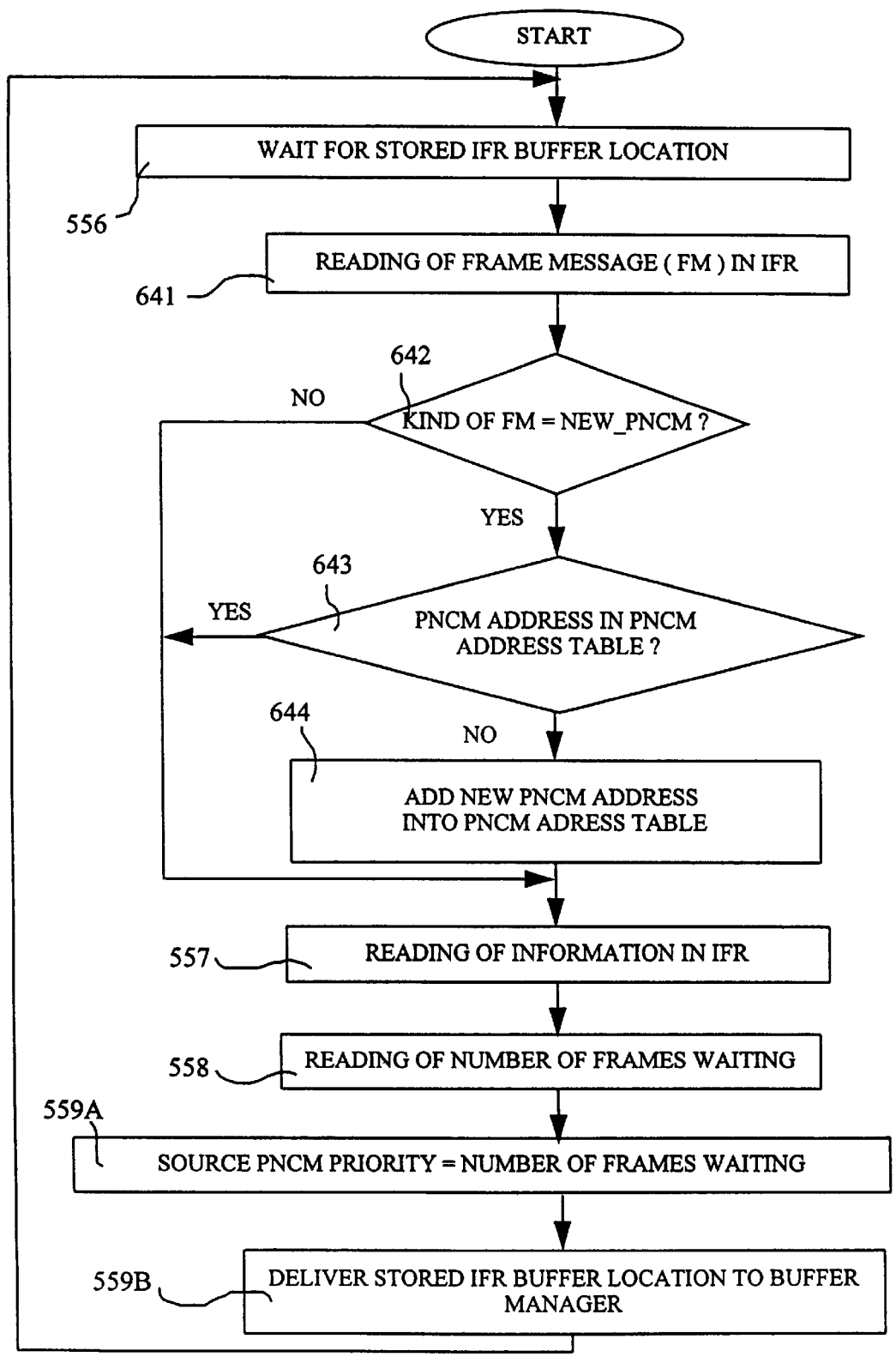
FIG. 20H is a flow diagram illustrating the functioning of a variant of the uplink frame analysing means of FIG. 20F, according to the first priority management variant.

The uplink frame analysing means 460 functioning in accordance with a first priority management variant, runs a program whose flow diagram is illustrated in FIG. 20H. First of all it performs the operation 556 which consists of awaiting a location of an uplink frame stored in a memory space 66, this location reaching it from the sending/receiving means 74. When it has received such a location, the uplink frame analysing means performs the series of operations 642 to 644, which is identical to the series 613 to 615 of the flow diagram in FIG. 20F, and then performs an operation 557 of reading a frame message 420 in the uplink frame, reading part of the memory space 66 which stores the said frame, then an operation 558 of reading the frame message 420, which includes, in the additional information, it will be recalled, the number of frames waiting to be prepared and/or transmitted by the peripheral networked communication means which transmitted the uplink frame from which the frame message 420 is extracted.

Then the operation 559A consists of giving, in the address table 64, to the address of the said communication means, a priority level equal to the number of frames waiting to be prepared and/or transmitted, that is to say equal also to the said number incorporated in the additional information of the frame message 422. Then the operation 559B consists of sending a signal to the memory space management means 93, a signal representing the location of the memory space where the uplink frame is stored. Following the operation 559B, the uplink frame analysing means returns to the operation 556 and the operations 556, 557, 558 and 559 are repeated iteratively.

Figure 46B:
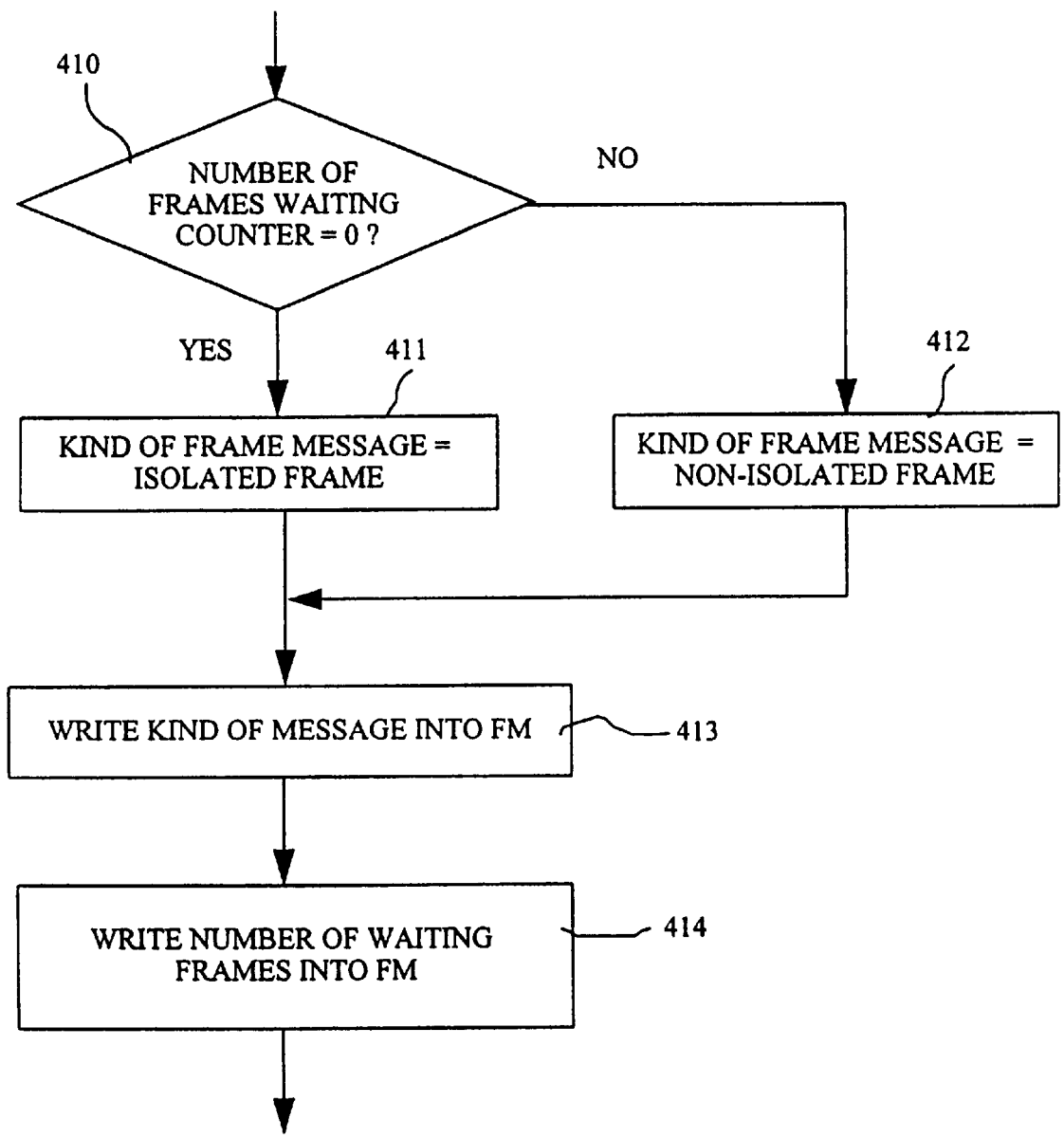
FIG. 46B shows a variant of this operation.

The flow diagram of the functioning of the uplink frame production means 203, the flow diagram presented with regard to the above FIG. 46, has, according to this first priority management variant, following the operation 222A, an operation 222B of updating the frame message which is presented in detail with regard to FIG. 46B.

It includes first of all the test 410 which determines whether or not the counter for the number of frames waiting, in the working memory, is nil. If the result of the test 410 is affirmative, the operation 411 gives, to the nature of the frame message incorporated in the first uplink frame, a so-called "isolated frame" form which indicates that the peripheral networked communication means no longer has any frame to transmit, following the said first frame. If the result of the test 410 is negative, the operation 412 gives, to the nature of the frame message incorporated in the first uplink frame, a so-called "non-isolated frame" form which indicates that the peripheral networked communication means still has uplink frames to transmit, following the said first frame.

Following one or other of the operations 411 or 412, the uplink frame production means 203 performs the operation 413 which consists of writing in the relevant buffer, or memory space, the nature of the frame message defined by one of the operations 411 or 412. Finally an operation 414 is performed, which consists of writing the number of frames waiting in the frame message field presented in FIGS. 9 and 9A.

This operation 222B therefore performs the updating of the frame message. Then the means 203 performs an operation 223 and the following operations presented with regard to FIG. 46.

According to this first priority management variant, the peripheral networked communication means which receives an authorisation-to-send message is the one which transmitted the number incorporated in the additional information of the frame message which corresponds to the largest number of frames which it has waiting to be prepared and/or transmitted. A peripheral means can therefore have allocated to it practically all the authorisation-to-send messages, if it still permanently has a large number of frames to transmit.

Figure 18:
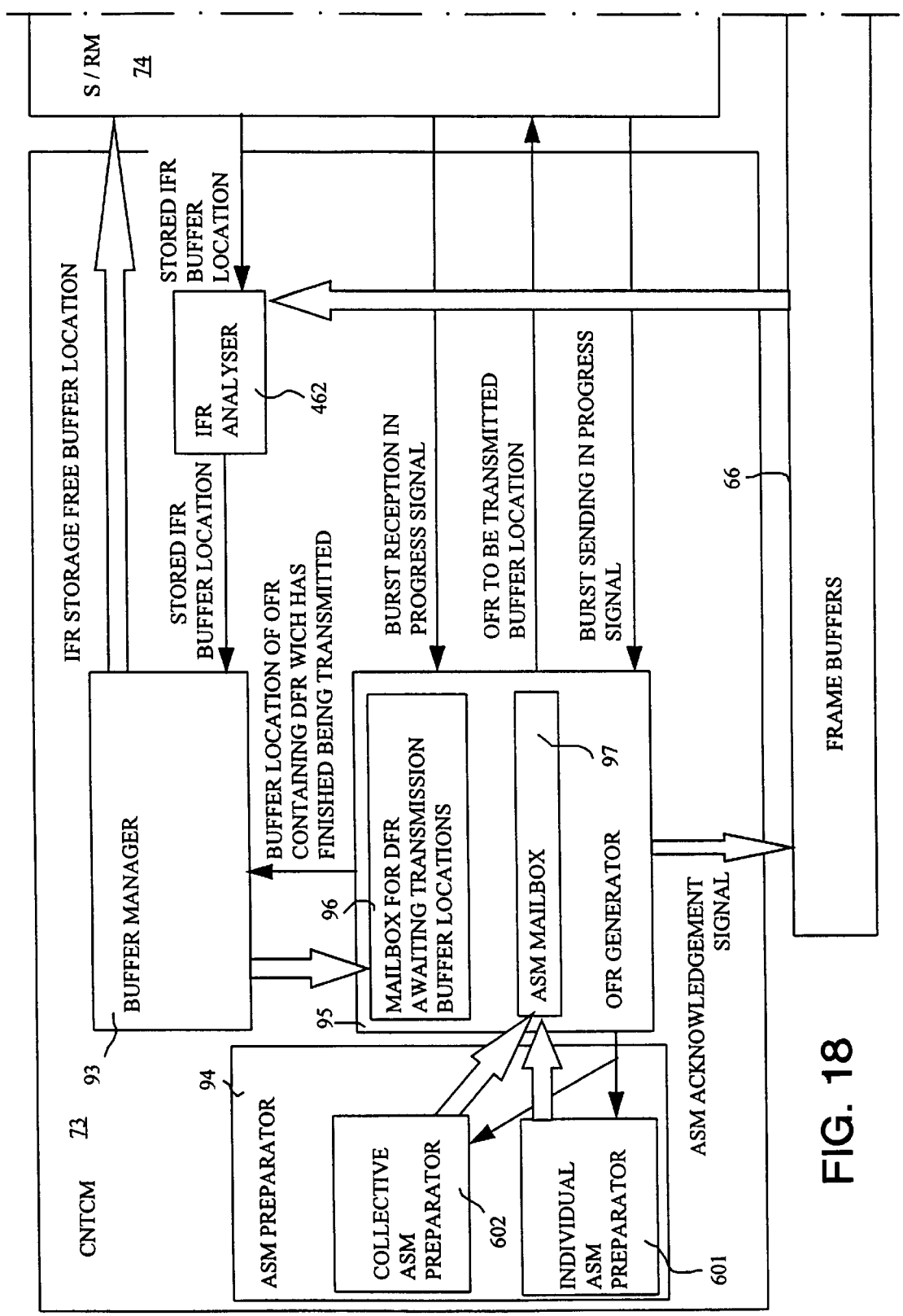
FIG. 18 is a partial functional diagram of the central communication means, showing in more detail the central transmission control means which it includes.
Figure 18A:
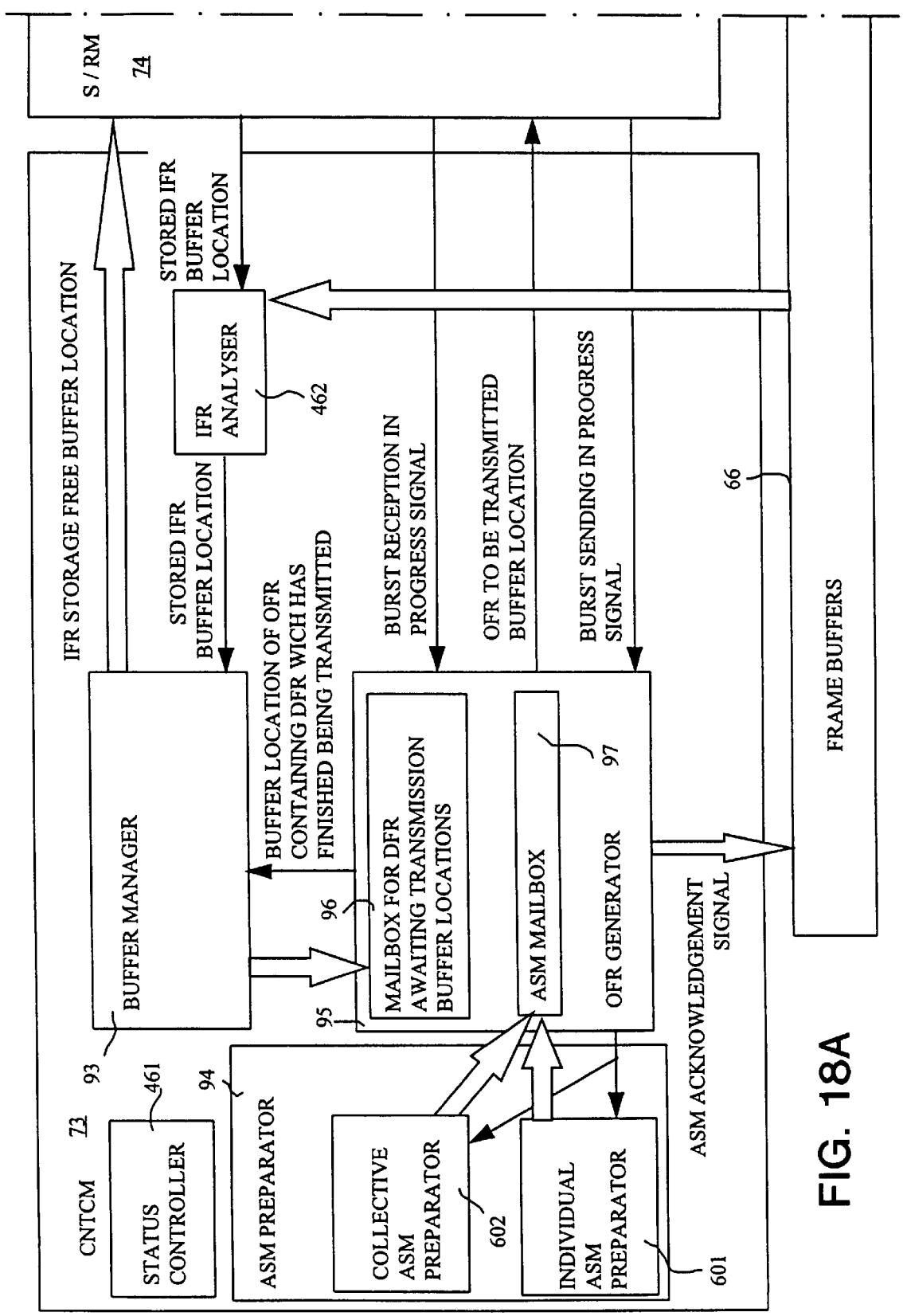
FIG. 18A is a similar diagram showing a variant of this central transmission control means.

Another priority management variant concerns the means 273. It is presented with regard to FIG. 18A and includes, on the one hand in place of the uplink frame analysing means 460 of the preferred embodiment (FIG. 18), an uplink frame analysing means 462 and, on the other hand, a state controlling means 461.

The uplink frame analysing means 462 and the individual authorisation-to-send message preparation means 601 conjointly effect the updatings of the priority levels allocated to the addresses in the address table 64.

The uplink frame analysing means 462 functions in the same way as the uplink frame analysing means 460.

Figure 20I:
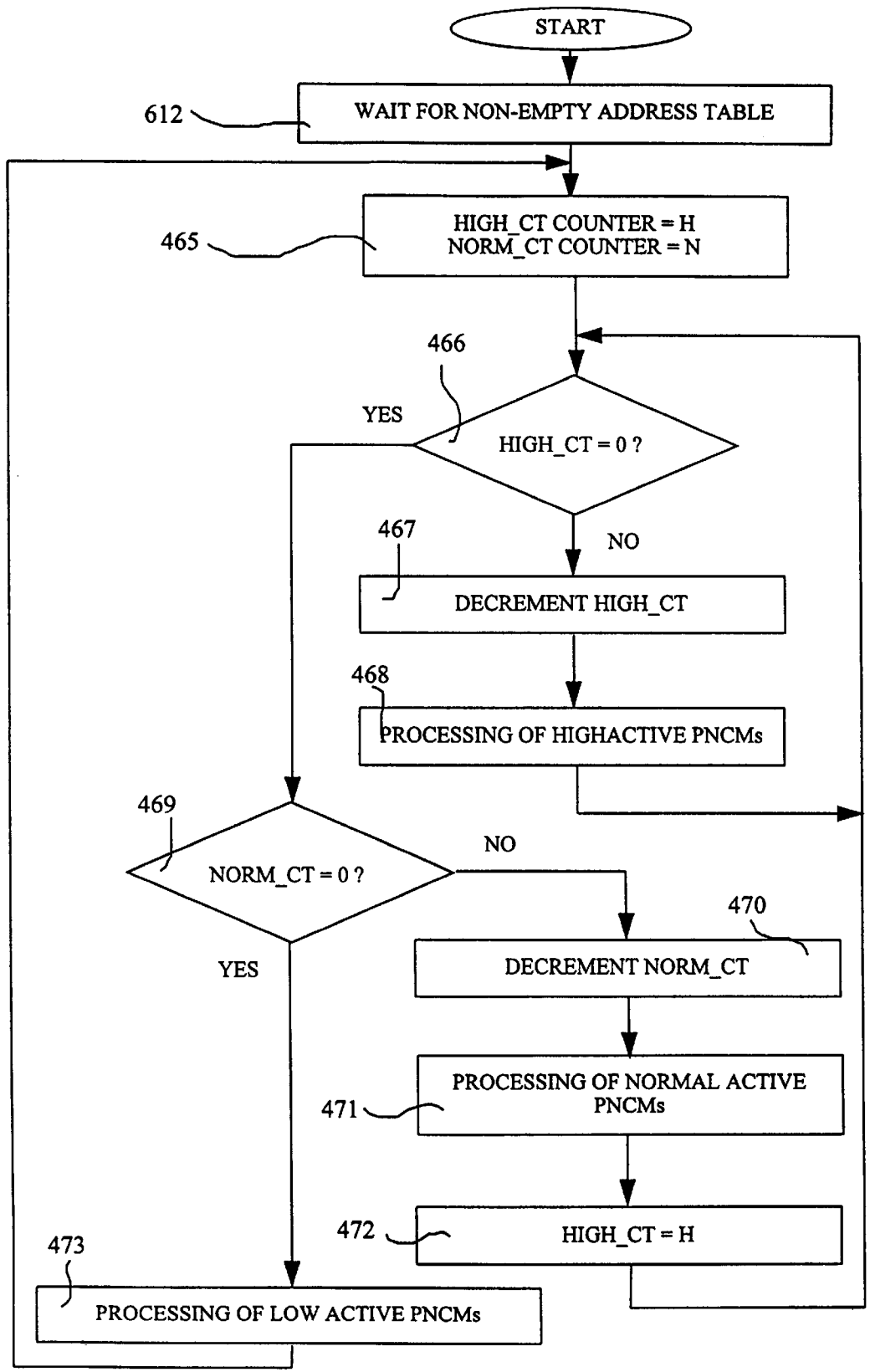

The flow chart of the functioning of the authorisation-to-send message preparation means 601 (FIG. 18A) is described with regard to FIG. 20I. It performs all the operations 612 and 465 to 473 presented with regard to FIG.

20 but, following the operation 473, it returns directly to the operation 465, neither of the operations 463 or 464 existing in this variant.

According to this embodiment, the authorisation-to-send message preparation device 601 performs sequentially, on the one hand, the updatings of the "normal active" priority level to the "low-active" priority level, in the address table 64 and, on the other hand, the preparation of authorizations to send.

Figure 20J:
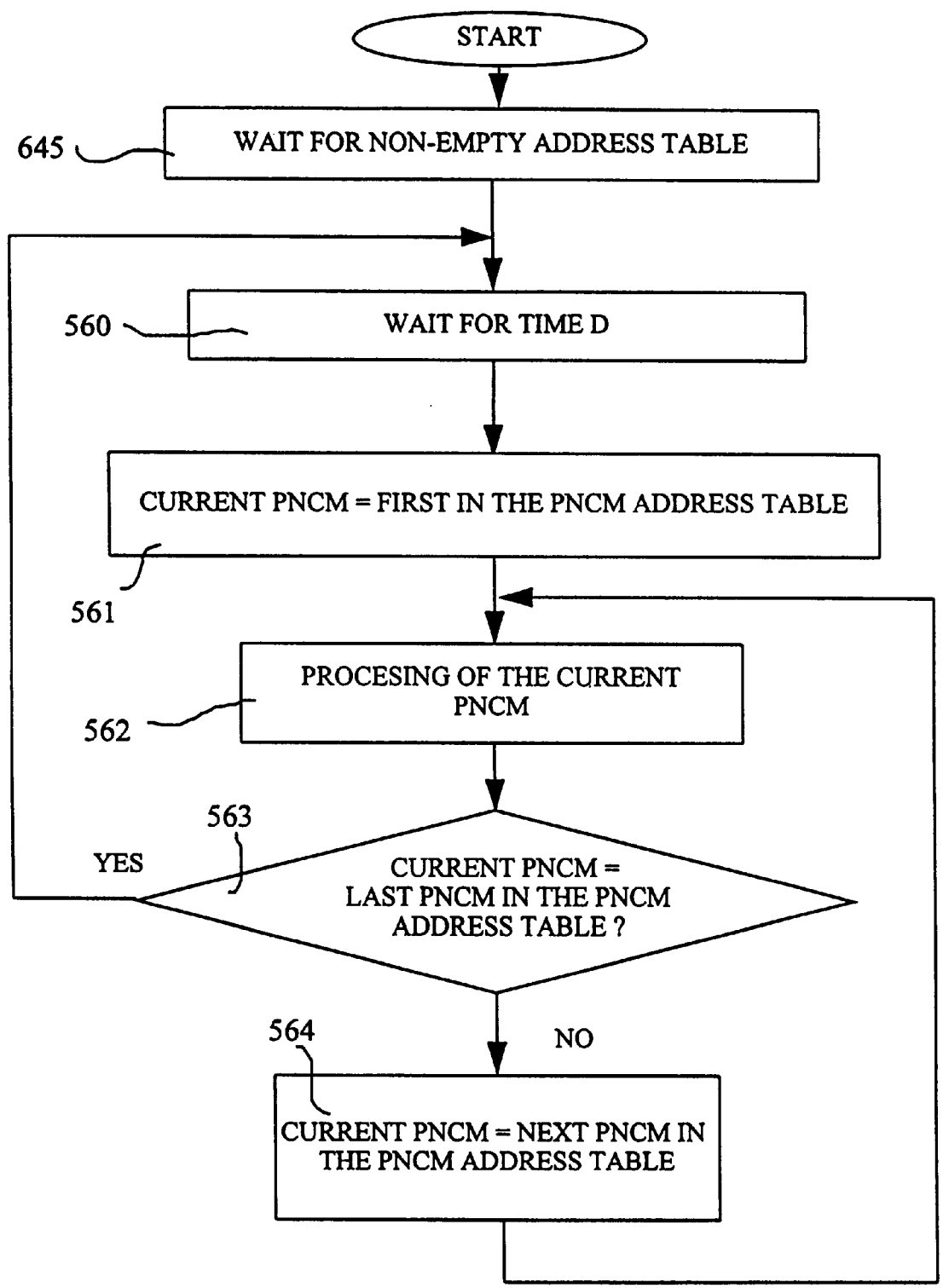
FIG. 20J is a flow diagram illustrating the functioning of the state controlling means included in the central transmission control means shown in FIG. 18A.

The flow diagram of the functioning of the state controlling means 461 (FIG. 18A) is described with regard to FIG. 20J. The state controller performs, just after start-up, an operation 645 in which it waits until the table 64 is not empty, and then enters a loop in which it first of all performs an operation 560 which consists of waiting until a given period, referred to as "D", has elapsed. In the example described here, the period D is equal to ten seconds. Then the operation 561 gives the name of "current" to the peripheral networked communications means whose address is the first in the address table 64. Then the operation 562 effects the processing of the current communication means, in accordance with the operating sequence described in FIG. 20E. Then a test 563 determines whether or not the current communication means is the one whose address is the last in the address table 64.

In the affirmative, it returns to the operation 560. In the negative, it takes, from the address table 64, the address which follows that of the so-called current peripheral means and performs the operation of calling "current" the communication means which has this new address.

According to the third priority management variant, the authorisation-to-send allocation means, here consisting of the authorisation-to-send message preparation means 601, no longer functions as presented conjointly in the flow diagrams in FIGS. 20, 20A, 20B, 20C, 20D and 20E, but according to the flow diagrams in FIGS. 20M, 20K, 20L, 20B, 20J and 20E. This third variant sends authorizations to send to the peripheral networked communication means which have "high active" as the priority level, so long as such exist, and then to the communication means whose priority level is higher than or equal to "normal active", and then to all the communication means.

According to this third priority management variant, after the operation 646 of waiting until the table 64 is not empty, which it performs directly after start-up, the authorisation-to-send message preparation device enters a loop in which it begins by performing the operation 520 by means of which a loop counter is set to the predetermined numerical value "M". Then the test 521 determines whether or not the number of the peripheral networked communication means whose address is, in the address table 64, given the "high active" priority level, is strictly greater than zero. If the result of the test 521 is positive, the operation 522 effects the processing of the peripheral networked communication means whose address is, in the address table 64, given the "high active" priority level in accordance with the sequence of operations and tests presented with regard to FIG. 20B. At the end of the operation 522, there is a return to the test 521.

If the result of the test 521 is negative, the operation 523 effects a decrementation of the loop counter, by a step of one unit. Then the operation 524 consists of the processing of the peripheral networked communication means whose address is, in the address table 64, given a "normal active" priority level, in accordance with the sequence of operations and tests presented with regard to FIG. 20K.

The first operation of processing of the peripheral means whose priority level is "normal active" is the operation 527 which consists of designating the first peripheral means shown by the address table 64 as the peripheral networked communication means. Then the test 528 determines whether or not, in the address table 64, the address of the current peripheral networked communication means is given the "high active" priority level. In the affirmative, the priority level given to the said address in the table 64 becomes "normal active" in the course of the operation 529.

If the result of the test 528 is negative, the test 532 determines whether or not the address of the current peripheral means is, in the address table 64, given a "normal active" priority level. In the affirmative, or at the end of the operation 529, the operation 530 prepares and posts the authorisation-to-send message which authorises solely the current peripheral networked communication means to transmit a frame in return for this authorisation-to-send message in the authorisation-to-send message mailbox.

It will be noted that, in the first priority management variant as in the example embodiment presented above, the authorisation-to-send allocation means, that is to say in this case the authorisation-to-send message preparation means 601, regularly effects the allocation, to each communication means and in particular to those whose priority level is the lowest, of an authorisation to send over the transmission medium, by means notably of the operations 554.

Then the operation 531 consists of awaiting the signal acknowledging the said authorisation-to-send message.

If the result of the test 532 is negative or when the operation 531 is completed, the test 533 determines whether or not the current peripheral means is the one whose address is the last in the address table 64. If the result is negative, the operation 534 gives the name "current" to the networked communication means whose address in the address table 64 follows that of the previous current peripheral means, and then the test 528 and the operations and tests which follow it are reiterated.

If the result of the test 533 is negative, the test 525 determines whether or not the loop counter is at a nil value. If the result of the test 525 is negative, there is a return to the test 521. If the result of the test 525 is positive, the operation 526 consists of the processing of the peripheral networked communication means whose address, in the address table 64, is given the "low active" priority level, in accordance with the sequence of operations and tests presented with regard to FIG. 20L.

Figure 20K:
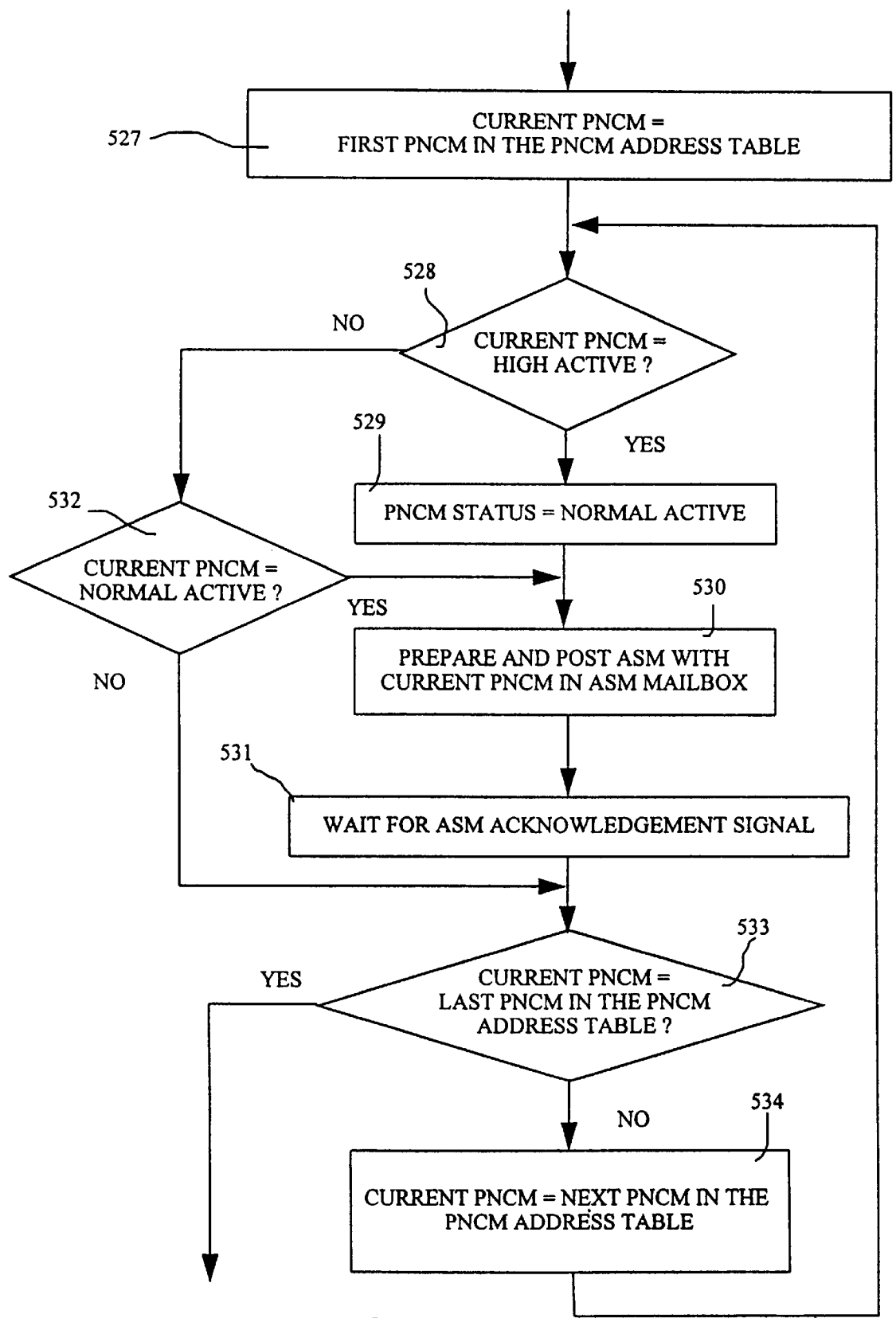
FIGS. 20K and 20L are flow diagrams showing a variant of the respective processing operation of normal active and low active peripheral means, illustrated respectively in FIG. 20C and FIG. 20D.
Figure 20L:
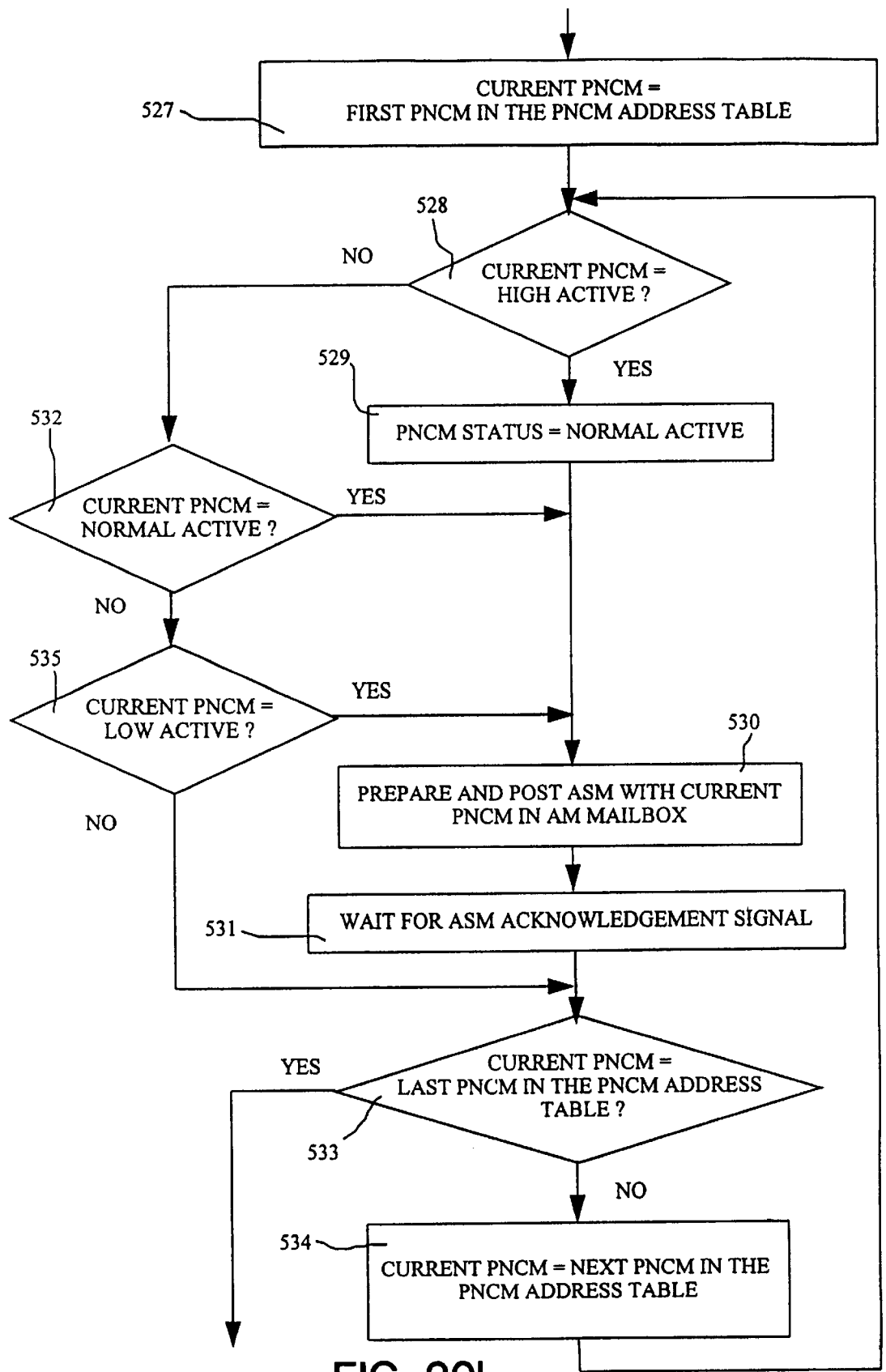

In this FIG. 20L there are depicted successively the operations presented with regard to FIG. 20K, to which there is added, when the result of the test 532 is negative, a test 535 which determines whether or not the current peripheral means is, in the address table 64, given a "low active" priority level. If the result of the test 535 is negative, the test 533 is performed, as well as the tests and operations which follow it. If the result of the test 535 is positive, the operation 530 is performed, along with the tests and operations which follow it as presented above.

Figure 20M:
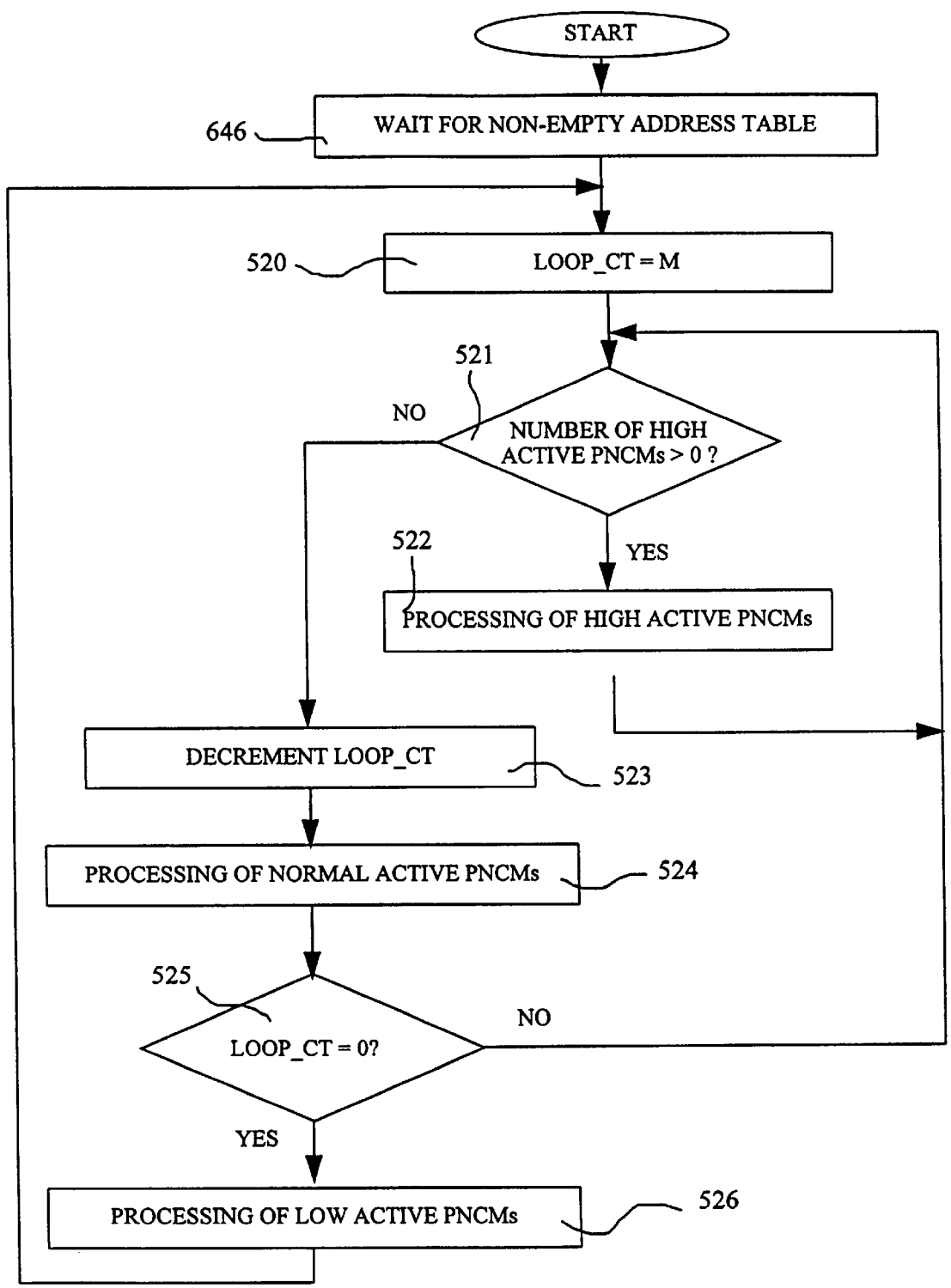
FIG. 20M is a flow diagram illustrating the functioning of a variant of the individual authorisation to-send message preparation means of FIG. 20I, according to a variant referred to as the "second priority management variant"

Finally, there is a return to the operation 520 in order to follow, in an endless loop, all the operations in FIG. 20M and, when the case presents itself, in FIG. 20K.

According to this third priority management variant, each time a peripheral means has an address which is given, in the address table 64, a "high active" priority level, a processing of this means is effected as soon as a single one of the two processings concerning, in the one case, all the peripheral means whose addresses are given, in the address table 64, the "normal active" priority level and, in the other case, all the peripheral means whose addresses are given, in the address table 64, the "low active" priority level.

Numerous other variants are possible according to circumstances.

In particular, in other variants, the radio transmission medium is replaced by an infrared transmission medium, by another wireless transmission medium, or else by a cable medium; and the uplink frames received by a peripheral means, instead of being ignored, give rise to a processing by the latter.

It should be stated that the invention is not limited to the examples described and depicted.

In particular, the invention is not limited solely to communication networks using a centralised polling communication protocol but, quite the contrary, extends to all converters for digital data transmission, whatever the transmission protocol used.

In particular, the invention applies on the one hand to non-centralised networks, that is to say those in which no communication means delivers an authorisation to send to-the other communication means, and on the other hand to networks without repetition, that is to say in which no communication means repeats the frames sent by the individual networked communication means.

In order to produce a network which is non-centralised and without repetition, experts can easily use the above description whilst:

not producing the central networked communication means;
using the parts of the description which concerns solely the
  central networked communication means as an explanation of or complement to the other parts concerning the peripheral networked communication means;
causing to correspond, in the description, for each peripheral networked communication means, to the name "downlink frame", a frame which reaches it by the shared transmission medium, and to the name "uplink frame" a frame which it transmits by the said medium.

As an example of modes of functioning of a network consisting solely of such peripheral networked communication means, a protocol managing access to the network is given below.

According to this example, this protocol functions by random selection of a waiting period before a transmission possibly in competition with other communication means, in accordance with methods known to experts, and:

by causing to be supplied, by the peripheral networked communication means, in each uplink frame, information enabling each of the other peripheral networked communication means to know whether it is authorised to transmit by the network. This information replaces the service messages sent by the central networked communication means of FIGS. 5 to 8;

by causing to be determined, by each peripheral networked communication means, whether and when it is authorised to send, in accordance with the information present in the downlink frames.

For the functioning of the peripheral networked communication means, other protocols controlling access to a shared transmission medium are also known, notably of the TDMA—Time Division Multiple Access—type, in which the stations can transmit only in a time slot allocated to them.

According to a second example of peripheral networked communication means functioning in a non-centralised network without repetition, each peripheral networked communication means has, in addition, a collision detection means. It will be recalled that these collisions consist of the simultaneous transmissions of two peripheral networked communication means.

With regard to the protocol governing access of the different stations to the transmission medium (MAC protocol), another example consists of the one provided for by IEEE recommendation 802.3, of the carrier sense multiple access/collision detection (CSMA/CD) type.

According to this protocol, each peripheral networked communication means is authorised to send when the shared transmission medium is available. When it seeks to transmit data, it listens on the transmission medium, and as soon as this medium becomes free it transmits a data frame whilst listening to see if a collision occurs. If the said peripheral networked communication means detects a collision during the transmission of the uplink frame, it stops transmission immediately, selects a random time and waits until this time has elapsed before once again sending the said uplink frame.

Numerous other variants of networks with or without repetition and with or without a central means are within the scope of experts, notably using their knowledge of cabled networks.

The invention consequently applies just as well to the conversion of transmissions in accordance with protocols known by the names of "TOKEN RING", "TOKEN BUS" and ETHERNET and vice versa.

Figure 84:
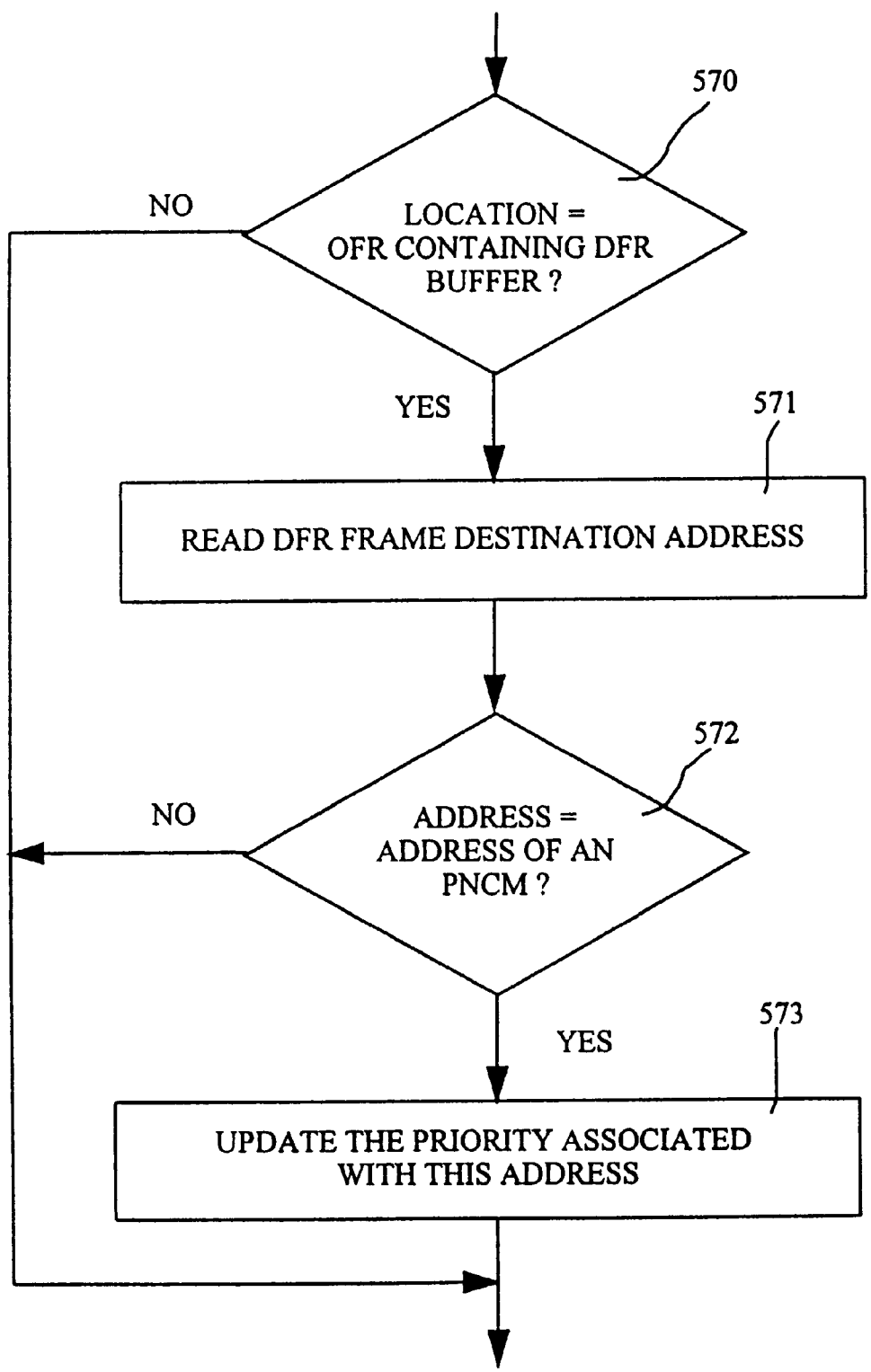
FIG. 84 illustrates a variant, referred to as the "fifth priority management variant", which is advantageously combined notably with any one of the flow diagrams presented in FIGS. 23, 31, 76 and 83.

According to the second priority management variant, a sequence of tests and operations illustrated in FIG. 84 unfolds immediately following a negative result of any one of the tests 138, 138', 384 and 384' and respectively before the operations 139, 139', 385 and 385'. This sequence includes first of all a test 570 which determines whether or not the location of the downlink frame which has just been transmitted contains a data frame. Where the result of the test is positive, an operation 571 consists of reading the destination address of the said data frame. Then a test 572 is performed which determines whether or not this destination address is an address of a peripheral communication means. In the affirmative, an operation 573 consists of updating the priority level associated with this address in the address table 64. In the event of a negative result of one of the two tests 570 and 572, or at the end of the operation 573, one of the operations 139, 139', 385 or 385' is performed respectively. Advantageously, according to this variant, the updating increases the priority level in question, within the limit of any maximum value possible. The corresponding communication means is thus allocated a new priority level as soon as it receives a data frame, which enables it to respond thereto more rapidly than with its previous priority level.

According to another variant, the Val_norm value varies with the communication means so that some work stations can transmit more rapidly and more often than others.

A variant will now be described in which no priority management is effected.

Figure 20N:
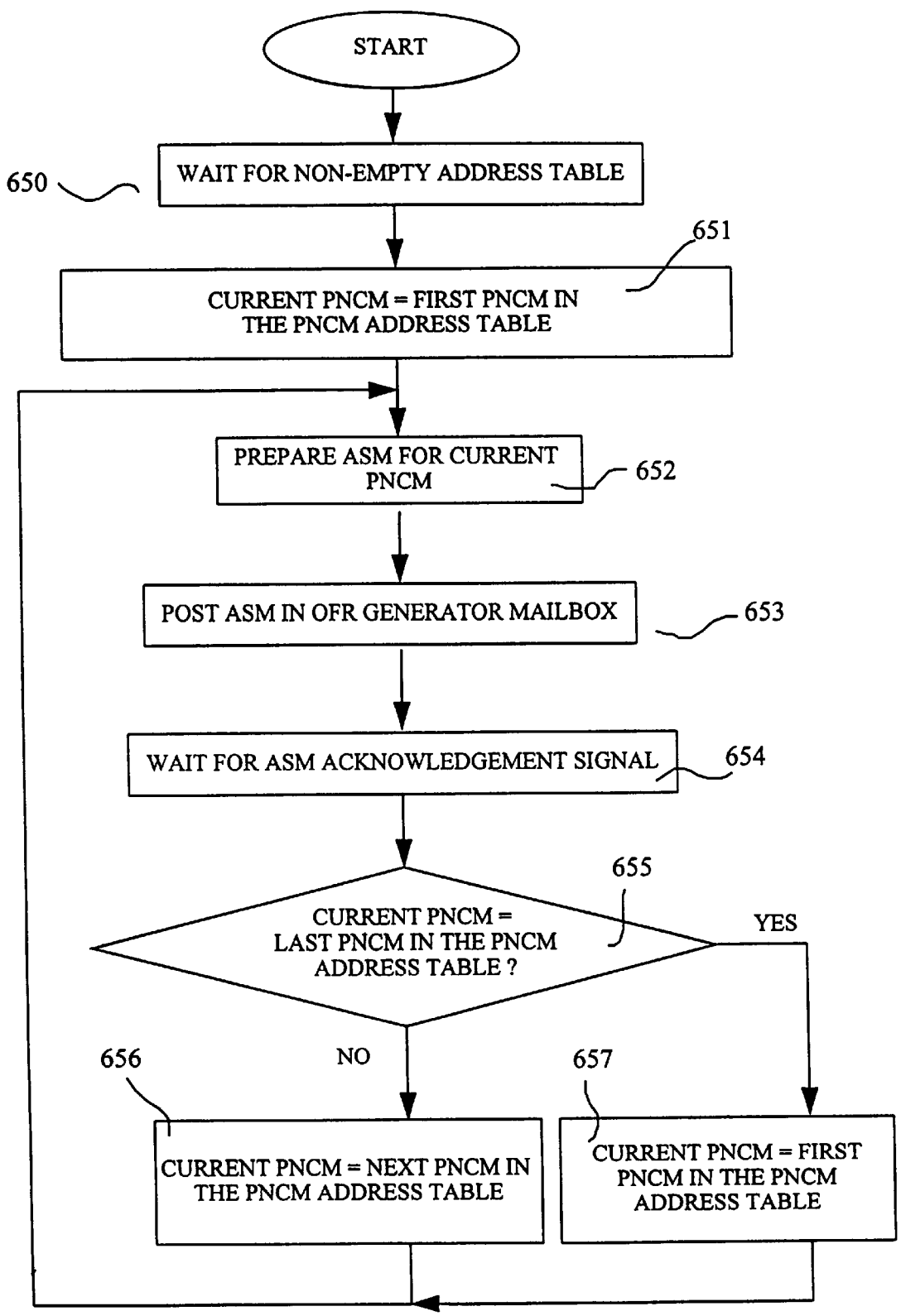
FIG. 20N is a flow diagram illustrating the functioning of another variant of the individual authorisation-to-send message preparation means included in the central transmission control means of FIG. 18A, in a so-called "no priority management" variant.

In this variant, the table 64 of addresses of peripheral means does not contain any priority level such as those illustrated in FIGS. 13A and 13B; the individual authorisation-to-send message preparation means 601 has the functioning illustrated by the flow diagram in FIG. 20N, the uplink frame analyser 460 or 462 has the functioning illustrated by the flow diagram in FIG. 20B; the operation 216B shown in FIG. 45 does not exist; the operation 222B in FIG. 46, instead of being the one shown in FIG. 46A or FIG. 46B, consists simply of taking a frame message nature which signifies that it is a question of a normal frame, whilst the operation 227B does not exist; and the operation shown in FIG. 84 does not exist.

As can be seen in FIG. 20N, in this variant without priority management, the preparation means 601 performs, directly after start-up, an operation 650 in which it waits until the table 64 is not empty.

When this event occurs, it performs an operation 651 in which it takes into account, as the current address, that of the peripheral means 24 which appears first in the table 64.

It then enters a loop in which it begins by performing an operation 652 in which it prepares an authorisation-to-send message with the current address, that is to say a message 31 (FIG. 8) in which the message nature information 37 indicates that it is a case of an authorisation-to-send message, and in which the address 38 is the current address.

The preparation means 601 then performs an operation 653 in which it posts the authorisation-to-send message which it has just prepared in the mailbox 97, and then goes to an operation 654 in which it waits until it receives, from the production means 95, a signal acknowledging an authorisation-to-send message.

When this event occurs, the preparation means 601 goes to a test operation 655, in which it determines whether or not the address of the current peripheral means is the last in the table 64.

In the negative, it performs an operation 656 in which it takes into account, as the current address, the following one the table 64, and in the affirmative it performs an operation 657 in which it takes into account, as the current address, the first one appearing in this table.

Once the operation 656 or 657 has been accomplished, the preparation means 601 returns to the start of the loop and will therefore perform iteratively, throughout its functioning, the operations 652 to 657.

In general terms, it can be seen that, in this variant, the authorisation-to-send messages are prepared simply by running through the table 64, in a circular rotation.

Figure 20P:
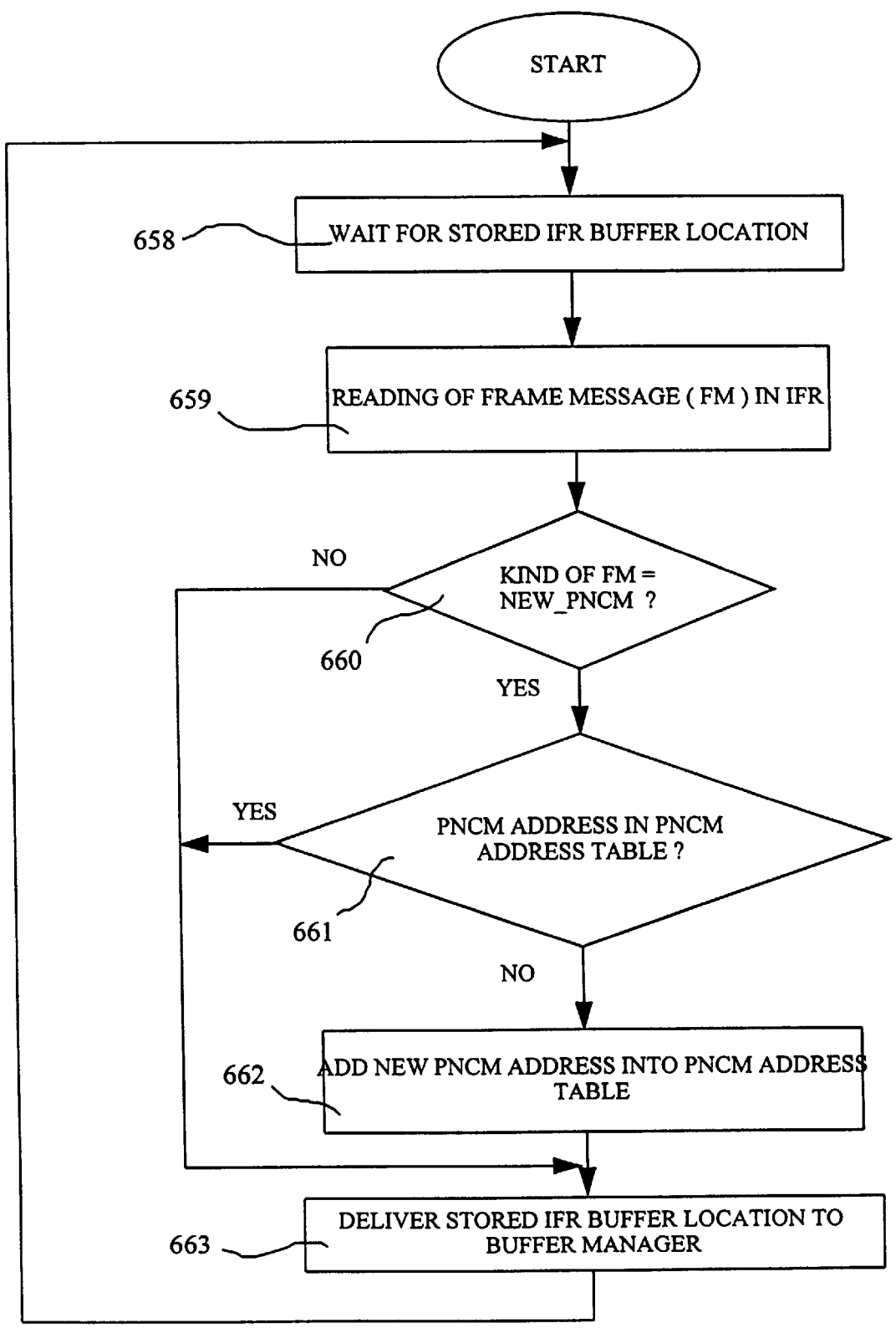
FIG. 20P is a flow diagram illustrating the functioning of another variant of the uplink frame analysing means, in the no priority management variant.

A description will now be given, with the aid of FIG. 20P, of the functioning of the analysing means 460 or 462, in this variant without priority management.

Directly after start-up, the analysing means performs an operation 658 in which it waits until it receives, from the sending/receiving means 74, a buffer location.

When this event occurs, the analysing means performs an operation 659 in which it reads, in this buffer, the frame message contained in the uplink frame which is stored therein, and then it performs a test 660 in which it determines whether this frame message is a request for insertion in the network 20.

In the affirmative, the means 460, for security reasons, performs a test 661 in which it determines whether or not the address included in this uplink frame is already included in the table 64.

In the negative, it performs the operation 662 of adding this address to the table 64.

Once the operation 662 is accomplished, or when the test 660 is negative, or when the test 661 is positive, the analysing means goes to the operation 663 in which it delivers to the management means 93 the buffer location which has just been delivered to it by the sending/receiving means 74, and then it returns to the start of the loop, that is to say, in the course of its functioning, it will iteratively perform the operations which have just been described.

It is noteworthy that the variants presented above are combined together when they are not incompatible and make it possible to implement a plurality of methods, devices and systems in accordance with the invention.

What is claimed is:

1. A method of sharing, by a plurality of digital communication means, a transmission medium of a network, including a broadcasting operation of broadcasting on the shared transmission medium, with co-ordination means, service messages indicating to each of the plurality of digital communication means whether or not it is authorized to send on the shared transmission medium, said method comprising:

a broadcast operation step of broadcasting authorization-to-send messages of a collective type indicating to each digital communication means of a group of at least one of the plurality of digital communication means that it is authorized to send on the shared transmission medium; and a determining step of determining, for each digital communication means of the group, when it attempts to send on the shared transmission medium and when it receives a collective-type authorization-to-send message authorizing each digital communication means of the group to which it belongs to send, whether or not it may immediately send after the broadcast operation step and the determining step for this collective-type authorization-to-send message, according to a result of random-type ballots carried out by each digital communication means.

2. A method according to claim 1, wherein said determining step includes carrying out random-type ballots when each digital communication means of the group attempts to send on the shared transmission medium and when it receives a collective-type authorization-to-send message authorizing the group to which it belongs to send, a result of which is one of two values, respectively favorable or unfavorable, and the result of carrying out random-type ballots operates to send in response to the collective-type authorization-to-send message when a ballot is favorable, and operates not to send when a ballot is unfavorable.

3. A method according to claim 2, wherein said determining step provides that the random-type ballot has a probability p of being favorable, where p is parametrizable for each digital communication means of the group.

4. A method according to claim 1, wherein said determining step includes carrying out a random-type ballot for each digital communication means of the group when it attempts to send, a result of which is an integer number n between 1 and a limit value N, then waiting before sending until having received n collective-type authorization-to-send message(s) authorizing each digital communication means of the group to which it belong to send.

5. A method according to claim 4, wherein said determining step provides that N is parametrizable for each digital communication means of the group.

6. A method according to claim 4, wherein n has a value equiprobable between 1 and N for each of the random-type ballots.

7. A method according to claim 1, wherein said broadcasting step includes broadcasting a collective-type authorization-to-send message to all unidentified digital communication means possibly connected to the shared transmission medium indicating that each of them is authorized to send on the shared transmission medium in response.

8. A method according to claim 7, wherein a transmission from an unidentified communication means in response to the collective-type authorization-to-send message includes address information for identifying the unidentified communication means.

9. A method according to claim 7, wherein in response to the transmission an acknowledgement procedure is initiated.

10. A method according to claim 9, wherein the acknowledgement procedure includes broadcasting an identification message incorporating the address information identifying the unidentified communication means.

11. A method according to claim 10, wherein the the acknowledgement procedure further includes:

using a timer on occasion of the transmission, waiting for a possible occurrence of an event relating to a successful completion of the acknowledgement procedure, and suspending the acknowledgement procedure when the timer expires without the event having occurred.

12. A method according to claim 11, wherein the event is constituted by reception of the identification message.

13. A method according to claim 11, wherein the unidentified communication means repeats the transmission that includes the address information for identifying it in response to another collective-type authorization-to-send message when the timer expires without the event having occurred.

14. A method according to claim 10, wherein the identification message is also an authorization-to-send message.

15. A method according to claim 1, wherein:

provision is made for a table representing the plurality of digital communication means each of which is assigned a priority level for access to the shared transmission medium representing its estimated requirement for transmission by means of the shared transmission medium, and the priority level of each of the plurality of digital communication means is updated, according to first predetermined rules.

16. A method according to claim 15, wherein the shared transmission medium is made available successively to each of the plurality of digital communication means in accordance with its priority level, according to second predetermined rules.

17. A method according to claim 16, wherein the second predetermined rules include making the shared transmission medium available regularly to each of the plurality of digital communication means.

18. A method according to claim 15, wherein each of the plurality of digital communication means associated with the network has an address that is specific to it, and the table representing the plurality of digital communication means includes the addresses of the plurality of digital communication means.

19. A method according to claim 15, wherein the table representing the plurality of digital communication means is stored in a memory of central communication means of the network, and the central communication means carries out updating of the priority levels of the table.

20. A method of transmitting data frames between a plurality of digital communication means, wherein the plurality of digital communication means shares a transmission medium according to claim 1, the method comprising the following operations:

A) providing:
   at least one of the plurality of digital communication means as peripheral digital communication means, each of the peripheral digital communication means for transmitting and/or receiving the data frames by means of a shared transmission medium, and
   central digital communication means for communicating with each of the peripheral digital communication means by means of the shared transmission medium, by receiving uplink frames each coming from a peripheral digital communication means and by broadcasting downlink frames to each of the peripheral digital communication means;

B) with the central digital communication means, retransmitting or not retransmitting, according to a result of carrying out random-type ballots, each data frame appearing in the uplink frames reaching it, to a destination digital communication means for that data frame;

C) with the central digital communication means, including in each down link frame:
   a service message for activating a protocol for controlling access to the shared transmission medium, and
   a data frame if, according to a preset rule, there is one to be included in a downlink frame in order to retransmit it to a peripheral digital communication means, each downlink frame thus systematically including a service message and possibly a data frame; and J) with the central digital communication means and with, where appropriate, each of the peripheral digital communication means, sharing the shared transmission medium.

21. A method according to claim 20, wherein at least one of the plurality of digital communication means has an address and is connected to a converter to form a peripheral digital communication means, and further comprising the following operations:

D) with the converter, capturing the address of the at least one digital communication means to which it is connected; and E) using the address thus captured for an operation specific to the converter in the network, in order to transmit over the network, with the address, information from the at least one digital communication means to which it is connected, and in order to be identified on the network as a destination for information.

22. A method for transmitting digital data between terminals each intended to co-operate with an individual communication means assigned with an address that is specific to it, the individual communication means belonging to a network, wherein each of the terminals is adapted:
   to deliver, in a predetermined manner, to the individual networked communication means, sequences of user data each accompanied by a destination address corresponding to an address specific to the individual networked communication means of the terminal for which a sequence of user data it accompanies is intended, and/or
   to allow the sequences of user data to be delivered, in a predetermined manner, by the individual networked communication means;

each of a plurality of individual networked communication means being intended to send or receive, over a transmission medium, bursts each transmitting a stream of bits in a manner allowing it to be identified from a first to a last bit, and being adapted:
   for each sequence of user data accompanied by a destination address which its terminal has delivered to it, to prepare a data frame including the sequence of data and the destination address that accompanies it arranged according to a predetermined format;
   for each data frame prepared, to send over the transmission medium a burst transmitting a stream of bits including the data frame; and
   for each burst that is received from the transmission medium, to determine whether a data frame appears in the stream of bits transmitted by the burst, and if a data frame is present in it, to isolate in the burst, in accordance with the predetermined format, the destination address that appears in it, to compare whether the isolated destination address corresponds to that which is specific to the data frame, and if there is correspondence, to isolate in the data frame the sequence of data that appears there, and to deliver the isolated sequence to its terminal, said method including the step of transmitting data frames between the individual networked communication means carried out in accordance with the method of claim 20.

23. A method according to claim 1, wherein the authorization-to-send message authorizes the digital communication means to immediately send without performing a carrier sense.

24. A method of identifying a communication converter connected to a shared transmission medium and to communication means, from which it receives information in order to transmit it over the shared transmission medium and to which it delivers information reaching it from the shared transmission medium, wherein the communication means has an address, the shared transmission medium is part of a network and is shared by a plurality of digital communication means and is a transmission medium in which a broadcasting operation that broadcasts on the shared transmission medium, with co-ordination means, service messages indicating to each of the plurality of digital communication means whether or not it is authorized to send on the shared transmission medium, the broadcasting operation broadcasts authorization-to-send messages of a collective type indicating to each digital communication means of a group of at least one of the plurality of digital communication means that it is authorized to send on the shared transmission medium, and a determining operation determines, for each of the digital communication means of the group when it attempts to send on the shared transmission medium and when it receives a collective authorization-to-send message authorizing each digital communication means of the group to which it belongs to send, whether or not it may immediately send after the broadcasting operation and the determining operation for the collective authorization-to-send message, according to a result of random-type ballots carried out by each digital communication means, the method comprising the step of:

capturing the address of the communication means using the communication converter, wherein the communication converter uses the address for its own operation with the network in order to transmit over the network, using the address, information from communication means to which it is connected, and in order to be identified on the network as a destination for information.

25. A method according to claim 24, wherein the authorization-to-send message authorizes the digital communication means to immediately send without performing a carrier sense.

26. A co-ordination apparatus for sharing a transmission medium between a plurality of digital communication means, the apparatus comprising:

broadcasting means adapted to broadcast on the shared transmission medium service messages indicating to each of the plurality of digital communication means whether or not it is authorized to send on the shared transmission medium, wherein said broadcasting means is also adapted to broadcast authorization-to-send messages of a collective type indicating to each digital communication means of a group of at least one of the plurality of digital communication means that it is authorized to immediately send on the shared transmission medium after broadcasting operation and a determining operation for determining, according to a result of random-type ballots carried out by each digital communication means, whether or not the communication means may send.

27. An apparatus according to claim 26, wherein said broadcasting means is also adapted to broadcast collective-type authorization-to-send messages to all unidentified digital communication means possibly connected to the shared transmission medium, indicating to them that each of them is authorized to send on the shared transmission medium in response.

28. An apparatus according to claim 27, further comprising acknowledgement means for controlling an acknowledgement procedure.

29. An apparatus according to claim 28, further comprising means for detecting identification information incorporated in a message transmitted by communication means in response to the collective-type authorization-to-send message, wherein said acknowledgement means is adapted, in conjunction with said broadcasting means and said detection means, to order, after detection of the identification information, a broadcast of an identification message incorporating the identification information.

30. An apparatus according to claim 28, wherein said broadcasting means is adapted to broadcast the identification message as an authorization-to-send message.

31. An apparatus according to claim 26, further comprising:

a memory for storing a table representing the plurality of digital communication means sharing the transmission medium, each of the plurality of digital communication means being assigned an access priority level for access to the shared transmission medium; and means for updating the access priority levels according to an estimated requirement for transmission on the shared transmission medium by a digital communication means under consideration.

32. An apparatus according to claim 31, further comprising allocation means for allocating, to each of the plurality of digital communication means, authorization to send on the shared transmission medium according to its access priority level.

33. An apparatus according to claim 32, wherein said allocation means is adapted to carry out regular allocation of an authorization to send by means of the shared transmission medium to each of the plurality of digital communication means.

34. An apparatus according to claim 31, wherein each of the plurality of digital communication means belonging to a network has an address that is specific to it, and the table representing the plurality of digital communication means includes the addresses of the digital communication means belonging to the network.

35. A controller apparatus for controlling communication means to which it is connected by connection means, and to serve as a converter between the communication means and a shared transmission medium, the controller apparatus being capable of working in co-operation with a co-ordination apparatus according to claim 26, said controller apparatus comprising:

detecting means for detecting reception of collective authorization-to-send messages;

decision means for determining, according to a result of carrying out random-type ballots, whether or not the communication means may immediately send after a detection of a collective-type authorization-to-send message and the determining operation; and a memory for storing an address relating to the communication means, the address being used for implementation of a protocol for controlling access to the transmission medium.

36. A device according to claim 35, wherein the authorization-to-send message authorizes the digital communication means to immediately send without performing a carrier sense.

37. A device according to claim 26, wherein the authorization-to-send message authorizes the digital communication means to immediately send without performing a carries sense.

38. A digital communication apparatus suitable for use as central digital communication means, the apparatus comprising:

means for communicating with at least one peripheral digital communication device by means of a shared transmission medium, by receiving uplink frames each coming from a peripheral digital communication device and by broadcasting downlink frames to each peripheral digital communication device, adapted so that the uplink and downlink frames include data frames;

means for retransmitting or not retransmitting, according to a first preset rule, each data frame appearing in the uplink frames reaching it to a destination digital communication device for that data frame; and broadcasting means for including in each downlink frame:
a service message for activating a protocol for controlling access to the shared transmission medium, the service message indicating to each peripheral communication device whether or not it is authorized to send on the shared transmission medium as soon as the shared transmission medium is free for sending after broadcast of the service message; and a data frame if, according to a second preset rule, there is one to be included in the downlink frame in order to retransmit it to a peripheral digital communication device, each downlink frame thus systematically including a service message and possibly a data frame, wherein said broadcasting means is adapted to broadcast authorization-to-send messages of a collective type indicating to a group of at least one peripheral digital communication device that each is authorized to send on the shared transmission medium in response.

39. A device for controlling communication means, comprising:

detecting means for detecting reception of collective authorization-to-send messages; and decision means for determining, according to a result of random-type ballots carried out by the communication means, whether or not the communication means may immediately send after a detection of a collective-type authorization-to-send message and the determining operation.

40. A device according to claim 39, wherein said decision means includes means for a random-type ballot, said decision means being capable of using a result of the ballot to authorize or not to authorize the sending.

41. A device according to claim 39, wherein said decision means is adapted:

to carry out, prior to an authorization to send, a random ballot, a result of which is one of two values respectively favorable and unfavorable, and to give the authorization to send only when the ballot is favorable.

42. A device according to claim 41, wherein the random ballot has a probability p of being favorable, and said decision means includes parametrization means capable of co-operating with balloting means to parametrize the probability p.

43. A device according to claim 39, wherein said decision means includes a counter, carries out, prior to an authorization to send, a random ballot, a result of which is an integer number n within a limit value N, cooperates with the counter in order to count the collective authorization-to-send messages detected by said detection means, and gives the authorization to send after a count of n detections of collective authorization-to-send messages.

44. A device according to claim 43, wherein said decision means includes parametrization means capable of co-operating with balloting means in order to parametrize the limit value N.

45. A device according to claim 44, wherein the balloting means is adapted to deliver the number n equiprobably between 1 and N.

46. A device according to claim 39, further comprising incorporation means adapted, in conjunction with co-operation means, to carry out incorporation of information capable of identifying the co-operation means in any transmission from the communication means in response to the collective-type authorization-to-send message.

47. A device according to claim 46, further comprising, for implementation of an acknowledgement procedure in response to the transmission:

timing means; and means for detecting an event relating to a favorable end of the acknowledgement procedure, and wherein said decision means is adapted:

to order, in conjunction with said timing means, use of a timer, on occasion of the transmission in response to the collective-type authorization-to-send message, and to order, in conjunction with said means for detecting an event relating to the favorable end of the acknowledgement procedure, suspension of the acknowledgement procedure, on an assumption that the timer has expired without the event having occurred.

48. A device according to claim 47, wherein said means for detecting an event is adapted to detect a reception of an identification message incorporating the information previously incorporated in the transmission in response to the collective-type authorization-to-send message.

49. A device according to claim 39, wherein the authorization-to-send message authorizes the digital communication means to immediately send without performing a carrier sense.

50. A communication apparatus suitable for implementing, as peripheral communication means of a network, a method of transmitting data frames between digital communication means, said communication apparatus comprising at least one writing means for incorporating in a transmission that it sends on a shared transmission medium of the network information representing a transmission requirement of the apparatus, wherein the method of transmitting implemented by the apparatus includes the steps of:
A) providing:
at least one digital communication means as peripheral digital communication means, each of the peripheral digital communication means for transmitting and/or receiving the data frames by means of the shared transmission medium, and
central digital communication means for communicating with each of the peripheral digital communication means by means of the shared transmission medium, by receiving uplink frames each coming from one of the peripheral digital communication means and by broadcasting downlink frames to each of the peripheral digital communication means;
B) with the central digital communication means, retransmitting or not retransmitting, according to a first preset rule, each data frame appearing in the uplink frames reaching it to a destination digital communication means for the data frame;
C) with the central digital communication means, in each downlink frame, including:
a service message for activating a protocol for controlling access to the shared transmission medium, and
a data frame if, according to a second preset rule, there is one to be included in the downlink frame in order to retransmit it to peripheral digital communication means,
wherein each downlink frame thus systematically includes a service message and possibly a data frame;
J) with the central digital communication means and with, where appropriate, each of the peripheral digital communication means, sharing the transmission medium in accordance with a medium-sharing method, and the medium-sharing method being a method of sharing the shared transmission medium of the network by a plurality of digital communication means, including an operation K) of broadcasting on the shared transmission medium, with co-ordination means, service messages indicating to each of the plurality of digital communication means whether or not it is authorized to send on the shared transmission medium when the shared transmission medium is free for sending after broadcast of a a service message, wherein: the operation K) includes broadcasting of authorization-to-send messages of a collective type indicating to a group of at least one of the digital communication means that each is authorized to send on the shared transmission medium in response, and the medium-sharing method also includes an operation L), for each digital communication means when it attempts to send on the shared transmission medium, of determining, each time it then receives a collective authorization-to-send message authorizing each digital communication means of the group of which it belongs to send, whether or not it may send in response to the collective authorization-to-send message, according to a preset rule.

51. An apparatus according to claim 50, further comprising a counter adapted to determine a number of transmissions which may be transmitted by a digital communication means immediately following the transmission with the information, the number constituting at least in part the information.

52. A communication apparatus suitable for use as peripheral digital communication means in implementing a method of sharing a transmission medium by a plurality of digital communication means, said communication apparatus intended to control at least on of the plurality of digital communication means to which it is connected by connection means, and to serve as a converter between the digital communication means to which it is connected and the shared transmission medium, said communication apparatus comprising:

communication means for communicating with a central digital communication device by means of the shared transmission medium, by transmission of uplink frames to the central digital communication device and by reception of downlink frames from the central digital communication device, adapted so that the uplink and downlink frames include data frames;

means for extracting from each downlink frame reaching it:
a service message for activating a protocol for controlling access to the shared transmission medium, and
a data frame, if there is one included in the downlink frame, wherein each downlink frame systematically includes the service message and possibly the data frame;

means for detecting reception of collective authorization-to-send messages; and decision means adapted, in conjunction with said means for detecting reception of collective authorization-to-send messages to determine, according to a preset rule, whether or not the communication means for communicating with the central digital communication device, associated with a control device, may send following a detection of a collective-type authorization-to-send message and in response to the collective-type authorization-to-send message;

where appropriate to authorize such sending, means for including in the uplink frames which it transmits, data frames intended for a digital communication device other than the central digital communication device; and a memory for storing an address relating to the at least one of the plurality of digital communication means, the address being used to implement a protocol for controlling access to the shared transmission medium, wherein the method of sharing includes an operation K) of broadcasting on the shared transmission medium of the network, with co-ordination means, service messages indicating to each of the plurality of digital communication means whether or not it is authorized to send on the shared transmission medium in response when the shared transmission medium is free for sending after broadcast of a service message, the operation K) including broadcasting of authorization-to-send messages of a collective type indicating to a group of at least one of the plurality of digital communication means that each is authorized to send on the shared transmission medium in response, and the method of sharing also including an operation L) of determining, with each of the plurality of digital communication means when it attempts to send on the shared transmission medium, each time it then receives a collective authorization-to-send message authorizing each digital communication means of a group to send, whether or not it may send in response to the collective authorization-to-send message, according to a preset rule.

53. A communication apparatus suitable for use as a peripheral digital communication device in implementing a method of sharing a transmission medium by a plurality of digital communication means, said communication apparatus intended to control at least one of the plurality of digital communication means to which it is connected by connection means, and to serve as a converter between the digital communication means to which it is connected and the shared transmission medium, said communication apparatus comprising:

means for communicating with a central digital communication device by means of the shared transmission medium, by transmission of uplink frames to the central digital communication device and by reception of downlink frames from the central digital communication device, adapted so that the uplink and downlink frames include data frames;

means for extracting from each downlink frame reaching it:
a service message for activating a protocol for controlling access to the shared transmission medium, and
a data frame, if there is one included in the downlink frame, wherein each downlink frame systematically includes the service message and possibly the data frame;

means for detecting reception of collective authorization-to-send messages;

decision means adapted, in conjunction with the means for detecting reception of collective authorization-to-send messages, to determine, according to a preset rule, whether or not the means for communicating with a central digital communication device, associated with a control device, may send following a detection of a collective-type authorization-to-send message, and in response to the collective-type authorization-to-send message;

where appropriate to authorize such sending, means for including in the uplink frames which it transmits, data frames intended for a digital communication device other than the central digital communication device;

writing means adapted to incorporate in a transmission that it sends on the shared transmission medium, information representing its transmission requirement; and a memory for storing an address relating to the at least one digital communication means, the address being used for implementing a protocol for controlling access to the shared transmission medium, wherein the method includes an operation K) of broadcasting on the shared transmission medium, with co-ordination means, service messages indicating to each of the plurality of digital communication means whether or not it is authorized to send on the shared transmission medium in response when the shared transmission medium is free for sending after broadcast of a service message, wherein the operation K) includes broadcasting of authorization-to-send messages of a collective type indicating to a group of at least one of the plurality of digital communication means that each is authorized to send on the shared transmission medium in response, and the method also includes an operation L) of determining, with each of the digital communication means, when it attempts to send on the shared transmission medium, each time it then receives a collective authorization-to-send message authorizing each of the digital communication means of the group of which it belongs to send, whether or not it may send in response to the collective authorization-to-send message, according to a preset rule.

* * * * *